(12) United States Patent
Pelavin et al.

(10) Patent No.: US 6,393,486 B1
(45) Date of Patent: *May 21, 2002

(54) SYSTEM AND METHOD USING LEVEL THREE PROTOCOL INFORMATION FOR NETWORK CENTRIC PROBLEM ANALYSIS AND TOPOLOGY CONSTRUCTION OF ACTUAL OR PLANNED ROUTED NETWORK

(75) Inventors: Richard N. Pelavin, San Francisco; James G. McGuire, Daly City; Herbert S. Madan, Sausalito, all of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,767

(22) Filed: Oct. 28, 1999

Related U.S. Application Data

(60) Division of application No. 08/668,639, filed on Jun. 21, 1996, now abandoned, which is a continuation-in-part of application No. 08/493,984, filed on Jun. 23, 1995, now abandoned.

(51) Int. Cl.[7] ............................................. G06F 15/173
(52) U.S. Cl. ........................ 709/238; 709/244; 709/242
(58) Field of Search ........................... 714/10; 370/392; 709/223, 240, 220, 221, 222, 228, 238, 244, 242

(56) References Cited

U.S. PATENT DOCUMENTS

| | | |
|---|---|---|
| 5,251,205 A | 10/1993 | Callon et al. |
| 5,301,303 A | 4/1994 | Abraham et al. |
| 5,317,568 A | 5/1994 | Bixby et al. |
| 5,351,237 A | 9/1994 | Shinohara et al. |
| 5,414,812 A | 5/1995 | Filip et al. |
| 5,434,863 A | 7/1995 | Onishi et al. |
| 5,485,455 A | 1/1996 | Dobbins et al. |

(List continued on next page.)

FOREIGN PATENT DOCUMENTS

| | | |
|---|---|---|
| GB | 2 206 713 A | 1/1993 |
| WO | WO 95/06989 | 3/1995 |
| WO | PCT/US96/10873 | 2/1997 |

OTHER PUBLICATIONS

Tsuchida et al., "Structural Representation of Management and Control Information in Broadband Networks," *Discovering A New World of Communications*, Chicago, Jun. 14–18, 1992, Institute of Electrical and Electronics Engineers, pp. 1019–1024 (1992).

Van Norman, Harrel J., "WAN Design Tools: The New Generation," *Data Communications International*, No. 13, New York, pp. 105–112 (Oct. 1990).

*Primary Examiner*—Le Hien Luu
(74) *Attorney, Agent, or Firm*—Hickman Palermo Truong & Becker LLP

(57) ABSTRACT

A method is provided for managing a computer network includes the step of providing respective router configuration information in executable form; producing respective Structured Router Objects (SROs) that are respectively associated with respective router configuration information and that respectively organize associated information in executable form in respective structures in electronic memory; and producing respective Single Protocol Topology (SPT) objects in electronic memory, each respectively associated with a different respective single protocol and each respectively interrelating SROs associated with the same respective single protocol.

34 Claims, 103 Drawing Sheets

U.S. PATENT DOCUMENTS

| | | |
|---|---|---|
| 5,491,690 A | 2/1996 | Alfonsi et al. |
| 5,509,123 A | 4/1996 | Dobbins et al. |
| 5,513,171 A | 4/1996 | Ludwiczak et al. |
| 5,541,911 A | 7/1996 | Nilakantan et al. |
| 5,588,119 A * | 12/1996 | Vincent et al. ............ 709/223 |
| 5,835,696 A * | 11/1998 | Hess ........................... 714/10 |
| 5,845,091 A * | 12/1998 | Dunne et al. ............... 709/240 |
| 5,856,974 A * | 1/1999 | Gervais et al. ............ 370/392 |

* cited by examiner

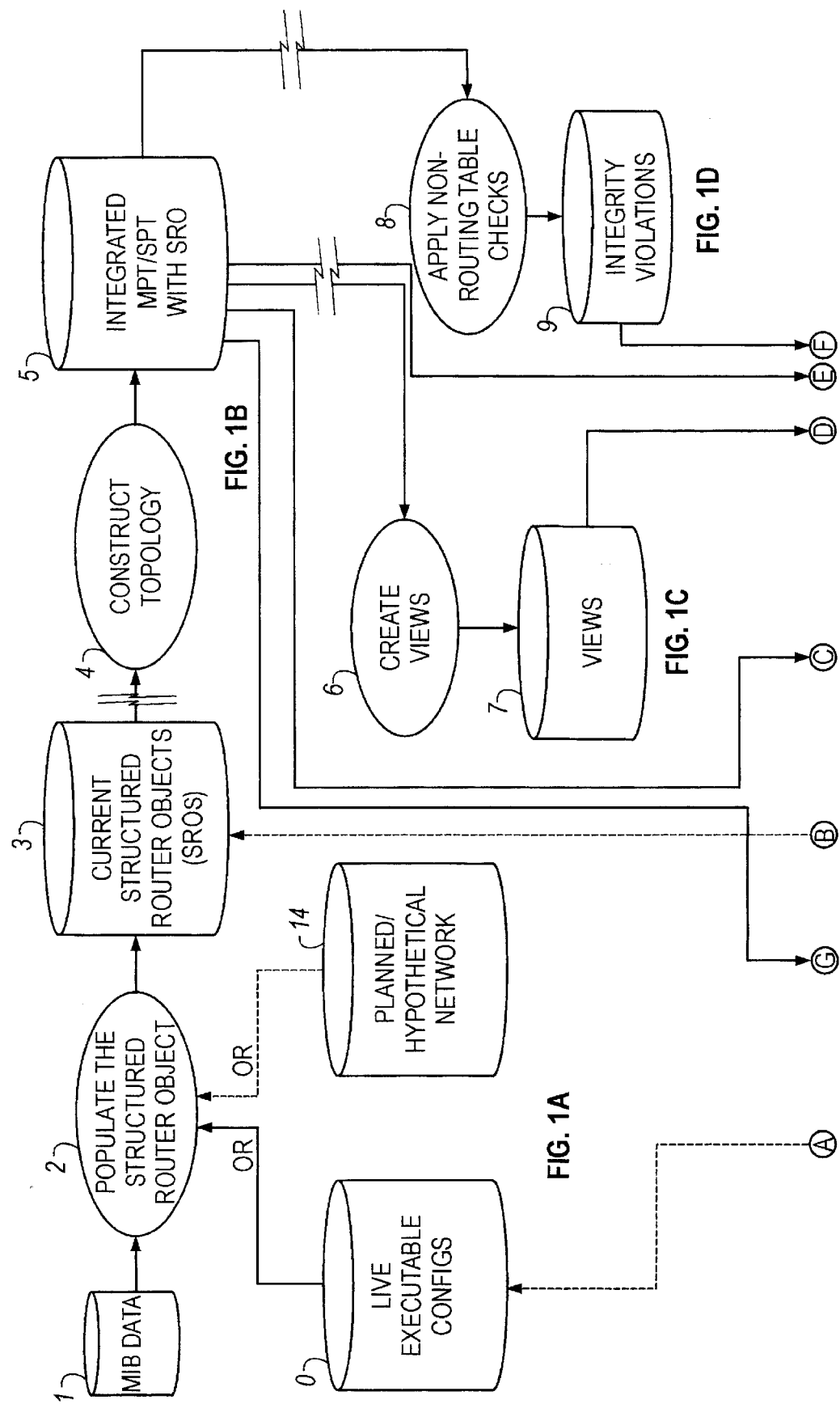

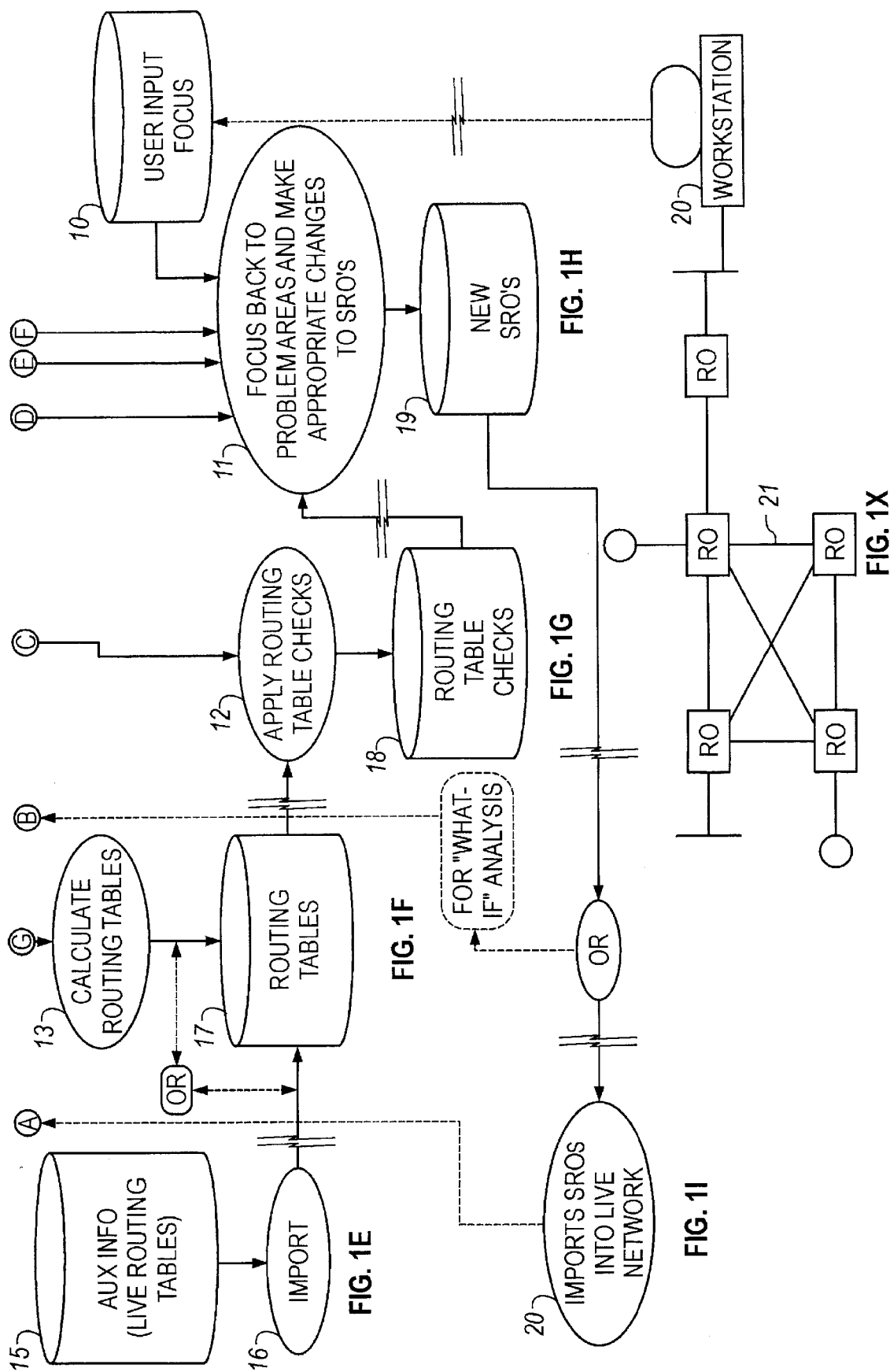

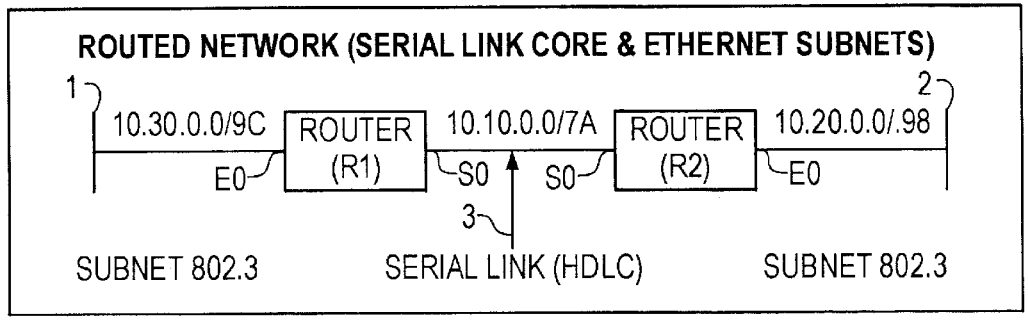

FIG. 5

ROUTER R1:

```
VERSION 10.0
!
HOSTNAME R1
!
NOVELL ROUTING 0000.0C08.94DD
!
INTERFACE ETHERNET0
IP ADDRESS 10.30.7.2 255.255.0.0
IPX NETWORK 9C
!
INTERFACE SERIAL0
IP ADDRESS 10.10.4.1 255.255.0.0
IPX NETWORK 7A
BANDWIDTH 1000
!
ROUTER IGRP 109
NETWORK 10.0.0.0
!
```

ROUTER R2:

```
VERSION 10.0
!
HOSTNAME R2
!
NOVELL ROUTING 0000.0C04.3A3E
!
INTERFACE ETHERNET0
IP ADDRESS 10.20.5.2 255.255.0.0
IPX NETWORK 98
!
INTERFACE SERIAL0
IP ADDRESS 10.10.4.2 255.255.0.0
IPX NETWORK 7A
!
ROUTER IGRP 109
NETWORK 10.0.0.0
!
! STATIC ROUTE DEFINITION
IP 70.70.3.0 255.255.0.0 199.37.28.3
```

FIG. 6A   FIG. 6B

| OBJECT TYPE: SPT |
|---|
| PROTOCOL: IP |
| CONNS: [EMPTY] |
FIG. 8A
| OBJECT TYPE: SPT |
|---|
| PROTOCOL: IP |
| CONNS: |
| OBJECT TYPE: CONN[1] |
|---|
| SUBNET: 10.30.0.0 |
| POINTERS: [EMPTY] |
FIG. 8B
| OBJECT TYPE: SPT |
|---|
| PROTOCOL: IP |
| CONNS: |
| OBJECT TYPE: CONN[1] |
|---|
| SUBNET: 10.30.0.0 |
| POINTERS: |
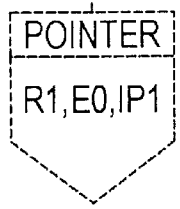
FIG. 8C
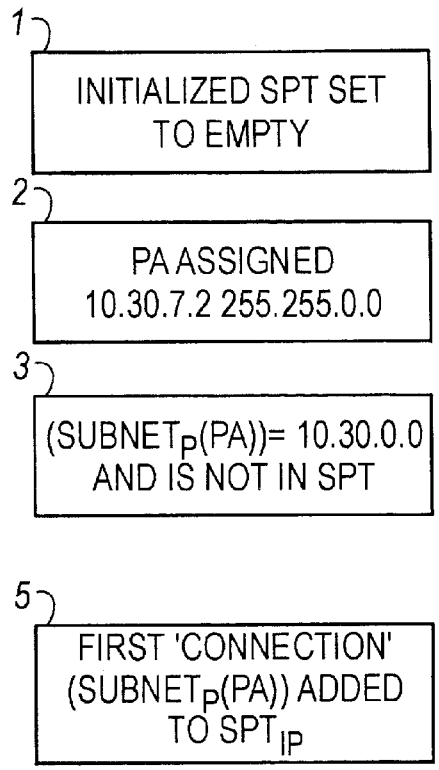
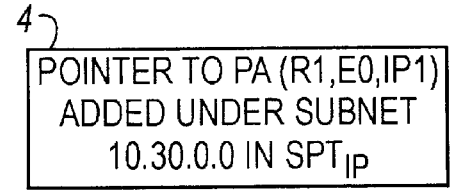

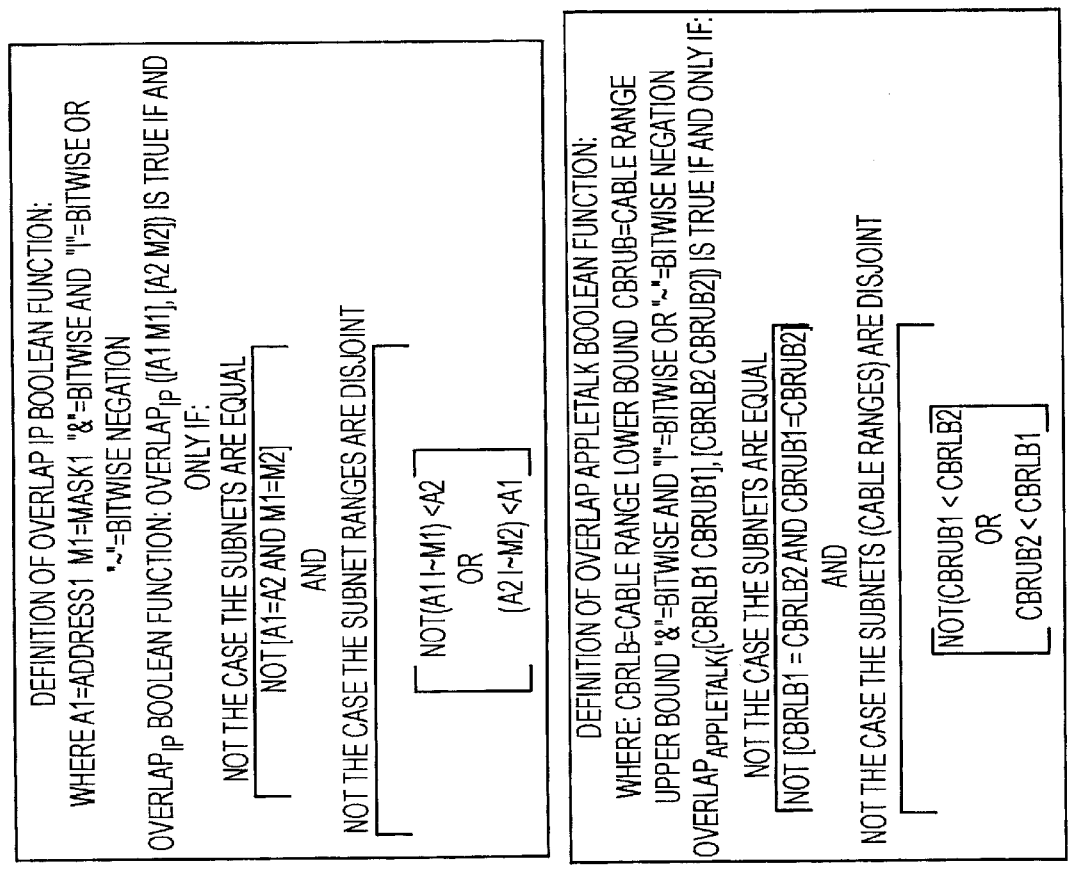
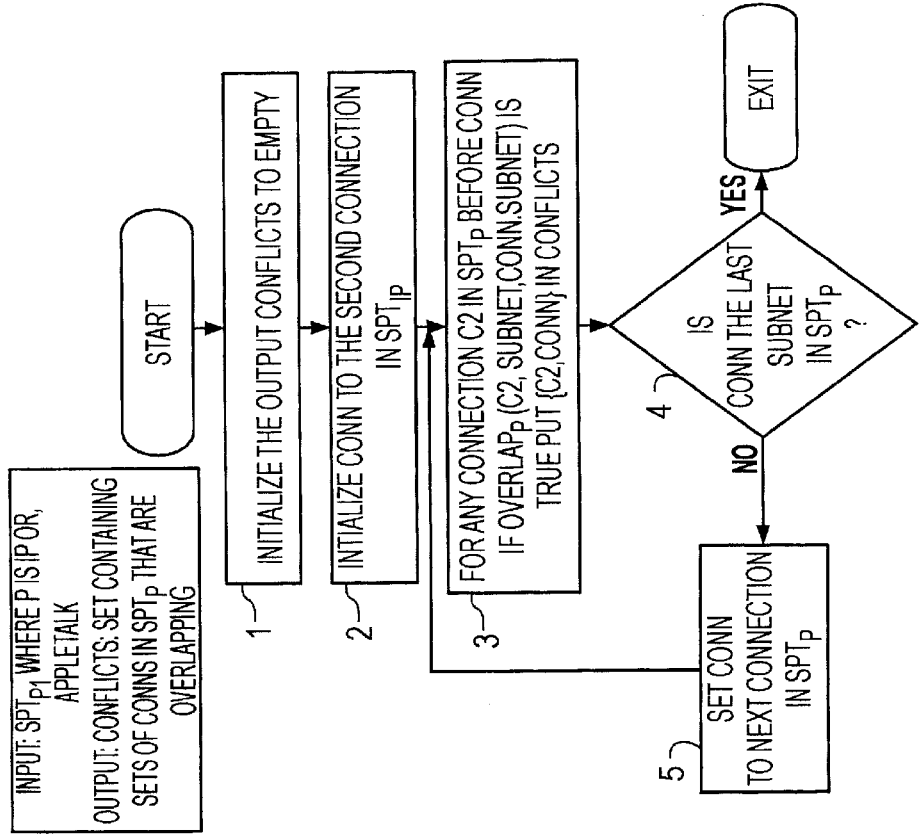
FIG. 10

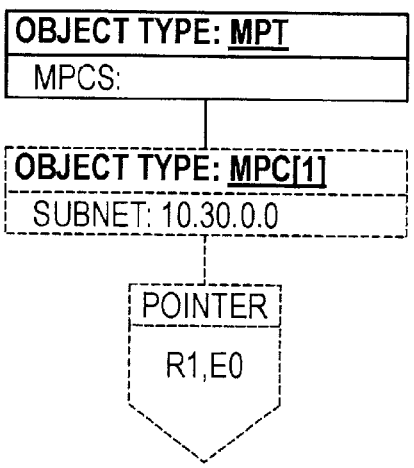
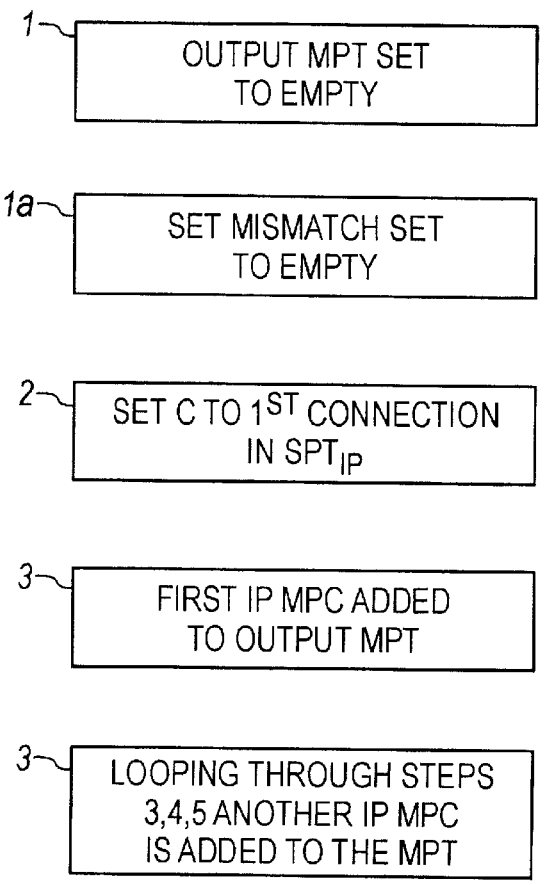
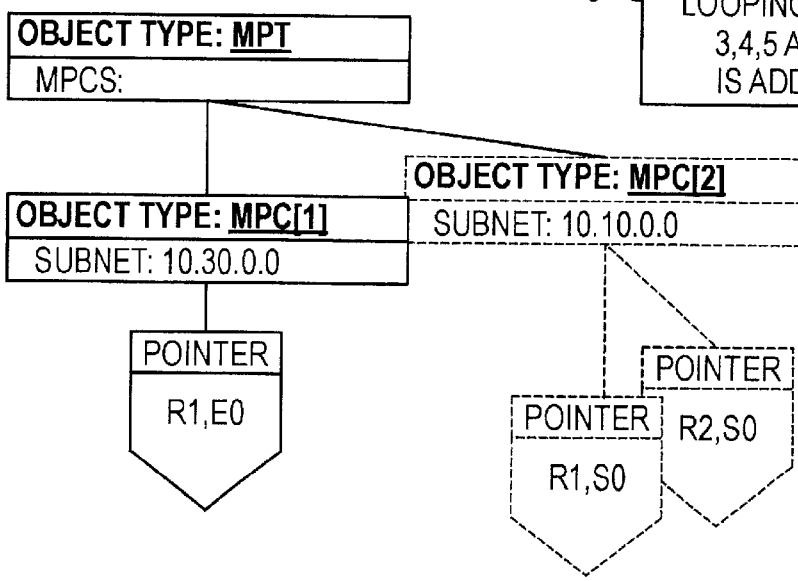

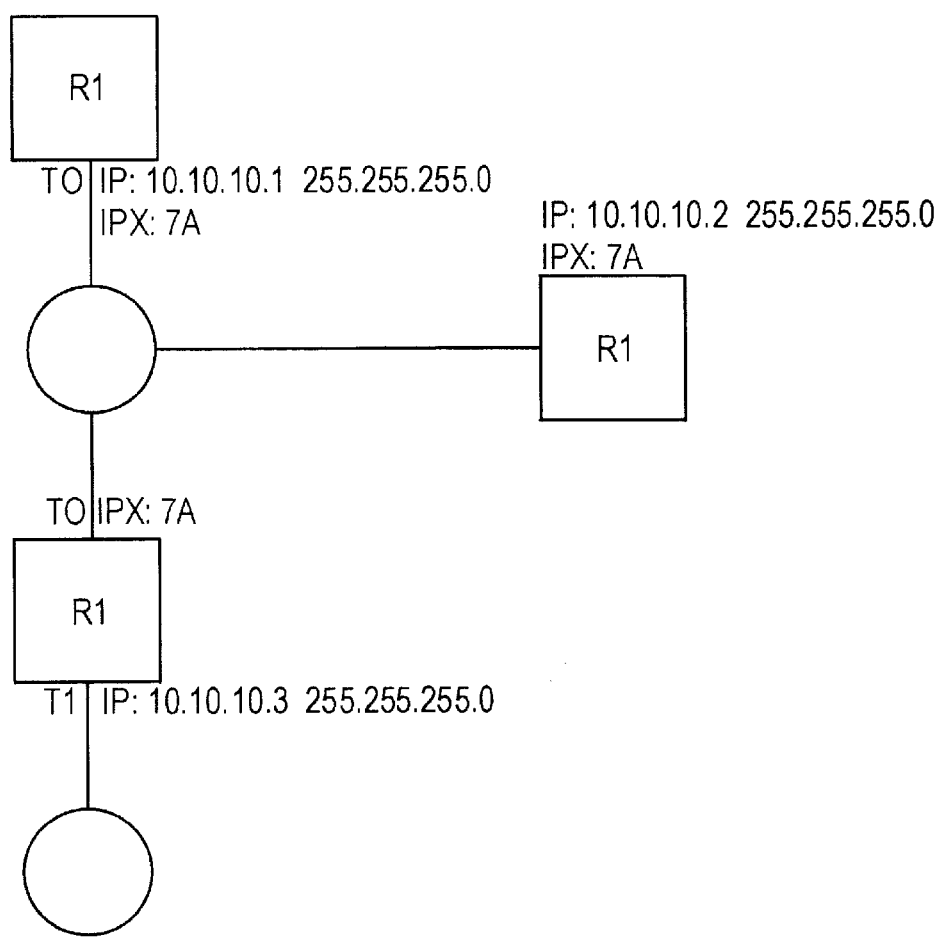
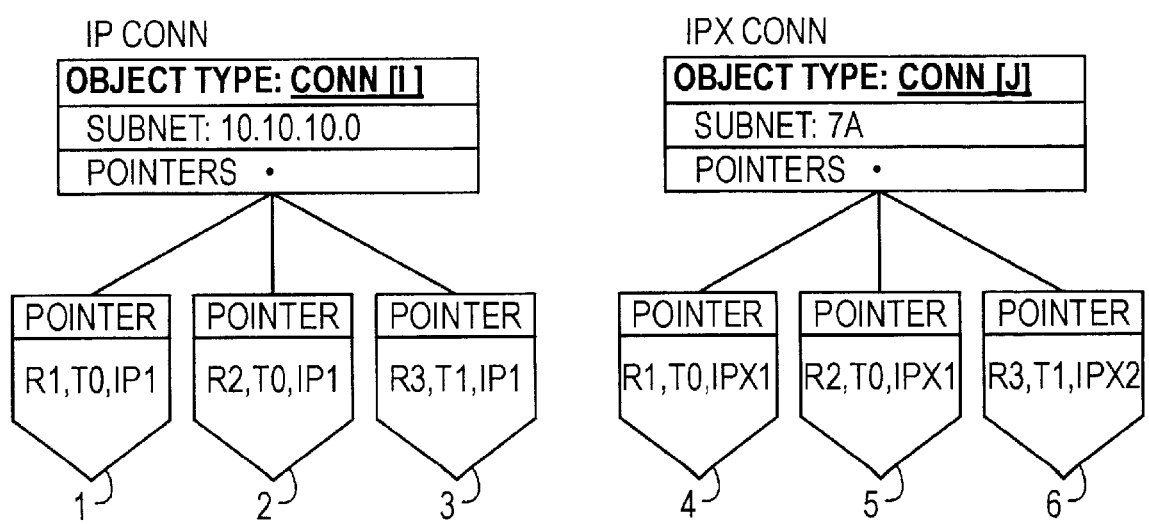
FIG. 26

ROUTER R3:

```
VERSION 10.0
!
HOSTNAME R3
!
NOVELL ROUTING 0000.0C08.94DD
!
INTERFACE LOOPBACK 1
IP ADDRESS 122.33.2.1  255.255.0.0

INTERFACE SERIAL0
IP-UNNUMBERED LOOPBACK 1
IPX NETWORK 8B
!
INTERFACE FDDI 0
IP ADDRESS 20.20.1.1  255.255.0.0
END
```

FIG. 29A

ROUTER R4:

```
VERSION 10.0
!
HOSTNAME R4
!
NOVELL ROUTING 0000.0C04.3A3E
!
INTERFACE LOOPBACK 1
IP ADDRESS 127.38.7.6  255.255.0.0

INTERFACE SERIAL0
IP-UNNUMBERED LOOPBACK 1
IPX NETWORK 9C
!
INTERFACE FDDI 0
IP ADDRESS 20.20.0.0  255.255.0.0
END
```

FIG. 29B

ROUTER R5:

```
VERSION 10.0
!
HOSTNAME R5
!
NOVELL ROUTING 0000.0D09.A5EE
!
INTERFACE LOOPBACK 1
IP ADDRESS 127.38.7.6  255.255.0.0

INTERFACE SERIAL0
IP-UNNUMBERED LOOPBACK 1
IPX NETWORK 8B
!
END
```

FIG. 29C

ROUTER R6:

```
VERSION 10.0
!
HOSTNAME R6
!
NOVELL ROUTING 0000.0D05.4B4F
!
INTERFACE LOOPBACK 1
IP ADDRESS 132.43.12.11  255.255.0.0

INTERFACE SERIAL0
IP-UNNUMBERED LOOPBACK 1
IPX NETWORK 9C
!
END
```

FIG. 29D

NOTE TO FIGURE 34

THE NOTION OF A FRAME RELAY CLOUD IMPLIES FULLY MESHED CONNECTIVITY, YET IN ACTUALITY CONNECTIVITY MAY BE LIMITED AS SHOWN WITH DOTTED LINES INSIDE CLOUD

```
VERSION 10.0
!
HOSTNAME R1
!
IP SUBNET-ZERO
!
INTERFACE SERIAL0
DESCRIPTION SERIAL 0
ENCAPSULATION FRAME-RELAY
IP ADDRESS 117.33.4.1  255.255.0.0
FRAME RELAY MAP IP 117.33.4.2 100 BROADCAST
FRAME RELAY MAP IP 117.33.4.3 101 BROADCAST
FRAME RELAY MAP IP 117.33.4.4 102 BROADCAST
!
ROUTER RIP 109
NETWORK 117.33.0.0
END
```

FIG. 38A

```
VERSION 10.0
!
HOSTNAME R2
!
IP SUBNET-ZERO
!
INTERFACE SERIAL0
DESCRIPTION SERIAL 0
ENCAPSULATION FRAME-RELAY
IP ADDRESS 117.33.4.1  255.255.0.0
FRAME RELAY MAP IP 117.33.4.1 100 BROADCAST
FRAME RELAY MAP IP 117.33.4.3 101 BROADCAST
!
ROUTER RIP 109
NETWORK 117.33.0.0
END
```

FIG. 38B

```
VERSION 10.0
!
HOSTNAME R3
!
IP SUBNET-ZERO
!
INTERFACE SERIAL0
DESCRIPTION SERIAL 0
ENCAPSULATION FRAME-RELAY
IP ADDRESS 117.33.4.1  255.255.0.0
FRAME RELAY MAP IP 117.33.4.1 100 BROADCAST
FRAME RELAY MAP IP 117.33.4.2 101 BROADCAST
!
ROUTER RIP 109
NETWORK 117.33.0.0
END
```

FIG. 38C

```
VERSION 10.0
!
HOSTNAME R4
!
IP SUBNET-ZERO
!
INTERFACE SERIAL0
DESCRIPTION SERIAL 0
ENCAPSULATION FRAME-RELAY
IP ADDRESS 117.33.4.1  255.255.0.0
FRAME RELAY MAP IP 117.33.4.1 100 BROADCAST
!
ROUTER RIP 109
NETWORK 117.33.0.0
END
```

FIG. 38D

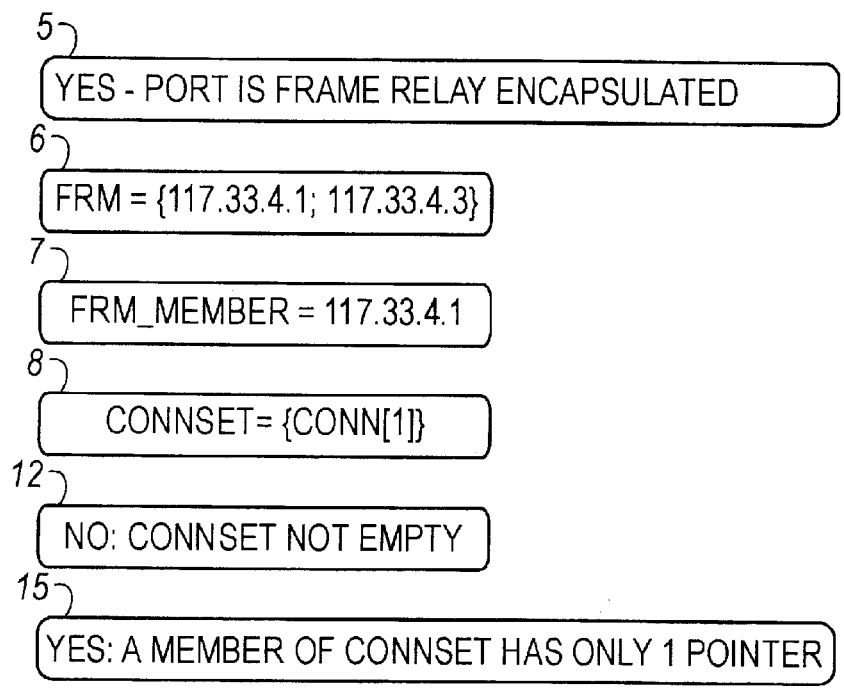
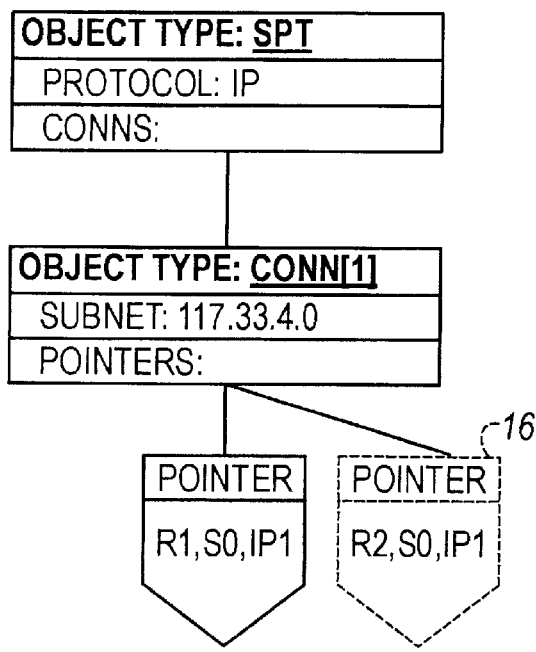
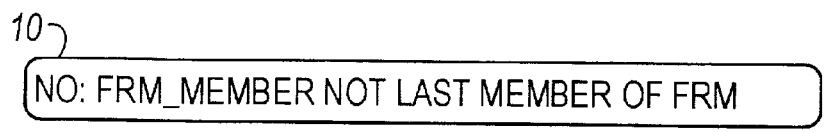
FIG. 39B

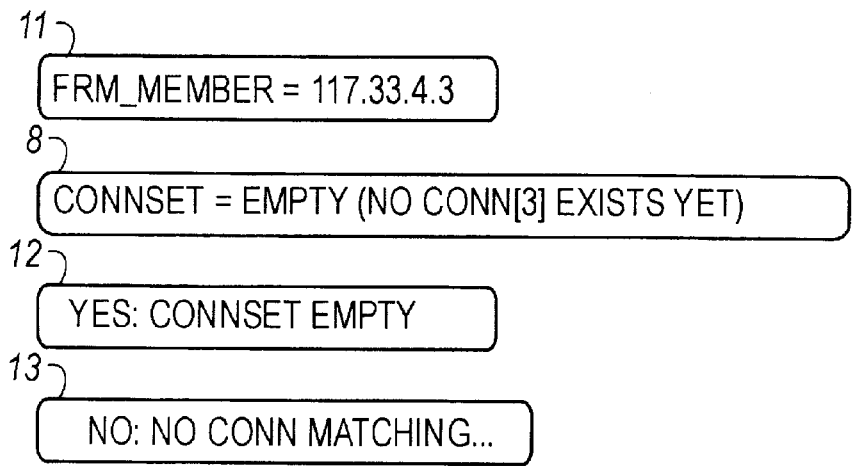
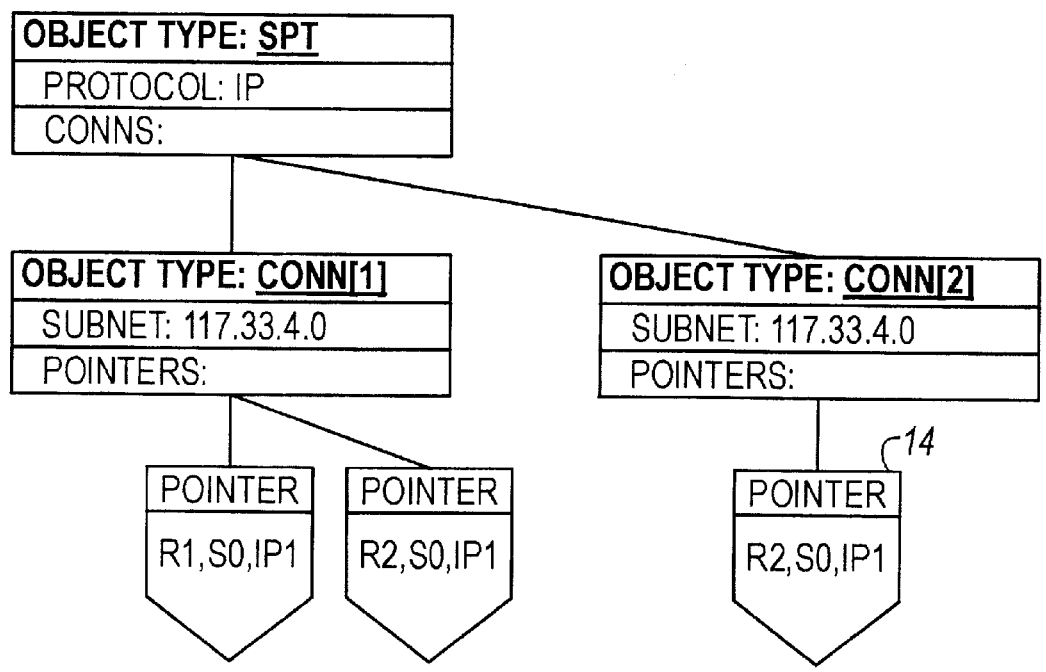
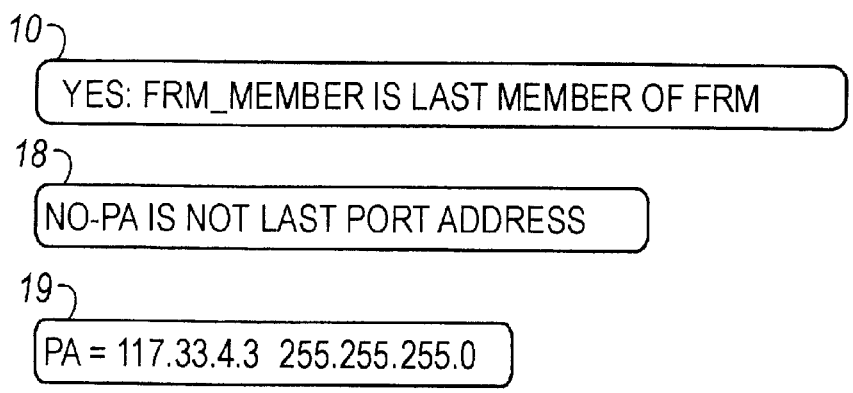
FIG. 39C

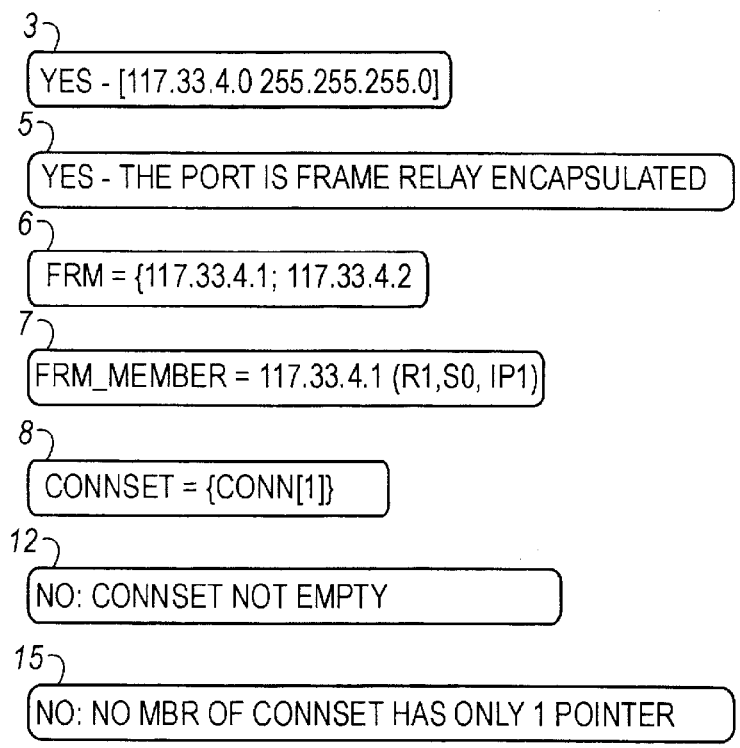
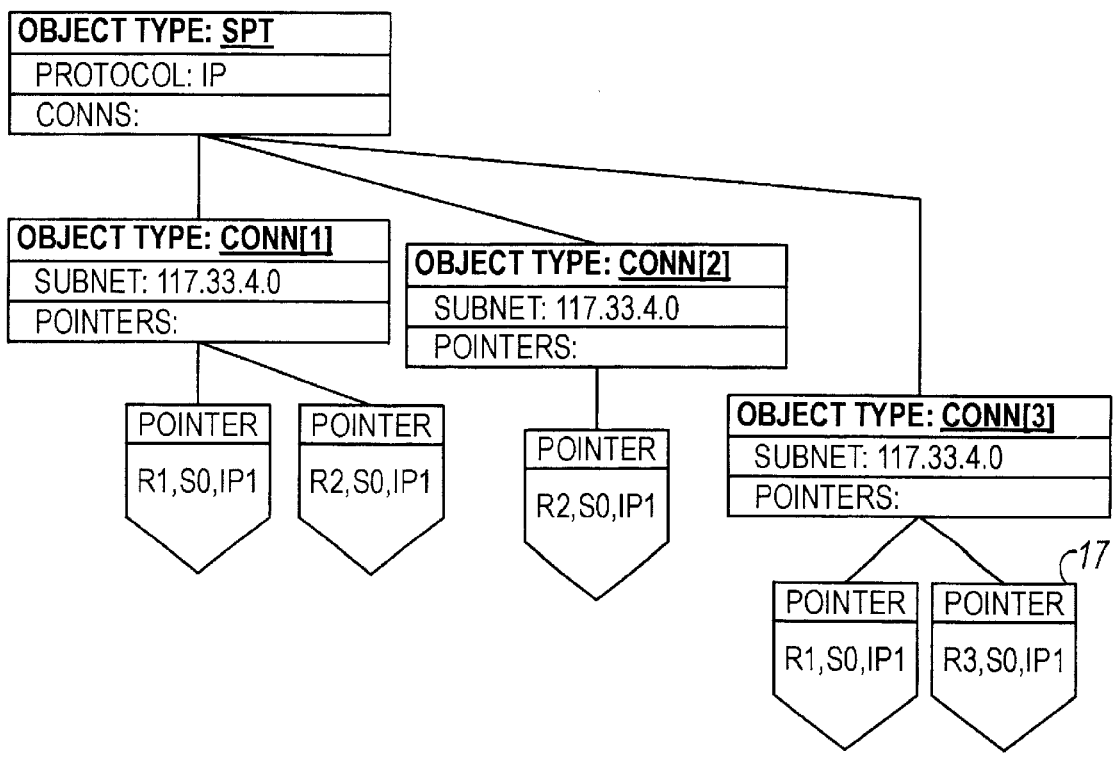
FIG. 39D

NOTE: THE FOLLOWING SEQUENCE OF DATA ELEMENT VALUES (FROM THOSE LISTED IN FIGURE 3-1) AND TOPOLOGY DIAGRAMS SHOWS, STEP-BY-STEP, HOW THE CURRENT PATH SET IS BUILT FROM SOURCE ADDRESS (SA) TO DESTINATION ADDRESS (DA). IN THE DIAGRAMS, NUMBERS REFER TO LOCATIONS IN FIG. 46 AS SIMILARLY LABELED.

BEGINNING AT START, THE PROCESS MOVES AS SHOWN UP TO THE FIRST DECISION BLOCK:
1 — CPS={ } (EMPTY)   2 — YES   3 — SC=CONN[1]
4 — DC=CONN [4]   5 — NO, SC NOT EQUAL DC

AS OF STEP 7, THE VALUES OF THE ACTIVE PATH SET ARE: APS={[SA;CONN[1];R1, [SA;CONN1];R2]}

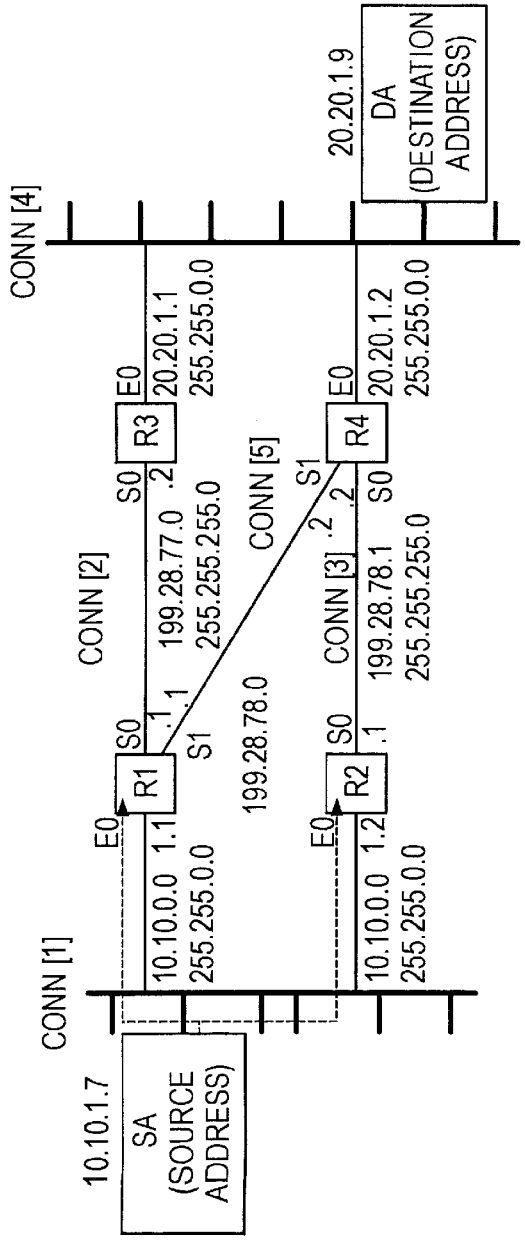

FIG. 53A

ROUTER R1:

```
VERSION 10.0
!
HOSTNAME ROUTER1
!
SOURCE-BRIDGE RING-GROUP 7
SOURCE-BRIDGE 7 TCP 30.50.2.1
!
INTERFACE LOOPBACK 1
IP ADDRESS 50.7.8.3  255.255.0.0
!
END
```

ROUTER R6:

```
VERSION 10.0
!
HOSTNAME ROUTER6
!
SOURCE-BRIDGE RING-GROUP 7
SOURCE-BRIDGE 7 TCP 50.7.8.3
!
INTERFACE LOOPBACK 0
IP ADDRESS 30.50.2.1  255.255.0.0
!
END
```

SYSTEM AND METHOD USING LEVEL THREE PROTOCOL INFORMATION FOR NETWORK CENTRIC PROBLEM ANALYSIS AND TOPOLOGY CONSTRUCTION OF ACTUAL OR PLANNED ROUTED NETWORK

CROSS-REFERENCE TO RELATED APPLICATION

This is a division of application Ser. No. 08/668,639 filed on Jun. 21, 1996, now abandoned, which is a continuation-in-part of application Ser. No. 08/493,984 filed on Jun. 23, 1995, now abandoned, the entire contents of which are hereby incorporated by reference for all purposes as if fully set forth herein.

BACKGROUND OF THE INVENTION

1. Field of the Invention

The invention relates in general to computer networks, and more particularly, to the design, modification and management of computer networks.

2. Description of the Related Art

Computer networks comprise multiple computers that are interconnected for communication with each other. A network may include only a few computers physically located close together or it may include many computers dispersed over a wide area. A network may include subnetworks or local area networks (LANs). A network also may include widely separated computers interconnected over a wide area network (WAN). Routing devices, in essence, are specialized computer networking devices that route or guide packets of digitized information throughout a network. Typically, when a host computer sends a packet out onto a network, it includes in the packet address information that specifies the source of the packet, the sending host, and the intended destination of the packet, another host computer connected to the network. The sending and receiving hosts ordinarily are interconnected through routing devices which use packet address information to route packets through the network from one routing device to the next en route from the sending host to the receiving host. Routing devices, therefore, perform a complex and critical role in network operations.

In many environments, networks are subjected to almost continual changes as host computers are added or deleted, for example. Unfortunately, networks are susceptible to failure. In today's information based economy, network failure can have severe implications to organizations that rely upon computer networks as a primary conduit for information. Network management is the process of maintaining the integrity of a network. It involves functions such as, observing the state of a network, monitoring network traffic, troubleshootting the network, making changes to the network and ensuring that the changes have the desired effect. Network management has become increasingly important as the size, diversity arid importance of computer networks have grown. The rise in prominence of the internet underscores the importance of high quality network management.

Complex technical challenges are an inherent feature of the network management function. For instance, network components may be diverse and physically dispersed. Many different communication protocols may be used simultaneously over the network. Security issues play a role in communications between hosts connected to the network. These are just a few of the numerous factors that combine to define the environment in which network management takes place. Some of the more routine objectives of a typical network manager include the swift analysis of large volumes of data, troubleshootting problems in a timely fashion, and implementing changes or upgrades without disruption of normal network operations.

Numerous network management tools are available to aid in achieving network management objectives. For example, there are tools that monitor network traffic and tools that monitor management information base (MIB) data. Configuration management tools can produce audit trails that indicate the history of changes to routing device configurations. There are network management stations that can collect information from network probes and present a network manager with data representing the state of the network. Simulation tools can predict the performance and behavior of hypothetical networks. Topology rendering tools can be used to identify possible problems on particular network components as well as network-wide problems.

There are particularly difficult technical challenges in the realm of network management tools that identify possible network-wide problems and that render network topologies. For example, it can difficult to determine the logical connections between network devices without requiring a live operational network. Additionally, the problems associated with providing a network centric view of potential problems in a network are significantly greater than the problems associated with testing an individual network component for potential problems. Moreover, diagnosing routing table problems may involve complex inquiries aimed at identifying routing loops and identifying dead end paths, for example. Furthermore, security issues involving router access lists can be difficult to diagnose without a relatively comprehensive understanding of the operation of the network containing routers with such access lists, so that, for instance, a route around a blocked host can be tracked.

Thus, there has been a need for improved network management tools that can provide network centric analysis of potential problems and that can provide diverse views of network topology in order to enhance a network manager's ability to manage a network. The present invention meets this need.

BRIEF DESCRIPTION OF THE DRAWINGS

FIG. 1a shows the subprocess of populating the Structured Router Objects the first process occurring within FIG. 1.

FIG. 1b shows the subprocess of Constructing the Topology as would logically follow the process described in FIG. 1a in the use of the invention by a user.

FIG. 1c shows the subprocess of Creating the View Objects, a process that would typically follow the process shown in FIG. 1b.

FIG. 1d shows the subprocess of applying non-routing table checks another portion of the invention that occurs after the process in FIG. 1b is executed.

FIG. 1e shows the subprocess of Importing Auxiliary live information (such as routing tables) which is an alternative to constructing routing tables (FIG. 1f). The user selects which of these procedures to use.

FIG. 1f shows the subprocess of calculating routing tables, which is an alternative process to the procedure shown as FIG. 1e as described above.

FIG. 1g shows the subprocess of Applying routing table integrity checks which is the procedure executed following either FIG. 1c or FIG. 1f as described above.

FIG. 1h shows the subprocess of the user making changes to the SRO given rendered logical topologies from FIG. 1b, rendered abstract topologies from FIG. 1c, and integrity checks from FIGS. 1d and 1f.

FIG. 1i shows the subprocess of importing modified SROs back into the live network, this occurs logically after the user is satisfied with the network configuration as captured by the set of SROs currently in the database.

FIG. 1x shows a block diagram of a network comprising routers (Ro) and a workstation that can access the network, and, on which the processes in FIGS. 1a–1i can run.

FIG. 5 is an annotated topology drawing of a hypothetical network. It is referenced by subsequent figures.

FIG. 6a & b are sample router configuration files for routers in FIG. 5.

FIG. 8 is a step-by-step walk through of a Single Protocol Topology (SPT) object data structure build routine that is shown in FIG.4.

FIGS. 8a through 8j illustrate the values of the SPT for Protocol=IP following the execution of steps in FIG. 4 as indicated by annotations on FIG. 5.

FIG. 8a shows the SPT following Step 1, initialized to its EMPTY state.

FIG. 8b shows the population of the SPT following FIG. 4, Step 5, with the first connection (a subnet) added to the object.

FIG. 8c shows the population of the SPT following FIG. 4, Step 4 with a Pointer added to the first Port Address.

FIG. 8d shows the population of the SPT following the second pass of FIG. 4, Step 5, adding the next connection to the object data structure.

FIG. 8e shows the SPT after the second pass of FIG. 4, Step 5, adding the next pointer to the SPT object data structure.

FIG. 8f shows the looping through FIG. 4, Step 4 adding the remaining pointer to the second connection.

FIG. 8g shows the third pass through FIG. 4, Step 5 adding the third and last connection to the SPT object data structure.

FIG. 8h shows the fourth pass through FIG. 4, Step 4 adding a pointer to SPT that points to the last port address of the hypothetical network configuration.

FIG. 8i shows the completed SPT object following FIG. 4, Step 7.

FIG. 8j shows the SPT that would be created by the process shown in FIG. 4 for the case where Protocol=IPX.

FIG. 10 is a flowchart to check for the integrity violation of overlapping subnet masks given an SPT as input.

FIG. 14).

FIGS. 24a through 24i comprise a step-by-step walkthrough of the Multi-Protocol Topology (MPT) object data structure build routine. It refers to the topology shown in FIG. 5.

FIGS. 24a through 24i illustrate the values in the MPT object following the Step(s) in FIG. 22.

FIG. 24a shows the MPT object initialized to EMPTY.

FIG. 24b Shows the addition of the first MpC for protocol=IP following FIG. 22, Step 3.

FIG. 24c Shows the effect of the loop through FIG. 22, Steps 3, 4, & 5 adding another MpC and pointers (again for Protocol=IP) to the object.

FIG. 24d shows the effect of the same loop now finishing MpC's and pointers for Protocol=IP.

FIG. 24e shows the completed MPT for Protocol=IP as would follow FIG. 22, Step 4.

FIG. 24f shows the addition of the first IPX element of the example following execution of FIG. 22, Step 8.

FIG. 24g shows the addition of the second IPX element to the MPT object again looping through FIG. 22, Step 8.

FIG. 24h shows the addition of the last IPX element to the MPT as follows the last pass through FIG. 22, Step 8.

FIG. 24i shows the completed MPT object as would occur at the time of FIG. 22, Step 11.

FIG. 26 shows an annotated network diagram and instantiated SPT object data structures that demonstrate a violation of the integrity check that finds mismatched protocols during the building of the MPT.

FIG. 29a–29d show hypothetical Router Configuration Files for routers (R3 through R6) shown in FIG. 28.

FIG. 38a–d shows the router configuration files for each router illustrated in FIG. 34 (topology to demonstrate the Frame Relay multipoint WAN example).

FIG. 39a through 39f shows the step-by-step execution of the flowchart in FIG. 33 by indicating values of variables and instantiations of the SPT as each step of the flowchart is executed. This is part of the process occurring in FIG. 1b.

FIG. 53a–f shows a step-by-step walk-through of the flowchart in FIG. 46a,b, &c (a flowchart for finding Paths between Source Address and Destination Address) using the topology illustrated in FIG. 48 as the example's input.

DETAILED DESCRIPTION OF THE PREFERRED EMBODIMENT

The present invention comprises a novel method and apparatus for network management. The following description is presented to enable any person skilled in the art to make and use the invention. Descriptions of specific applications are provided only as examples. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiment shown, but is to be accorded the widest scope consistent with the principles and features disclosed herein.

The purpose of the present invention is to assist network managers, administrators and/or planners manage routed networks for which they are responsible. "Routed Network" herein means a set of logically connected devices, each of which can operate as a switching device at level 3 in the OSI model. A presently preferred embodiment of the invention is architected to operate in connection with any of the following environments: a live network to manage; proposed network configuration information existing for a planned network to be analyzed; a live network along with configuration information for a set of planned changes; or, multiple live networks to be merged.

Figures 1, 2:
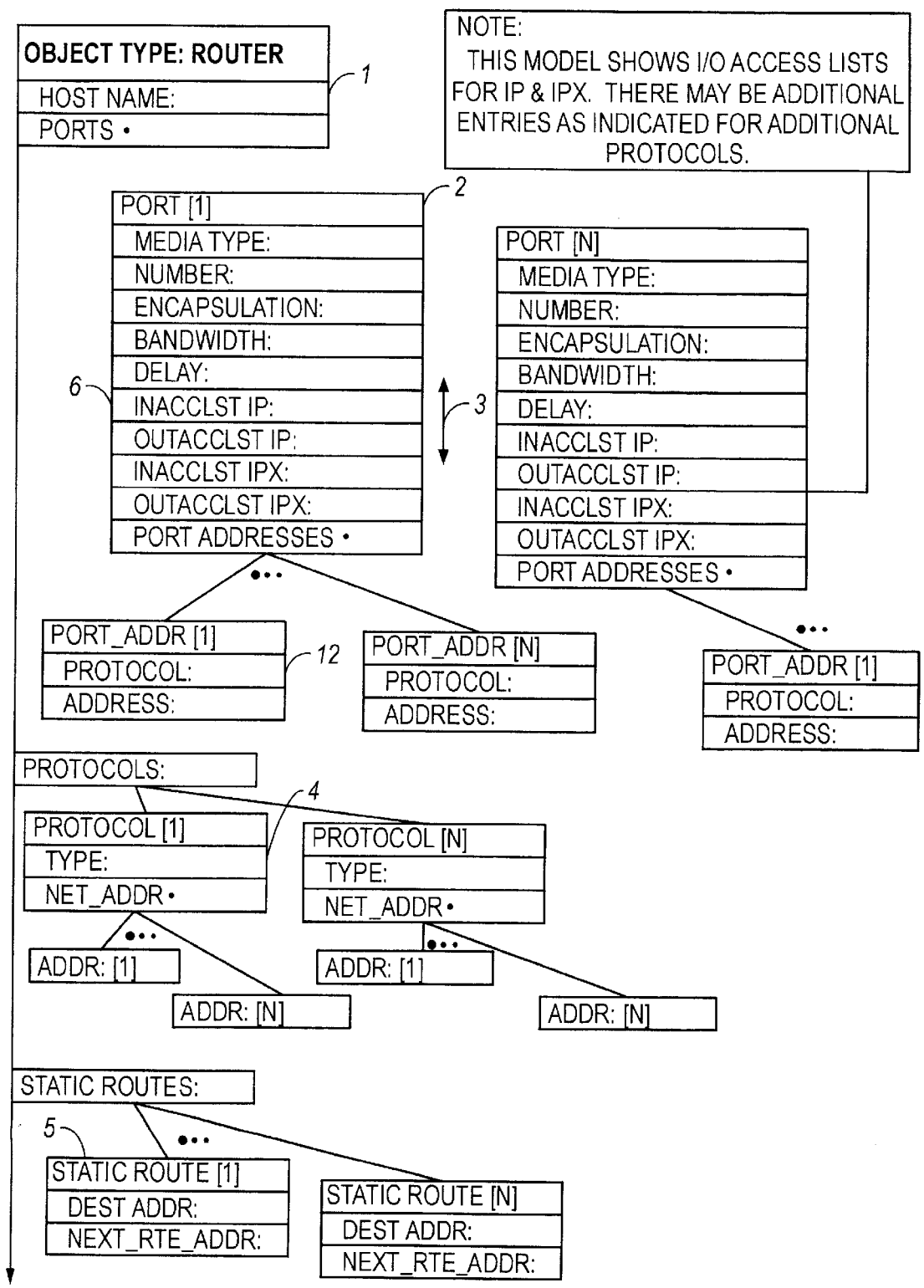
FIG. 1 shows a flow chart of the overall data and process flow of the present invention.
FIG. 2 shows the object data structure of the "Structured Router Object (SRO) a principle data structures of the invention. A set of SROs serve as the primary input for all subsequent analysis.
Figure 2:
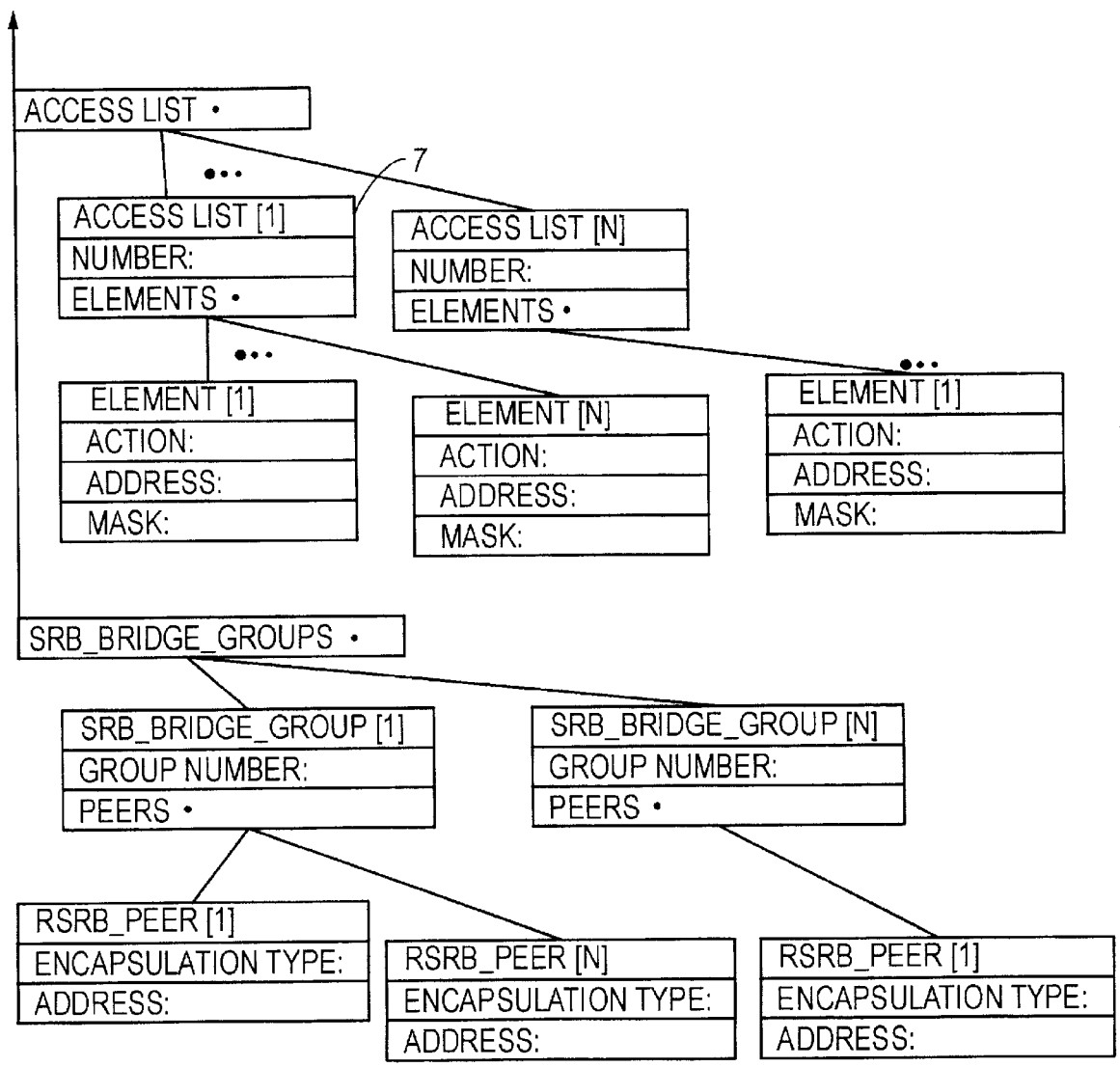

A high level view of FIG. 1 shows an overall process, in accordance with a preferred embodiment of the invention, for obtaining network information from a variety of sources, putting this information into the invention's data base, rendering different views of the network, applying various integrity checks, using this information to decide if there are problems needing to be addressed, making corrections if there are problems, then either downloading these corrections to the network, or, putting these corrections back in the data base for reiterative analysis. In sum, this process assists the user to: capture network configuration information, analyze it, find problems in the network's configuration, evaluate that information, proactively validate prospective changes, and, either download the configuration back into the live routed network or reiterate the analysis based on the original configuration with the prospective changes applied. A key factor is that the invention enables proactive validation of a planned network or changes to an existing one. A network manager, therefore, can better design, manage and modify routed user and manage a routed network which is devoid of, or has fewer problems than without the invention.

Throughout the following discussion it will be presumed that line by line coding involved in implementing the processes and structures disclosed herein is well within the abilities of one skilled in the art and so is not described herein.

Each sub-figure (1a–1i) in FIG. 1 relates to a discrete portion of an overall analytical process in accordance with a current implementation of the invention.

FIG. 1a represents the process for capturing information about each of the routers in the live or planned network from in a format actually used by a given router. Router devices are well known in the art. They are switching devices at level 3 in the OSI model. For Cisco Systems, Inc. products, for example, this input is an ASCII text configuration file in a proprietary language (IOS, TM). For Bay Networks Corp. products, for example, this input is the binary configuration data base provided as output from a commercially available computer program such as Site Manager (TM) program, for example. The process represented in FIG. 1a parses the input data from configuration file or the MIB, as described above, and fills-in default information as necessary to populate object data structure referred to herein as the Structured Router Object (SRO).

FIG. 1b represents a process of forming a "topology" from the SROs. In the presently preferred embodiment of the invention, there are several types of consitutent components of the topology. One type of component comprises is a set of objects called SPTs, for "Single Protocol Topology". An SPT is produced for each protocol running on a network, such as IP, IPX and Appletalk™. Running multiple protocols in a network has become a common practice in networking. Each SPT indicates for a given protocol which routing device ports are running the given protocol and which ports are logically connected over the protocol. Another type of component comprising the topology is implemented as an object referred to herein as an MPT, which stands for "Multiple Protocol Topology". In the present embodiment, there is one MPT per network. The MPT includes information that indicates how the SPTs relate to each other. For example, if a network routes both IP and IPX, both an IP SPT and an IPX SPT will be created, and they will be cross-referenced to each other to form an MPT.

The novel MPT can be used, in conjunction with novel processes in accordance with the invention, to determine whether network protocols have compatible addressing.

Processes in accordance with the invention can determine when two topologies have incompatible addressing and can identify the source of the conflict, such as the parts and protocols involved in the conflict. More particularly, during the process represented by FIG. 1b, logical topologies are produced for the different protocols that run on a live or planned network. These topologies are called SPTs and are produced from the SROs. Once SPTs have been constructed for the various protocols, they are interrelated with each other to form a structure called an MPT. The MPT can be used to identify conflicts between protocols represented in the different SPTs. The SPTs and the MPT provide valuable diagnostic information that can be useful in identifying network problems.

The processes represented by FIG. 1b produce "level 3 logic" topologies. A level 3 logic topology is defined by the OSI model. FIG. 1c represents a process which provides more abstract or "higher level" views or representations of a network. Examples of these more abstract views are OSPF and BGP views These more abstract views can be useful to a network manager or designer who wishes to observe only certain abstractions or views of a network. Modern networks are extremely complex creations. Higher level/more abstract views enable the persons responsible for maintaining, designing or modifying networks to better visualize the network they are operating upon by removing from the view components that are not relevant to the immediate task at hand or grouping devices.

Using the object model formed in FIG. 1b, (i.e., integrated SRO/SPTs/NPT), processes represented by FIG. 1d determine whether there are potential problems in the actual or proposed network represented by the object model. The conventional approach to trouble-shooting a routed network typically involved a user evaluating routers one by one to determine whether there are problems with individual routers' configurations. A router configuration is a specification interpreted by a router's operating system that indicates precisely how a router is to process and respond to all types of data packets, and how it generates, receives, and processes messages that are sent between itself and other routers to construct routing tables. The abstract view produced in accordance with the processes of FIG. 1b enables a more network-centric view which allows a user to visualize not just problems in a single router, but also problems that relate to two or more routers. An important feature of the process represented by FIG. 1d is the application of numerous novel integrity checks which can identify problems in not just individual routers, but across routers spanning the whole network. "Integrity Check" as used herein means the result from a procedure that determines whether this a critical or potential problem in the network configuration.

The differences and relationship between the views produced according to the processes of FIG. 1c and the integrity checks represented by FIG. 1d are as follows. In the current embodiment, high level/abstract views may be used for rendering images of various protocol topologies; while integrity checks ordinarily represent information in a more textural form. A user can employ both views and integrity checks to diagnose potential problems with a network. More to the point, views set a graphic or visual context for interpreting textual reports of integrity check violations. For example, an integrity check violation may identify a network component or components such as a router or a subnet; while the view permits a user to visualize where the component or components resides in the network and its relation to other network components.

Referring now to FIG. 1g, there are multiple types of intently checks that can be performed given routing tables as input. A routing table is a table with rows (elements) indexed by level 3 destination addresses and/or level 3 "summary addresses", which refer to ranges of addresses; if a router receives a packet that is not filtered on the incoming port, (and the packet's destination is not the router itself), it will look for a routing table element that matches the packet's destination. If no match is found, the packet is dropped. If there are a number of matches, then the element with the narrowest range (i.e., most specific address range) is used. The matching element indicates what port to send the packet out of and either a next hop router or the fact that the port is connected to the local area network (LAN) where the destination resides. The packet is sent out this output port unless there is an output port filter that blocks transmission. Routing tables are produced by routers in a network exchange information about destinations they could reach. See, Comer, Douglas E., "Table Driven IP Routing", Internetworking with TCP/IP, pp. 113–115, Prentice Hall Inc., 1991. In a network, different host systems may wish to exchange information with one another. In order to do so, however, there must be a route through the network between the hosts. The routing tables are used to switch the packets "hop-by-hop" through the network. If two hosts wish to communicate, but there is no path enabled between them then a "no route" situation, which is just one of the routing table integrity checks in accordance with the invention. Another example of a routing table check is that the routers for a particular destination might be involved in what may be referred to as a routing loop. In other words, router 1 may receive packets destined for host D and transmit the packets to Router 2 which then sends these packets to Router 3 which sends these packs back to Router 1 resulting in an infinite loop. These are problems a network manager wants to avoid.

There are a number of approaches to gathering the routing table information for use in the process of FIG. 1g. One approach represented by FIG. 1f is to calculate the routing tables through simulation using the topology (SRO/SPTs/MPT) as input. This novel calculation process simulates behavior of actual routers in an actual network to produce the routing tables used in the process represented by FIG. 1g. Alternatively, if the user does not want to simulate routing tables, then, in accordance with a process represented by FIG. 1e, the user can poll live routers in a network to get the routing table information and to put it into the routing table data structure 17 illustrated in generalized form in FIG. 1f.

FIG. 1h is a process largely guided by the user who has access to the views, integrity checks and other information that are automatically computed according to other process represented in FIG. 1. Given this information, the user can observe the problems in his or her network, and consequently may make modifications to the object model (i.e., the topology comprising SRO/SPTs/MPT). Once the user makes changes he or she has a number of alternatives. One alternative, represented by FIG. 1i, is to make the changes and download those changes directly into a live router network by providing the information on the SROs to live routers in a live network. Another alternative, represented by the feedback path that includes the "what if Analysis" comment, is to modify the SROs in the object model and reiterate through the process steps described above in order to analyze and trouble-shoot the proposed network changes represented in the updated SROs.

A significant advantage of the invention is that the information in the object model (SROs/SPTs/MPT) can be both used for analysis (creating views and running integrity checks for example) and for actual download to a live network. This advantage is achieved in the preferred embodiment by storing router configuration (or MIB) information in executable form in the SROs. The term "executable" as used herein means a state of representation of router configuration that contains sufficient detail so that it can be translated into a form that a router can execute.

Thus, FIG. 1 shows the overall process, in accordance with a present embodiment of the invention, of obtaining information from a network, putting it into a data base, applying different types of integrity checks, rendering different views, using this information to determine if there are problems, making corrections, if there are problems, and either downloading these corrections to the network or putting these corrections back in an object mode data base for further analysis. Consequently, a user can capture an existing (live or modelled) network configuration, analyze it, find problems, evaluate the problems, proactively validate changes before downloading the changes back into the network. An important factor here is that such proactive validation permits making validated changes to a routed network without impacting operation of a live network: changes can be planned and tested before downloading to a live network.

As mentioned above, an important factor distinguishing the present implementation of the invention from conventional network analysis tools is the use of an object data model is both structured and executable the network to be automatically analyzed using the processors represented by FIGS. 1d, FIG. 1c and in FIG. 1g. The executable aspect of the object model means that the model contains sufficient detail to enable information contained in SROs to be readily imported into live network routers.

The advantages of the invention can be better appreciated, for example, by considering the prior network tool called, CiscoWorks, whose purpose is configuration management. CiscoWorks deals with the uninterperted text files (Cisco's Configuration Files). CiscoWorks permits the user to load these files and make textual modifications, but the user still is at risk of introducing syntax errors, for instance, since changes are not validated before the user downloads them to the router. In contrast, the processes and structures employed in the current embodiment of the invention perform automated validation of changes because they use structured objects (SROs) representative of the changed configuration.

Another earlier exemplary product that performs network analysis is produced by Make System and performs network analysis. The router objects in the earlier Make Systems tool, however, are not executable. In other words, the Make Systems product can not automatically download configurations from a database to the live routers without requiring a user to manually add configuration detail that the routers require in order to operate. Thus, output from the Make Systems product is not designed for automatic input of configuration information to live network routers. With the Make Systems tool, problems are reported and it is up to the network managers versed in the command set(s) of Bay Networks Site Manager and/or Cisco System's IOS to select the appropriate router configuration commands to correct the indicated problems, reload these changes to each affected router in the network and then run Make's "discovery" process to generate a data model for the analytical process to be run again. As used herein, "discovery" means a live process performed on an actual network that identifies elements and their connections in the actual network, which relies on the elements and their ports being operational during the process. Contrast the difficulty and potential inexactitude (room for human errors) of that process against the ability of the present embodiment of the invention to assist the user in identifying potential problems via views and integrity checks, automatically generate executable configuration files and before implementing those changes to a live network, check the proposed changes before then automatically loading the fully executable files to the live network for both Cisco Systems and Bay Networks products.

FIG. 2 depicts the Structured Router Object which, in accordance with a presently preferred embodiment of the invention, we will refer to herein as the SRO. The SRO is a data structure encoding the contents of a single router's configuration that are relevant to a given network analysis at hand. We refer to this data structure as "structured" to convey that it is composed of interrelated attributes and to distinguish it from such constructs as a text file containing a router's configuration which is amorphous rather than structured.

FIG. 2 illustrates a sufficient subset of the components constituting an SRO to enable one skilled in the art to practice the invention. In an actual real-life SRO there are many more components. A SRO, as well as other structured objects referred to in this disclosure, can be described in the hierarchical fashion by starting with top level attributes and then explaining and illustrating how these attributes are further decomposed into lower level attributes. In the disclosure that follows structured objects will be presented in two different ways: i) in attribute form which is a description of an object's interrelated attributes that omits the exact values of the attributes and ii) in instantiated form which is a description of both the attributes and their (exemplary) exact values. FIG. 2 provides an attribute form description of a SRO.

In the present implementation of the invention, objects are produced using C++ programming language techniques. However, other programming languages could be used to produce the structures. This is considered to be well within the ordinary level of skill in the art, and, therefore, is not explained in detail herein.

Referring to FIG. 2, at reference numeral 1 there is shown an attribute, which is host name. This is a unique name for identifying the router. Looking down the structure, the next high level attribute is Ports. The value of this attribute is a list of objects, each one having it own structure. Each of these objects, such as the one labelled 2, is called a Port Object. A router consists of a set of physical ports, each having its own configuration. Each router's port in the invention is represented by a Port Object, which consists of a list of structured objects itself Referring to FIG. 2, we see that there are ports 1 through N, representing N different ports or the router. The number of ports on a router depends on the type (i.e. make and model number) of the router and how it is physically configured. For an individual port, (labelled as (2) in FIG. 2), there are a number of attributes. The first is media type, whose value can be Ethernet, Token Ring, Serial, Serial Link, FDDI, etc. We also identify a number, which is used to distinguish between two ports of the same media type. The next attribute is called encapsulation, which indicates what type of encapsulation is running on the connected media. An encapsulation example is Frame Relay on a Serial media to distinguish it from a HDLC serial. Further attributes include: bandwidth—which is a scalar metric used by the IGRP routing protocol that relates to bandwidth of the connecting media. The attributes also include delay—which is a scalar metric connoting the speed of the connected media and is also used by the IGRP routing process. The next four attributes shown in FIG. 2 (labeled as (3)) are attributes related to access lists. Access lists are used to filter traffic coming in and out of the router.

Typically access lists are used for security purposes and routing purposes. Access lists are used to block or permit packets with either specific addresses or ranges of addresses, to be received or transmitted by a router. The first access list attribute illustrated in FIG. 2. (AccLstIP), stands for input access list, IP. This access list item is used to filter input IP packets. The attribute OutAccLat refers to filtering output IP traffic. Similarly, the attributes AccLstIPX and OutAccLatIPX refer to filtering input and output IPX packets. It should be appreciated that access information for other protocols, such as AppleTalk, has been omitted from FIG. 2 for simplification.

The last attribute under the port object is Port addr. Each port has one or more addresses assigned to it. The Port addr object has an attribute called "protocol" which refers to a particular address' level 3 protocol such as IP, IPX and AppleTalk. The address attribute gives the exact address. Port Addresses serve as building blocks for forming the topology information.

The SRO structure accommodates multiple port address per port as any given port on a router may be running multiple protocols. For instance, consider a port configured for both IP and IPX. Typically such case, one would have both an IP and IPX address for this port. Another reason for having multiple port addresses is that routers produced by Cisco Systems, for example, employ a concept called primary and secondary IP addresses where the user could address the same physical port with multiple IP addresses.

Before discussing the next high level attribute of the SRO, Protocols, we consider the difference between this high level attribute and the subobject of the Port Object similarly named Protocol. The latter refers to the protocol(s) "running" on the particular port. These port-related protocols define the type of the packets of data that come in and out of the router's ports (i.e., IP, IPX, AppleTalk, DECnet, etc.) By contrast, the high-level attribute Protocols refers to the routing protocols such as RIP, IGRP, OSPF, EIGRP and BGP, that the routers use to exchange information and build up the routing tables.

The attribute Protocols comprises of a list of objects describing each routing protocol running on the router. The value of the "Type" attribute of a protocol object, labelled 4 in FIG. 2, represents a type of routing protocol (e.g., RIP, OSPF, IGRP, etc.), and for some of the protocols, additionally a number. This number is used because a router could run multiple copies of some protocols, such as OSPF or IGRP, on the same router. The next attribute is Net Addresses. Typically a routing protocol is running on certain interfaces (i.e. ports) on the router. Each element in the list Net_Addr is an address capturing the ports (port addresses) the associated protocol is running over. This specification greatly simplifies the Protocol object; a current implementation of the invention includes over 50 attributes associated with protocols. One skilled in the art will appreciate how to incorporate such router attributes into an SRO based upon this discussion.

The next high level attribute of the SRO is Static-Routes. The value of the Static Routes attribute is a list of objects. Each one of these objects, labelled 5, refers to what is called a static route. There are basically two approaches to produce routes in a routing table. One approach is to run the routing protocols discussed earlier. The other approach is to directly code routes into the routing table. This latter approach involves specifying a set of static routes. A static route is identified by specifying a destination address Dest-Addr a next router address, which tells the router where to send a packet matching Dest-Addr which is discussed below.

The next high level attribute of the SRO is Access Lists, whose value is a list of objects, each object representing an access list. We earlier referred to access lists when we talked about port objects. For example, at the reference numberal 6 we refer to an "input" IP access list. At reference numeral 6, the SRO does not contain a whole access list, rather at this point in the structure there is a number referencing an access list. Each access list object in the list Access Lists contains a full description of the access list and a number (see reference numberal 7) used for reference elsewhere (such as at InAcclstIP). The Elements attribute in an access list refers to a list of patterns which describe what addresses to permit and deny.

Still referring to FIG. 2, we see an example of the next high level attribute called SRB Bridge Groups SRB stands for "Source Route Bridging," which is a mechanism for transporting traffic typically associated with Level 2 in the OSI model. There is also a variant of SRB bridging implemented in routed networks where SRB traffic can be encanqulated over an IP backbone. SRB Bridge Group and RSRB-Peer objects are specified in the SRO. Each bridge group has a group number associated with it and a list of peers. Briefly, a peer is an object with an attribute specifying encapsulation type, which indicates what encapsulation method is being used to transport SRB frames. One example is TCP encapsulated; another example, which Cisco Systems provides, is FST encapsulation. The other attribute of a Peer object may indicate the address of another router in the network where encapsulated SRB data should or potentially should be sent.

Thus, to summarize FIG. 2, the information in the SRO captures a router's configuration. The information put into an SRO could be gleaned from a MIB or from a router configuration file, or from information regarding a planned or hypothetical network. A SRO structure, in accordance with the present embodiment of the invention, can serve as a neutral repository for configuration information from virtually any router vendor whether they use binaries or configuration files.

Figure 3:
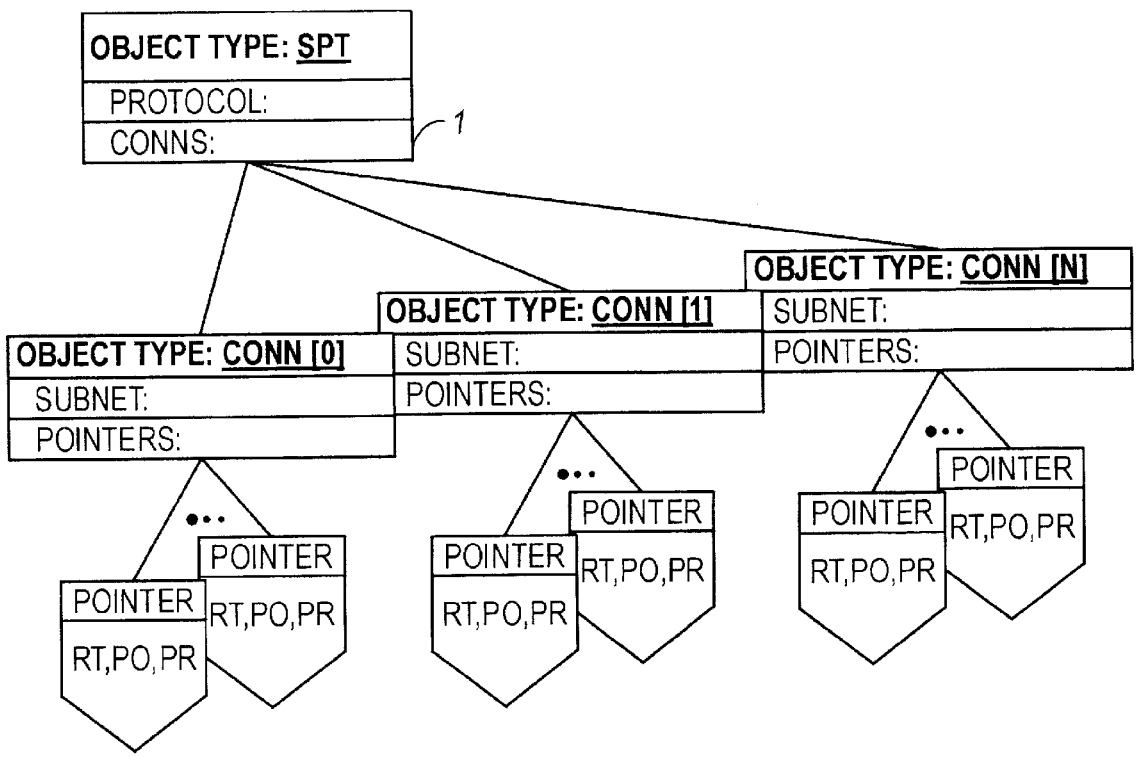
FIG. 3 shows the object data structure of the "Single Protocol Topology" object, a principle data structures of the invention that is populated in the process shown as FIG. 1b. It will serve as input to numerous processes as shown in FIG. 1.

FIG. 3 represents a Single Protocol Topology (SPT) object in attribute form, in accordance with a presently preferred embodiment of the invention. An SPT is formed for each of multiple Level 3 protocols (e.g. IP, IPX, AppleTalk). The SPT for a given protocol "P" represents a logical view of the topology from the perspective of that given protocol. The data structure in FIG. 3 indicates which router ports are configured to run protocol "P" and how each of these ports is logically interconnected with other ports that run protocol "P." A SPT for protocol P has a top level atomic attribute Protocol that is set to "P," (e.g., IP, IPX AppleTalk etc.) and a top-level attribute CONNs (labelled 1 in FIG. 3). which is a list of objects each called a Connection. Each Connection identifies a list of router ports and their addresses all of which are configured to receive and transmit packets of protocol type P and are directly connected from a Level 3 perspective with respect to protocol P. As an example, for an IP SPT, all the ports listed in the Connection will belong to the same subnet. We can say that all the ports in a Connection are directly Connected from a Level 3 perspective to clarify that at a lower level, at Level 2, these ports might not be directly connected. For example, there may be bridges, LAN or WAN switches between these ports. If they are also directly connected from a Level 2 perspective, then one could necessarily associate a single media type with the connection such as serial links, Ethernets, token rings, FDDI's, etc.

FIG. 3 shows that each Connection object consists of a list of pointers. Each of these pointers refers to a port address in a specific router. When representing a pointer in a SPT Connection we will use the form (Rt,Po,Pr) where Rt refers to a router's host name, Po refers to a router's port, and Pr refers to a protocol annotated by an index which is described below. For example, (R1,S0,IP1) refers to the first IP address assigned to port S0 (or in long form, Serial 0) on the router with host name R1. This pointer links to a Port Address object in a SROs (see the reference numeral 12 in FIG. 2) in a network under consideration.

In giving the description of IP1, we said the "first" IP address; the reason we said "the first IP address" is that it is possible to assign two or more IP addresses to the same physical port. Cisco Systems, for example, refers to this configuration feature as assigning secondary IP addresses (as well the mandatory primary IP address) to a router port. Although the actual implementation of the invention makes a distinction between primary and secondary addresses, this disclosure does not make this distinction, and simply states that a port has a set of IP addresses. Thus, in general a port may have one or more addresses for any Protocol. Now suppose that two ports, S1 and S2, respectively, on routers R1 and R2, are physically connected through a serial link and both these ports have two IP addresses assigned. Furthermore, assume that the first IP address on S1, whose pointer would be (R1,S1,IP1) belongs to the same subnet as the first IP address on S2, whose pointer would be (R2,S2, IP1) also suppose that the second IP address on S1, (R1,S1, IP2), belongs to the same subnet as the second IP address on S2, that is (R2,S2,IP2). In this case, although there is only one physical medium connecting the two ports, that is a single serial link, the IP SPT containing routers R1 and R2 will have two (logical) connections for this one serial link.

Thus to summarize FIG. 3 a Single Protocal Topology SPT is a data structure that can be produced for each Level 3 protocol such as IP, IPX, and AppleTalk. A SPT for some protocol P is a logical view of the topology from the perspective of protocol P. This data structure indicates which router ports are configured to run protocol P and how each of these port are logically interconnected with respect to the protocol. Although the network under analysis may contain Level 2 devices, such as bridges and switches, but at a Level 3 view, these devices are "invisible" meaning, for example, if there is a switch between two router ports in the Level 3 view, the ports are still viewed as being directly connected. A SPT differs from an SRO in that, while a single SRO captures the configuration of a single router, a single SPT captures the logical interconnections of a set of routers.

The following discussion describes an earlier tool by Make Systems, and explains some significant differences in the process that tool employs to create an SPT-like data structure and how that structure differs from the SPTs of the present embodiment of the invention.

The Make Systems' internetworking product can use a "discovery" process, which requires a live network. Starting at a seed router (an arbitrary starting point on the live network), the tool reads the router's routing tables for the next hop addresses to the neighbor routers. This process continues in a breadth first manner to find the set of interconnected routers. This process also uses information, such as ARP (Address Resolution Protocol) information and configured interface speeds, in determining the valid router connections.

An important distinction is the fact that the Make Systems process is a discovery process. It is inherently a live process which relies on live routers and their interfaces being operational. In contrast, the current embodiment of the invention SPT topology formation involves processes that can take place "off-line." Specifically, in the current embodiment of the invention, on-line configuration information typically is captured in one pass. After it has been captured, the formation of the SPT topology occurs off-line. In contrast, the Make System uses an on-line discovery process during topology formation. An advantage inherent in the approach to SPT formation in accordance with the invention is that it not as susceptible to errors in determining the proper configuration due to network devices and router ports being in a temporarily failed state.

Another discriminating factor with respect to SPTs formation is the fact that earlier tools typically focused mainly on producing IP topologies because discovery is typically oriented towards IP. Some earlier tools also looked at IPX, but one of the disadvantages of discovery is that for a given protocol, one needs a certain level of instrumentation for that protocol to find the topology. Another disadvantage is that one may need to use different discovery techniques to discover an IP logical view versus IPX or versus AppleTalk. In contrast, an SPT formation process in accordance with the present invention, handles all protocols using the same algorithm.

Figure 4:
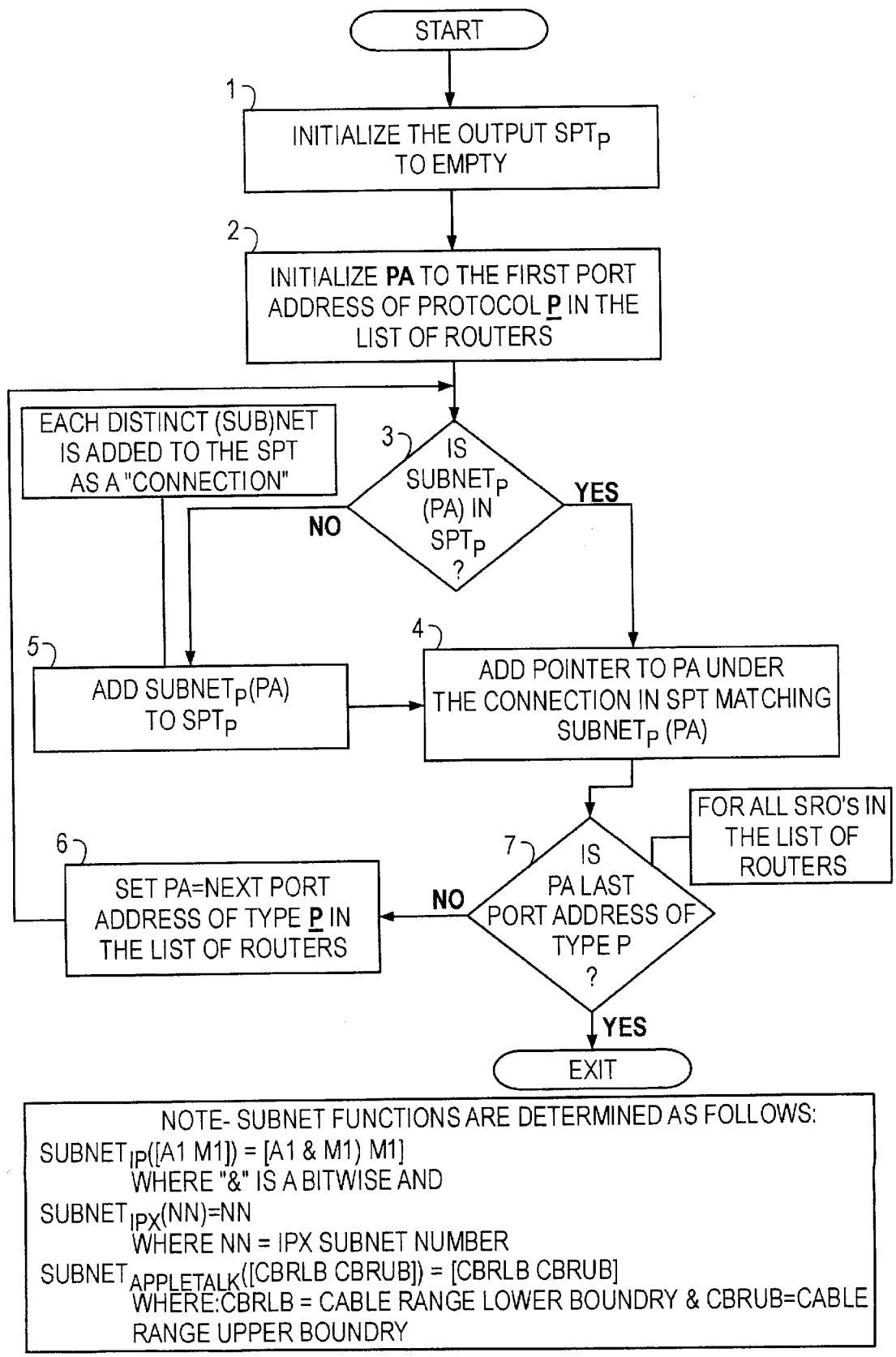
FIG. 4 is a flowchart of the process that creates a Single Protocol Topology (SPT) object data structure for a given protocol P given the set of SROs (FIG. 3) as input.

FIG. 4 is a generic procedure for forming a SPT for some protocol P from the set of SROs corresponding to the routers spanning the network. When we say "generic" we mean that this procedure, aside from a function called the SUBNET function, referenced in by numeral (3), is the same regardless to whether P refers to IP, IPX, AppleTalk or DECnet, etc. FIG. 4 provides a flowchart of the SPT build process of the presently preferred embodiment of the invention. At Step (1) the Output $SPT_p$ is initialized (set to empty) to indicate that initially there are no connections in the SPT for protocol P.

Step 2 initializes a variable PA to the first port address of protocol P in the list of routers. Given the set of SROs that contain router information for the network under consideration, the invention arbitrarily orders this set in an ordered list.

Step 3 asks whether the subnet function (which will be different from protocol to protocol) associated with port address PA already in the $SPT_p$". Initially, since $SPT_p$ is empty, the answer will be "no," and the algorithm moves to step (5). At Step (5) a new Connection object with subnet attribute set to $SUBNET_p(PA)$ is added to the $SPT_p$. A Connection object represents a particular connection between a set of router ports. If the answer was "yes" at Step (3), (in other words, $SUBNET_p(PA)$ is already in the SPT), then the invention would skip directly to Step (4). Next, at step (4) a pointer is added under the subnet to that port address PA. Next, after step (4), go to Step (7) and ask if the last port address has been reached. If so, the process is finished because all the port addresses have been processed. If the answer is "no" then Step (6) is reached where PA is assigned the next port address and the process repeats itself by looping to Step (3).

The definitions for the subnet functions are given in the box on the bottom of FIG. 4. For IP, the input to the Subnet function is 32 bit address A1 and 32 bit mask M1 configured on a port; the subnet function returns an address mask pair, where the address-part is formed by applying the mask M1 using bit-wise "AND" to address A1; the mask given as output is simply M1. In the examples in this patent, we use the address-part of the subnet as shorthand for the the entire subnet. For example 10.10.0.0 is used for [10.10.0.0 255.255.0.0]; in general this shorthand cannot be used, but if the masks used as either 255.0.0.0 255.255.0.0 or 255.255.255.0 and the zero subnet is not allowed, one can infer the mask from the address-part.

The subnet functions for IPX and AppleTalk are trivial. For IPX, given the IPX network number as input, subnet returns this number as being the "subnet". Similarly, for AppleTalk, given lower and upper bound for a cable range, the subnet function simply returns this range as output.

Thus in summary, the procedure iterates through all the port addresses in the set of routers and adds a pointer to each port address into the SPT structure grouping it with other port addresses belonging to the same. This basic SPT formation process is modified in practice to handle complicating factors that may arise in networks, such as, multipoint Wide Area Networks (WAN's), like Frame Relay, which is described later in this disclosure.

FIG. 5 is a generalized block diagram of a simple example network that shall be referenced in a number of subsequent figures. In this network, there are two routers, R1 and R2. These two routers are directly connected through a serial link. In this and subsequent figures, ports are designated by an abbreviation for media type and a number such as "E0" on router R1, which means Ethernet 0. On R1's E0 port, which is in the left of the diagram, we see that it connects to a symbol, labelled (1), which refers to an ethernet. Also associated with the ethernet are two numeric designators— "10.30.0.0", which is the IP subnet number of this ethernet in standard IP octet notation, and 9C, which is the IPX network number associated with the same ethernet. In other words, there is one ethernet designated at (1), but it has an IPX network number 9C and IP subnet number 10.30.0.0. Traversing the drawing from left to right, we see port S0 (Serial 0) on R1 which is connected to a line that designates a serial link with HDLC encapsulation. Following to the other side of the link, we see the port S0 on router R2. We can say that Router R1, through a serial link is connected from port S0 to Router 2 through Router 2's port S0. For serial links, like ethernets or other LANs, we can identify both an IP subnet, which in this case is 10.10.0.0 and an IPX network number, which is 7A. Router R2 includes port E0 (for Ethernet 0) which is labelled (2). This port E0 at (2) has IP subnet number 10.20.0.0 and IPX network numbered 98. In this example, we show a network where both IP and IPX are running on all interfaces. It should be appreciated that there may be networks in which different protocols run on different interfaces. For example, an interface might be running just one protocol or running none at all. Also, an interface could be running other protocols, such as AppleTalk and DecNet.

Figure 7A:
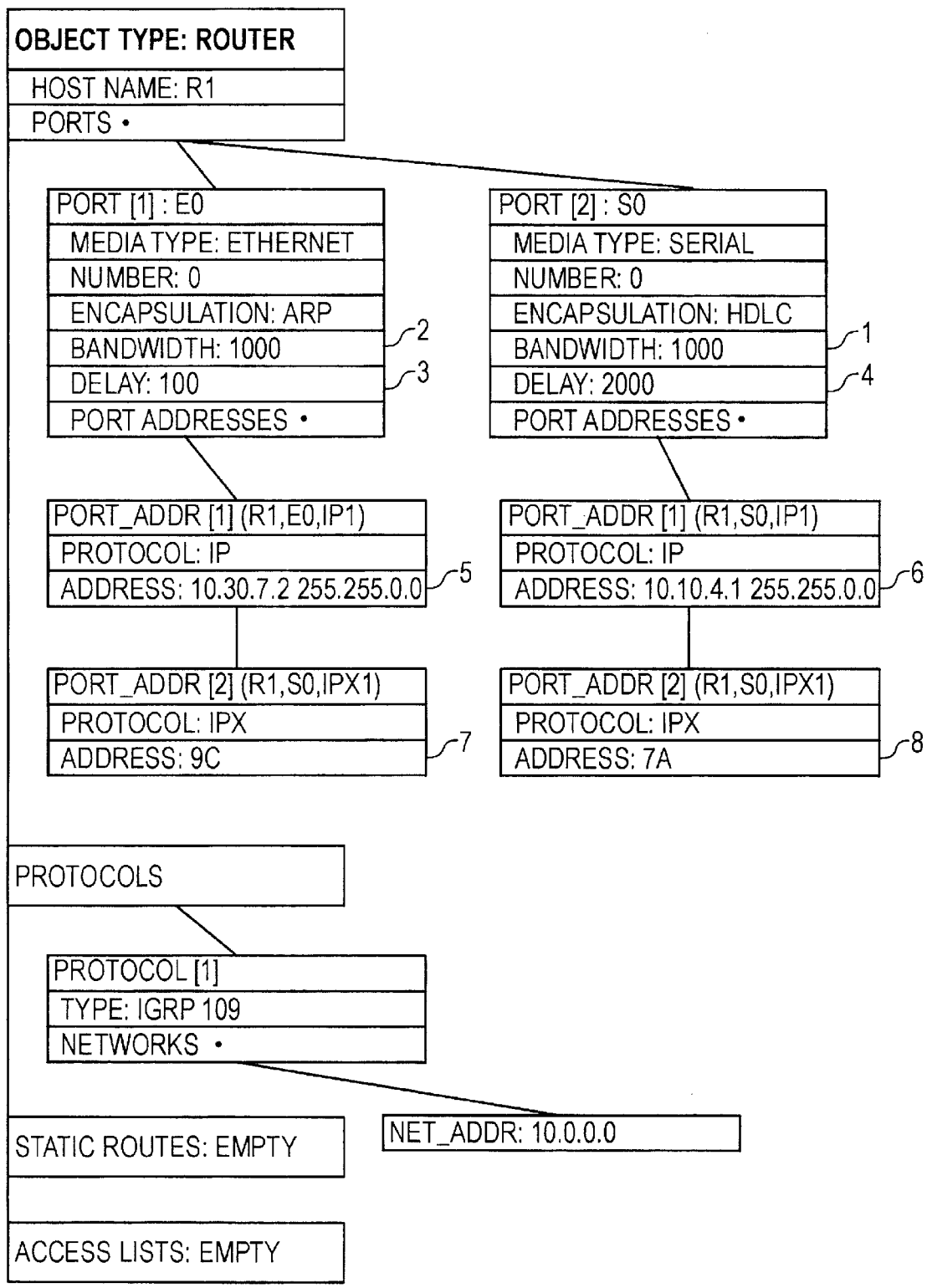
FIG. 7a shows the populated SRO associated with the router configuration file shown in FIG. 6a, Router 1 (R1) in FIG. 5.
Figure 7B:
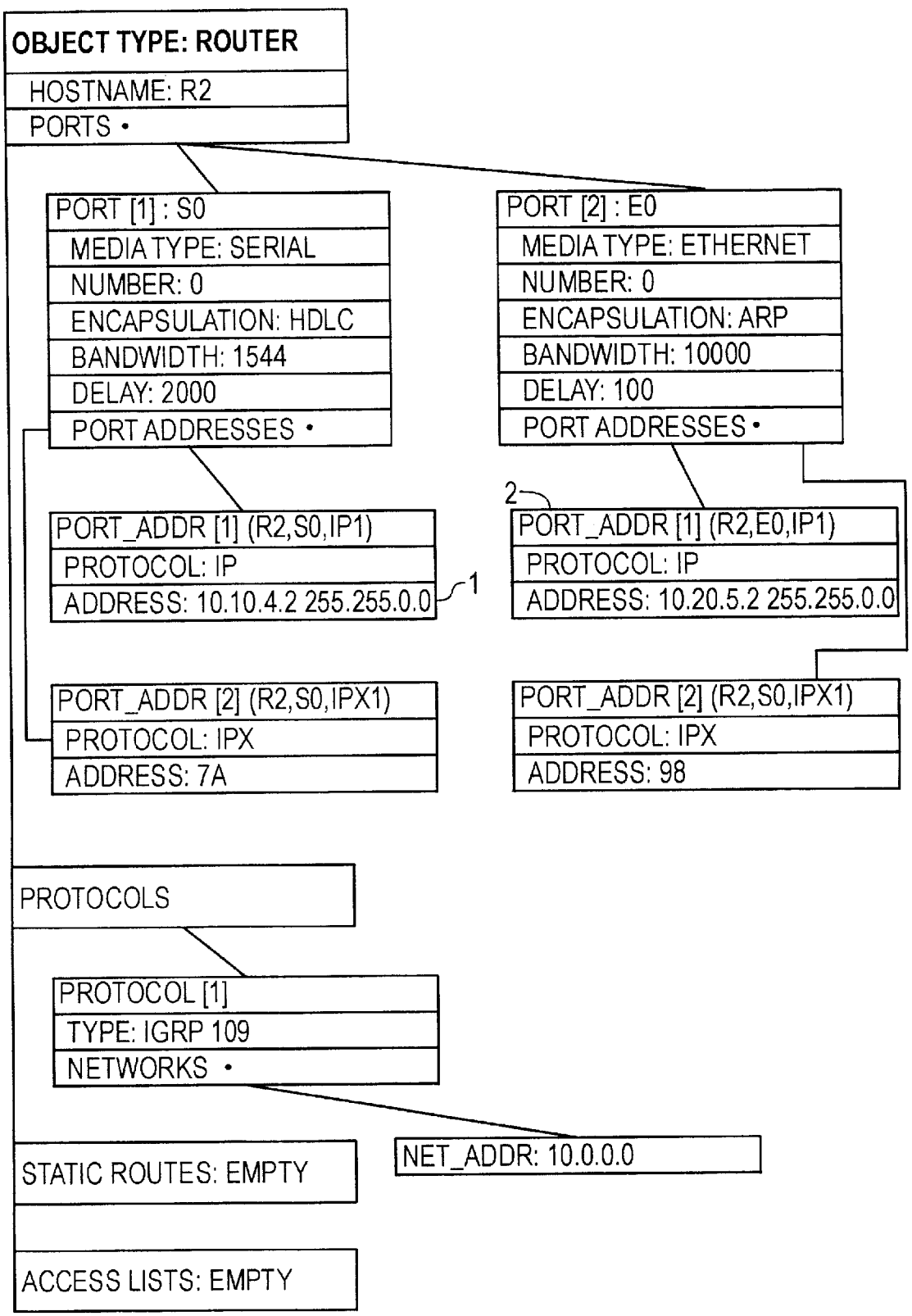
FIG. 7b shows the populated SRO associated with the router configuration file shown in FIG. 6b, Router 2 (R2) in FIG. 5.

FIG. 6A shows the text configuration tile for Router R1 and FIG. 6B shows a text configuration file for Router R2. See, Cisco Systems, Inc. "Configuration File Load Commands", Router Products Command Summary, pp. 6–584, Cisco Systems, Inc., 1992–1995. FIG. 7A illustrates the SRO that corresponds to Router R1's text file, and FIG. 7B shows the SRO that corresponds the text configuration file shown in FIG. 6B.

Briefly stated, a text configuration file is put into SRO form using standard parsing techniques. In addition, certain default values also are entered into the SRO. There is default information that is implicit in the configuration file. By omission, attributes still have values. As an example, refer to FIG. 6A and note where we designate (1), a bandwidth statement for Serial 0 Router R1. Refer now to FIG. 7A; at the point that is marked (1) is an associated bandwidth value of "1000". This bandwidth statement was explicitly coded in FIG. 6A, and consequently was parsed and was explicitly put into the SRO of FIG. 7A. In contrast, note in FIG. 6A the version labelled (2), which is interface E0 for R2. In this case, there is no bandwidth statement. Referring to FIG. 7A at the point marked (2), note in the SRO the bandwidth is assigned the value 1000. The fact that the bandwidth at (2) and the one labelled (1) are both 1000 is just an artifact. By default, each of the different media, such as ethernet have bandwidth settings, which are the default values. These are values, for example, that a Vendor such as Cisco Systems makes public in documentation. Another example of default values is apparent in FIG. 6A. No delay specification for either of the interfaces is coded in FIG. 6A, but referring to FIG. 7A at the regions labelled (3) and (4) delay parameters are specified. These were inferred knowing that Port [1] is an ethernet, which has a default delay of 100, and that Port [2] is a serial interface, which has a default delay equal to 2000.

FIGS. 8A through 8I show a walkthrough of the flowchart in FIG. 4 (a depiction of the process for constructing the SPT for a given protocol). For this walkthrough, the inputs are the two SROs given in FIG. 7A and 7B. In this case, we will be producing a SPT for protocol IP. In the walkthrough, we will be referring to the steps which are numbered in FIG. 4 and discussing what happens at each step. The result will show the incremental build of the output, an IP SPT for the SROs of FIGS. 7A and 7B.

In Step (1) the SPT is initialized. FIG. 8A shows the SPT at this point; protocol is set to IP and there are no connections.

In Step 2 the variable PA, which refers to a port address, is assigned the first port address (referring to FIG. 7A, the port address marked (5) in the diagram). Note that the port address assigned has two ports 10.30.7.2—which is the address—and 255.255.0.0, which is the mask.

Step (3) asks the question whether the subnet associated with PA is in the SPT. The subnet for this PA is 10.30.0.0. The conventional approach to applying the subnet function for the IP protocol follows a simple rule: for each of the four octets in the address apply the corresponding mask octet using the bit-wise AND operation. For the special case when the mask octets are 0s and 255s, we can use the rule: if there is a 255, it means use the corresponding octet—if there is a 0 that means ignore it (i.e. "zero out") the corresponding octet. Thus, given PA set to 10.30.7.2 255.255.0.0, we use the first to octets and ignore the last two, yielding 10.30.0.0. See, Comer, Douglas E., "Implementation of Subnets with Masks", Internetworking with TCP/IP, pp. 273–274, Prentice Hall Inc., 1991.

Since the STP at this point is empty the subnet, 10.30.0.0 is not in this SPT. Thus, the answer to the question in FIG. 4, Step (3) is "no", and the process moves to Step (5) where the process adds a connection Conn[1] with subnet 10.30.0.0 to the SPT. FIG. 8B shows the state of the SPT after this operation (Step 5).

Step (4) adds a pointer to the current port address (referred to as R1,E0,IP1) under the connection that is labeled 10.30.0.0. FIG. 8C shows the result after this step.

Step 7 asks whether we reached the last port address. In this case, we have not—there is three more to process—so the proceeds to Step (6).

In Step (6) the variable PA is set to the next IP port address, which is the port address labeled (6) in FIG. 7A. After Step (6), processing moves back to Step (3).

At Step (3) the process computes the subnet for this new port address;—in this case, the subnet is 10.10.0.0 which is not in the SPT—so the answer to Step (3) is "no".

Figure 8D:
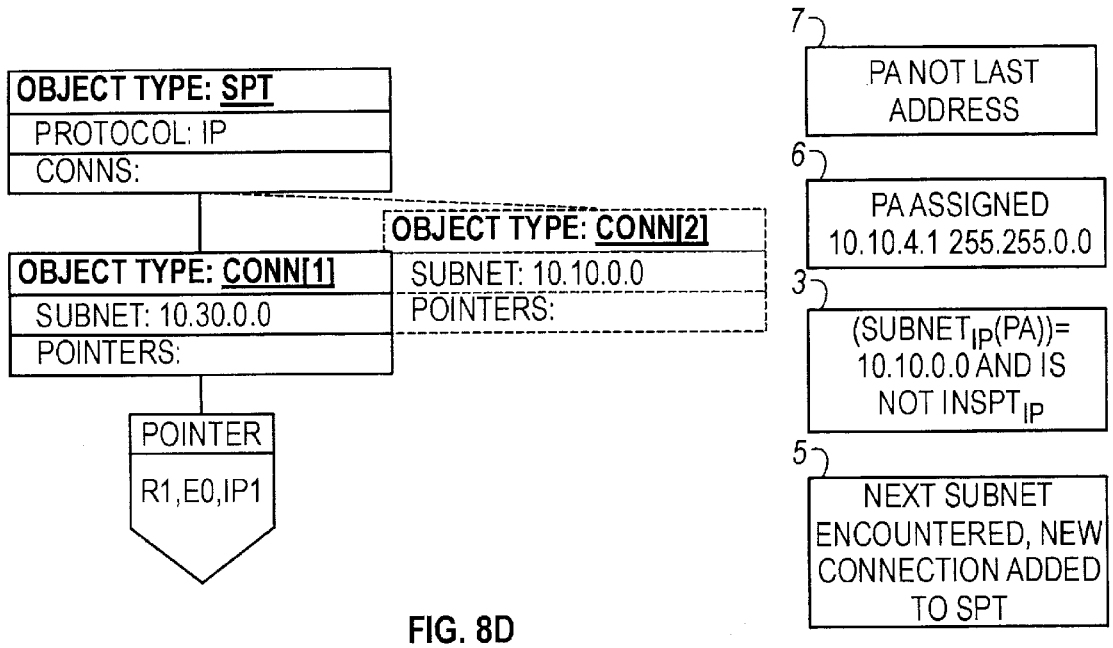

The process proceeds to Step (5) and adds a new connection, whose subnet is 10.10.0.0, to the SPT that it is building. FIG. 8D shows the state of the SPT after Step (5).

Figure 8E:
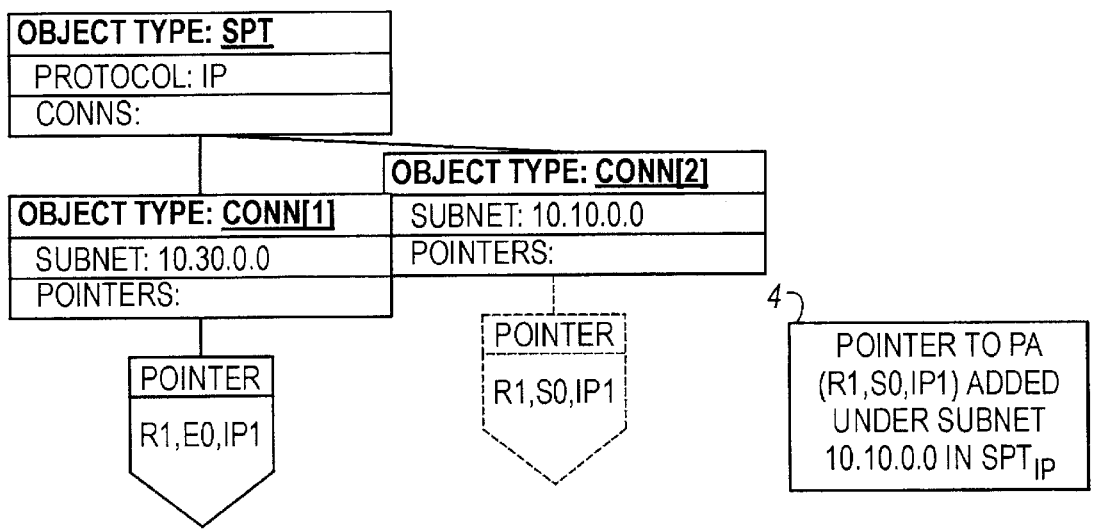

Next, processing proceeds to Step (4) where a pointer is added to PA the pointer being R1, S0, IP1—under the subnet 10.10.0.0, resulting in the structure in FIG. 8e.

Next at Step (7), since we are not at the last port address, the answer is "no"; thus processing moves to Step (6), and the port address is set to the next address which is shown in FIG. 7b at the port address labeled (1). In other words, the next port address is assigned 10.10.4.2 with mask 255.255.0.0.

Processing moves back to Step (3), and computes the subnet for the port address, which is 10.10.0.0, and the answer to Step (3) in this case is "yes", because 10.10.0.0 matches Conn[2].

Figure 8F:
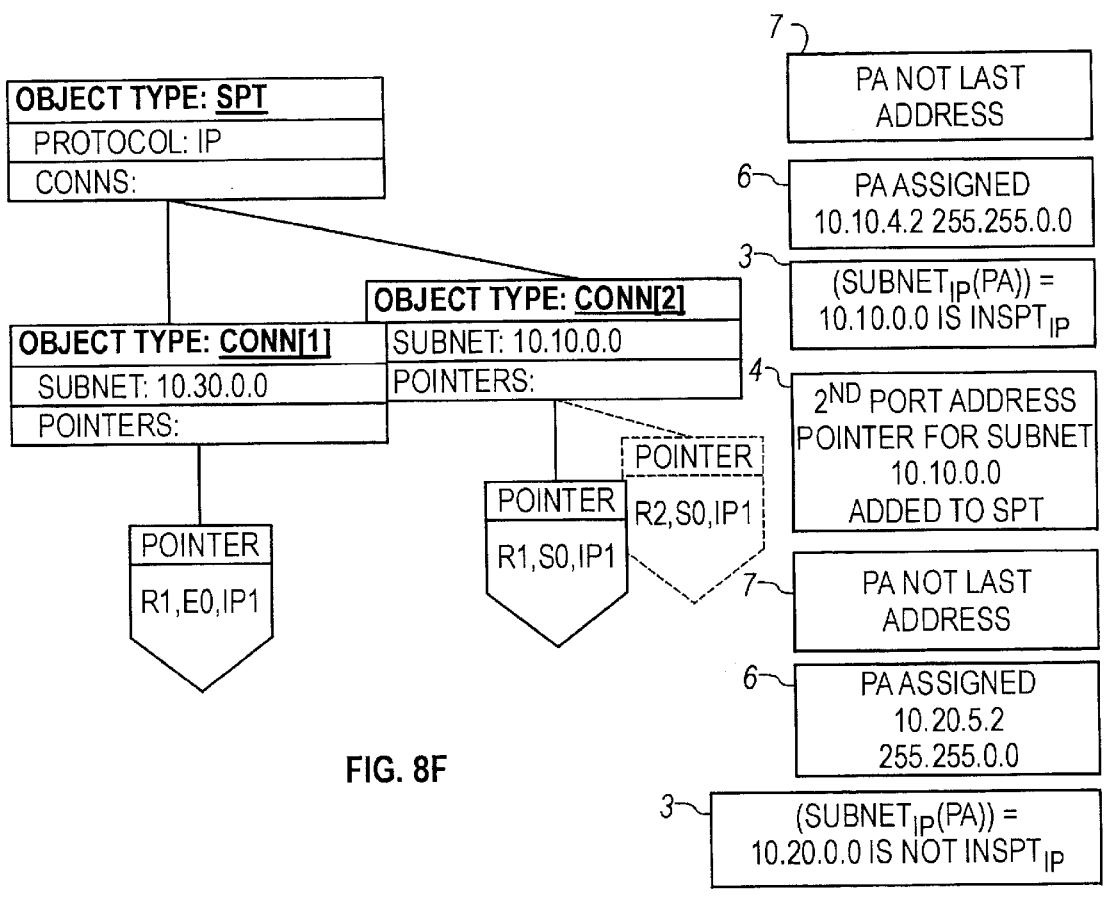
Figure 8G:
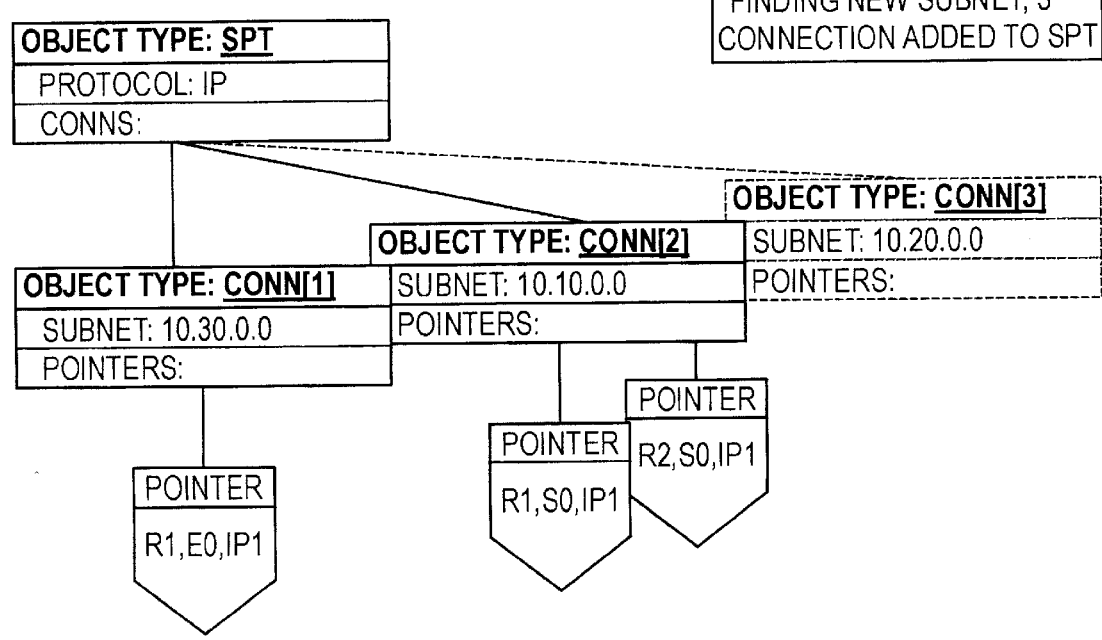

Processing moves directly to Step (4), rather than going through Step (5), and simply adds a pointer to the port address under the matching connection (Conn[2]) (i.e., the connection associated with subnet 10.10.0.0.). Referring to FIG. 8F, there is shown the status at this juncture.

The process proceeds to Step (7). PA is not the last address. So processing then goes to Step (6) where PA is assigned the address which is shown in FIG. 7B at the port address labeled (2).

Processing moves back to Step (3) and computes the subnet associated with PA which in this case is 10.20.0.0. The answer to Step (3) is "not in SPT", and thus processing moves to Step (5) and adds the subnet to the SPT resulting in the structure illustrated in FIG. 8g.

Figure 8H:
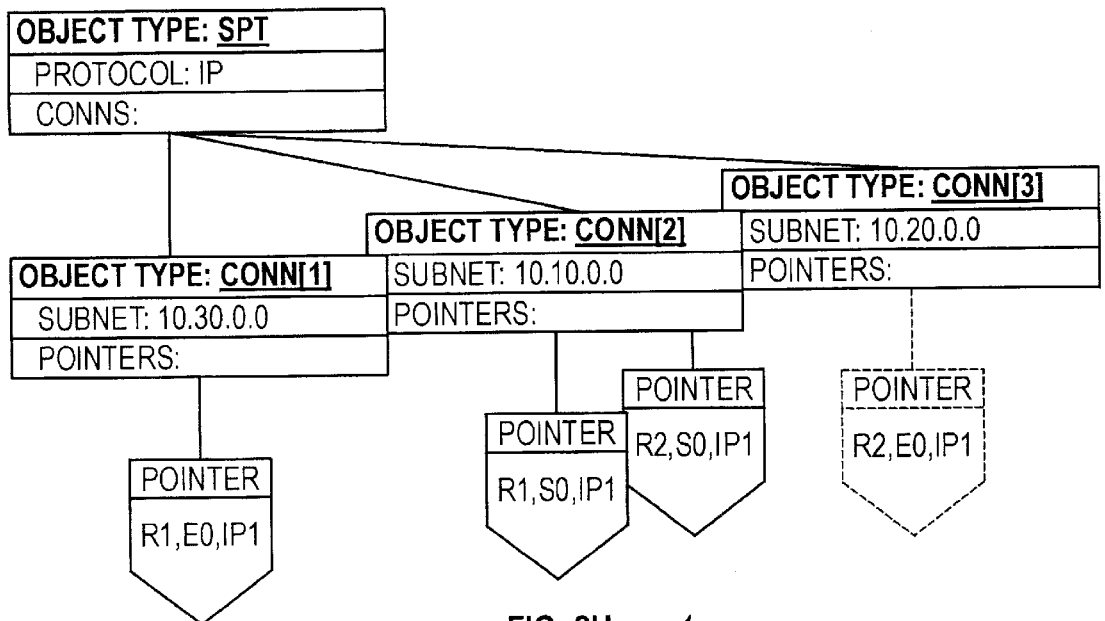

Processing then moves to Step (4) where a pointer is added under Conn[3] (i.e., the connection associated with 10.20.0.0) to this port address which is R2, E0, IP1 as shown in FIG. 8H.

Figure 8I:
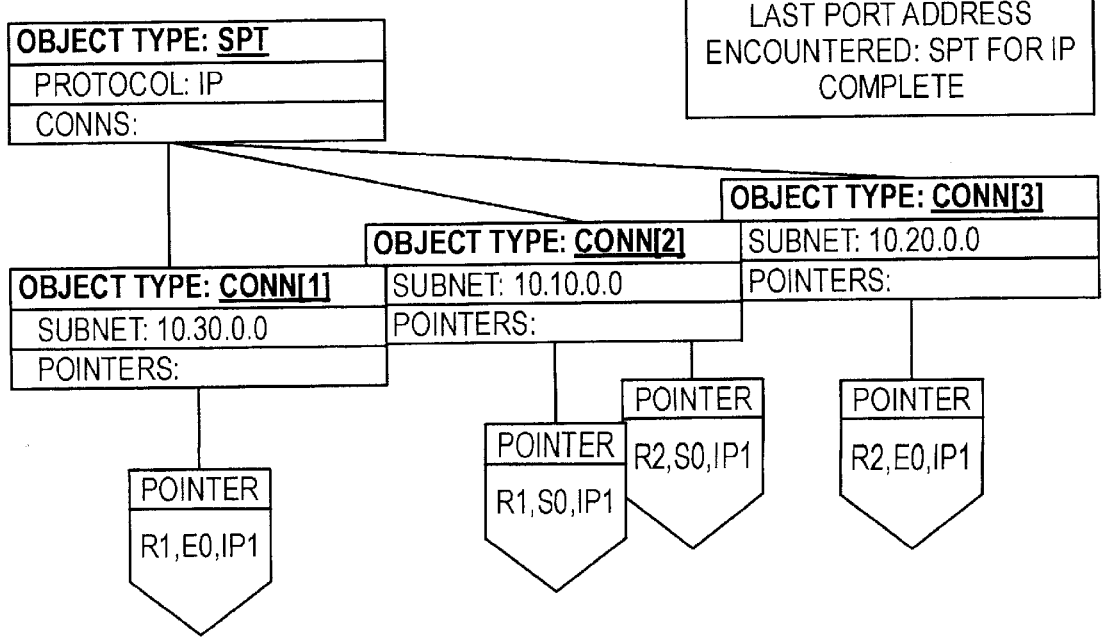

Processing moves to Step (7) and since processing has reached the last port address the answer is "yes" and the process is terminated. FIG. 8I shows the resulting SPT after all the processing is complete.

FIG. 8I is the SPT for protocol IP. The data structure of FIG. 8I represents the IP connections shown in FIG. 5. It will be helpful to see how 8I corresponds to FIG. 5. Referring to the SPT in FIG. 8I at the region labeled (1), note that there is one subnet (10.30.0.0) that connects to just one pointer. A pointer is a link into the SRO substructure corresponding to a port address. The single pointer under Conn[1] (in FIG. 8I) links to Router R1's port E0's only IP address. Conn[1] can be interpreted as capturing that subnet 10.30.0.0 which has one router point attached to it, namely router R1s E0. Since 'E' refers to an ethernet, this connection can be associated with an ethernet. Next, refer to Conn[2] in FIG. 8I, and note that this is associated with subnet 10.10.0.0, which is labelled (3) in FIG. 5, the Serial Link. This serial link connects two ports, represented in the data structure by the two pointers associated with Conn[2]. Lastly, Conn[3] corresponds to subnet 10.20.0.0, which is an ethernet with a single router port attached, Router R2's E0.

Figure 8J:
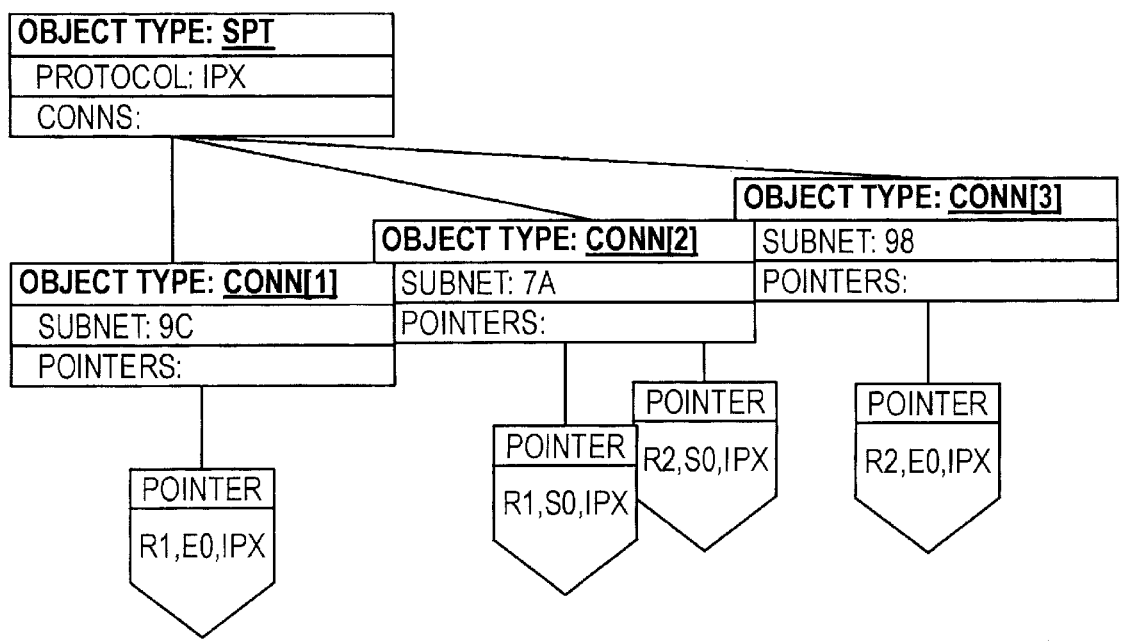

FIG. 8J shows the SPT that would be produced if the procedure in FIG. 4 were applied to SROs in FIGS. 7a and 7b for protocol IPX. A difference between the IPX and IP walkthough are that, for IPX, PA will be assigned IPX port addresses. Another difference is that for IPX a $SUBNET_{IPX}$, rather than $SUBNET_{IP}$ would be used in Step 3 of FIG. 4.

It will be apparent from the foregoing discussion that there exist only minor distinctions in the process of building the SPT among certain different protocols. If the process of FIG. 4 was building an AppleTalk SPT, it would step through AppleTalk port addresses. Another difference is the function "subnet" which is specified in FIG. 4 at Step (3). For the different protocols there are different subnet functions. We described earlier that for IP the port addresses which are given by an address and mask—the invention applies the mask using "bit-wise AND," and then does the comparison to get the subnet from the mask/address combination. For IPX, the condition is much easier. The invention simply uses the address specified in the port address which is the IPX Network Address. Once again, referring to FIG. 7A, the region labelled (7), note the address is 9C. Next reference FIG. 8J and observe that the subnet is simply the network number 9C.

Thus, a significant advantage of the processes and structures of the present invention over earlier network management tools is with the present invention, one needs go to the live network only once for each router to populate the SROs. When the SROs are populated, the formation of topology is strictly an off-line process that can proceed even if the network at that time has regions that are not operational. This is in contrast to other mechanisms which uses (on-line) discovery for topology production.

Another advantage of the invention is in creating topologies for two networks that are separate, but are to be merged. Using the methodology of the present invention, one can obtain the router configurations for one of the networks; go to the second network and get the router configurations even though they are not connected at this moment; merge them; load the configurations into SRO's; make modifications to the configurations to be sure the networks interoperate properly; and perform analysis of the newly merged networks. Generally, earlier network management tools cannot be used to form a topology unless the two networks are merged.

Figures 1, 9:
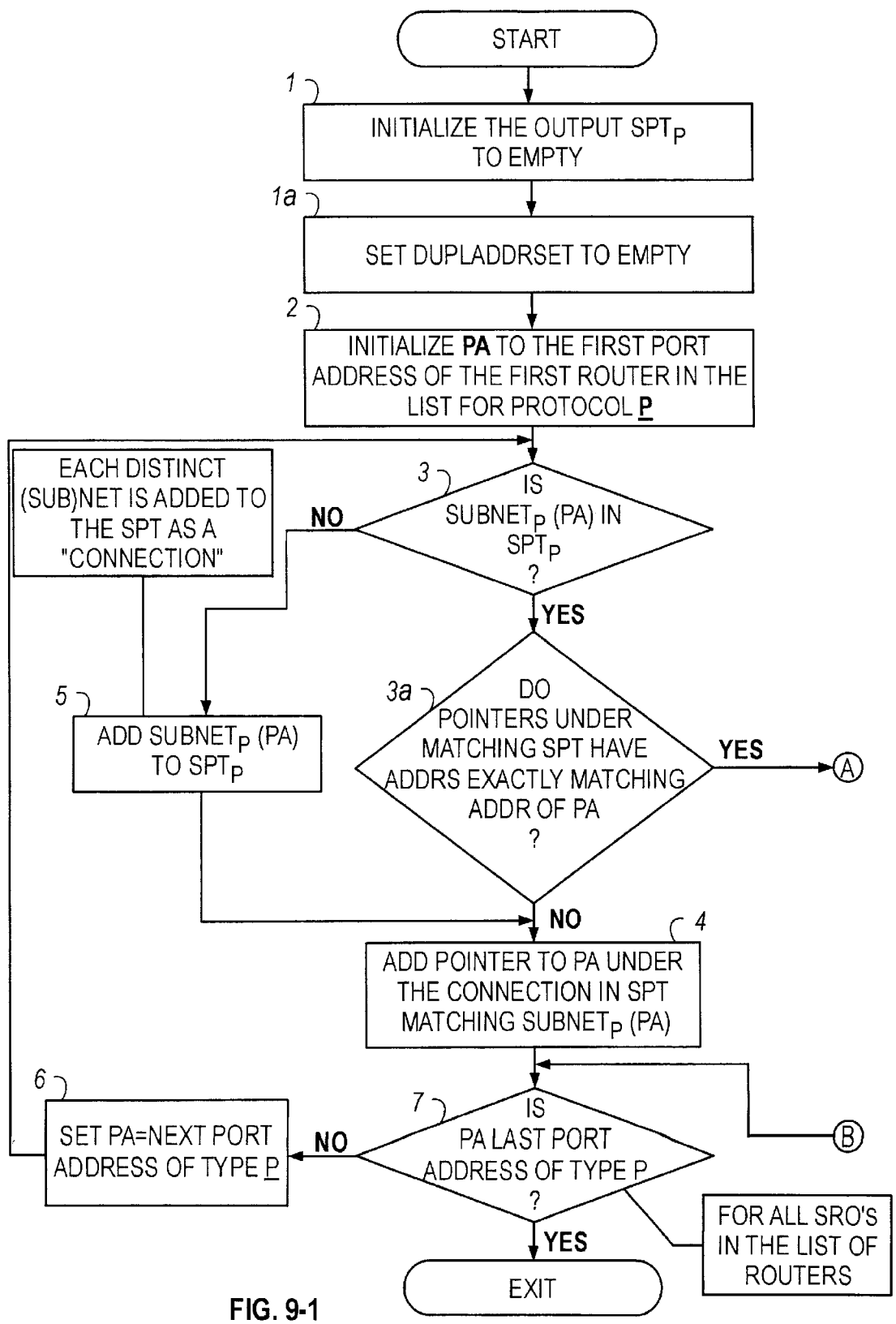
FIG. 9 shows an extension of the flowchart in FIG. 4, which constructs the SPT's, to check for the integrity violation of duplicate addresses.
Figures 2, 9:
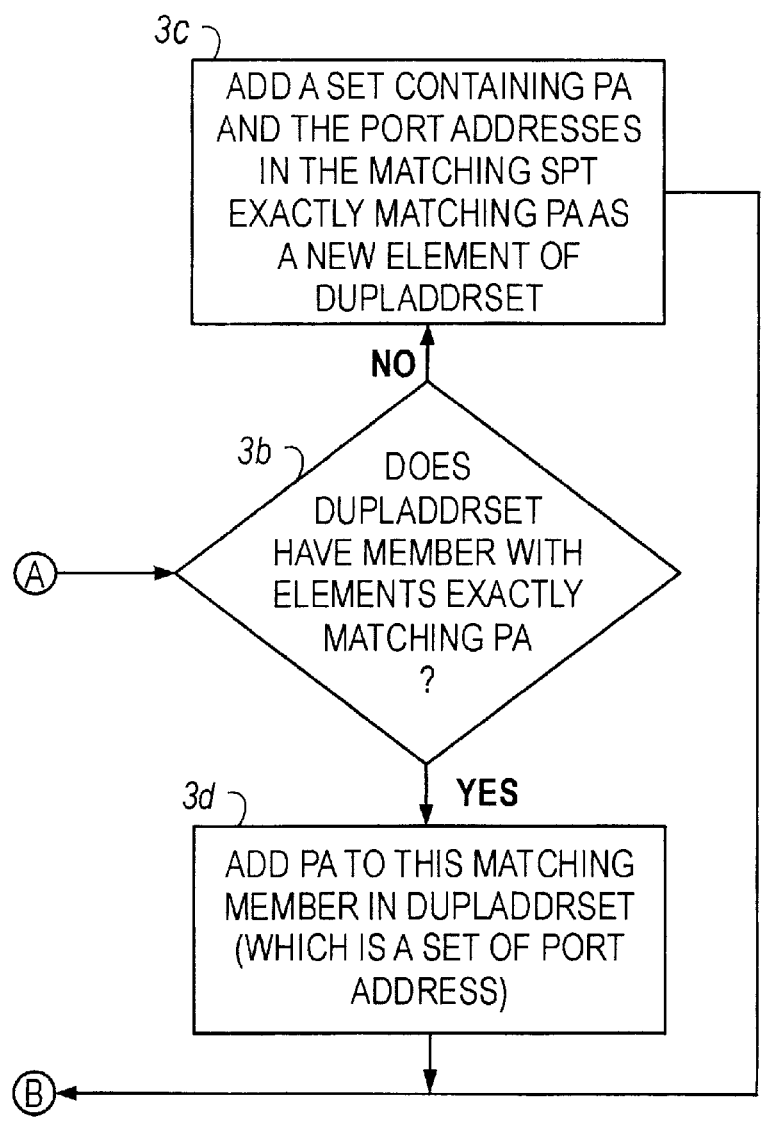

FIG. 9 shows an extension of the SPT Build process shown in FIG. 4. The process in FIG. 9 handles a complication where it is possible, due to misconfiguration that ports on two different routers are given the same address. This is high seventy integrity check, a problem that the network manager wants to correct on the network without delay. The problem is somewhat analogous to a situation where, you are mailing a letter, and two people have the exact same address. It is not clear who you would sent it to. During the process of forming the topology, a search is made for duplicate addressees. FIG. 9a shows the steps from FIG. 4 and inserts the additional steps that look for duplicate addresses.

Focusing now only on the the additional steps add in FIG. 9, Step 1a, is inserted between Step (1) and Step (2). Step 1a sets the duplicate address set to empty. The process in FIG. 9 will produce not only the SPT, but also an integrity check output set that conveys which port addresses refer to the same address. The comments on the bottom of FIG. 9 provide an example of what this set might connote. For example, consider the DuplAddrSet (which is a set of sets) with elements {PA1, PA3, PA4} means that the port address pointed to by PA1, PA3, and PA4 all refer to the exact same address. Similarly, the presence of the second set, {PA9, PA7} means that PA9 and PA7 refer to the same address. A conflicts are identified, the set DuplAddrSet will grow.

In Step (3A), if the process finds that the subset of the port address being processed is already in the SPT, then it is necessary to determine if in that SPT there are any duplicate addresses. (If the subnet is not in the SPT, it is not necessary to do the check since an address equal to PA cannot be in the SPT.) If there aren't any duplicate addresses detected in Step 3(A), the answer will be "NO" and we process as normal, going to Step (4) as it appeared in FIG. 4.

Now, back to FIG. 9, Step 3A; if the test in this step detects an address conflict, then processing goes to Step 3. Step 3b is a test that checks to see if already, in DuplAddrSet, there exists a member (i.e., a set of port address pointers) having same address as PA, the current port address). If the answer is Yes, then the matching element is extended to include a pointer to PA. If it doesn't, we add a new member to DuplAddrSet containing a pointer to PA and a pointer to the port address in SPT exactly matching PA Thus, Steps labeled (1a), (3a), (3c), (3b) and (3d), are added in FIG. 9 to look for duplicate addresses and put them in this duplicate address set, DuplAddrSet.

Referring to FIG. 1, note that the invention forms topology information and then determines whether there are any integrity violations (FIG. 1d and 1g). The address set is the result of one of the integrity checks referred in FIG. 1d. This is important information that the user can apply in FIG. 1h to find if there are problems and remove them.

FIG. 10 shows a procedure for calculating another integrity check, which is applicable to IP using an SPT. In IP, not only do you want to make sure that two addresses do not exactly match, but also you want to be sure that address/mask pairs, which intuitively refer to address ranges, either refer to the exact same ranges or do not overlap at all. We don't want the case where they overlap.

FIG. 10 illustrates a general procedure for computing the "Overlapping Address Range" integrity constraint, which is applicable for protocols, such as IP and IPX that allow interfaces to be configured with address ranges. (Note: an IP subnet as we will see, can be thought of as corresponding to an address range.

The input to the "Overlapping Address Range" flowchart is the SPT for the protocol being analyzed, which for our invention can be IP or AppleTalk and its output, the set Conflicts, whose elements are the pairs of connections in the SPT being analyzed that refer to overlaping address range. In step (1) of the flowchart (FIG. 10), the output variable Conflicts is initialized to the empty set. In Step (2), the variable Conn is set to the second connection in the SPT. (Note: if there is only one connection in the SPT then there cannot be any conflicts and we assume this procedure would not be applied). In Step (3) the process looks for any connections in SPT listed before Conn that overlaps with it; if any overlap is found, a set containing the two overlapping connections are put in as a member of Conflicts; in the bottom of FIG. 10 we show the definitions of the Overlap functions, which are the only part of the algorithm that differs from protocol to protocol. In Step (4) the algorithm checks if the last connection has been reached; if so, processing terminates; if not processing goes to step (5) where Conn is set to the next connection and processing repeats for this new connection starting at Step (3).

The overlap function for IP (shown in the first box in FIG. 10) takes as arguments two IP subnets, each which is given by a 32 bit address and 32 bit mask. The subnet given by [A1 M1] defines the range of addresses from A1 to "(A1|~M1)", where "|" refers to bitwise OR and "~" to bitwise negation. The expression "(A1|~M1) can be thought of producing a 32 bit number formed by flipping the bits in A1 that were masked out (which are the ones where M1 has 1s) from 0s to 1s. The definition for OverlapIP([a1 m1],[a2 m2]) can be interpreted as saying that subnets [a1 m1] and [a2 m2] overlap if and only if it is the case that they are not equal and not disjoint, now two addresses are disjoint if the lower bound of one of the ranges is greater than the upper bound of the other.

The overlap function for AppleTalk (shown in the second box in FIG. 10) takes as arguments two (Appletalk "subnets", each which is given by a lower and upper bound giving a cable range. The definition for OverlapAppleTalk [[cbrlb1 cbrub1], [cbrlb2 cbrub2]) can be interpreted as saying that the cable ranges [cbrlb1 cbrub1 ] and [cbrlb2 ebrub2) overlap if and only if it is the case that they are not equal and not disjoint.

Remember that we are sequentially moving through overall the processes described in FIG. 1. We have already talked about the process of taking text configuration files or MIB data and producing SROs (FIG. 1a). Given the SROs, for each of the protocols that running on the network, individual SPTs are formed (part of what is done in FIG. 1b). Given each of the individual SPTs, there are a number of integrity checks we apply (some of what is done in FIG. 1d). For each SPT, duplicate addresses are identified in the associated protocol. Additionally, for IP, overlapping subnet masks are identified.

Figure 11:
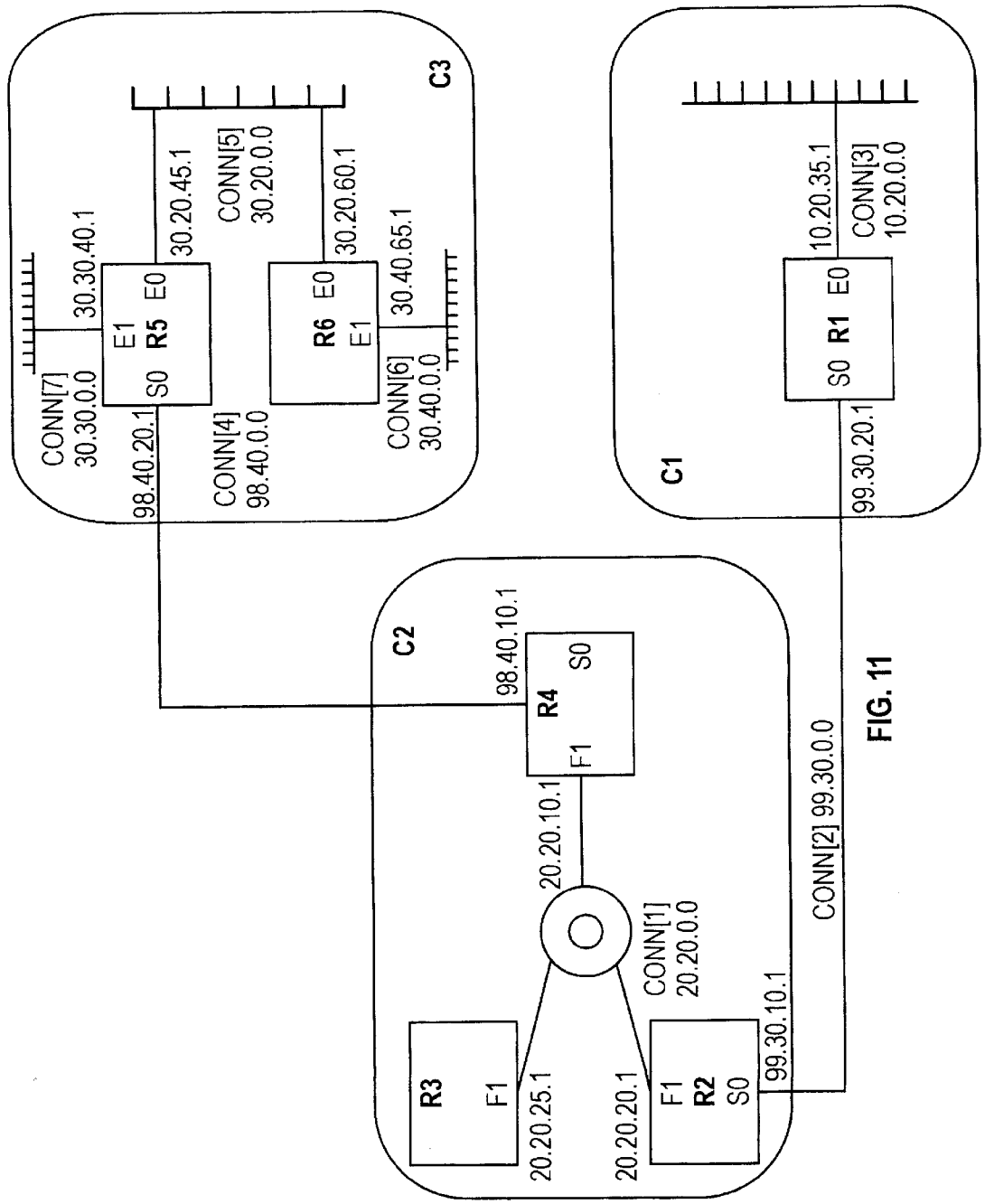
FIG. 11 is a topology drawing of a hypothetical network shown with a Campus View. It supports discussion of the "Create Views" process shown as FIG. 1c.
Figure 12:
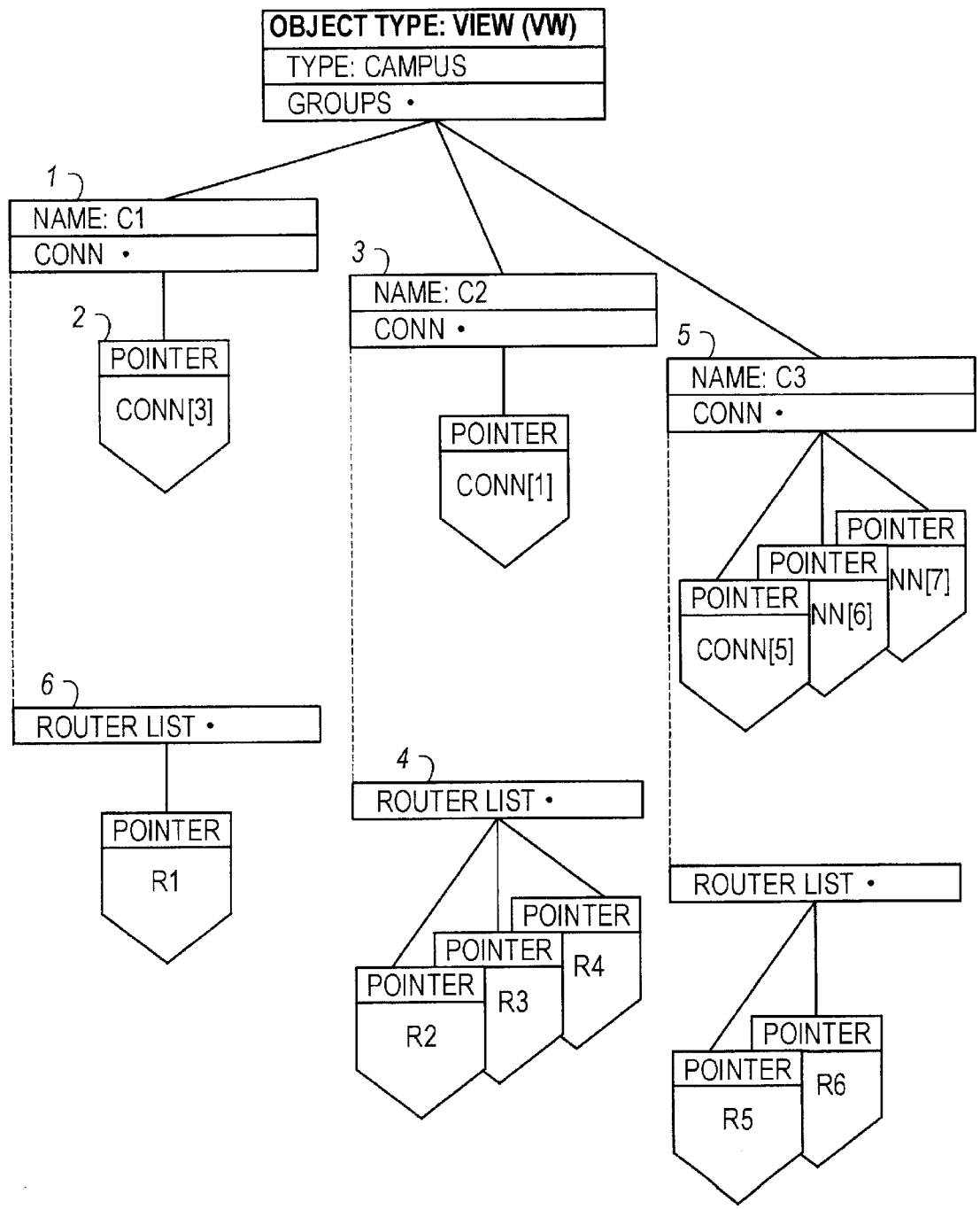
FIG. 12 shows the object data structure of a Campus View Object corresponding to the topology shown in FIG. 11.

Next, we provide examples of the production of views in accordance with the process represented in FIG. 1c. The first example is illustrated in FIG. 11. The term "view" as used herein means an abstract representation of a level 3 topology that omits irrelevant elements and logically groups elements. FIG. 11 provides a view which groups routers together to show which routers and LANs share the same campuses. In FIG. 11, we show campuses labeled C2, C1 and C3, each containing routers and LANs. Referring to C2 first, we see that routers R3, R4 and R2 are grouped together appearing in Campus C2. Referring to C3 next, we see that router R5 and R6 are grouped together and if we look at C1, we see that there is one router in this campus, R1. To understand how this information is captured in data structures, in accordance with the invention, refer to FIG. 12, which provides an example of a "View" data structure in instantiated form. The same basic type of data structure framework is used for the different type of views. The first element in this View data structure is the atomic attribute "Type" set to "Campus" to distinguish it from different views, such as the OSPF view. The next attribute, "Group"; is a list of objects, each of them being what we call a "Group", which shows how the routers, links and LANs, or in our terminology "Connections" tie together. Going back to FIG. 12, refer to reference-numeral (1), which refers to an object with name C1. The next attribute Conn refers to a list of pointers to connections in the SPT being abstracted. These connections are the links and LANs that belong to the group. In FIG. 12, in the group with name C1, we see that the Conn[3], which corresponds to the ethernet 10.20.0.0, is a member. In FIG. 11, this ethernet is within the C1 campus group. Groupings have two parts, the connections and the routers. In C1 of FIG. 11, note that router R1 is in this grouping. Refer to the Router List attribute at region (6) FIG. 12 where there is a pointer to just a single router, R1.

In FIG. 12 reference numeral (2) indicates a pointer into SPT. Many of the data structures of the present embodiment of the invention are intertwined data structures that connect the topological information to the SRO information.

Referring to reference numeral (3) in FIG. 12, a group corresponding to campus C2 is shown. The connection that belongs to it is Conn[1] and the routers that belong to it are R2, R3 and R4 (shown at Point (4)). The last group (reference number 5), corresponds to campus C3; it has three connections associated with it, Conn[5], [6], and [7] and two routers, R5 and R6. Note that a view might not contain all routers or all connections that are contained in an SPT. It merely describes the elements that are relevant to the abstraction. In a campus view, some of the connections may be omitted. Connections belong to a campus view only if they are LANs. So, for example, Conn[1] in FIG. 11 is a FDDI and is in C2. We see that Conn[3] is an Ethernet, and that is in C1; also connections Conn[7], Conn[6] and Conn [5], which are all Ethernets, are in C3. There are two connections, serial links (Conn[2] and Conn[4]) in FIG. 11 that do not appear in FIG. 12, because serial links do not belong to a particular campus; rather they span campuses.

Figure 13:
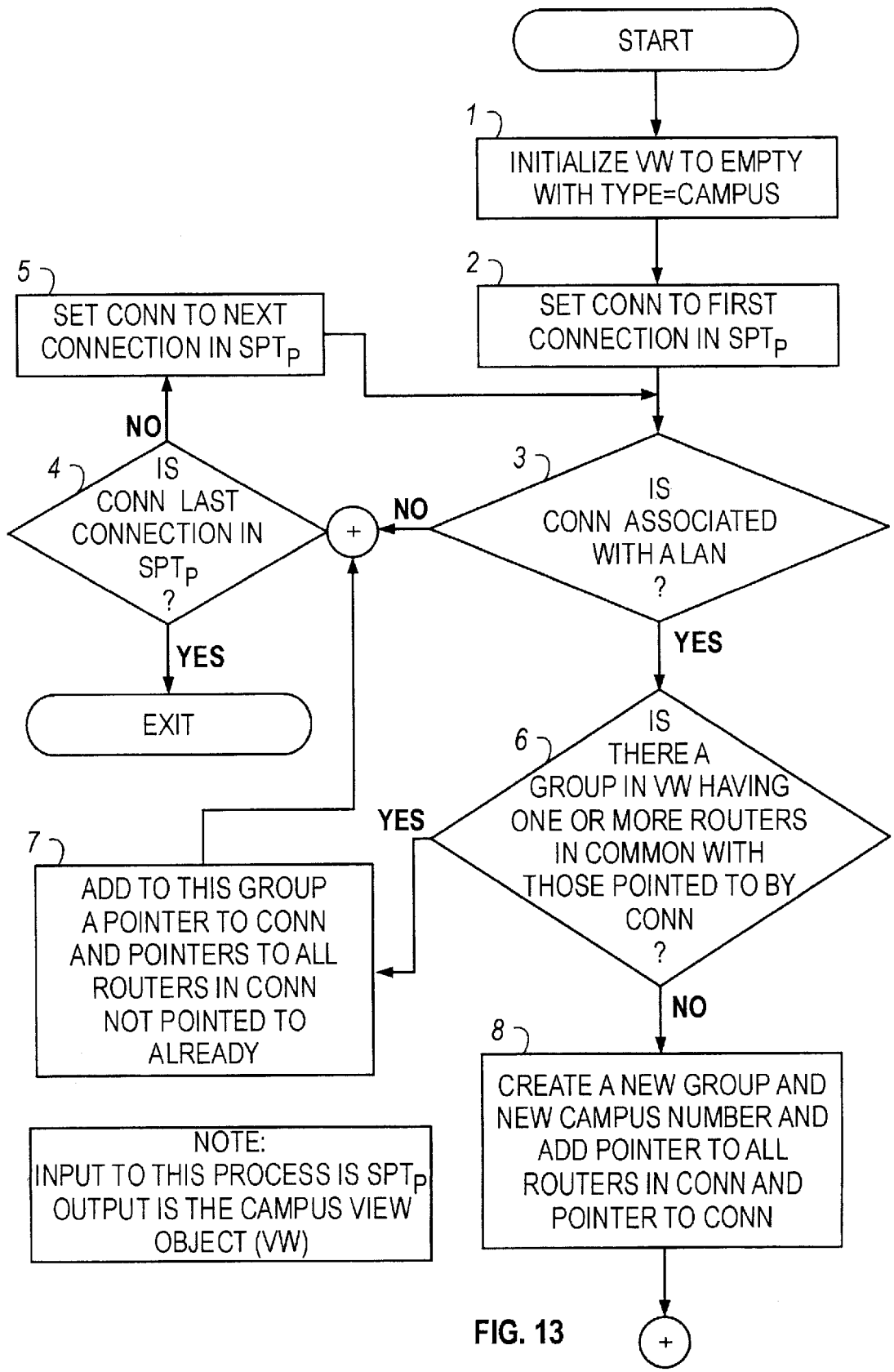
FIG. 13 is a flowchart of the process that forms a Campus View Object, given an SPT and SROs as input.

FIG. 13 is a flowchart that illustrates a process for constructing a campus View object given as input, an SPT and the SROs that are pointed to by the SPT. In FIG. 13, we refer to $SPT_p$, where "P" can stand for any protocol since basically the same is used for multiple protocols, e.g., IP, IPX, AppleTalk etc.

Referring to FIG. 13, we first initialize the view object (VW) to "empty" and set Type to "campus". Next, at step (2), the variable Conn is set to the first connection in SPT (really $SPT_p$). In the following discussion, realize that the view object formation process iterates through all the connections in the SPT under consideration.

In Step (3), we ask whether the Conn variable is associated with a LAN. If the answer is "no", (in other words, Conn is associated with a serial link or any other wide area link) then the connection is ignored and processing goes to Step (4), which asks whether the last connection in SPT been reached. If it has, the procedure terminates. If it has not, then Conn is set to the next connection in the SPT, and processing goes back to Step (3).

On the other hand, at Step 3, if the Conn is a LAN connection, we go to Step (6), which asks whether there is a group in a view already having one or more routers in common with those pointed by Conn. (Remember that Conn is a connection in a SPT, which has pointers to port addressees, and each port address belongs to a router). If the answer is "yes", then we go to Step (7) and add to this existing group in the view a pointer to Conn under the Conn attribute and pointers to all routers associated with Conn under the Router list attribute. If the answer to Step 6 is "no", then processing goes to Step (8) where we create a new group. We give each group a unique name, (Campus C1, Campus C2, etc.) We add a pointer to Conn connection and to all routers pointed to by this connection. After this step, we go back to Step (4) and find out if we reached the last connection. If not, iterate to the next connection. Similarly, after Step (7), we go back to Step (4) ask whether we have reached the last connection. If not, we continue to process connections until we have processed them all. So, the result, upon answering "yes" in Step 4 is that the process terminates and the object VW (the view object) will be fully instantiated. For example, for the network view in FIG. 11, we have a view object like that in FIG. 12.

We will next provide an example involving the formation of an OSPF view. OSPF is a particular routing protocol. See, Spohn, Darren L., "Router Protocols", Data Network Design, pp. 192–213, McGraw-Hill Inc., 1993. Also, see the following Requests for Comment issued by the Internet Engineering Task Force (IETF): RFC 1771—A Border Gateway Protocol 4 (BGP-4) specification; RFC 1131—OSPF specification; and RFC 1058—Routing Information Protocol (RIP). Basically, routers run routing protocols in which they exchange and generate information to produce routing tables. For OSPF, a network is grouped into areas with some routers called area border router, responsible for exchanging information between areas.

Figure 14:
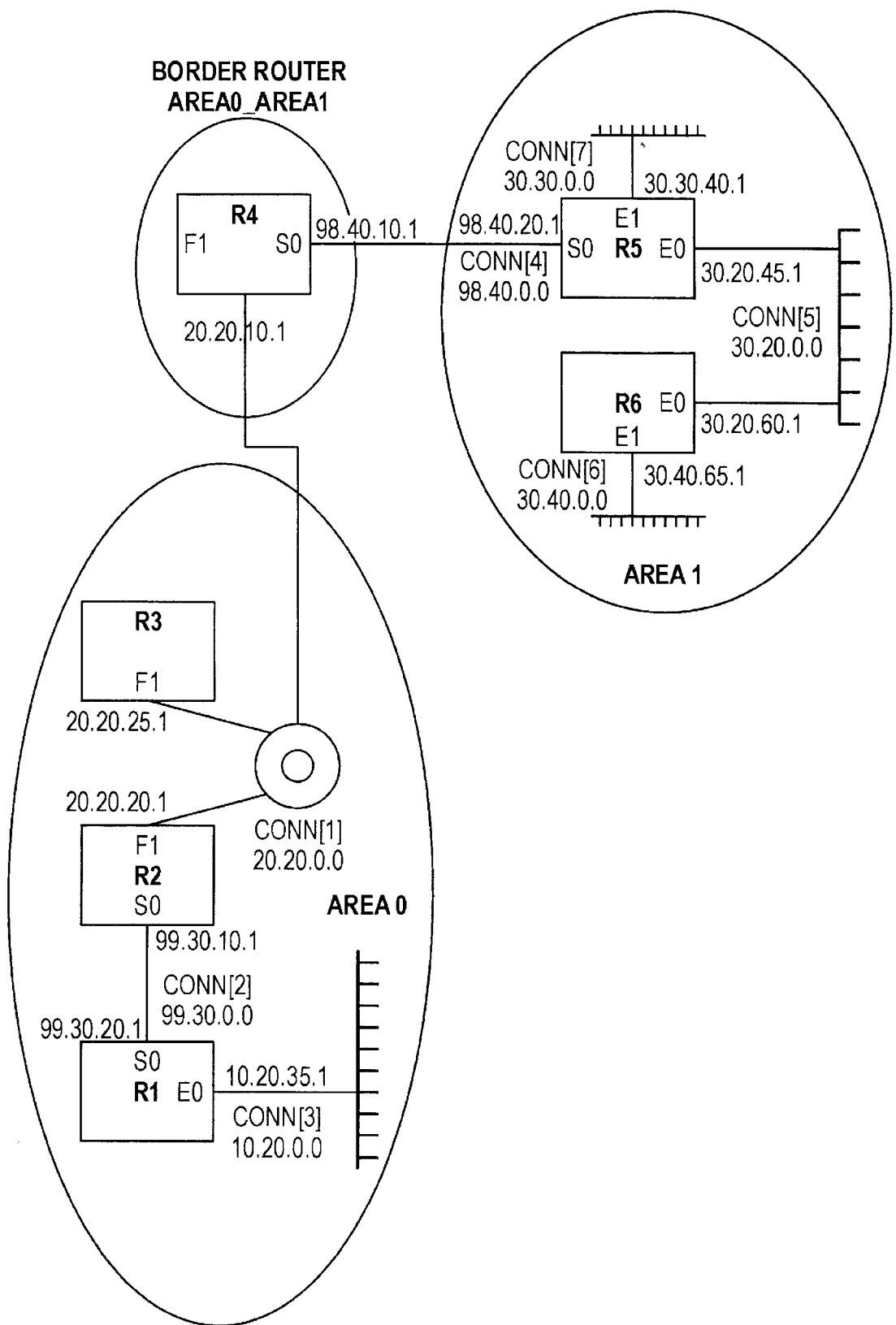
FIG. 14 is a topology drawing of the same network shown in FIG. 11 representing an OSPF view of the same configuration shown in a Campus View (ref.
Figure 15:
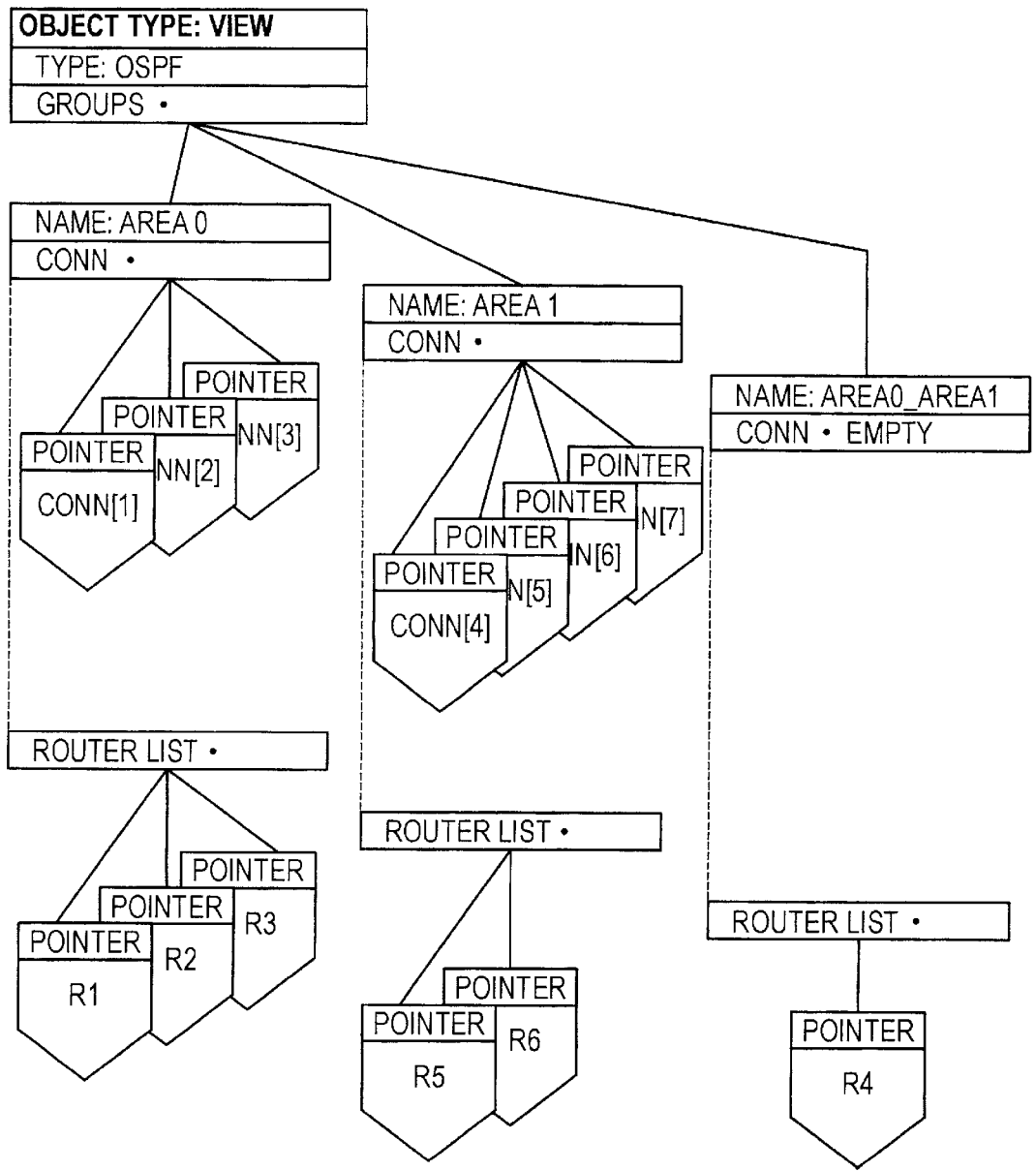
FIG. 15 is the OSPF View Object data structure corresponding to the topology shown in FIG. 14.
Figure 16A:
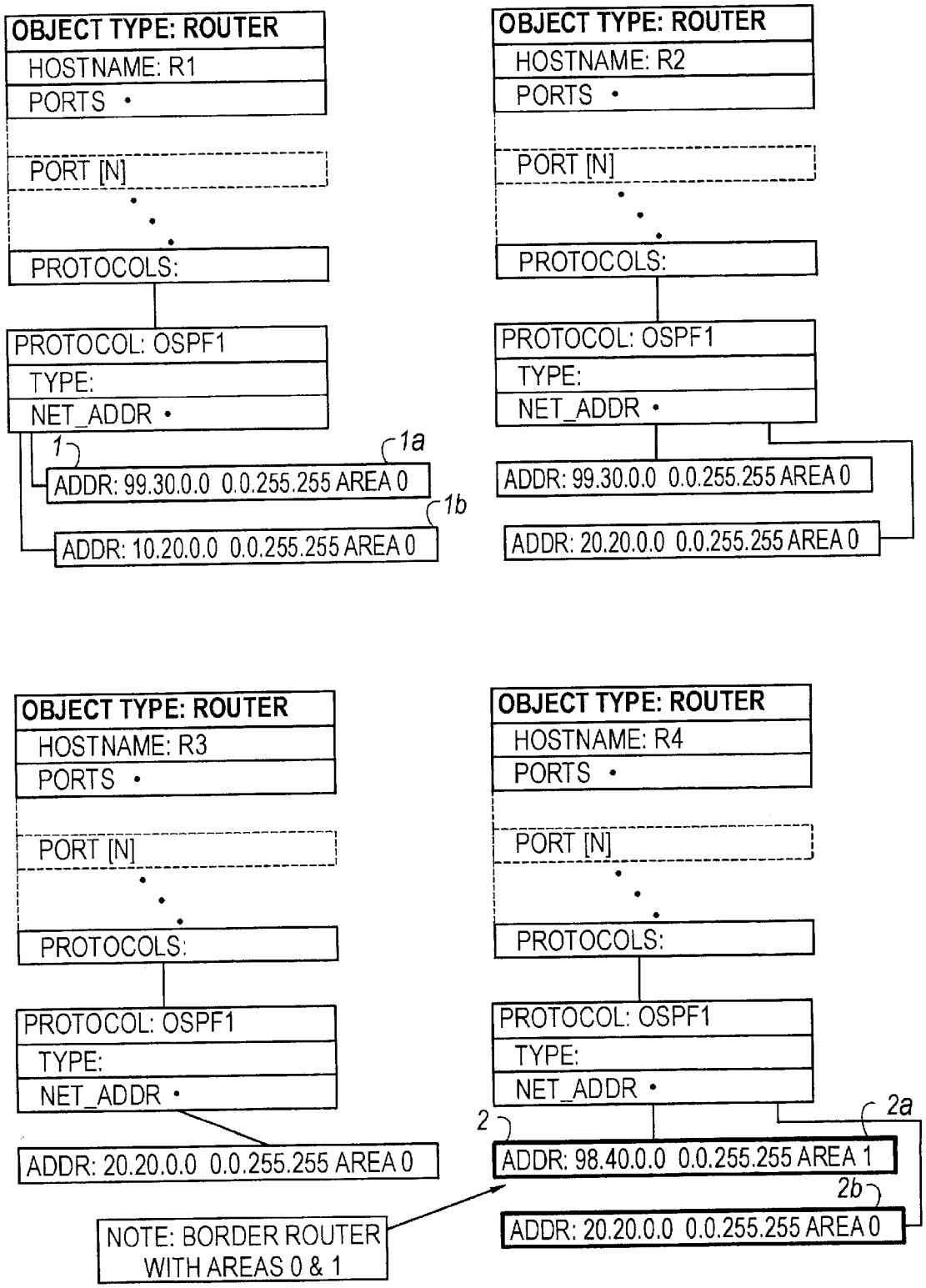
FIGS. 16a & b shows the SRO object data structures for the routers shown in FIG. 14.
Figure 16B:
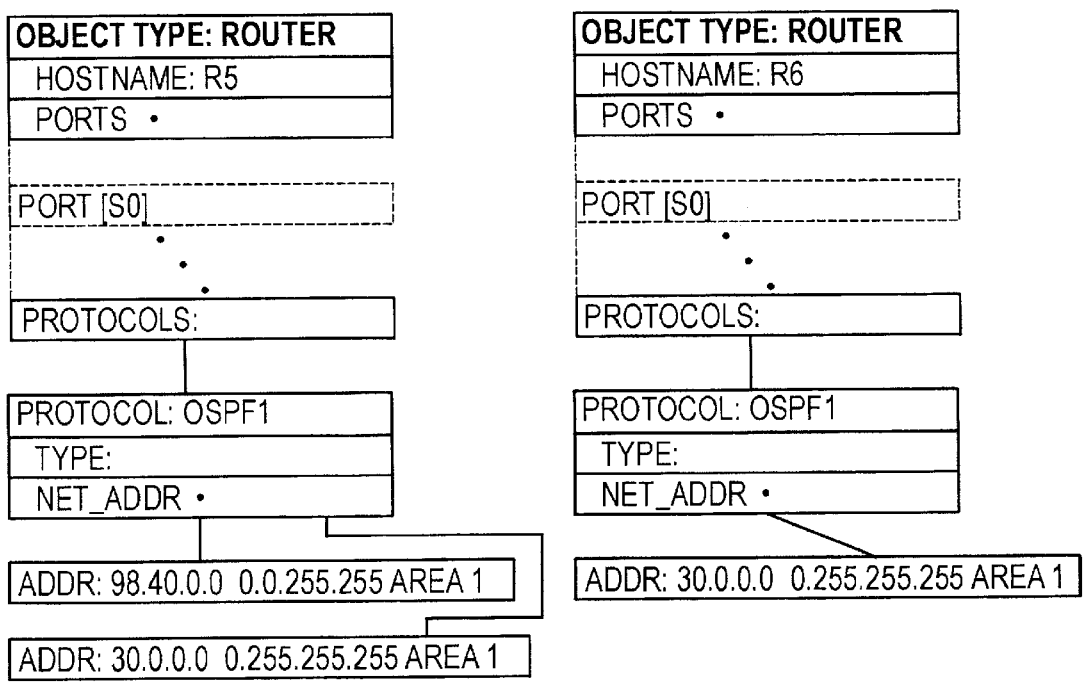
Figures 1, 17:
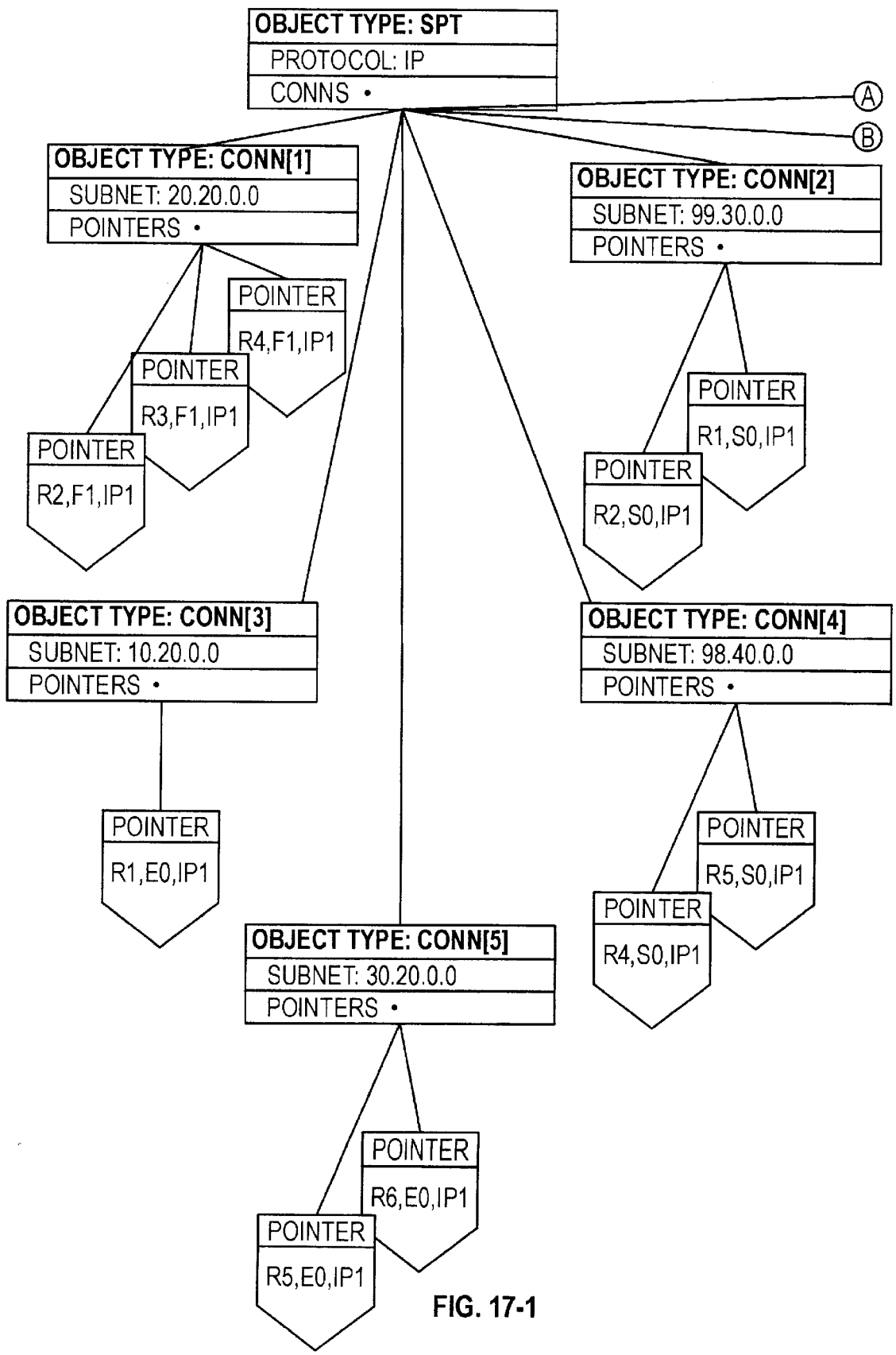
FIG. 17 shows the SPT object data structure for the network shown in FIG. 14.
Figures 2, 17:
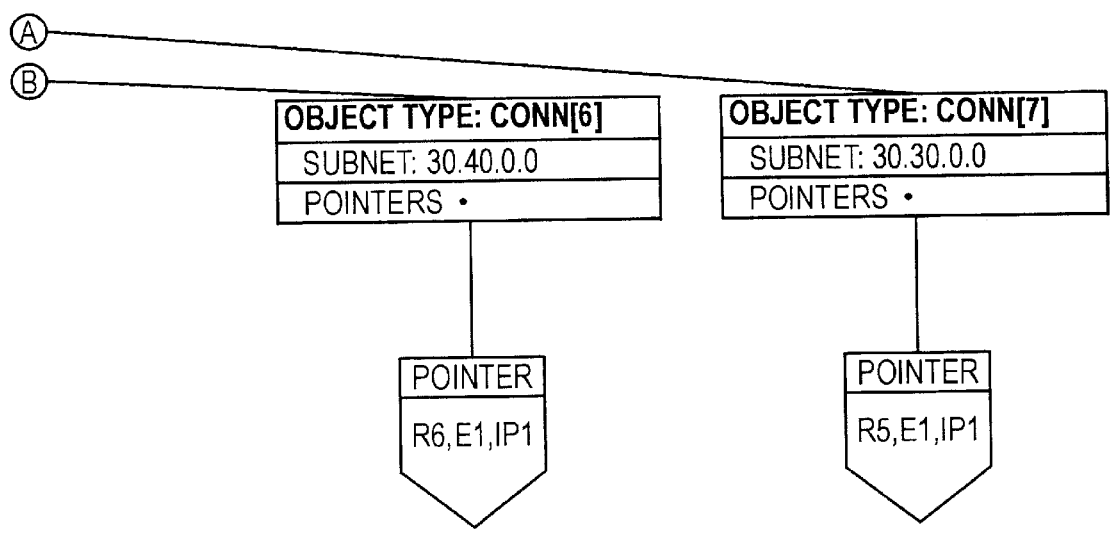

FIGS. 14 through 17 deal with creating an exemplary OSPF View. FIG. 14 gives an intuitive picture of an exemplary OSPF view. FIG. 15 shows an example of a data structure that captures the OSPF view of FIG. 14. FIGS. 16*a* and 16*b* are portions of the SROs for the routers shown in FIG. 14 that are relevant for the analysis. Finally, FIG. 17 is an IP SPT that was formed for the routers in FIG. 14.

Referring to 14, there are two Areas, Area 0, (encompassing routers R1, R2 and R3) and Area 1, (encompassing routers R6 and R5 and a group with a single router 4) which is the area border router between Area 0 and Area 1; to be more specific, R4 is running both Area 0 and Area 1.

Referring to FIG. 15, there is shown a View data structure that captures the grouping of FIG. 14. The View object Type is OSPF. The View object's TYPE attribute distinguishes it from other View objects, such as the campus view TYPE. Next, note the groups attributes. The group attribute comprises a list of group objects. The first group refers to Area 0, the connections in that group are, Conn[1], [2], and [3], and the routers in the group are, R1, R2 and R3. The next group refers to Area-1, which includes Conn's [4] thru [7] and routers R5 and R6. Finally, there is a group for the area border router R4.

FIGS. 16*a* and 16*b* illustrate how router configurations as captured by the SROs contain the information that is used to indicate which areas the different routers correspond to. In FIG. 16*a*, we see that the SRO for router R1 is running an OSPF process, OSPF 1. Note that a router can be running many different OSPF processes. For simplicity here, we only consider cases where a router runs just one process. At reference numeral (1), we see that the OSPF process on router R1 has an attribute called Net Address, which refers to a list of statements indicating what areas the different router interfaces belong to. To find out if an interface belongs to a particular area, you sequentially go down the list of network statements looking for a match. Referring to FIG. 16*a*, the process for finding a router interface's area involves first starting network statement object labeled (1*a*) and seeking a match. If there is no match, then the process proceeds to the network statement object labeled (1*b*). If no match is found in any of the Net-addrs, this interface does not belong to any Area and is not considered in an OSPF view.

The actual matching process is as follows. Consider the item 1*a* that has 99.30.0.0 and 0.0.255.255 as it matching pattern. Referring to FIG. 14, we see router R1, port S0 has an address of 99.30.20.1, which matches 99.30.0.0 and 0.0.255.255. The second part, 0.0.255.255, is called an access list mask, to distinguish it from the masks found on IP port addresses. For "port address" mask, the Octet, "255" mean "consider" the corresponding address octet during the matching process, and "0" means ignore the corresponding address octet. For access lists, the meaning of the matching octets are reversed. "255" means ignore the matching address octet, and "0" means consider it. So for example, the pattern at the network statement (1*a*) means look for addresses that start with 99.30 because there is a corresponding 0.0 matching octet, but ignore the rest of the address because the mask ends with 255.255. So we see that R1, S0 has address 99.30.20.1 which matches item 1*a* in FIG. 16*a*, and consequently R1, S0 belongs to Area 0. Referring to FIG. 14, R1, E0 has address is 10.20.35.1. This does not match item 1*a* but does match item 1*b* so this interface (E0 on R1) is in the specified area Area 0. In summary, looking at FIG. 16, we see that both interfaces, S0 and E0 for router R1, shown in FIG. 14 match Area 0.

As another example of interface matching in OSPF areas, refer to reference numeral (2) in FIG. 16. Now refer FIG. 14 at Router R4. Router R4 has two interfaces, F1 whose address is 20.20.10.1 and S0 whose address is 98.40.10.1. Now going back to FIG. 16A, reference numeral (2) shows the network statements for router R4. The first network statement reference numeral (2) shows the pattern 98.40 (ignore the rest of the bits). This matches Serial 0's address (98.40.10.1), and thus this interface is in area 1. However, F1's address (20.20.10) does not match the first network statement, (the statement at reference numeral 2 in FIG. 16a), but the second network statement matches 2b. Thus F1 (from router R4) is in the area specified by network statement 2b, i.e., Area 0.

For the routers running OSPF, determining what areas their interfaces match is an important step in the algorithm for producing the OSPF view. Very briefly, if there is a router that has one or more interfaces, all of them belonging to the same area, then this router will be put in the group for this area. For example, you see that routers R1, R2 and R3, in FIG. 14 have all their interfaces match a statement associated with area 0. On the other hand, router R4 has interfaces that match two different areas, so it is in its own border area group. Similarly, routers R5 and R6, have all their interfaces match area 1. Thus, R5 and R6 are in area 1.

An advantage of multiple views is if you have a particular task at hand, then a specific view might be particularly suitable. The OSPF view, for example, is a view that would be useful for configuring OSPF. In configuring OSPF, a central concept is specifying what areas each router, running OSPF belongs to. So being able in a very succinct way, to observe the area groupings is an enormous benefit in gaining a more comprehensive understanding of how the OSPF processes are running.

Placing a router in the wrong area is a very easy mistake to make. For example, in typing in a configuration, a user's mistyping 1 instead of 0 in a single area statement changes what areas a router's interface is in. Thus, it is very helpful to have a view based upon OPSF areas to permit easier diagnosis of errors, for example.

As we mentioned, FIG. 17 is the IP SPT, which will be produced by running the algorithm we described in FIG. 4 on the SROs corresponding to routers R1 to R6.

Figures 1, 18:
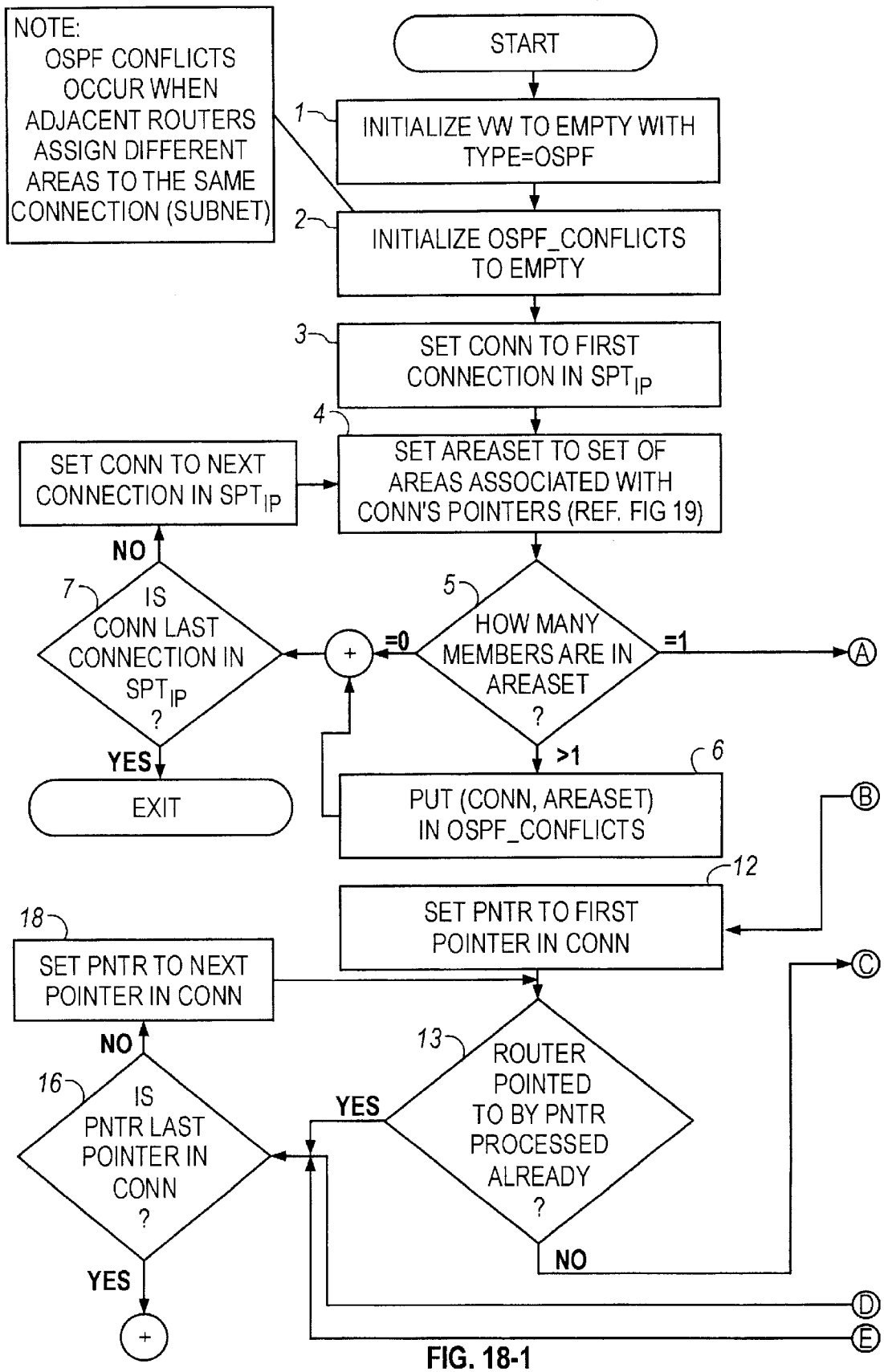
FIG. 18 is a flowchart of the process that forms an OSPF View object data structure given an SPT and set of SROs as input.
Figures 2, 18:
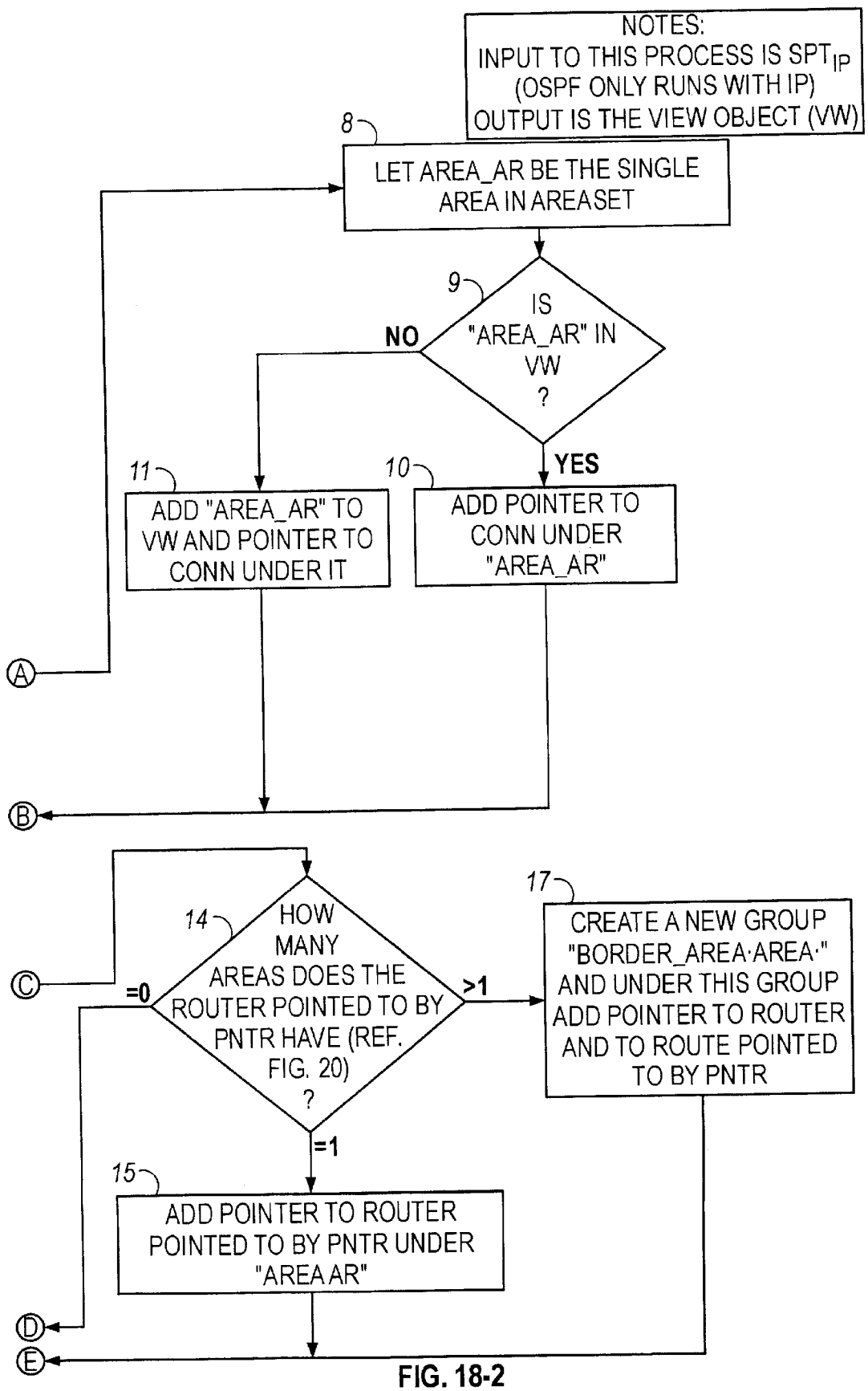

FIG. 18 is a flow chart which shows how the OSPF View is produced with the inputs being the IP SPT its related SROs. In the course of producing the OPSF View, an integrity check is performed which determines whether there are two adjacent routers running OSPF that have their connected ports assigned to different areas. This condition is a misconfiguration that should be pointed out to a user so he or she can correct the error. In step (1) of FIG. 18, the main object we're building, the VW object is set to empty with Type set to OSPF. In Step (2), the OSPF Conflict set is initialized to empty. In this algorithm, we will be iterating through the connections in the IP SPT. So in Step (3) variable Conn is set to the first connection in the IP SPT. Next, in Step (4), the AreaSet is assigned the set of areas associated with Conn's pointers. We will go into detail about this process in FIG. 19. If connection Conn has one or more ports which are running OSPF, then Conn will be processed. On the other hand, if no ports are running OSPF, it is ignored. If it is the case that there is a conflict as, for example, when one port attached to Conn has area 1 associated with it, and another port attached to the same Conn has area 0 associated with it then AreaSet will have more than one element. So let us see how this is done. In Step (5) we ask "how many members are in AreaSet." If the answer is "0" that means that there are no routers touching this connection with ports that run OSPF, and we go to Step (7) meaning that we go on to the next connection, if it exists. At Step (7), the process checks whether the last connection has been reached. If it has, processing terminates. Otherwise processing goes to Step (7a) where Conn is set to the next connection and the process iterates through the loop again going back through (4) to (5), etc. On the other hand, if there is a conflict in which there are two or more areas associated with a single connection, then Conn processing from Step (5) goes to Step (6) where the connection Conn is put in OSPF_conflicts.

Another case arises when the connection is only associated with one area in which case the process continues to Step (8). In Step (8), just for convenience "Area_Ar" refers to the case where there is a single element in AreaSet.

After Step 8, processing proceeds to Step (9) which asks whether the area associated with connection Conn is already in the view. If it is in the View, then we want to add this connection under this area which is accomplished at Step (10). On the other hand if the area associated with Conn is not in the view, processing goes to Step (11) where a new group labeled "Area_Ar" is created and under which there is added a pointer to Conn. From both Steps (11) and (10), processing goes to Step (12).

Steps (12) through (17) are responsible for putting routers pointed to by Conn under the appropriate area if they have not already been placed. Recall that a connection points to a set of port addresses each one of them corresponds to a router. We set variable PNTR to the first pointer in Conn at step (12). We then go on to (13), which asks whether a router associated with this pointer is in the View already". If the answer is yes, then we do not have to process this router and we go on to Step (16), which asks whether PNTR is the last pointer in Conn. In other words, it asks whether we have finished processing the routers in Conn. If that is the case, then we go on to Step (7) to process the next connection. If not, we go on to (18) to process the next pointer (more particularly to the router pointed to by this next port address pointer and go back to Step (13)).

Figure 20:
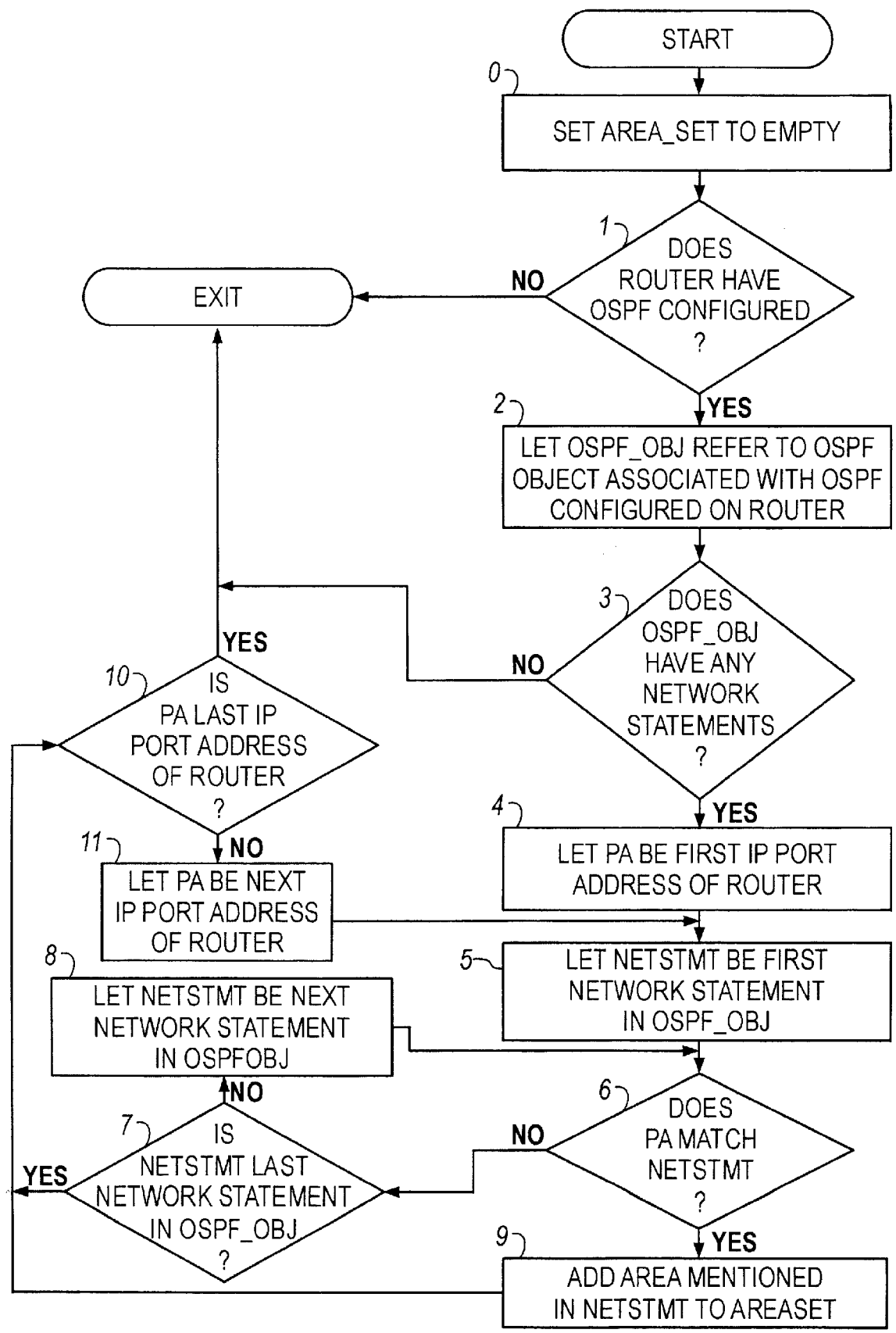
FIG. 20 is a flowchart expanding on the "How Many Areas Does Router Have" question from FIG. 18.

In Step (13), if the router associated with PNTR has not been processed already, we go to Step (14) and ask how many areas the router pointed to by PNTR has. FIG. 20 shows detail of how the answer to this is computed. If the answer is zero, in other words this is a router which is not running OSPF, then we just go on to Step (16). If the area answer is 1, then we know that this router is running one area, Area_Ar and thus we put it under group Area_Ar under the Router Lists attribute. On the other hand, if the router is running in more than one area, then we know that it is a border area router, and we construct a special group for that router. That happens in Step (17) where we create a new group called "Border Area" and a pointer to the single router in this group. In the View of FIG. 14, router R4 is one of these border routers, and hence belongs to its own group.

Figure 19:
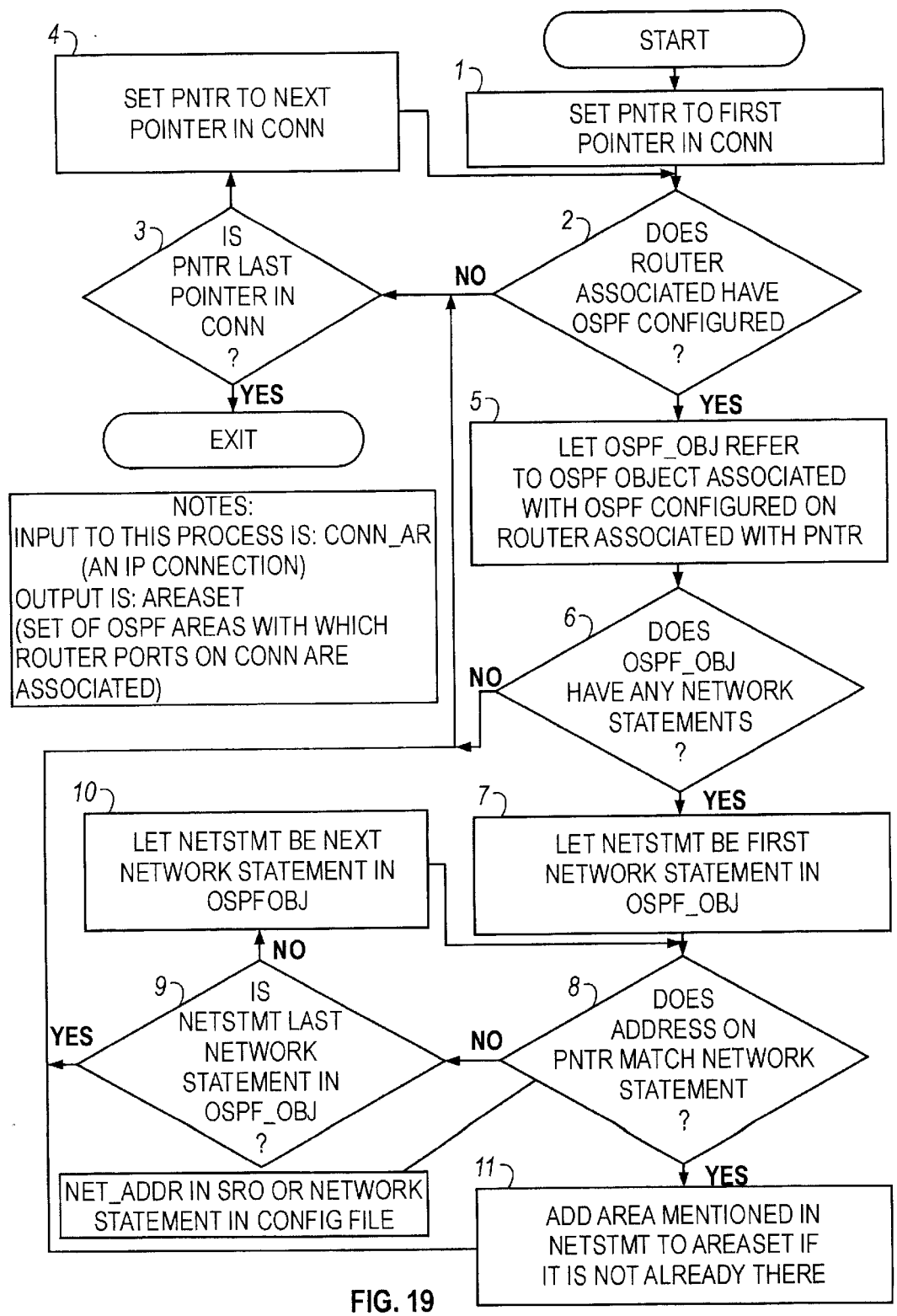
FIG. 19 is a flowchart expanding on the "AreaSet" concept introduced in FIG. 18

FIG. 19 is a flow chart which explains details of Step (4) in FIG. 18. This is a procedure, which given as input a particular Connection in a IP SPT, indicates all the areas associated with the router ports which are attached to this connection. Let's start at Step (1) in FIG. 19. As an overview of the following discussion of FIG. 19, the process for associating areas and router ports involves iterating through the pointers contained in the input connection, or in other words, iterating over all the routers that are connected to the input connection Conn. At Step (1), PNTR is set to the first pointer in Conn.

Step (2) asks if a given router pointed to by PNTR has the routing process OSPF configured. If the answer is "no" then the procedure does not have to process this given router. At Step (3) a determination is made as to whether PNTR is the last pointer in Conn. If it is, then processing is finished. If not, the process moves to Step (4) in which PNTR is set to the next pointer in CONN. The process then returns to Step (2). On the other hand, if the given router has OSPF configured, Step (5) is reached.

Note that for simplicity we assume that a router only has one OSPF process, if it has any. The actual implementation of the preferred embodiment, however, can handle multiple OSPF protocols on a single router, and this process described herein naturally extends to cover that situation.

At Step (5), for convenience, we let OSPF_obj refer to the OSPF object associated with the router pointed to by PNTR. The process then proceeds on to Step (6), which asks whether the OSPF_obj has any network statements. If the answer is "no", then the process go back to step (3) and iterates through and processes the next router. If the answer is "yes" then "Netstmt", becomes the first "network statement" in OSPF_obj.

In steps (7) through (11), the process goes through sequentially the list of network of statements associated with the OSPF process to see if the address associated with PNTR matches one of those statements. If so, then the process uses the area number associated with that network statement. At Step (7), the process makes Netstmt the first network statement. Step (8) asks an address associated with PNTR matches the network statement". The details of this matching process are described earlier in this specification. If there is a match, then the process proceeds to Step 11 which adds the area mentioned in the network statement to the output AreaSet if it is not there already. Processing then goes back to Step (3) to process another router, if any are left. On the other hand, if at Step (8), the address does not match the network statement, then the next OSPF network statement is processed, looking for a match, if it exists.

FIG. 20 depicts a flow chart that describes in detail Step (14) in FIG. 18, it asks how many areas a particular "router" is associated with. We contrast this with the process in FIG. 19 which is the question: how many areas a "connection" has associated with it.

The first step in FIG. 20, labeled (0), is to set the output AreaSet to empty. The process next goes to Step (1), and asks "whether a router has OSPF configured". If the answer is "no", then the process is finished, and the output area set is empty. If the answer is "yes", the process proceeds to Step (2). For convenience the variable OSPF_obj is set to refer to the OSPF object associated with the input router. The process then goes to Step (3) which asks whether this OSPF object has any network statements. If it does not, then the process exits with the answer being that the area set is empty. If it does, the process goes to Step (4) and iterates over the port address on this router. Step (4) lets the variable PA be the first IP port address of the input router. The process then goes to Step (5).

Step 5 lets Netstmt be the first network statement in the OSPF object. Next, Step (6), asks whether PA (the Port address that is currently being processed) matches the network statement, Netstmt. This notion of matching is the same as that described at Step (8) of FIG. 19. If there is no match, go to Step (7) and the last network statement has been reached. If the last network statement has been reached, go to Step (10) to process the next port address on the router.

In Step (7), on the other hand, if the last network statement has not yet been reached, then go to Step (8), and we set the variable Netstmt to this next network statement and iterate through the loop to determine whether there is a match. Now referring again to Step (6), if a match is found, then the area mentioned in the Netstmt is added to the AreaSet, and the procedure goes to (10) to process a new port address.

Figure 34:
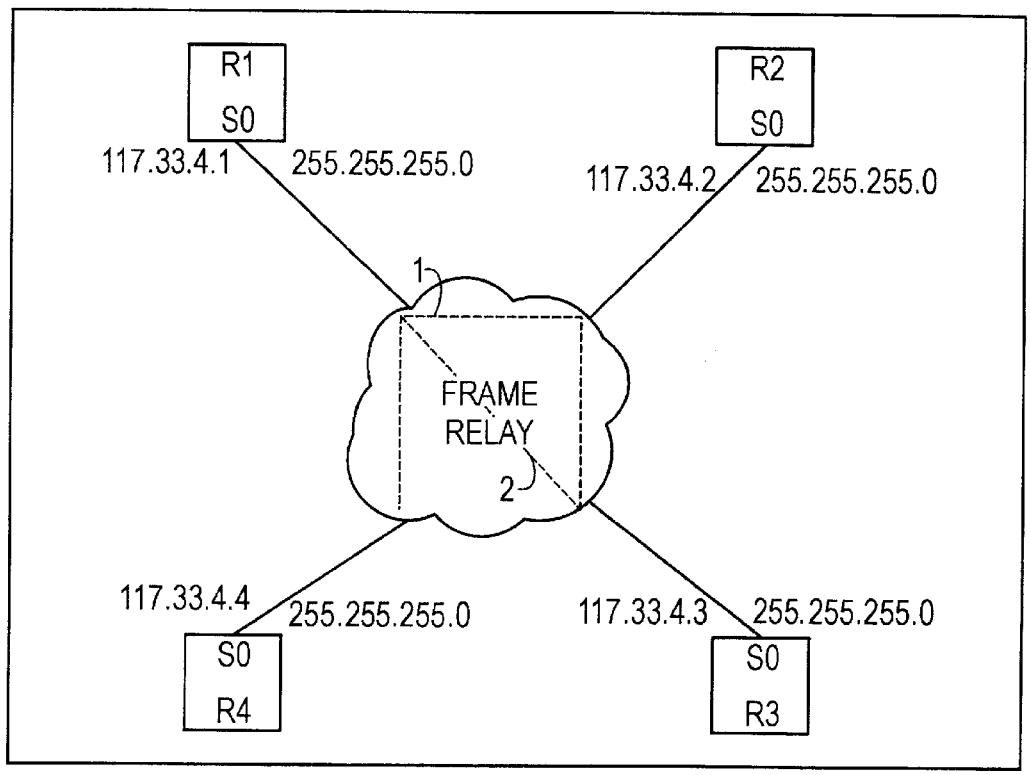
FIG. 34 is a topology drawing of a hypothetical network. It is referenced by subsequent figures in support of the illustrations related to the Multipoint WAN-complication discussion.
Figure 35:
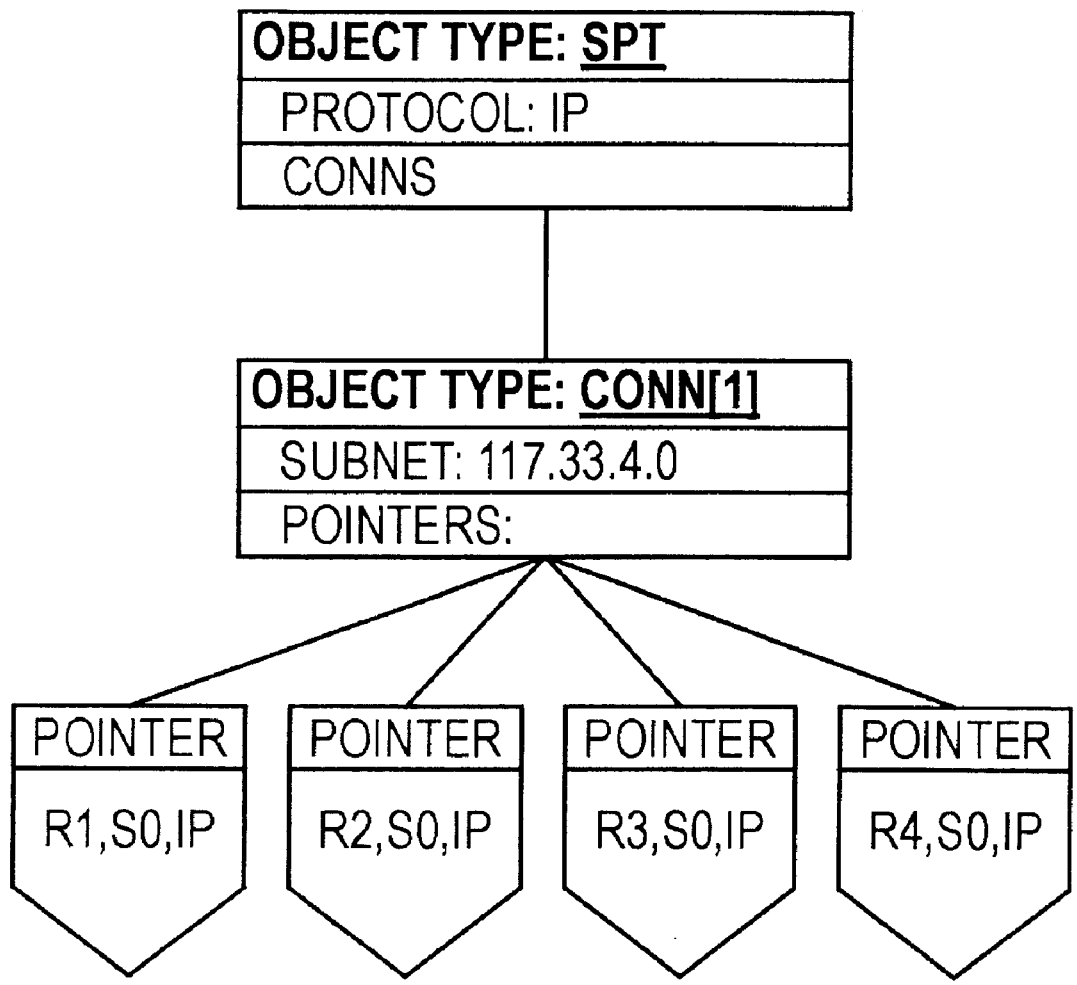
FIG. 35 shows a SPT object as would be prepared by a naive algorithm incorrectly creating pointers for a Frame Relay WAN (FIG. 4) without the enhancements shown as FIG. 32.

The following discussion addresses some of the issues that come up with a multi-point WAN, such as Frame Relay. We will first give an intuitive description and then show how we modify the flow chart in FIG. 4 to account for the complications that the multipoint WAN introduces. Let us first start with an intuitive view of an exemplary network depicted in FIG. 34, which shows 4 routers R1, R2, R3, R4 that are connected through a Frame Relay cloud. Each of these routers attach to the Frame Relay cloud through its S0 port. As far as the Level 3 view is concerned, all the routers that hook into the frame relay, such as, R1 and R2 are one hop away. Another consideration to note is that all the S0 port addresses for all the four routers belong to the same subnet, 117.33.4.0. If we took the algorithm, described in FIG. 4, (or even with the extensions shown in FIG. 9) and just simply applied it to the description of this network as given by its SROs, we would produce the SPT depicted in FIG. 35. The SPT in FIG. 35 shows that R1's, R2's, R3's and R4's S0 port all are attached to subnet 117.33.4.0. The implicit assumption of these four ports in the same grouping is that they all could directly reach each other, or in network terms, that they are "fully meshed". For a LAN this is the case; all the connected ports can directly communicate.

A potential problem, however, is that in a multipoint WAN, such as Frame Relay for example, the connected routers may not be fully meshed. For example in FIG. 34 we show that there is only a partial meshing. The dotted lines, in the Frame Relay cloud in FIG. 34, are there to convey that the pairs of routers that can directly "talk" are: R1 and R2; R1 and R3; R1 and R4; and R2 and R3. This is not a full meshing, for example, because R4 cannot directly talk to R3.

Figure 36:
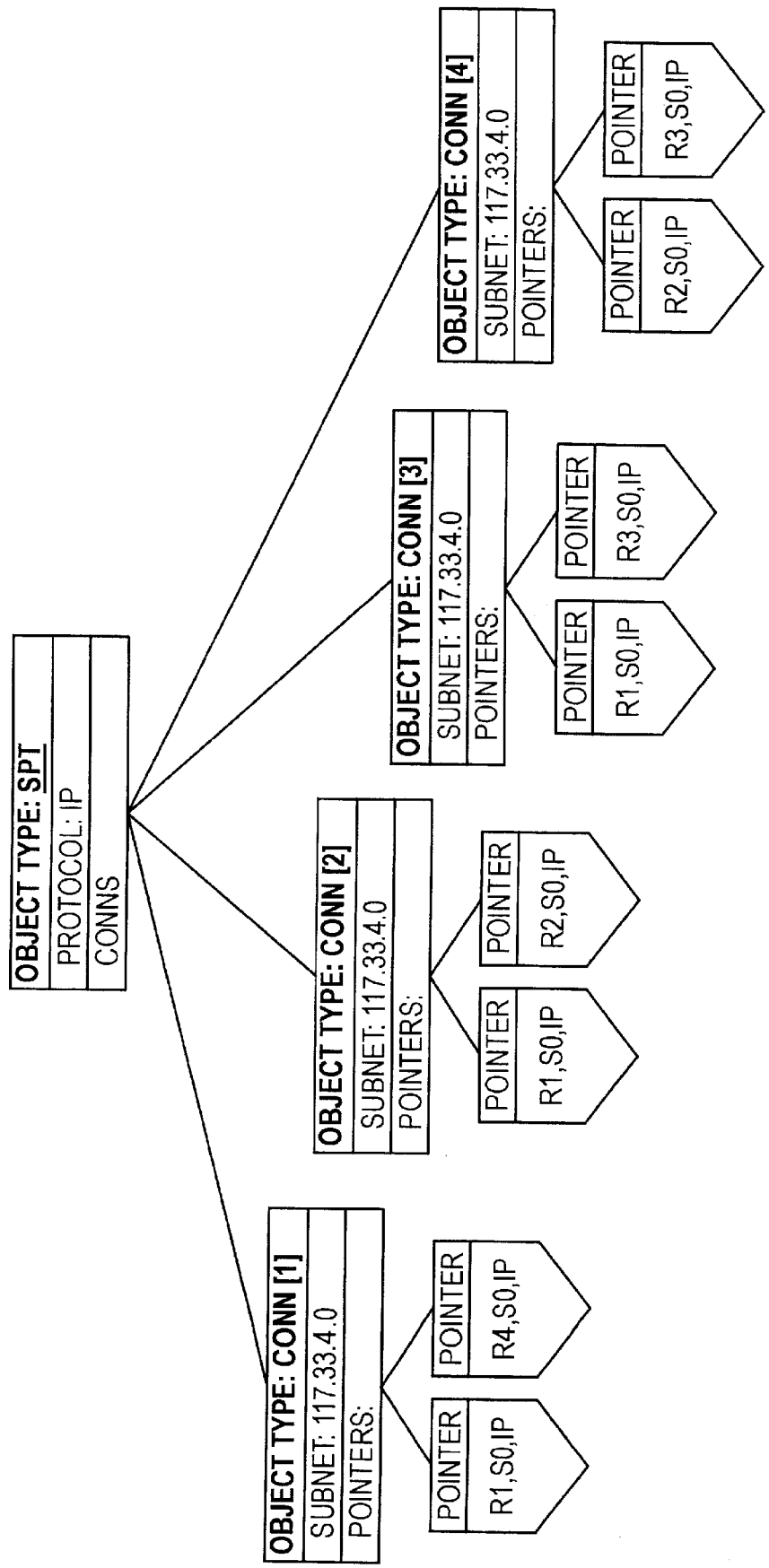
FIG. 36 shows an accurate SPT object for FIG. 4 as computed by the SPT build algorithm that takes into account Multipoint WAN complication as shown in FIG. 33.

An important aspect of capturing a Level 3 view is capturing the fact that R4 and R3 are not directly connected. If we use the SPT in FIG. 35, we are not capturing that distinction. Instead, we can use the SPT in FIG. 36 to represent this incomplete meshing. FIG. 36 shows four Connections, all with the same subnet 11733.4.0. These four Connections show the directly connected routers in the Frame Relay Cloud.

There are a number of sources of information about meshing in a multipoint WAN, such as Frame Relay. One mechanism to determine the meshing is by the inclusion in the router configuration text of explicit Frame map commands. Looking at FIG. 38a at reference numeral (1) there appears command, "Frame Relay Map IP", and the address 117.33.4.2 and the number 100 (and the term "broadcast" which is not relevant to the disclosure). This command which is associated with router R1's S0 port is saying that S0 is meshed with the address 117.33.4.2, an address of R2. So, reference numeral (1) in FIG. 38a corresponds to the dotted line marked (1) in FIG. 34. Similarly, referring to the second line under the Frame Relay Command, in FIG. 38a, we see mention of address 117.33.4.3 which corresponds to the dotted line that connects R1 to R3 in FIG. 34. Referring next to FIG. 38b, at reference numeral (3), we see the mapping from R1 to R2 in the other direction: from R2 to R1. In summary, the presence of the map commands in router configuration files is one source of information to determine the meshing in a Frame Relay cloud, for example. This information often can be obtained from text files, such as those shown in exemplary FIGS. 38a through 38d.

Figure 37:
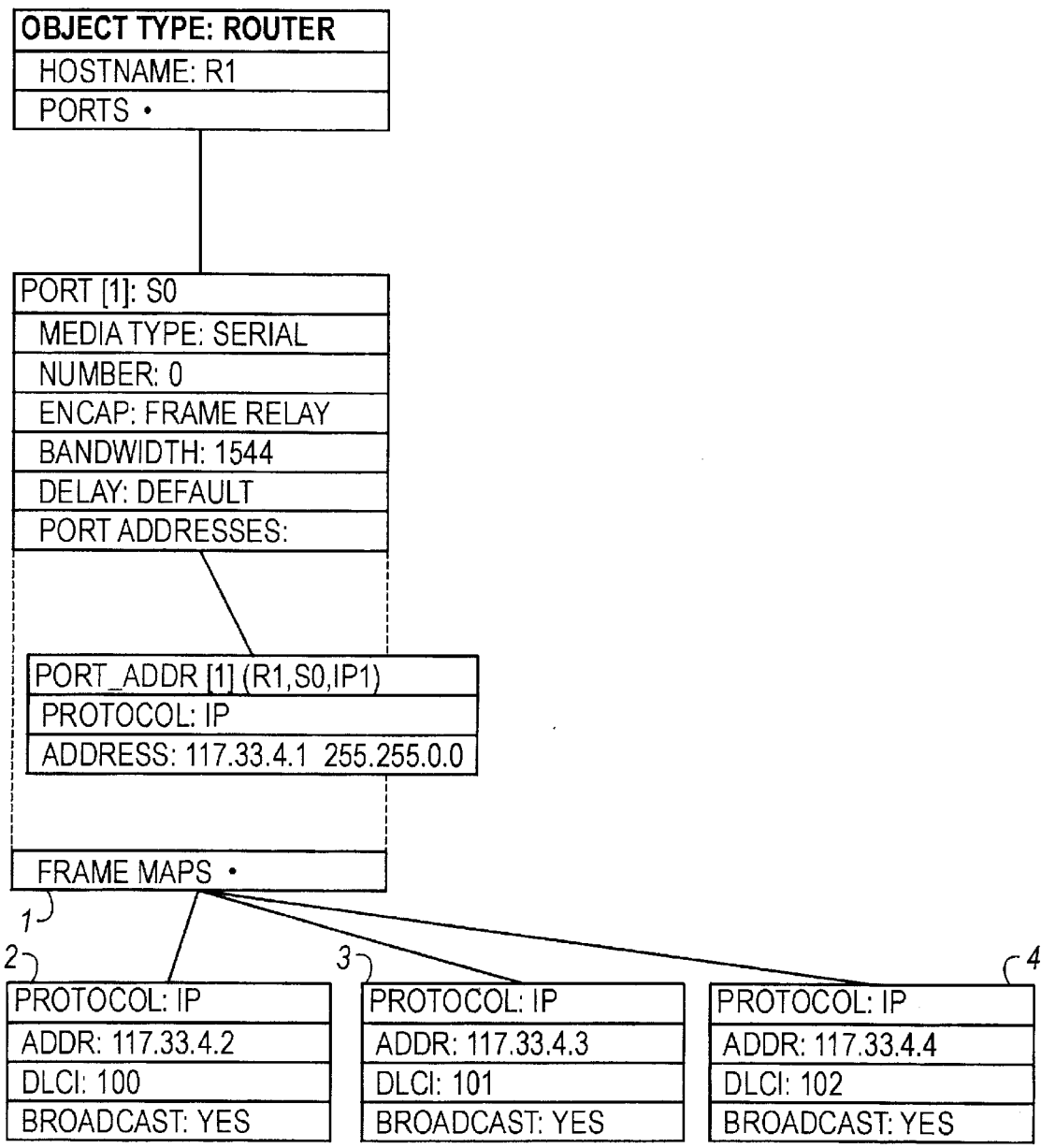
FIG. 37 shows the SRO object for router R1 in FIG. 34 focusing on the Frame Map objects.

In FIG. 37 there is shown a fragment of the SRO for router R1 that focuses on how the Frame Relay maps in FIG. 38a translate into the SRO. Referring to reference numeral (1), note that there is an attribute for port S0, which is a list of Frame Relay map objects. In FIG. 37, each one of these items under Frame Maps labeled (1) which items are labeled (2), (3) and (4), correspond to the three Frame Relay Map commands that are present under interface S0 in FIG. 38a. It is a straight-forward translation. Another process for determining the meshing in a multi-point WAN is referring to the live router and executing a "Show Frame Map" command, parsing the response and bringing it in the SRO.

To handle the complications due to a multi-point WAN we have to modify the SPT algorithm that we described in FIG. 4. To show how we modify this algorithm, we repeat diagram 4, labeling the boxes with letters, rather than numbers, which is given in FIG. 31. We show the additional processing steps, labeled with numbers, that modify it (FIG. 32) and then we'll just apply the modifications and the show the resulting flowchart (FIG. 33). In FIG. 33, the previous steps are labeled with letters, while the new ones are labeled with numbers.

Figure 31:
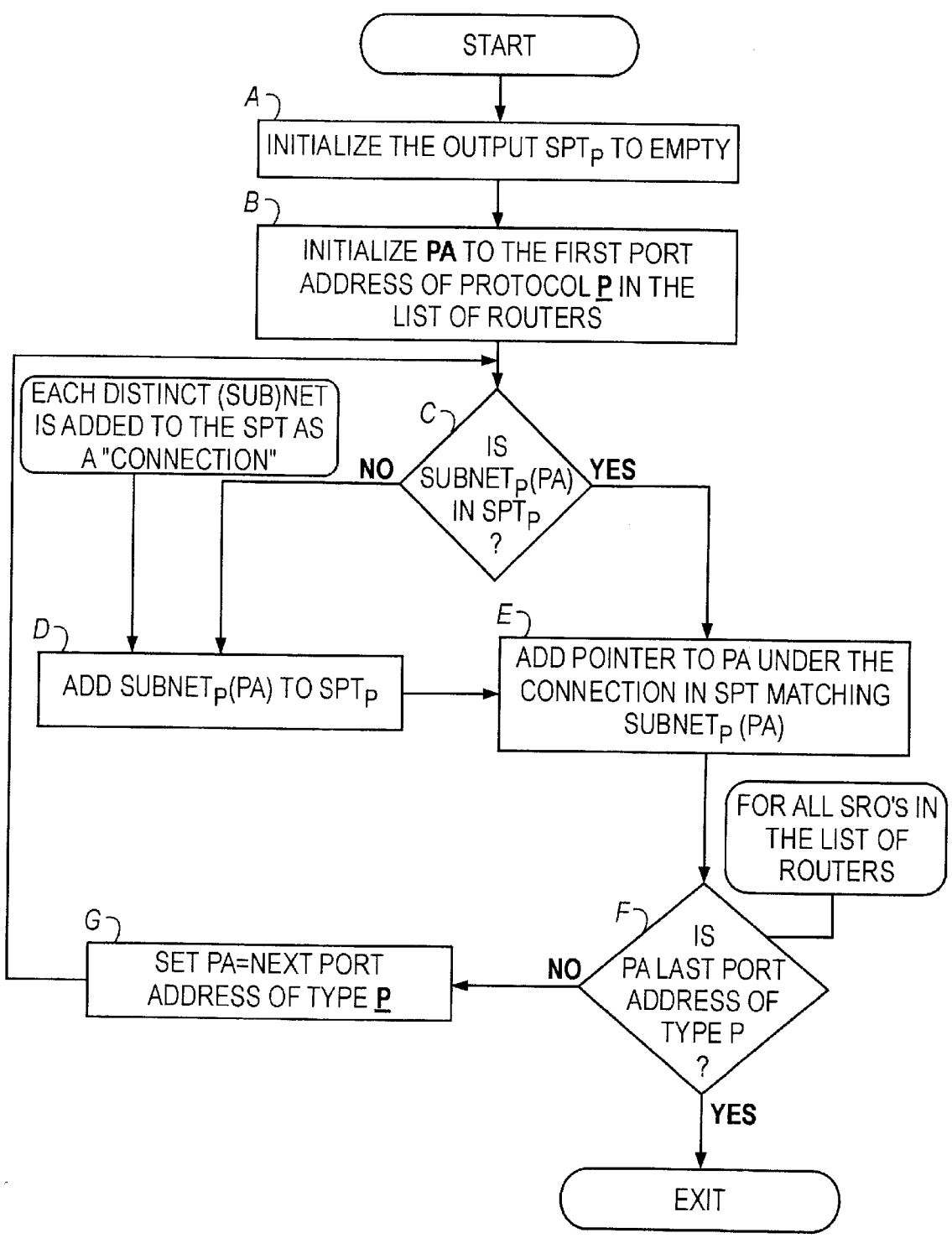
FIG. 31 is a repetition of FIG. 4 (a flowchart of the process that populates the SPT object data structure) annotated for integration with a flowchart for handling the Frame Relay WAN complication to the SPT build process.
Figures 1, 32:
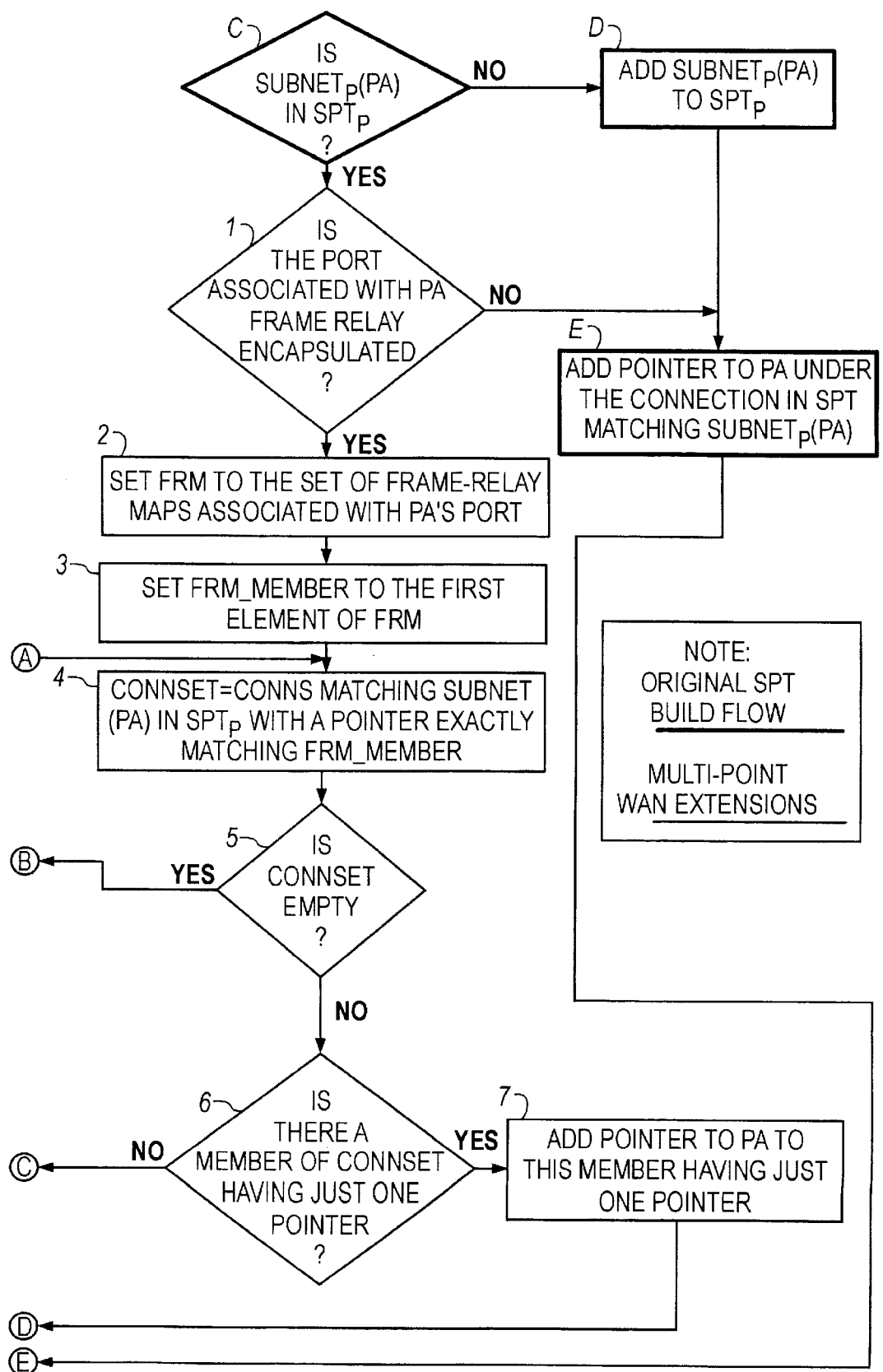
FIG. 32 is a flowchart that shows the set of extensions to FIG. 31 required to handle the Frame Relay WAN complication to the SPT build process (FIG. 4).
Figures 2, 32:
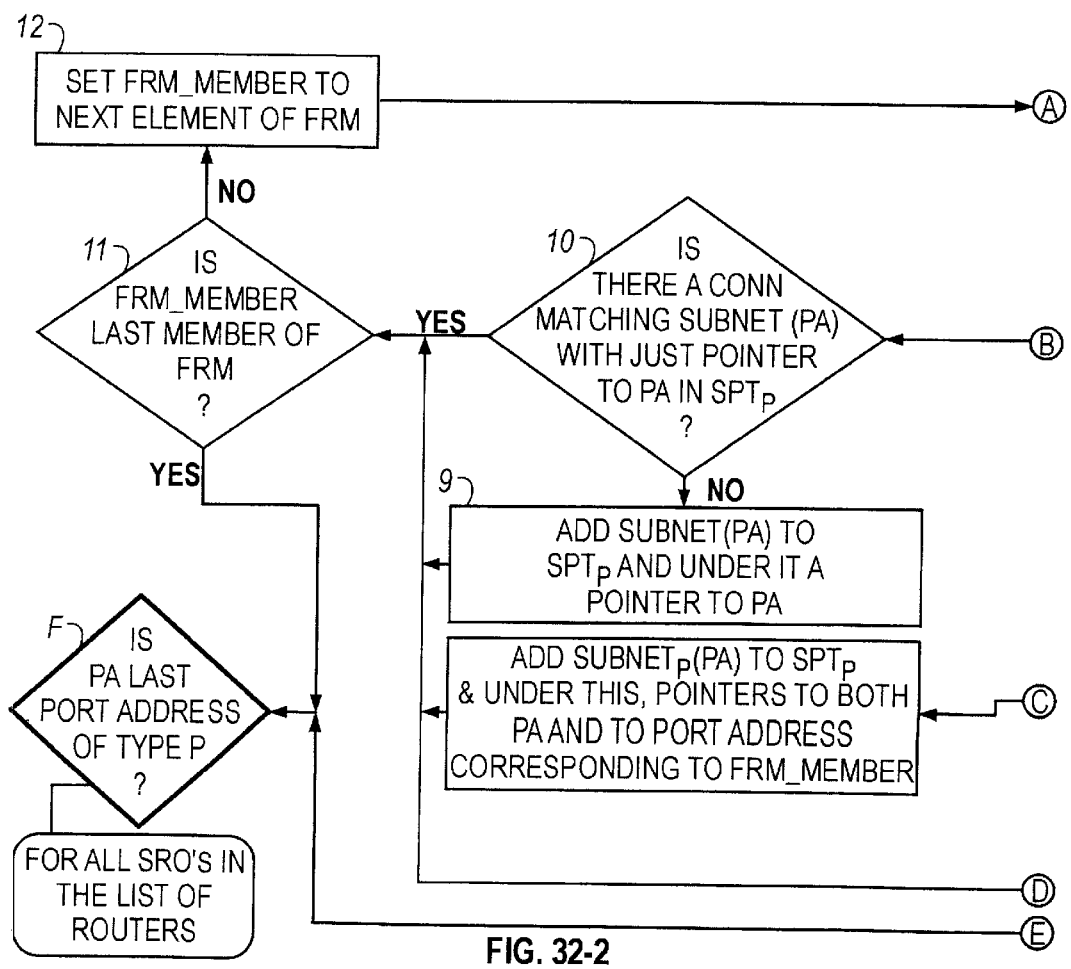
Figures 1, 33:
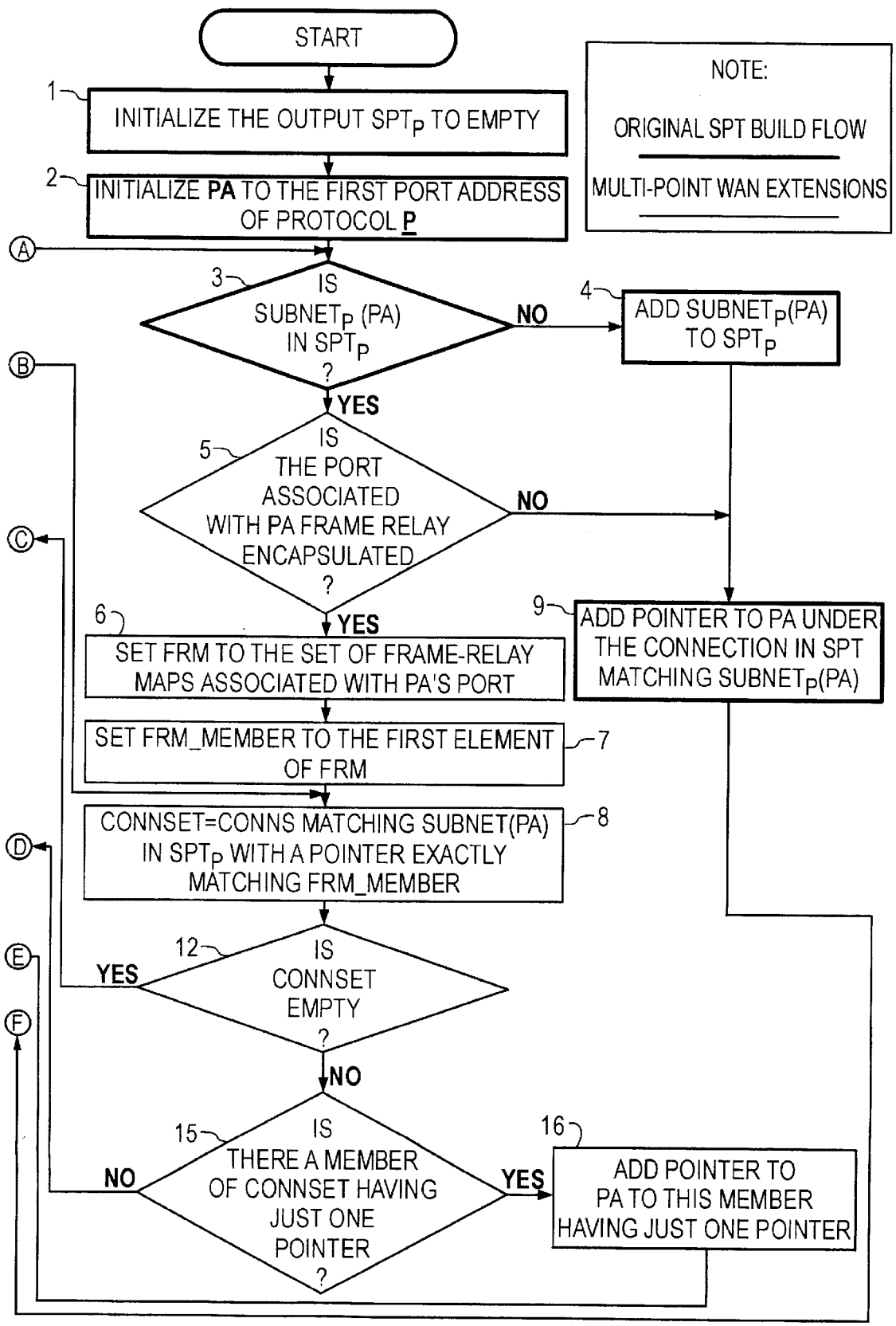
FIG. 33 is the merged result of FIGS. 31 & 32 and shows the complete set of logic applied by the invention to accurately populate the SPT despite the complications introduced when the process encounters the presence of Frame Relay multi-point WAN.
Figures 2, 33:
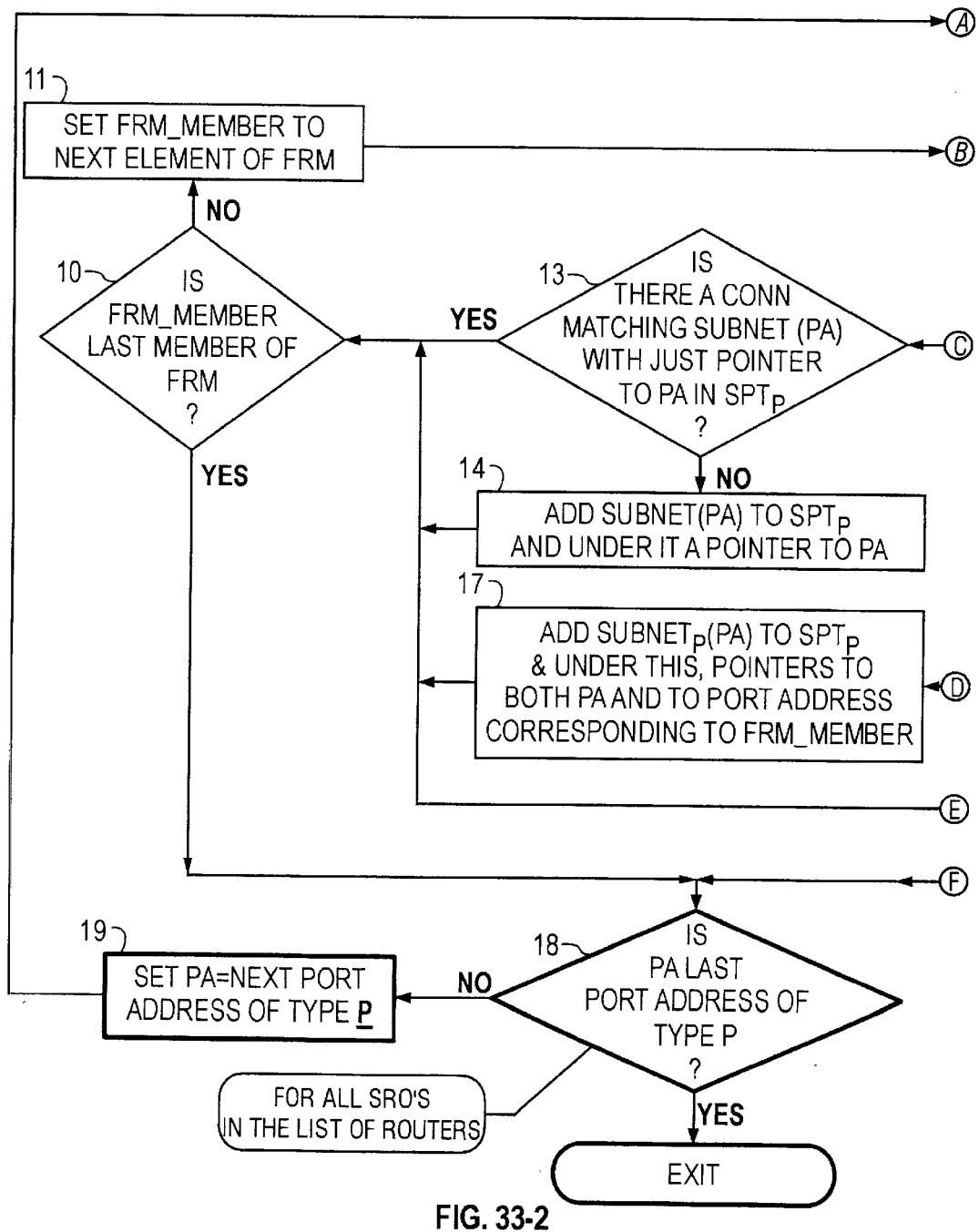

Referring to the Step labeled (C) in FIG. 32, which is the same as Step (C) in FIG. 31. Step "C" is a test to see if the subnet for the port address being processed (PA) is in the SPT. If the case is "no" then we go to (D), which is normal processing, and reiterate the process with the next port address. On the other hand, if the Subnet (PA) is in the SPT, processing goes to Step (1), which asks whether the port associated with the PA is Frame Relay encapsulated. This is determined by looking in the encapsulation attribute of the port associated with PA in the SRO. If this is not the case, then normal processing takes place and the procedure goes to (E) (again as depicted in FIG. 31). If not, go to the special Frame Relay multi-WAN processing, in other words we go to Step (2). In Step (2) the variable FRM is set to the set of Frame Relay maps associated with PA's port. The process iterates through this set by first setting FRM_member to the first element of FRM (Step (3)). In Step (4) for convenience the variable ConnSet is assigned to the set of connections in SPT that i) match subnet (PA) and ii) have the property that it has a pointer exactly matching the address in the variable FRM_member. Now it's possible this set could be empty. Step (5) asks whether the Conn Set is empty. If the answer is yes, then go to Step (10), which asks whether there is a connection of SPT matching Subnet (PA) with just a single pointer to PA. If the answer is "no" go to Step (9) and add a new connection with subnet Subnet (PA) and with a single pointer to PA. Then go to Step (11) to determine if the last frame member has been reached. If not, continue in the loop, going to Step (12) to set Frm_member to the next element, and continue processing. On the other hand, if the answer is "yes" at step (11), then processing of PA is finished. Then go to Step (F), which is in the original FIG. 31, to process the next port address. Now, on the other hand if the answer is "yes" at Step (10) i.e., there a connection in SPT matching subnet (PA) with just pointer to PA, then go to Step (11) and continue in the loop over Frame members.

Now referring again to Step (5), if ConnSet is not empty then we go to Step (6), which asks whether there is a member of ConnSet having just one pointer. If the answer is "yes", add a pointer to PA to this member, (step (7)), and then continue to Step (11) to process the remaining elements of FRM. If the answer is "no" then go to step (8), and create a new connection whose label is subnet (PA), and under this we add two pointers: one to PA and the other to the port address corresponding to the address in FRM_member.

To give a better feel for the flowchart that we obtained after grafting in the additional steps to handle multi-point WANs, (FIG. 33) we'll walk through a specific example, the one that's intuitively depicted in FIG. 34, whose configurations appear in FIGS. 38a through 38d and having an SRO as shown in FIG. 37. (FIG. 37 shows only one of the SROs (for Router R1)). We do not include the SROs for Router R2 through R4 because the process of going from a config file to a SRO representation for these routers should be evident.

FIGS. 39a through 39f provide a detailed example used as a walkthrough of the flow chart depicted in FIG. 33.

Figure 39A:
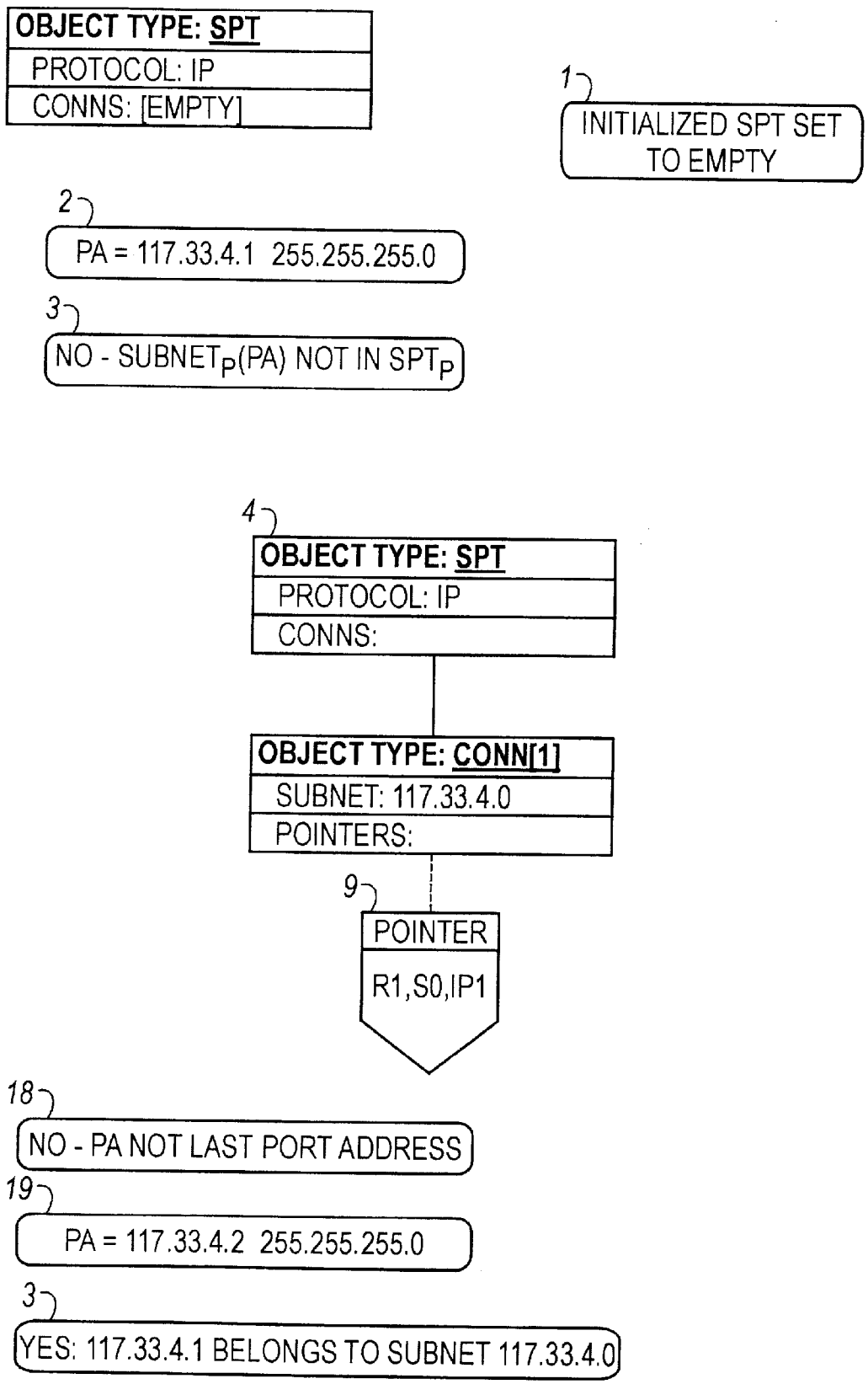

Starting at FIG. 39a we see reference to Step (1) of the flowchart of FIG. 33 where the output, the SPT, is initialized to the structure shown opposite Step (1). This is an IP SPT. So the protocol is set to IP. In step (2) PA is set to the first port address, 117.33.41.1 255.255.255.0. At Step (3) the question is whether subnet (PA), which is 117.33.4.0, is in the SPT. In this case it is not because the SPT is empty. Thus, go on to Step (4), which adds a new Connection, whose subnet is 117.33.4.0, to the SPT. Then go to Step (9), which adds a pointer under this subnet to R1, S0, IP1 (the current port address). Referring to Step (9) in FIG. 39a, there is shown the structure formed by Step (9). After Step (9) go to Step (18), which asks whether PA is the last port address. The answer here is "no". Processing goes to Step (19) where PA is set to the next port address, 117.33.4.2 255 and 255.255.0. After Step (19), go to Step (3), which asks whether subnet (PA), (117.33.4.0) is in the SPT. The answer here is "yes". In FIG. 39b, there is a continuation of the walkthrough continuing from step (3), which answered "yes". Thus the current step is Step (5), which asks whether PA is Frame Relay encapsulated. The answer is "yes". Thus go to Step (6) and set the variable FRM to the set of Frame Relay map addresses associated with PA's port. In this case there are two of them, 117.33.4.1 and 117.33.4.3. Then go to Step (7) and set FRM_member to the first address, 117.33.4.1. Then go to Step (8) and set the variable ConnSet to the connections in the SPT matching subnet 117.33.4.0 with a pointer exactly matching the Frame member. In this case, ConnSet contains Conn[1] because this has the subnet 117.33.4.0 and also has a pointer to R1,S0,IP1 whose address is 117.33.4.1.

Next, go to to Step (12) which asks whether the Conn_Set is empty. Here it has one element and so the answer is "no". Step (15) asks whether there is a member of ConnSet having just one pointer. The answer here is "yes" because Conn [1] only has one pointer. Thus go to Step (16) and add a pointer to PA under this connection forming the structure shown at (16) in FIG. 39b. Then go from Step (16) to Step (10) which asks whether the process has reached the last member of FRM. In this case "no" because there is one more element to process. So, the answer at Step (10) is "no".

Refer now to FIG. 39c. Since the answer to (10) was "no", the current step is Step (11), and FRM_member is set to the next element of FRM, 117.33.4.3. Then go to Step (8) and set ConnSet to the connections matching 117.33.4.0 and also with the pointer exactly matching frame member which is 117.33.4.3. In this case there are no connections meeting the second criteria. So Step (13) asks whether there is a connection matching subnet (PA) with a pointer to PA in SPT? The answer here is "no". Go to Step (14) and add a new connection with subnet 117.33.4.0 to SPT under it, a pointer to PA. The resulting structural addition to the SPT is shown in the diagram at reference numeral (14) in FIG. 39c. Then go to Step (10), which asks if the last member of the frame set has been processed. The answer here is "yes," and thus we go on to Step (18) which asks whether the last port address has been reached. The answer here is "no" because there are more port addresses to process. Go to Step (19)

which sets the next port address to 117.33.4.3 and 255.255.0.0. Move now to FIG. 39d, which is a continuation of the walkthrough example. After setting the new port address in Step (19), go to Step (3) which asks whether the subnet is associated with the new port address (which in this case is 117.33.4.0) in the SPT. The answer here is "yes". Thus, go to Step (5), which asks whether this Frame Relay encapsulated. The answer is "yes," and thus processing goes to Step (6), which sets the variable FRM to the set of frame maps associated with this PA port. In this case, PA refers to Router R3's S0 port, which has two Frame Relay addresses, 117.33.4.1 and 117.33.4.2. Go to Step (7) and set FRM__member to the first element of the frame set, 117.33.4.1. Next in Step (8), compute the ConnSet by looking for connections that match subnet (PA), 117.33.4.0, and ones that also have a pointer exactly matching the frame member. In this case one element is found, Conn[1], because its first pointer R1, S0, IP1 has the address 117.33.4.1. So the ConnSet has a single element. Go to Step (12) and ask whether ConnSet is empty. The answer here is "no". Go to Step (15), which asks whether there is a member of ConnSet having just one pointer. The answer here is "no" because Conn[1] has two pointers under it. Go on to Step (17) and add a new connection with subnet 117.33.4.0, and under it add a pointer to both PA which is R3, S0, IP1 and to the port address corresponding to the FRM__member, which is R1, S0, IP1. Looking in FIG. 39d, reference numeral (17), indicates structure add to the SPT upon completing Step (17).

Figure 39E:
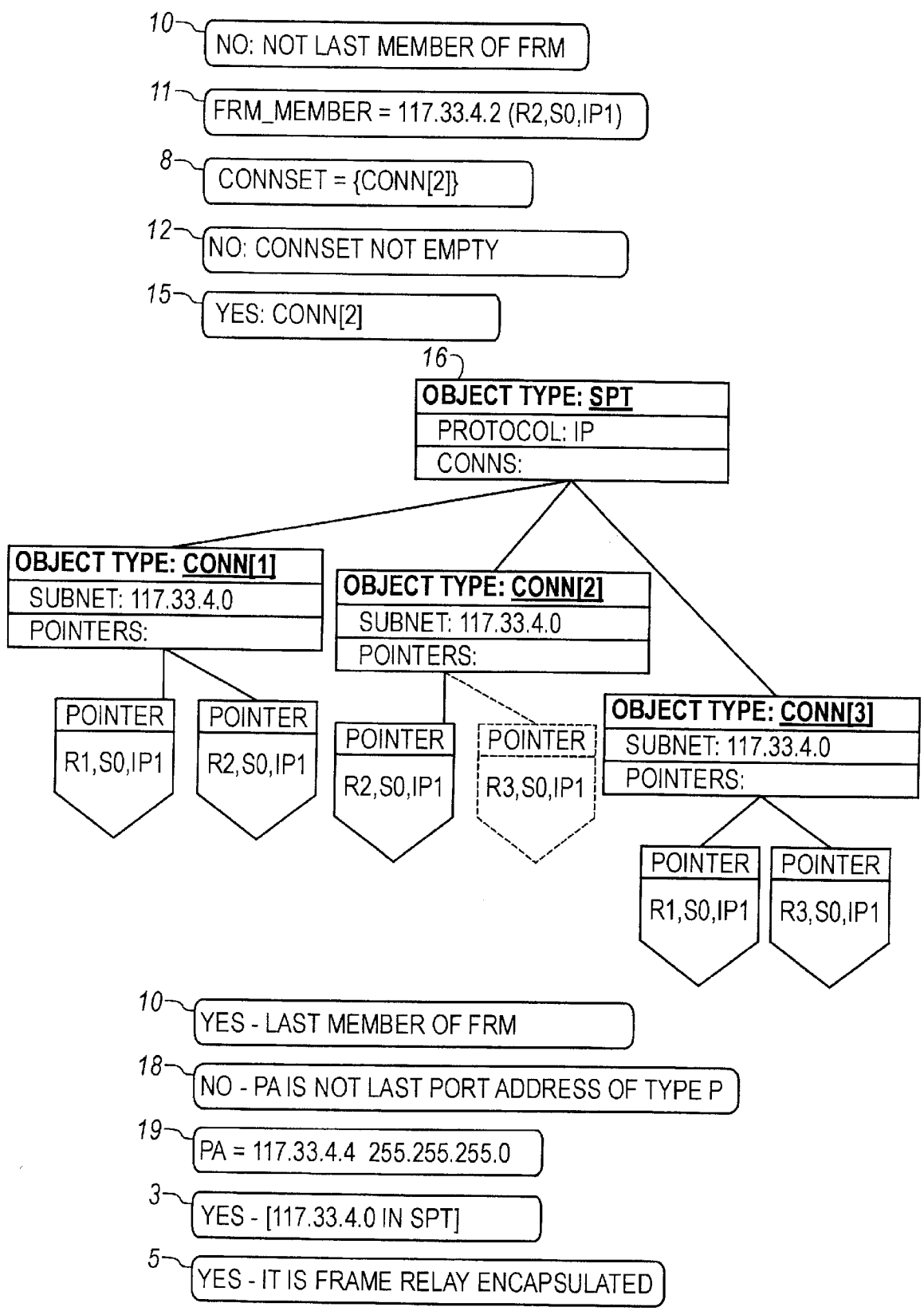

Refer now to FIG. 39e, which is a continuation of the walkthrough. Step (10) asks whether the last member in FRM has been processed. The answer here is "no" because there is one member left to process, and thus processing goes to Step (11), where FRM__member is set to this next element, 117.33.4.2, to the first IP address on R2, S0. Next at Step (8), Connections matching 117.33.4.0 with a pointer at exactly matching the FRM__member 117.33.4.2. In this case the ConnSet will have one element which is Conn[2]. Thus, the answer at Step (12) is "no", and processing goes to Step (15) which answers "yes" since ConnSet has a single member. Consequently, processing goes to (16) which adds a pointer to PA under this member Conn[2] leading to the structure in FIG. 39e adjacent to reference numeral (16). After Step (16), processing goes to Step (10) which asks if the last FRM__member in FRM has been processed. The answer here is "yes". Hence go to Step (18), which asks if the last port address has been processed. The answer here is "no". There is still one more port address to process. Step (19) sets variable PA to the next port address which is 117.33.4.4 and 255.255.0. Next, Step (3). At step (3), the answer is "yes" since subnet (PA) which equals 117.33.4.0, is in the SPT. We then go to Step (5), which answers "yes" since PA is frame relay encapsulated.

Figure 39F:
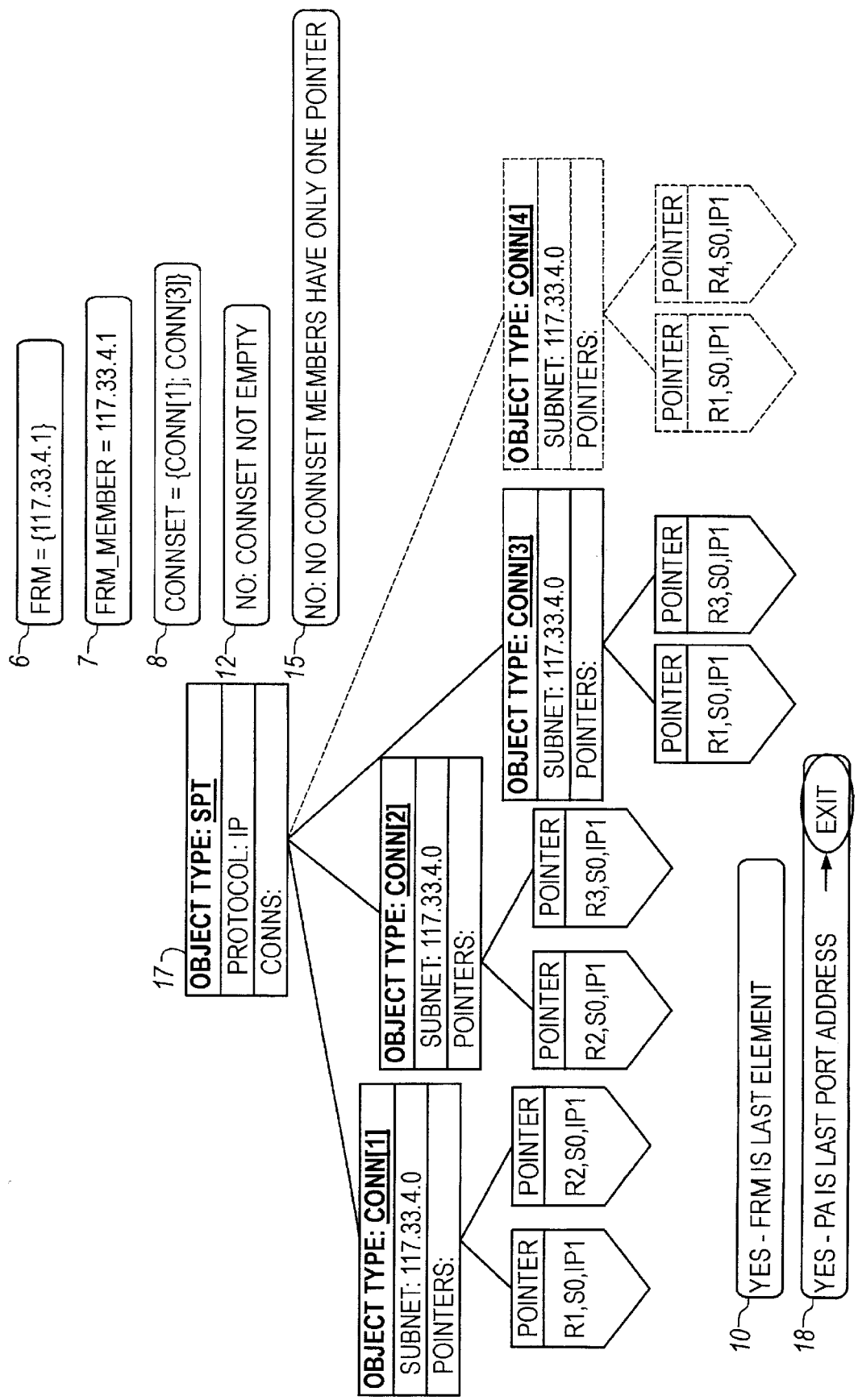

The walkthrough example now continues with FIG. 39f. Step (6) sets FRM equal to the Frame relay maps. In this case it is a set having one element, 117.33.4.1. Go to Step (7) where the FRM__member is set to the first element, which is the only element, 117.33.4.1. In Step (8) look for the connections matching subnet 117.33.4.0 with a pointer exactly matching FRM__member. In this case two matching elements are found: Conn[1] and Conn[3]. Step (12) asks whether the set is empty. The answer here is "no" because it has two elements. Go to Step (15), which asks whether there is a member of ConnSet having just one pointer. The answer here is "no". The two elements both have two pointers. Go to Step (17) which adds a new connection with subnet 117.33.4.0 and a pointer to PA, which is R4, S0, IP1, and also to the port address corresponding to FRM__member, which is R1, S0, IP1 resulting in the SPT structure shown adjacent to reference numeral (17) in FIG. 39f. Go to Step (10) which asks if the last member of FRM has been reached. The answer here is "yes". Go to Step (18) which then leads to termination of the procedure since the last port address has been processed.

Next we shall discuss the construction of the MPT, which stands for the Multiple Protocol Topology. Referring to FIG. 1b, the MPT is constructed in Step (4). The MPT is constructed from the set of SPTs. The MPT is as a data structure that captures the interrelationships between the different Level 3 topologies, each of which is encoded as an SPT. A single router's physical port can have multiple Level 3 addresses configured on it with different protocols. When there are multiple addresses from different protocols assigned to router's ports in the network there is potential for logical topologies with incompatible addresses.

As used herein, "incompatible addresses" means two level 3 protocols, such as IP and IPX, have assignments to port addresses that are inconsistent. An example of a network with incompatible addresses is shown in FIG. 26, which shows a network with mismatched IP and IPX addresses and two IP and IPX connections that would be flagged as being a Mismatch by the process shown in FIG. 23. The reason that these two connections are in conflict is because they overlap by virtue of having the pointer labeled (1) (in FIG. 26) refer to the same port as the pointer labeled (4) and also having pointers (2) and (5) match. On the other hand, pointer (3) does not match pointer (6) and thus IP and IPX connections are in conflict. Looking at the network in FIG. 26, we see that this conflict is important to identify because it is caused by mis-addressing Router R1's T1 port with an IP address belonging to subnet 10.10.10.0. The problem could be corrected by instead putting this address on R1's T0 port.

In the process of building a MPT from a set of SPTs, (one for each Level 3 protocol running on the network), certain existing conflicts between the SPTs can be identified through certain integrity checks. Although networks may be able to run when their logical topologies have incompatible addresses it is a common practice to do, which otherwise greatly improves the ability to manage the network. Because it is common practice to have logical topologies with compatible addresses, finding the conflicts between logical topologies can be an extremely valuable diagnostic aid that can identify addressing errors. As mentioned earlier, it can be important to identify addressing errors because they can have substantial impact on network operations. An important benefit of computing how logical topologies relate is that information regarding one logical topology can be used to fill in missing information about another logical topology once they are synchronized. We will show, later on, an example of how information that would be missed by just looking at the IP topology alone because of a Cisco configuration command called IP-unnumbered could be filled in by using logical topologies from the other protocols such as IPX and AppleTalk. The production of the MPT is a unique aspect of the invention. The MPT serves to coordinate topologies from different protocols.

Figure 21:
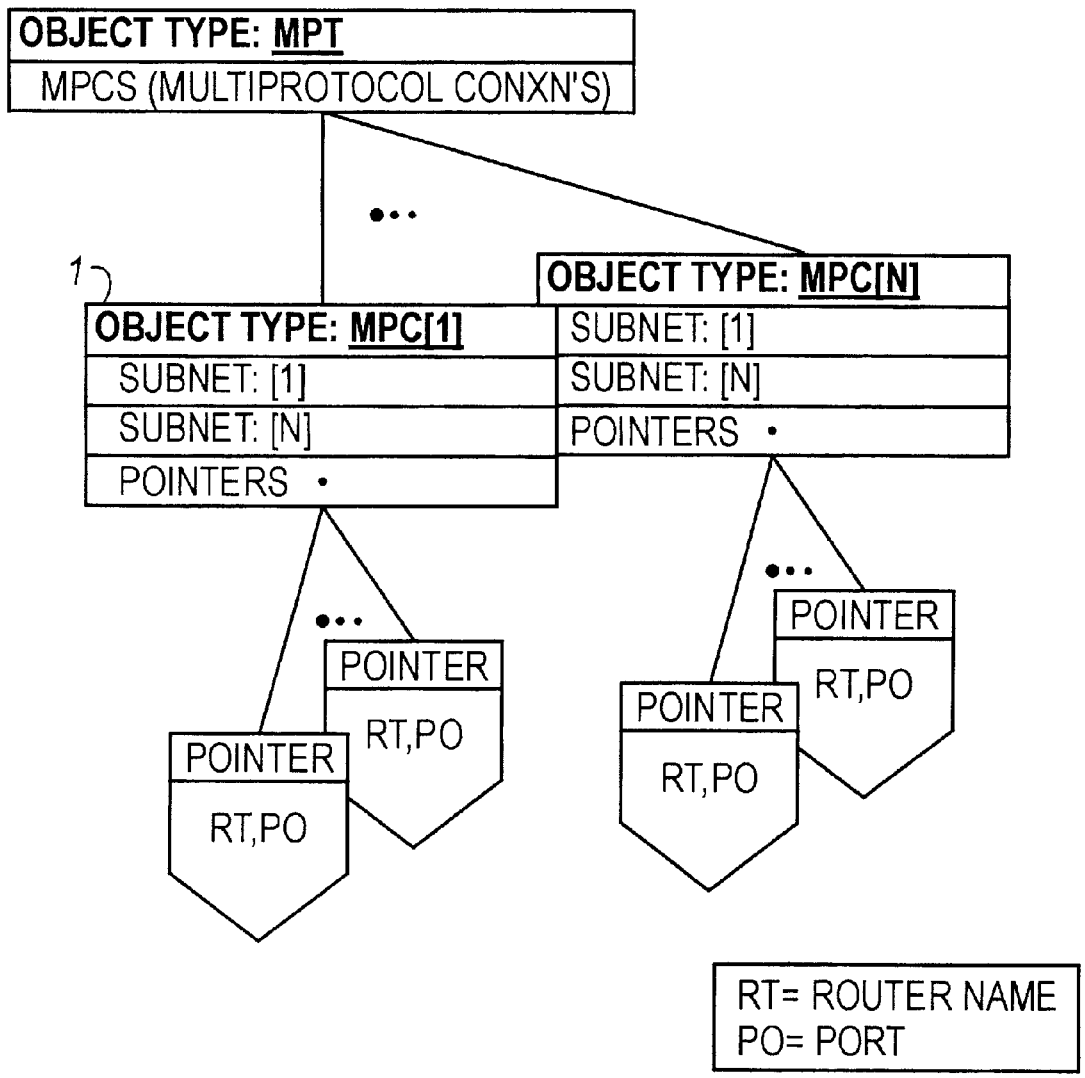
FIG. 21 shows the object data structure of the Multiple Protocol Topology (MPT) object, a principle data structure of the invention that is populated during execution of the process shown in FIG. 1b.

FIG. 21 provides an illustration of a MPT data structure, in attribute form. A MPT structurally looks very similar to an SPT. A MPT consists of a list of objects which are called Multiple Protocol Connections. In FIG. 21, reference numeral (1) indicates a first multiple protocol connection labeled MpC[1]. This object contains a list of subnets that it refers to. Each subnet is from a different protocol. Note also that, for IPX for example, a network number would be included in the list. So, MpC[1] could have an IP subnet and an IPX network number. A multiple protocol connection object also contains a list of pointers, nor to the port address on a router, but to the port itself. So, a pointer for a MpC is identified by simply a router and a port. It does not have the additional attribute that SPT has which identifies a particular address within a port. So one could think of a MPT as tying together router ports and grouping them together in the different protocol (sub)nets that correspond to each other.

Figure 22:
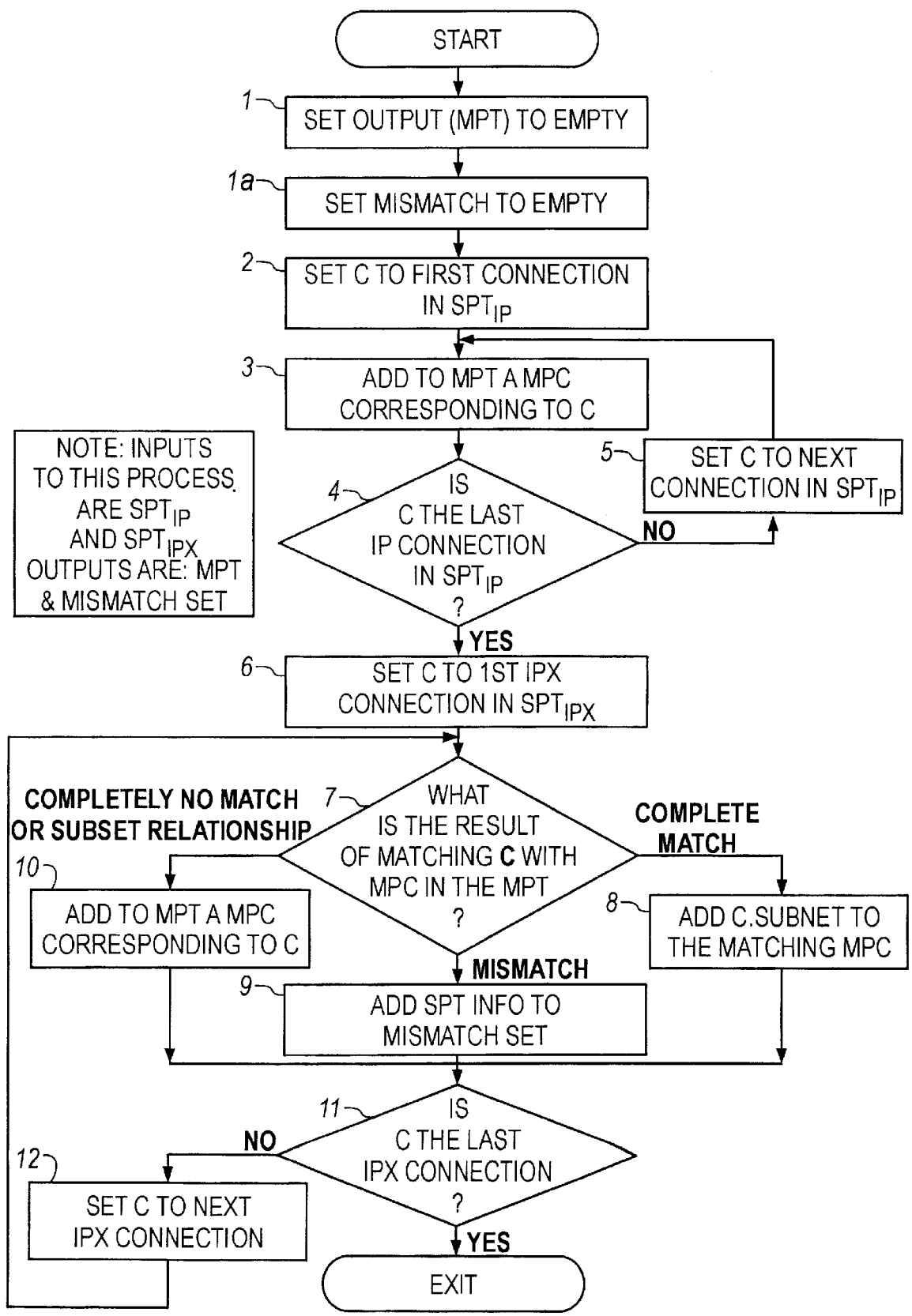
FIG. 22 is a flowchart of the process that populates the MPT object data structure taking a set of SPTs (for the different protocols) as input.

FIG. 22 is a flowchart that computes a process which produces a MPT from a set of SPTs denoting the different logical topologies. In addition, during formation of the MPT the process will also find mismatches between the topologies, which are put in a mismatch set which is another output for this process. Identifying such mismatches is a particular integrity check in accordance with the invention.

Note that although FIG. 22 only handles processing of IP and IPX, the process is easily generalized to handle other protocols. For example, the same basic process can be used to process IP, IPX and AppleTalk.

In Steps (1) and (1a), the two outputs of the process, the MPT and Mismatch set are initialized to empty. The first part of the process, which is denoted by Steps (2) through (5), handles the IP part, and then the rest of the process handles the IPX part. For the IP part, a relatively simple process is used which essentially just copies the IP structure into the MPT. Step (2) sets "C" to the first connection in the IP SPT. Step (3) adds into MPT a MpC corresponding to this connection. Step (4) asks whether "C" is the last IP connection in $SPT_{IP}$. If "C" is the last IP connection, then go to Step (6). If "C" is not the last IP Connection, go to Step (5) and set C to the next IP connection and repeat the process. When Step (6) is reached the IP SPT has been "copied" into the MPT.

Next, the process represented by Steps (6) through (12) integrates the IPX SPT into the MPT, and also look for conflicts. In these Steps, variable "C" is used to iterate over the IPX connections. Step (6) sets "C" to the first IPX Connection in the IPX SPT. Step (7) asks whether the result of matching Connection C with the MpCs in the MPT (which at this point in the process merely reflect the IP SPT structure.)

The result of the match process is one of four states. One state is a complete match, another one is a mismatch, connoting a problem, another state is no match at all and a last state is a subset relationship. If there is a mismatch, go to Step (9) and add to the mismatch set the conflict between "C" and the conflicting member in MPT. Go to Step (11) to determine if C is the last IPX connection. If it is, the process terminates. If not, set "C" to the next IPX connection and go back to Step (7). If there is a complete match in Step (7) then there is an IP connection and an IPX connection that correspond to the exact same router ports. In that case, go to Step (8) which adds a new IPX subnet to the matching MpC. Then go to Step (11), etc. iterating through the loop. On the other hand, if there is no match or if there is a subset relationship in Step (7), then go to Step (10) where a new MpC is created by "copying over" the IPX connection "C". Next go to Step (11). If C is the last IPX Connection, then the process terminates. If not, go to Step (12), and iterate through the rest of the IPX connections.

Figure 23:
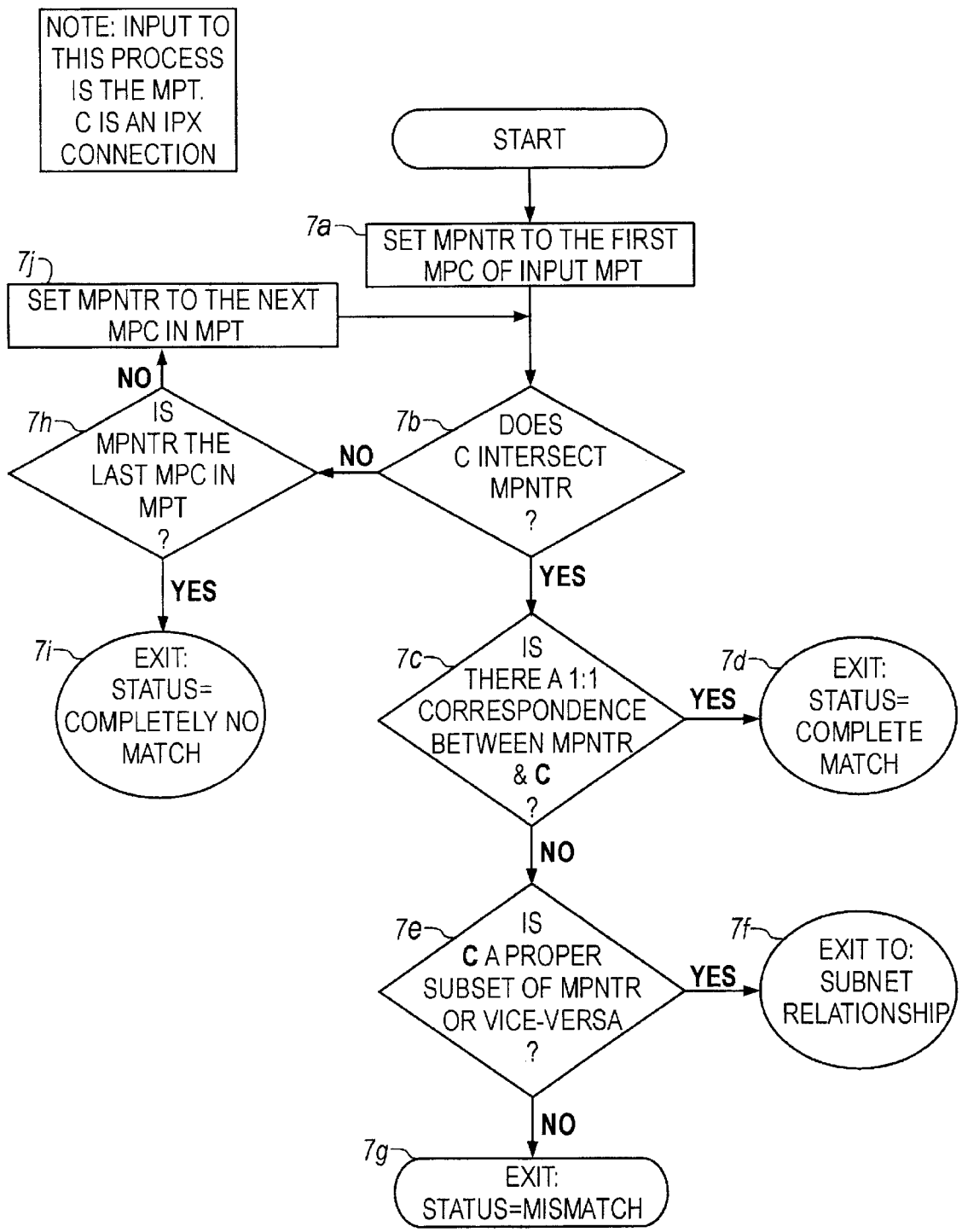
FIG. 23 is a flowchart expanding on the process of Step '7' in FIG. 22, "matching connections with Multiprotocol Connection (MpC) objects".

FIG. 23 is a flowchart that provides additional details about Step (7) in FIG. 22. The input for this flowchart is "C", which refers to an IPX connection, and the MPT. The process starts at Step (7a) where MPNTR is set to the first connection in MPT. Step (7b) asks whether the IPX connection intersects the MPNTR. As used herein, the term "intersect" means "refers to one or more of the same ports." If the answer is "no", then Step (7h) asks whether MPNTR is the last MpC in the MPT. If the answer is "yes", then all the connections in MPT have been processed, and no matches or intersections have been found. The process exits with status: completely no match. If there are more MPCs to process, then set the variable MPNTR to the next connection in MPT (Step 7) and go back to Step (7b).

If at Step (7b), an intersection is found between "C" and MPNTR then go to Step (7c) which asks what type of intersection relationship is present. Specifically, the question is whether there is a one to one correspondence between MPNTR and "C". That is, do they point to the exact same router ports? If the answer is "yes" then the process exits with status: a complete match. If there is not a one-to-one correspondence, then Step (7e) asks whether the ports in "C" refer to a proper subset of the ports referred to by MPNTR or visa versa. In other words, do we have a subset relationship? If the answer is "yes" then the procedure exists with status: subset relationship. If not, the process exits with a mismatch status.

FIGS. 24a through 24i, illustrate a walkthrough example of the flowcharts of FIGS. 22 and 23. The walkthrough example shown in FIGS. 24a through 24i uses as input the IP SPT in FIG. 8i and the IPX SPT in FIG. 8j. Recall that these SPTs were produced from the SROs in FIGS. 7a and 7b. The SROs, in turn represent the router configuration files shown in FIGS. 6a and 6b. Recall that FIG. 5 is intended to be an intuitive illustration of the routers in the network.

Referring to FIG. 24a, the diagram shows the state of the output MPT after Step (1) in FIG. 22 is executed. Reference numeral in FIG. 24 indicates that at Step (1a) in FIG. 22, MisMatch is initialized to empty. Step (2) sets "C" to the first IP connection in SPT IP, Conn[1] in FIG. 8i whose subnet is 10.30.0.0. Step (3) adds a connection corresponding to "C" to the MPT. FIG. 24b shows the resulting MPT state after applying Step (3). Note the similarity between the structure in FIG. 24b and the structure marked as (1) in FIG. 8i. The difference's that the pointer in the MPT is R1 E0, rather than R2, E0, IP1. In other words rather than pointing to a specific address on a port, a connection in a MPT dust points to the port itself.

FIGS. 24a and 24b show the main operation in processing the IP SPT: the pointers in the IP SPT are copied into the MPT, omitting their address references yielding pointers just mentioning a router and a port thereby pointing to a higher level in the SRO structure and being independent of protocol.

FIG. 24c shows the results after processing the next connection, which is Conn[2] (See FIG. 8i). The diagram in FIG. 24c shows the state of the MPT after Step (3) is executed the second time. Once again, note the similarity between the structure in FIG. 24c and the first two connections in the structure of FIG. 8i.

Figure 24D:
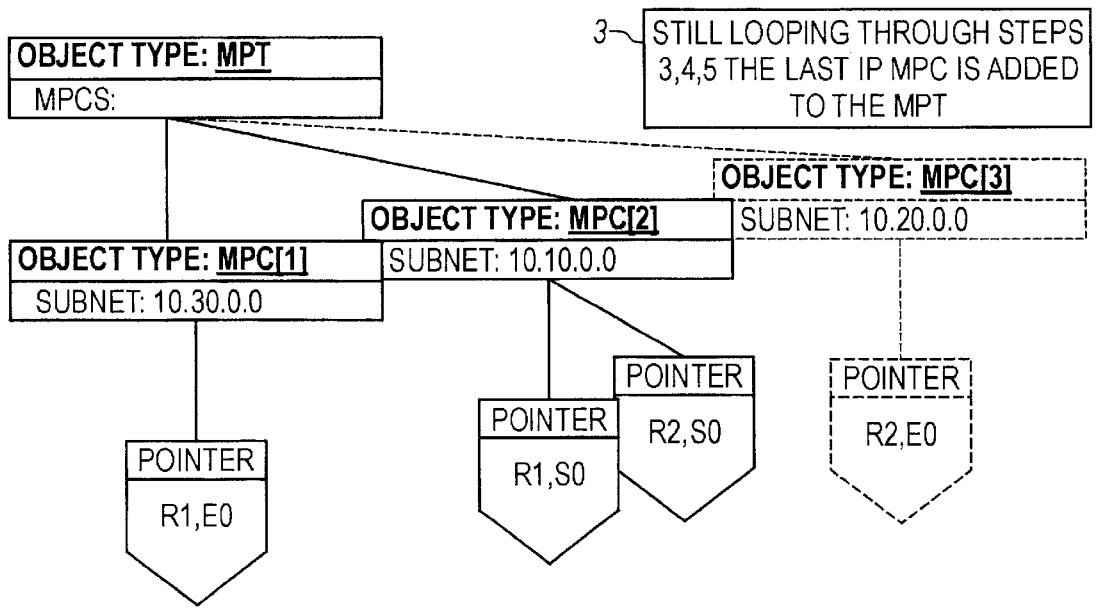

FIG. 24d illustrates the state of the MPT after Conn[3] is processed in Step (3).

Figure 24E:
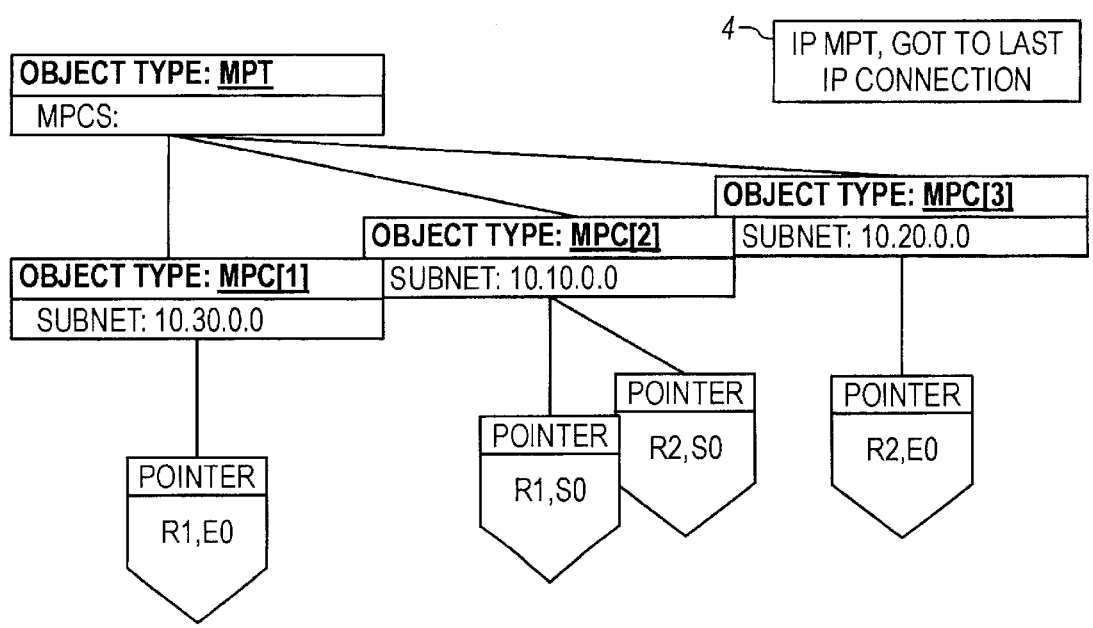

FIG. 24e shows the state of the MPT after the last IP SPT has been processed.

Figure 24F:
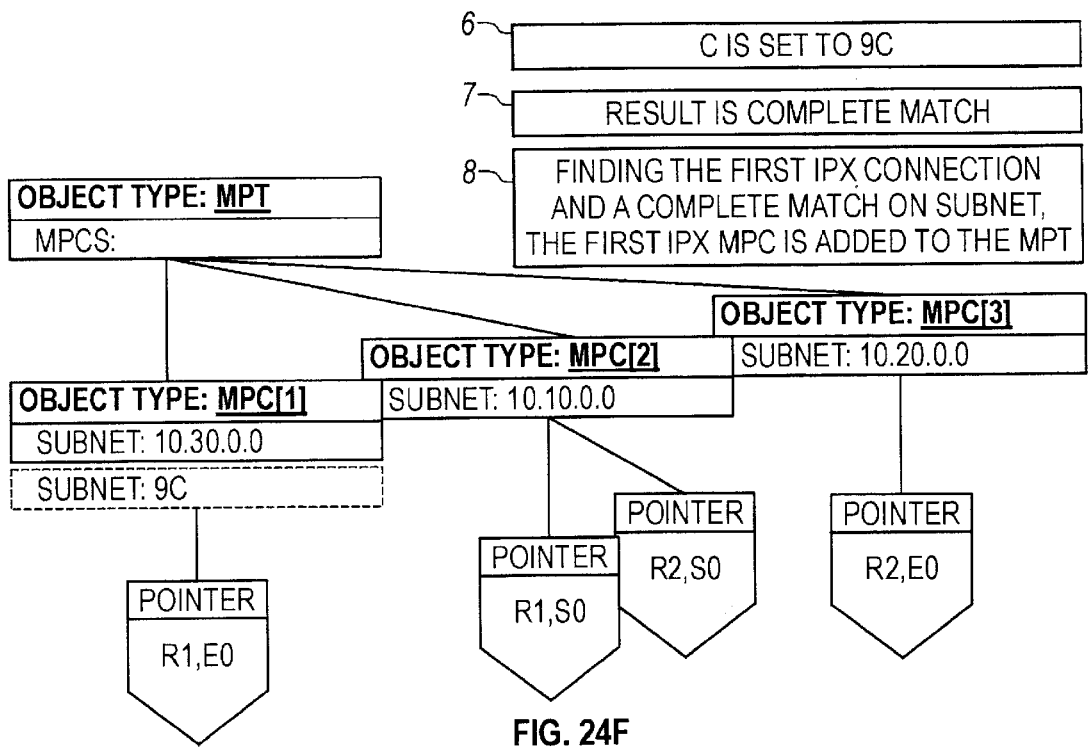

We have now discussed the first part of the process in FIG. 22, where the IP SPT is copied over to the MPT. Next, the process iterates through the IPX SPT where an additional step is performed that looks for matches and mismatches FIG. 24f continues the walkthrough example at Step (6). In this part of the flowchart, the variable "C" is set to the connections in the SPT IPX. In Step (6), "C" is set to Conn[1] in FIG. 8*j* which has (sub)net 9C. Step (7) determines the type of matching relationship between "C" and the MPT in FIG. 24*e*. In this case, the result is a complete match. The reason that there is a complete match between the connection in FIG. 8*j* (with subnet 9C) and the first connection in the MPT is that they both corresponded to only one router port, R1, E0. As a result, since the answer to Step (7) is a complete match, go to Step (8) which "adds C's subnet to the matching MpC. The subnet corresponding to "C" is 9C. Referring to FIG. 24*f* there is shown subnet: 9C" which has been added under MpC[1].

Figure 24G:
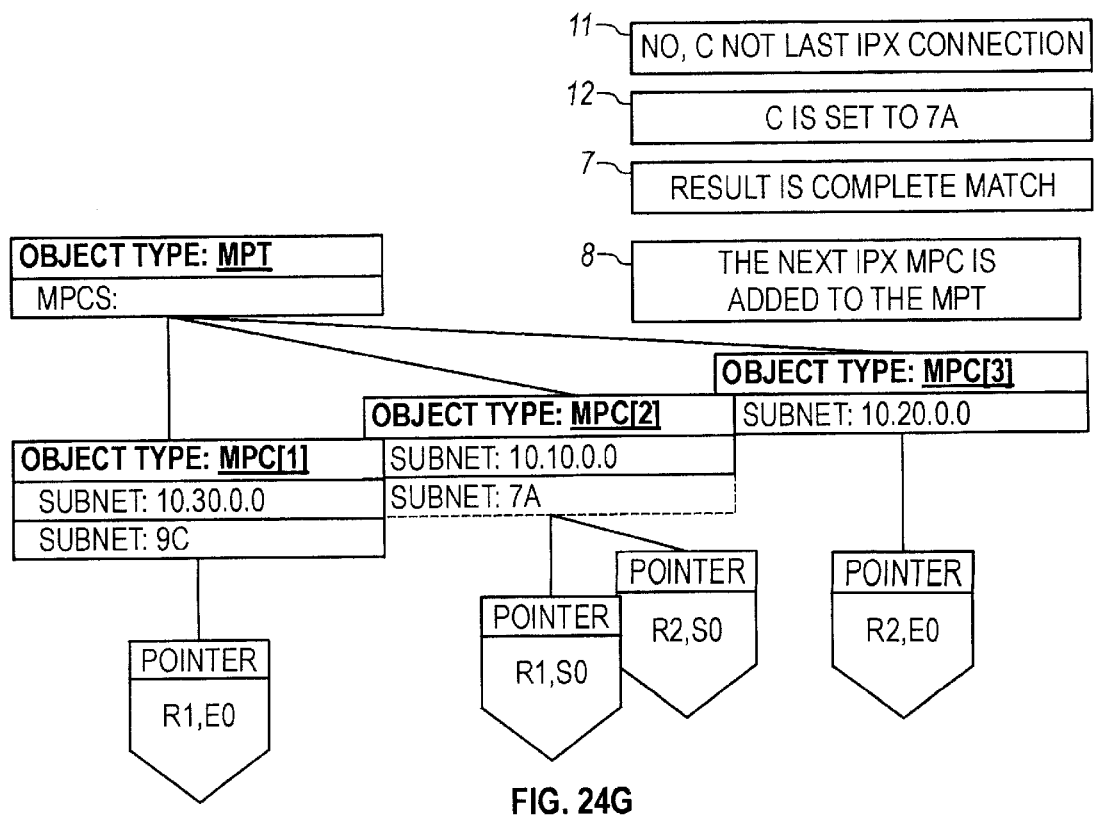
Figure 24H:
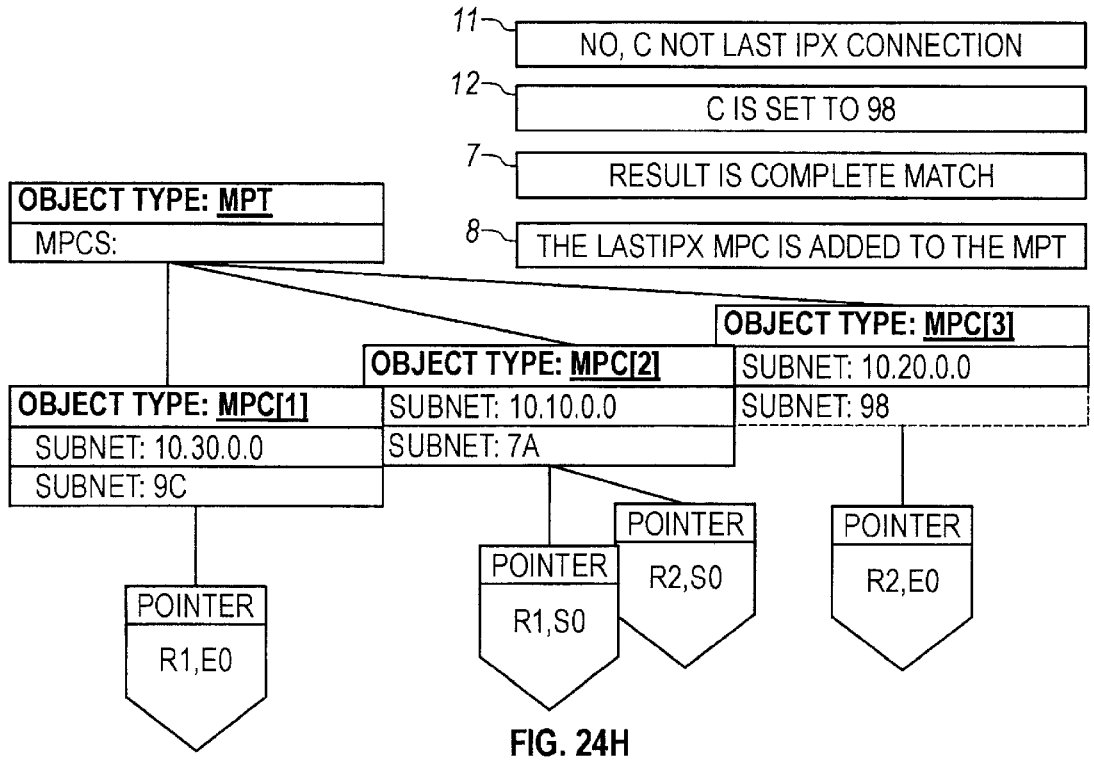
Figure 24I:
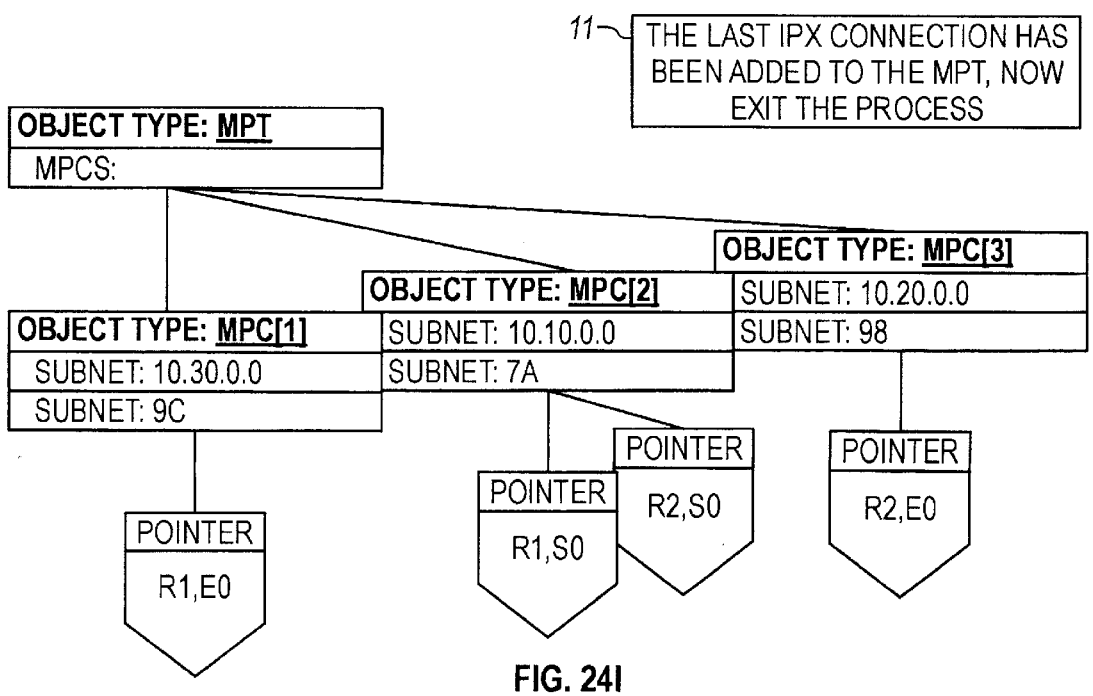

Referring to FIG. 24*g*, Step (11) asks, whether "C" is the last IPX connection. The answer is "no" because there are two more IPX connections to process. Step (12) sets C to the next IPX connection, Conn[2] as shown in FIG. 8*j*, which has subnet 7A. Step (7) then asks what is the result of matching this IPX connection with the MPT. In this case, it is found to be an exact match with MpC[2]. Now, refer back to FIG. 24*f*, which is the state of the MPT at the time the matching takes place. The reason that it is an exact match is that MpC[2] it refers to two router parts, R1 S0 and R2 S0 and so does Conn[2] in FIG. 8*j*. Because there is an exact match, go to Step (8) and add "C's" subnet (7A) under MpC[2] yielding the structure in FIG. 24*g*. Then go to Step (11) which asks whether "C" is the last IPX connection. The answer is "no" because there is one more IPX Connection to process. Step (12) "C" is to the next IPX connection, which in FIG. 8*j* is Conn[3], which has subnet 98. Then go to Step (7) which once again finds an exact match. Note that in FIG. 8*j* Conn[3] has a pointer to one router port R2 E0 as does MpC[3] as shown in FIG. 24*e*. Because there is an exact match, go to Step (8) which adds "C's" (Sub)net 98 under MpC[3] yielding the structure shown in FIG. 24*h*. Finally, Step (11) determines that the last IPX connection has been reached, and the process exists. The resulting competed MPT is the structure shown in FIG. 24*i*.

Figures 1, 25:
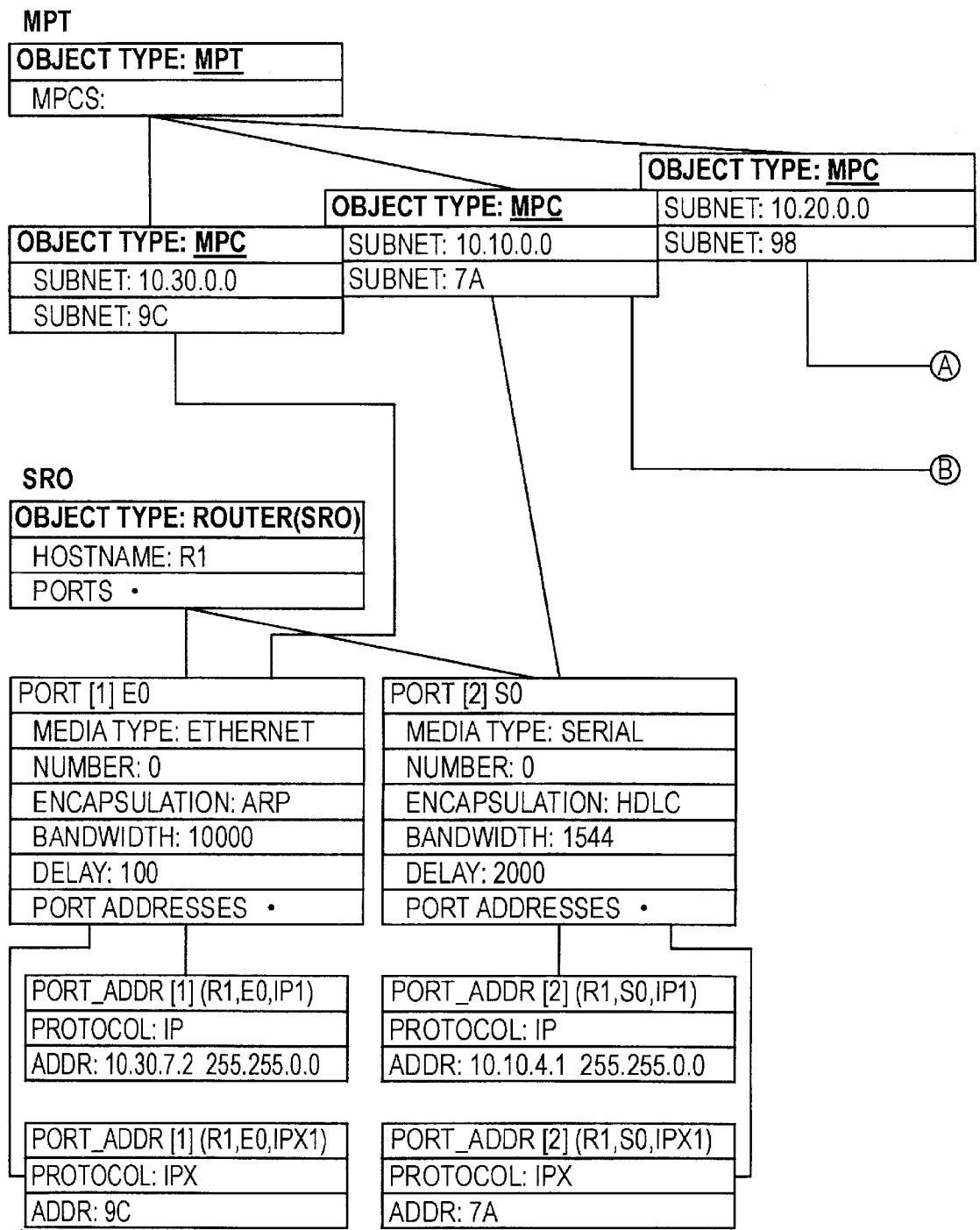
FIG. 25 shows the Object data structures of the SRO & MPT to demonstrate the linkages that inter-relate them as they would occur following execution of the process shown in FIG. 1b.
Figures 2, 25:
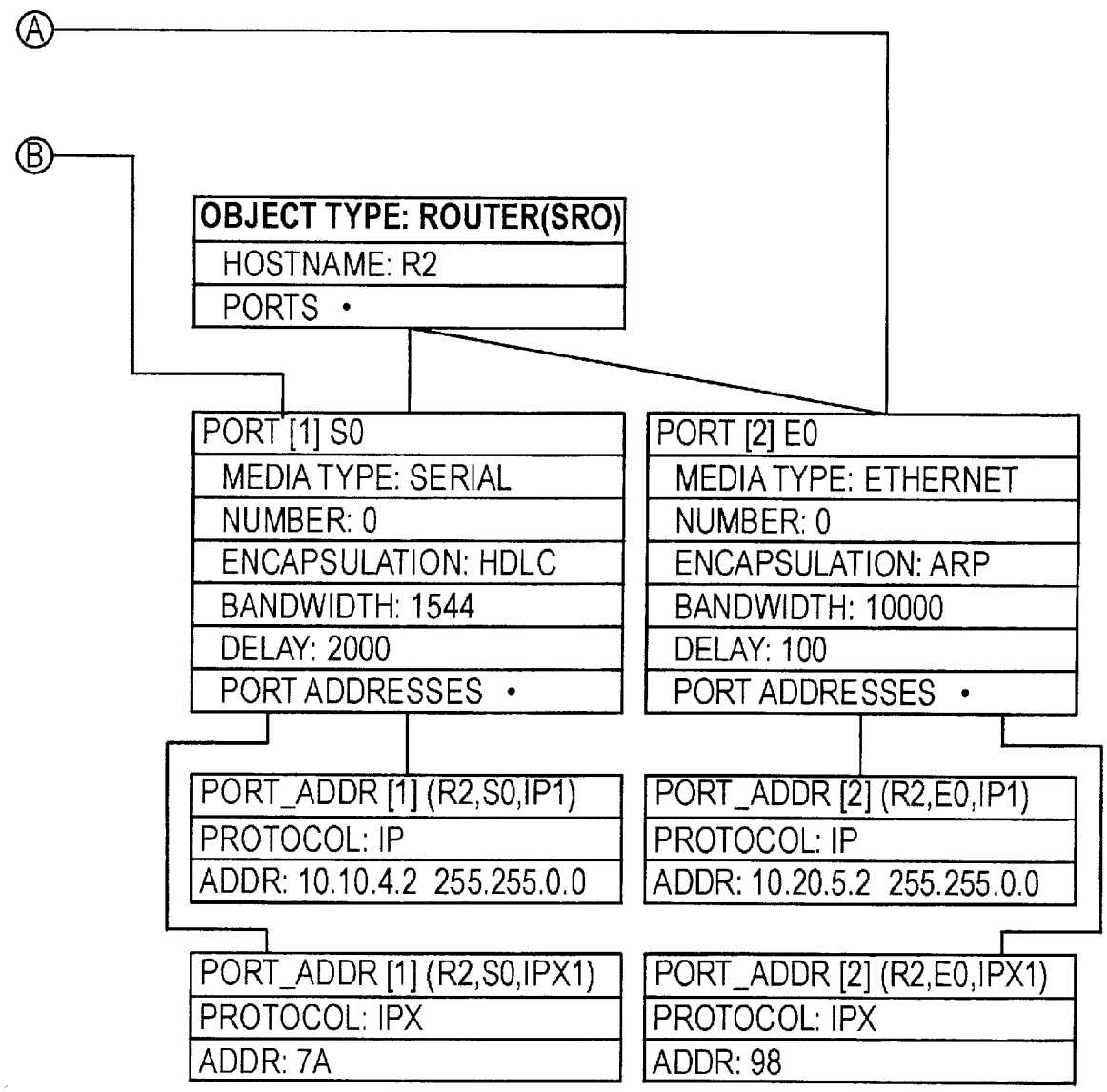

FIG. 25 shows the integration of the example MPT with the example SROs. When we presented the MPTs earlier there were just pointers, here we replace pointers with the actual SROs to better illustrate the integrated structure. This is a novel aspect of the invention, the fact that the object model does not merely manage isolated routers, but rather maintain the interrelationships among routers. Specifically, the MPTs and the SPTs interrelate the SROs.

Note that in FIG. 25 there are two type of links connoting two different relationships, the single links represent a component relationship (for example, the object type MPT has MPC components). The double lines represent pointers. A pointer differs from a component-link in that it links to a separate object.

As mentioned above, one of the advantages of forming a MPT is that information from one logical protocol can be used to fill in missing information from another logical protocol The following figures show how information that is omitted from the IP SPT could be filled in from another protocol, such as IPX. Cisco Systems, for example, has a configuration option called IP-unnumbered, where on a particular router port, rather than explicitly giving it an IP address, the IP-unnumbered command could be used. One advantage of this configuration option is that it helps to conserve the address space. However, a problematic ramification of using IP-unnumbered is that since a port configured with IP-unnumbered does not have its own address, it cannot be readily matched up to the other router ports. Remember that in FIG. 4, which shows how to produce the SPTs, a critical aspect of the SPT formation process is knowing the port addresses and matching them up. So, if a port lacks a port address, the process, in a sense, is blocked. The example network of FIG. 28 shall be used to illustrate a procedure that accommodates IP-unnumbered. The example network with four routers, R3, R4, R5 and R6. Router R3 and Router R4 are connected through their FDDI 1 interfaces to a FDDI ring whose subnet is 20.20.0.0. Router R3 and Router R5 are connected through their Serial 0 interfaces to a serial link, which is explicitly assigned an IPX network number, but no IP address (because IP-unnumbered is being used). Routers R4 and R6 are connected through their serial 0 interfaces with a serial link that is given an IPX network number (9C) but no IP address. Now look at the configuration files for these four routers and what their SROs structures. In FIGS. 29*a* through 29*d* we show the four configuration files. Refer to FIG. 29*a* reference numeral (1). Under interface Serial 0, rather than explicitly having an IP address with an address and mask, we see the IP-unnumbered command. (Note: The interface mentioned in the command, loopback 1, will not be further discussed because it is not relevant to the present discussion. However, to give a little more background or what a loopback is: while a router has a number of physical interfaces such as serial, FDDI and Ethernet interfaces, the user can manually configure as many loopback interfaces as he or she wants. These serve, in a sense, as a way of addressing a router. If a host wants to reach a router, it needs to mention an address on the router's ports. A common technique is to supply loopbacks to serve as addresses into a router; an advantage of a loopback address over the address of a physical port, is that a "loopback cannot fail").

Figure 30A:
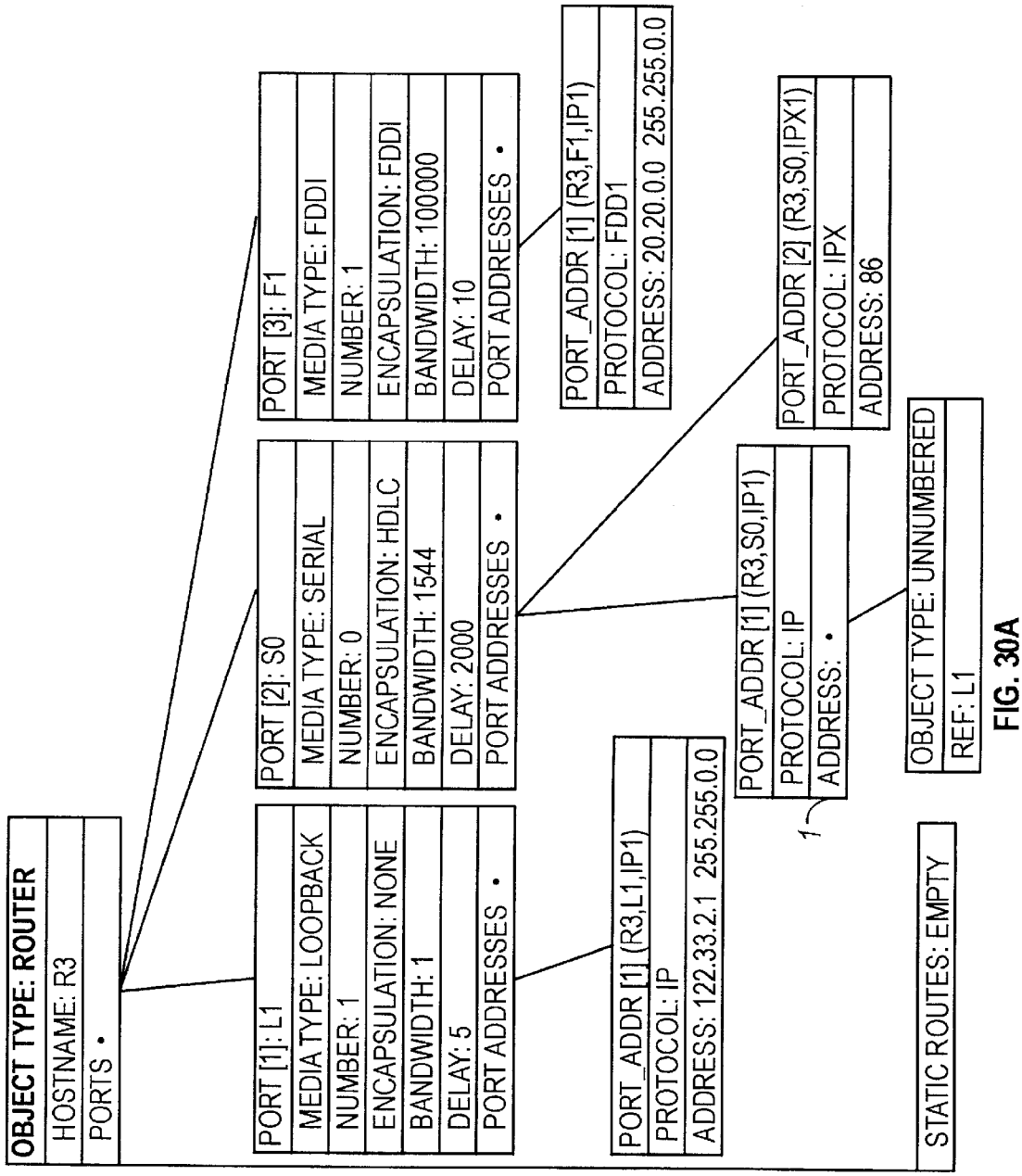
FIG. 30a shows the SRO object for R3 in FIG. 28.
Figure 30B:
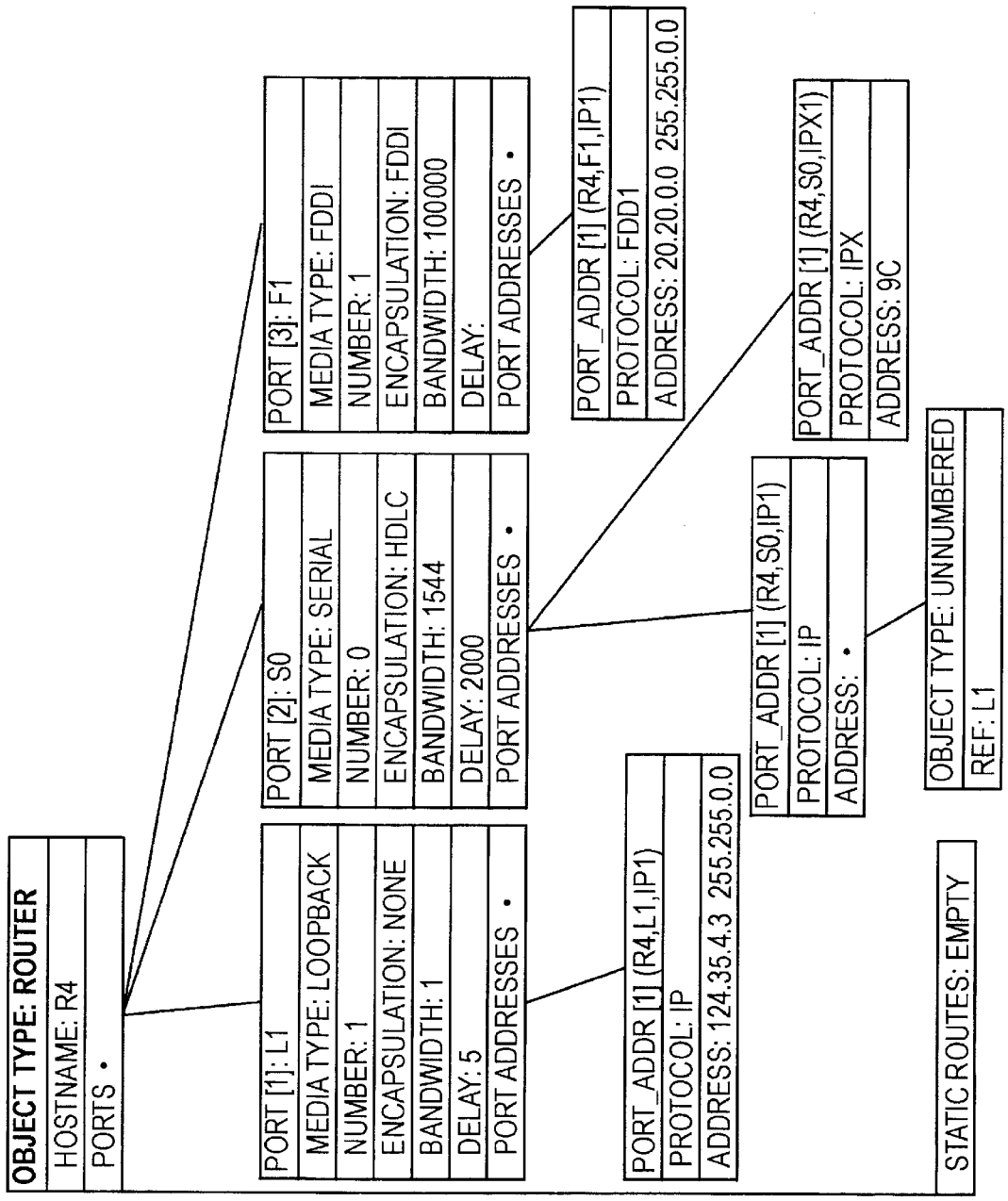
FIG. 30b shows the SRO object for R4 in FIG. 28.
Figure 30C:
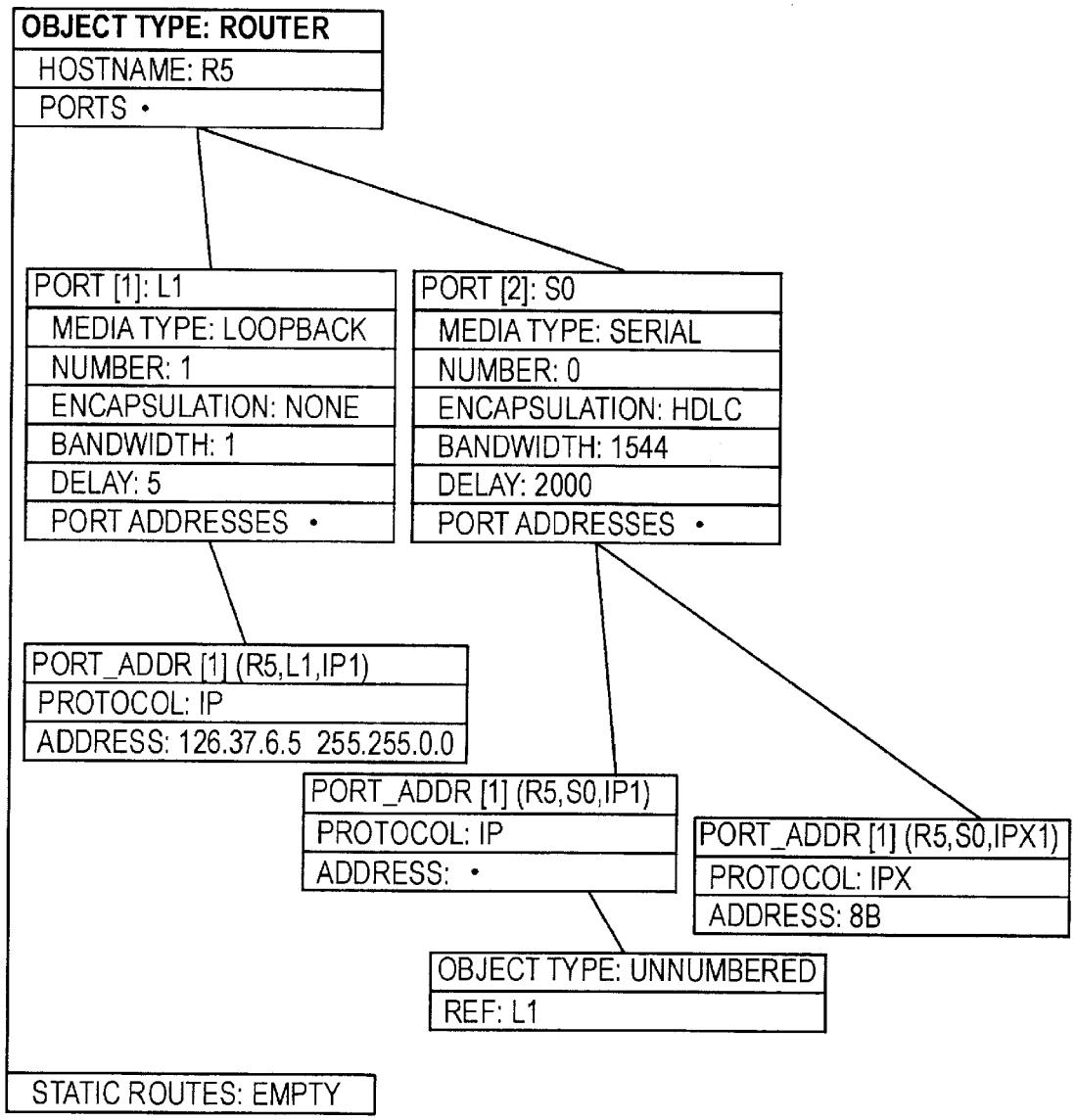
FIG. 30c shows the SRO object for R5 in FIG. 28.
Figure 30D:
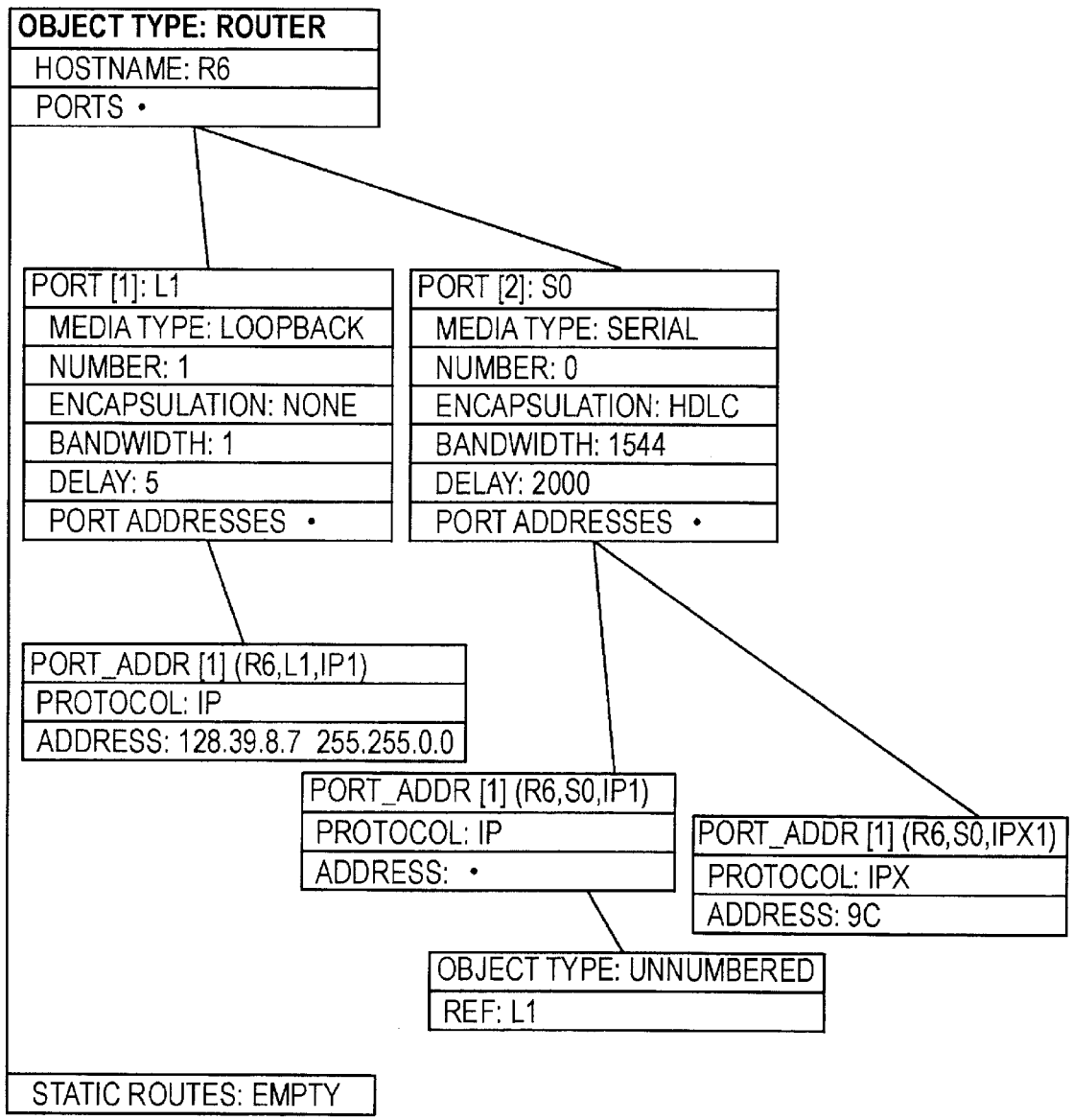
FIG. 30d shows the SRO object for R6 in FIG. 28.

FIGS. 29*b* through 29*d* each have IP-unnumbered configurations on their respective Serial 0 interfaces. FIGS. 30*a* through 30*d* show the SROs that are produced by parsing and filling in the defaults of the configuration files that are shown in FIGS. 29*a* through 29*d*. FIG. 30*a* shows the SRO corresponding to FIG. 29*a*. It's a straightforward translation. The only thing to highlight here is the protocol address indicated by numeral (1). Rather than including an address, an object type, "Unnumbered" is provided. The structure in FIG. 30*a* indicates that the router is an IP-unnumbered and points to the loopback L1. Similarly, FIG. 30*b* corresponds to FIG. 29*b*, FIG. 30*c* corresponds to FIG. 29*c* and FIG. 30*d* corresponds to FIG. 29*d*.

Figure 27:
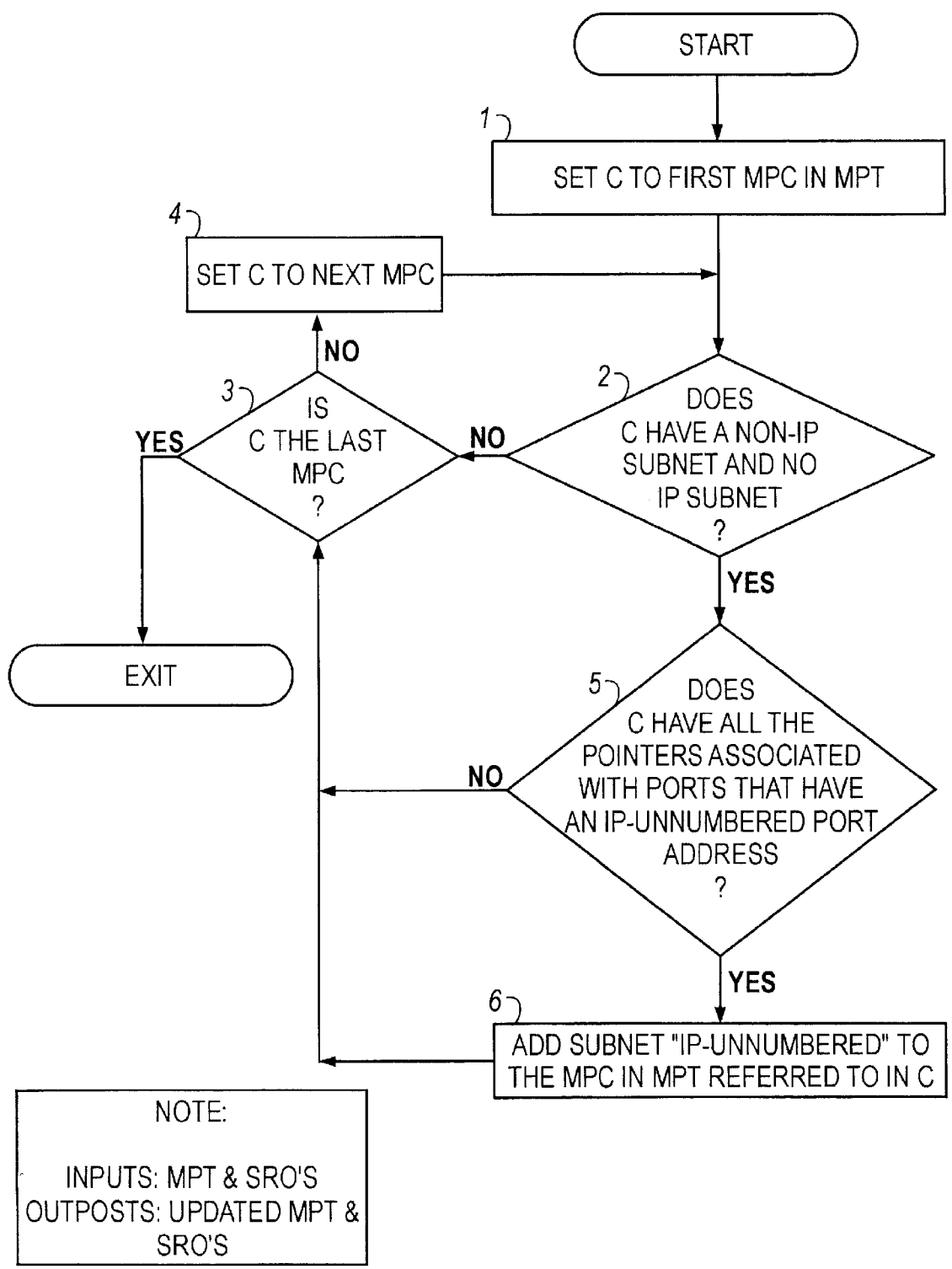
FIG. 27 shows a flowchart for the process for resolving IP-unnumbered connections using connections of another protocol, this process occurs during the topology construction phase (FIG. 1b).

FIG. 27 shows a flow chart that takes as input the MPT and the SROs it points to, and as a result of processing will add more items to the MPT to fill in the missing information that's missing in the IP SPT due to the use of IP-unnumbered.

Figure 28:
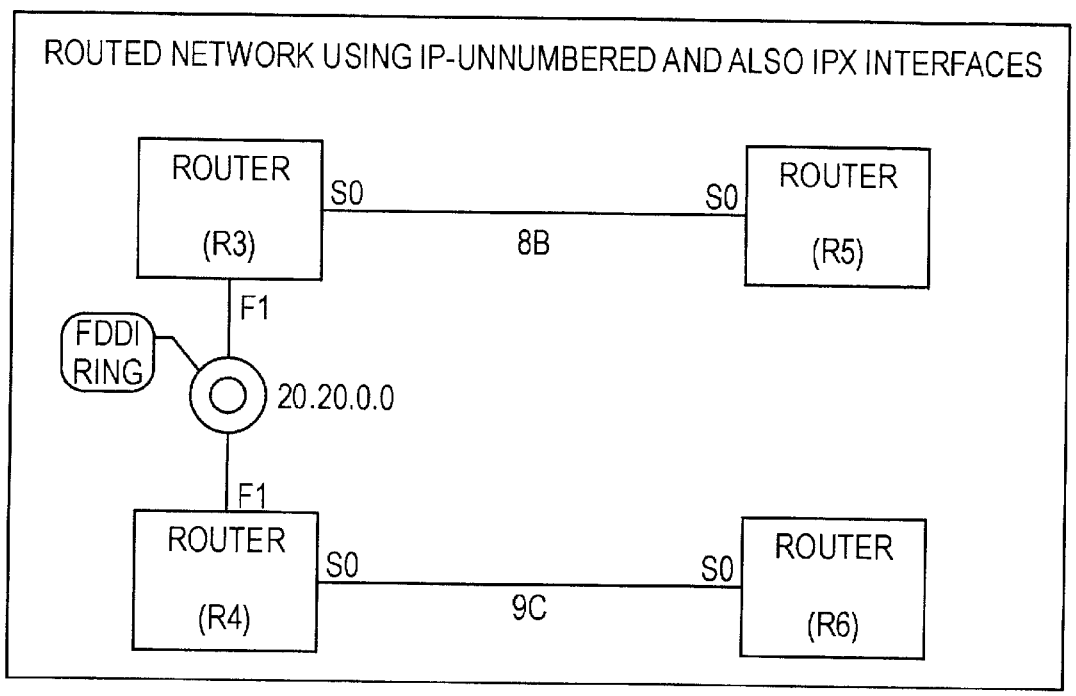
FIG. 28 is a topology drawing of a hypothetical network that will be referenced along with subsequent figures to show how information missing from the IP SPT because of the use of IP-unnumbered is filled-in using the IPX SPT.
Figure 30E:
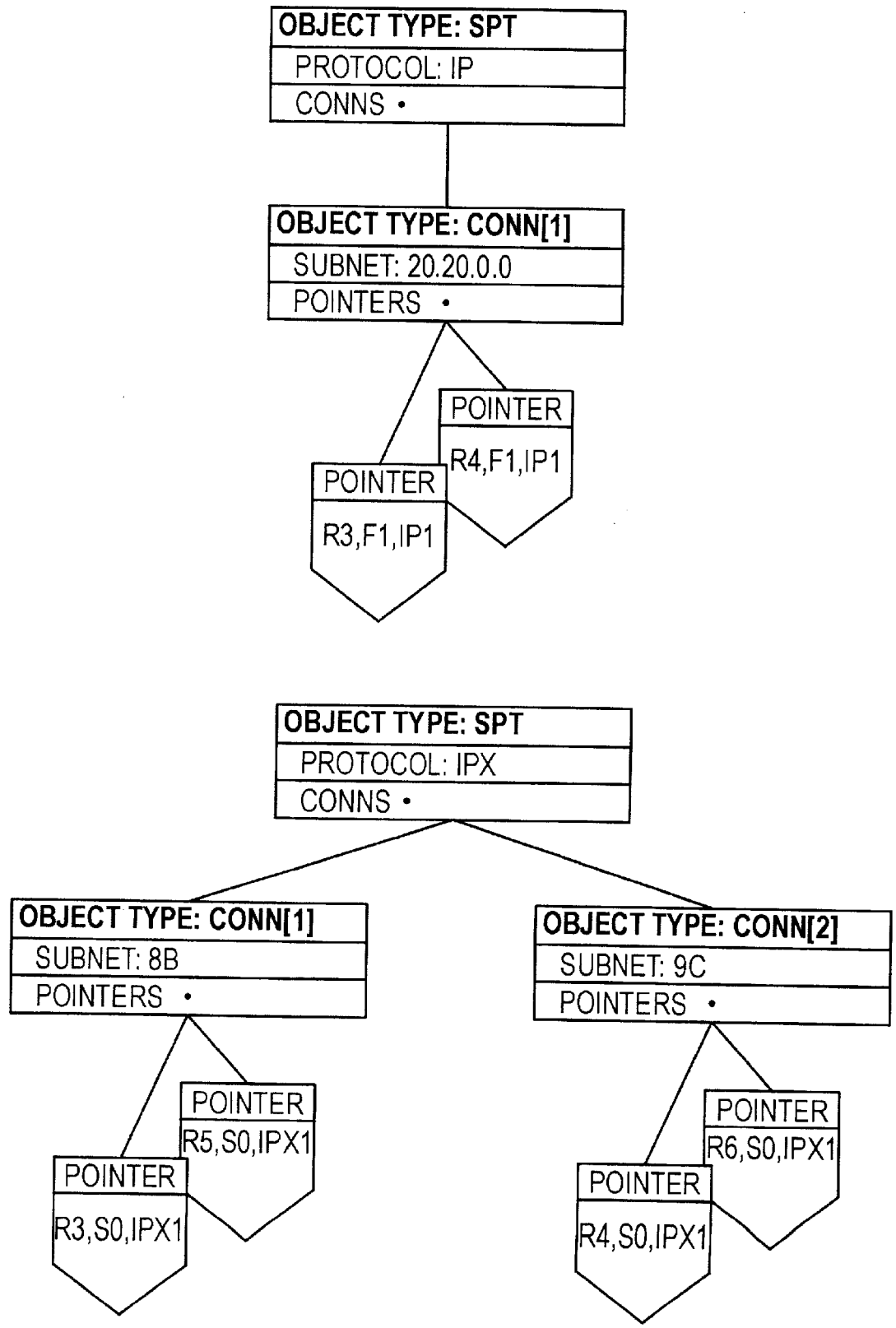
FIG. 30e shows examples of the IP and IPX SPT object data structures as they would be populated following the execution of the SPT build process in FIG. 4 for IP and IPX.

FIG. 30*e* shows the IP and IPX SPTs that would be produced for the network intuitively shown in FIG. 28 and with routers having the configuration files shown in FIGS. 29*a*–29*d*. Notice that the IP SPT only has a connection for the FDDI because only at the FDDI ports are there are explicit IP port addresses. At all the serial ports, IP-unnumbered is used. The IPX SPT, on the other hand, has connections associated with the two serial links.

In FIG. 27, Step (1) sets C to the first connection in MPT. Step (2) asks whether this connection has a non-IP subnet. If the answer is "no", then this Connection does not need to be processed, and the process goes to Step (3) to process the next connection in the MPT. If at step (2), the answer is "yes", then go to Step (5) and determine whether C has all the pointers associated with ports that have IP-unnumbered address. If the answer is "no", then continue at step (3) and process the next connection in the MPT. If the answer is "yes", then add to connection IP a new subnet labeled "IP-unnumbered."

Figure 30F:
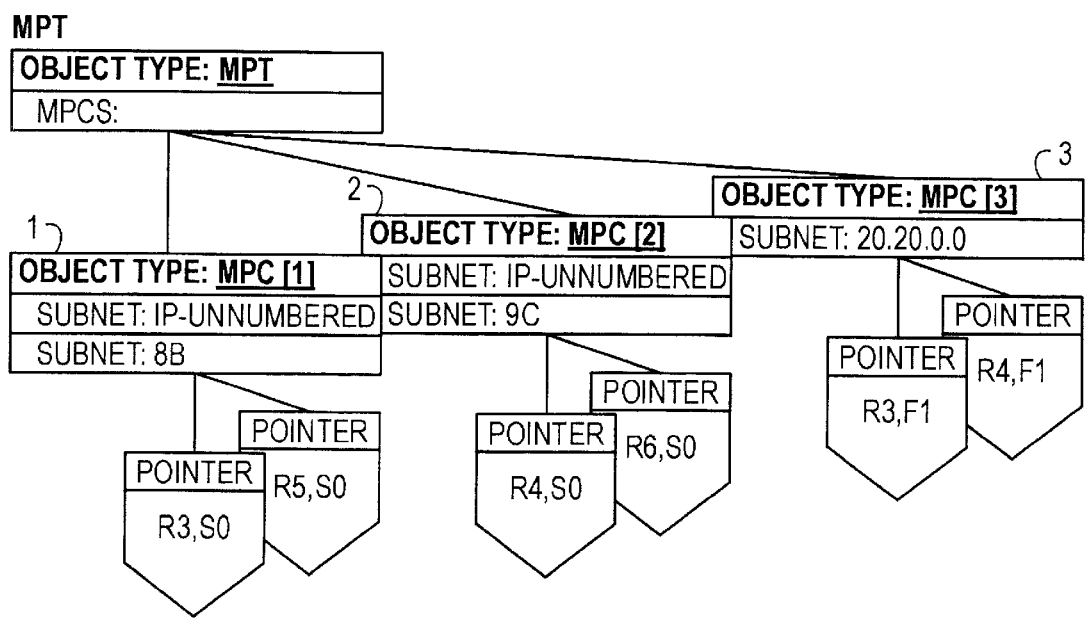
FIG. 30f shows an example of the MPT object data structure as it would be populated following the execution of the process in FIG. 22 taking the SPTs in FIG. 30e as input, and refined with the additional process shown as FIG. 27 that fills-in information missing due to the use of IP-unnumbered.

FIG. 30*f* shows the MPT that would be produced after performing the MPT construction algorithm, shown in FIG. 22, and then applying the algorithm for handling missing information due to IP unnumbered, shown in FIG. 27. Before the IP-unnumbered processing takes place, the MPT would look like FIG. 30*f* with the exception that connection MPC[1] would only have a single subnet 9*c*, and not "IP-unnumbered" in the subnet list; similarly MPC[2] would only have a single subnet 8*b*, and not "IP-unnumbered" in the subnet list. The IP-unnumbered subnets shown at points (1) and (2) in FIG. 30*f* are added during execution of the "IP unnumbered processing algorithm (FIG. 27). The reason that "subnet: IP-unnumbered" is added under MPC[1] is the presence of the IPX connection between ports R3, S0 and R5, S0 and the fact that both of these ports are configured for IP-unnumbered. Similarly, the reason that "subnet: IP-unnumbered" is added under MPC[s]is the presence of the IPX connection between ports R4, S0 and R6, S0 and the fact that both of these ports are configured for IP-unnumbered.

Figure 40:
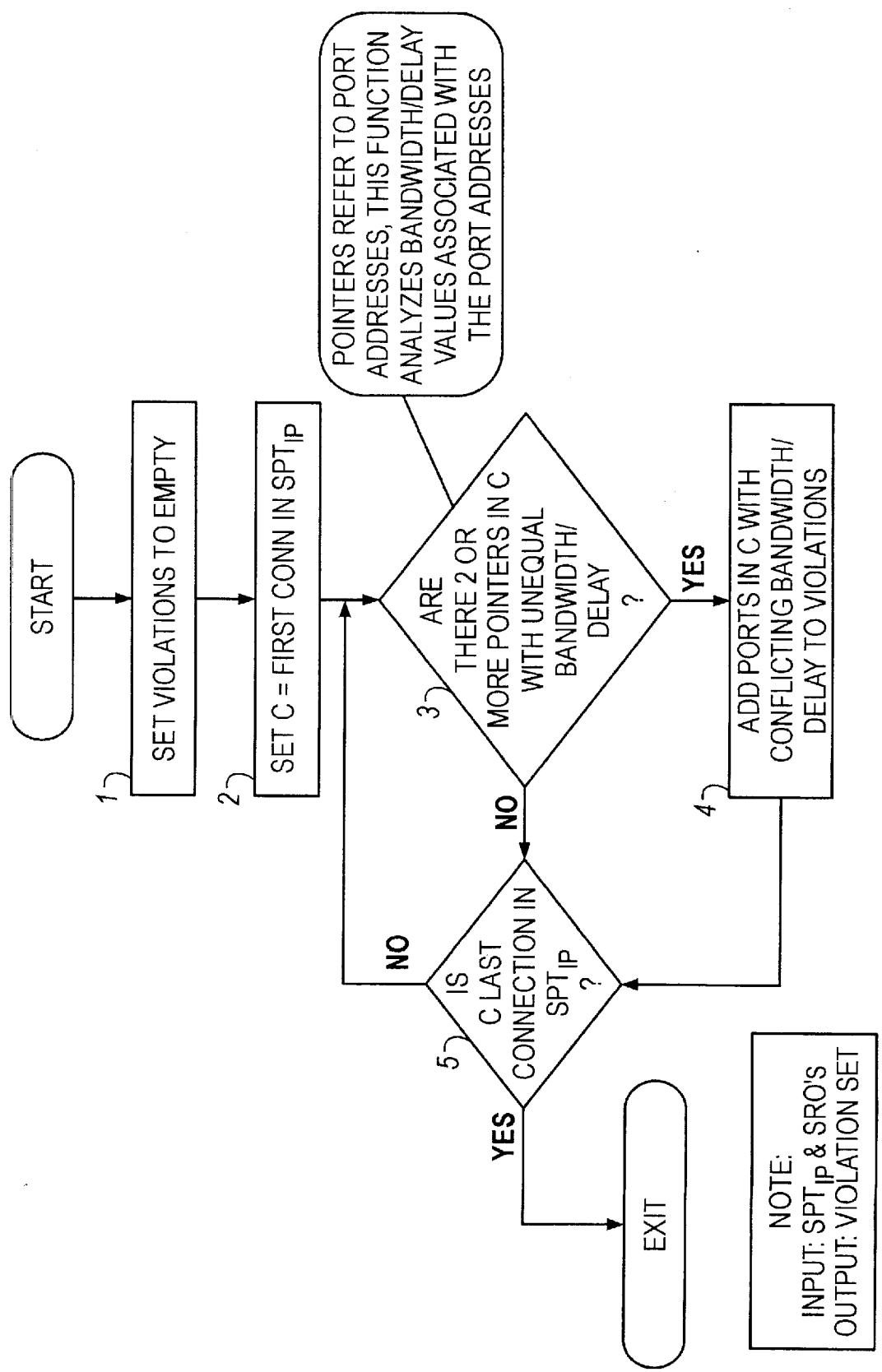
FIG. 40 is a flowchart showing the process for determining bandwidth and delay mismatches between adjacent routers. This is an integrity check that occurs during the phase indicated as FIG. 1d.

FIG. 40 is a flow chart that describes the process for finding mismatched bandwidth statements and mismatched delay statements. (Note: this is a non-routing integrity check; see FIG. 1*d*). On each port in a router, a bandwidth and delay statement is either explicitly or implicitly configured. These are used by both the IGRP and EIGRP routing protocols to compute the "cost" of a routing path. The process illustrated by flowchart in FIG. 40 looks for conflicts, where two adjacent router ports are configured with different bandwidth and/or delay metrics, which may or may not be a problem. Because mismatching may be inadvertent and detrimental to the network operation, it is valuable integrity check information to present to the user.

The input of this procedure is the SPT$_{IP}$ and the SRO's that it points to. The output is a violation set which is initialized to empty in Step (1). In Step (2), the variable C is set to the first connection in the SPT$_{IP}$. The process iterates through all the connections in the SPT$_{IP}$. Step (3), asks whether there are two or more pointers in C (recall these are pointers to port addresses) associated with ports having bandwidth or delay that are unequal. If the answer is "yes", go to Step (4) and add the ports in C with a conflicting bandwidth or delay to the violation set. Then go to Step (5), which asks whether C is the last connection. If it is, the procedure terminates. If not, go back to Step (3). If in Step (3) the answer is "no conflict", go to Step (5), and process the next connection in the SPT$_{IP}$.

Figure 41:
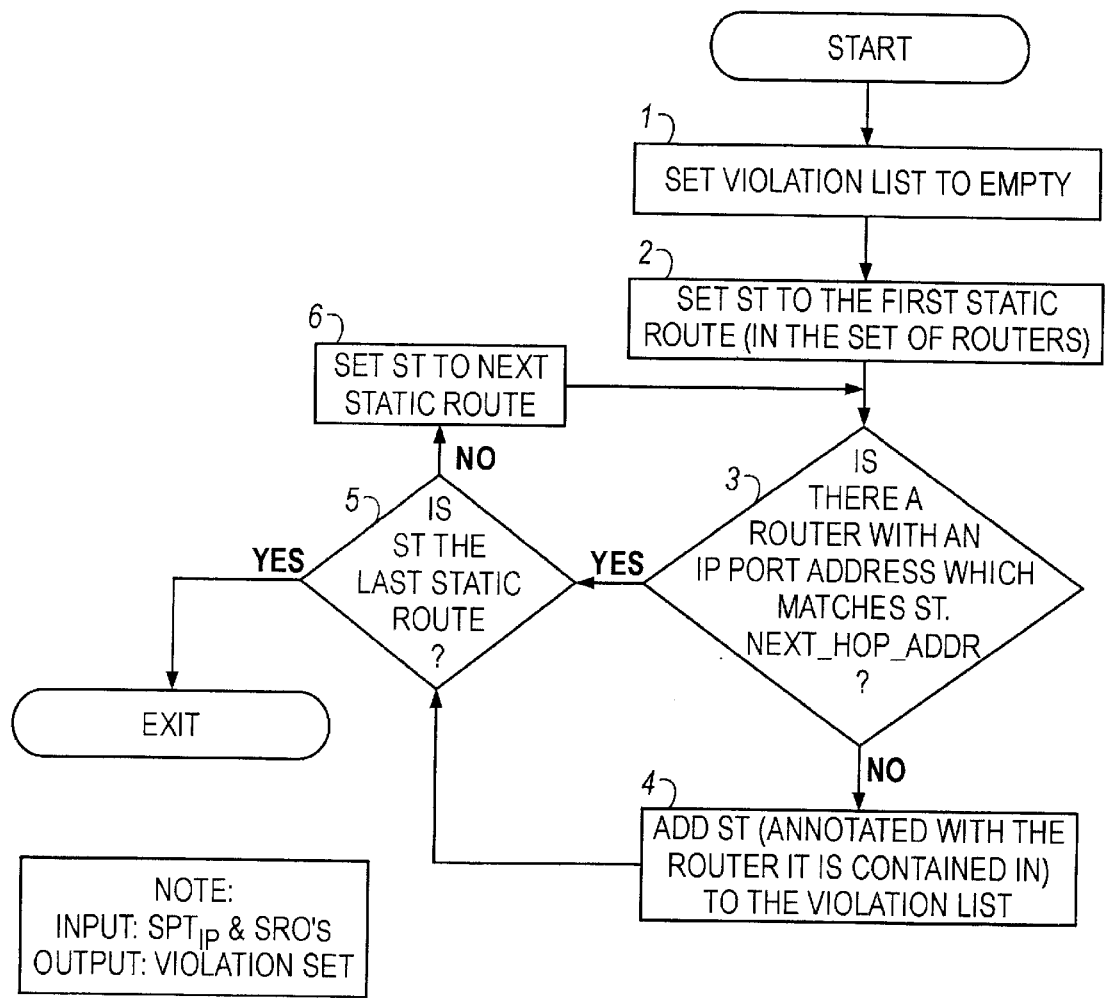
FIG. 41 is a flowchart showing the process for determining the existence of unresolved static routes as coded in router configurations, this is an integrity check that occurs during the execution of the phase shown as FIG. 1d.

FIG. 41 provides a flow chart depicting process for performing another type of non-routing integrity check, (FIG. 2) which looks for static routes configured on the router that point to routers that do not exist in the network being analyzed. This may or may not be a problem. It is a problem in the case that the static route's next hop address is incorrectly specified; in which case, it will not match an existing router. On the other hand it might point to a router outside the domain being analyzed; in which case, the user could discount the integrity check. Let us go step by step through the flow chart. The input to this flow chart is the set of SROs spanning the network. The output is a violation list which in Step (1) is initialized to "empty". The process steps through all the routers and all the static routes configured. Step (2) sets ST to the first static route in the list of routers. Step (3) asks whether there is a router with an IP port address that matches the static route's next hop address. To determine this, the procedure searches through all the SROs. If no match is found, then add to the violation list, a pointer to this static route object, meaning that this static route refers to a next-hop router that is not in the domain of analysis. Step (5) asks whether ST is the last static route in the list of routers. If the answer is "yes", the process terminates. If the answer is "no", ST is set to the next static route and process repeats. If the answer to Step (3) is "yes", then the address in the static route is within the set of routers, and the procedure goes to Step (5) to process the next static route if it exists.

Figure 42:
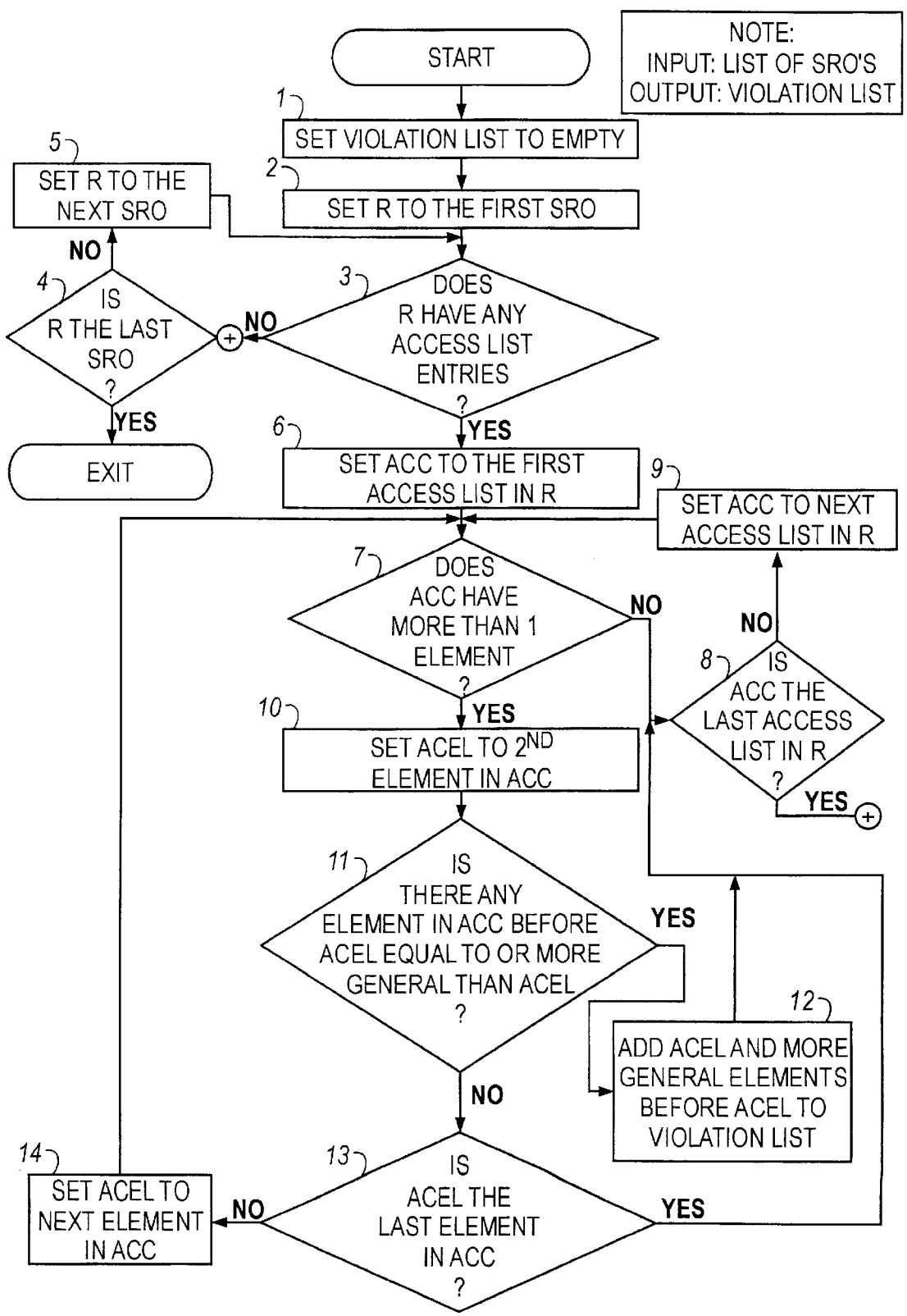
FIG. 42 is a flowchart of the process for determining access list subsumption problems, this is an integrity check applied during the phase shown as FIG. 1d.

FIG. 42 describes another non-routing table integrity check (See FIG. 1*d*.) This integrity check is responsible for looking at all the routers' access lists to find problems within an access list. An access list is a set of patterns used to filter traffic going into and coming out of a router. Given a destination to filter, an access list will be processed starting at its first element. If the destination matches this first element, then the router looks at the action associated with the element; if its a "permit", the destination gets through; if its a "deny", the destination is filtered. If the first element does not match, the router goes on to the next element and looks for a match. If processing get to the end of the access list (and thus there's no match) the destination is filtered. The checks that are depicted in FIG. 42 look at an access list to see if there are two or more elements in the access list where the earlier one is more general than the later one. If that is the case, the latter one will never be reached. This relation is called a "subsumption relation". The high severity error occurs when the two access elements in the subsumption relation have different actions: one says "permit" and the other says "deny". The less severe integrity check occurs when the access list elements in the subsumption relation refer to the same action. In this latter case, its an issue of efficiency, in the first case, it's probably a problem where the user didn't realize that processing would not reach this more specific entry later in the list.

FIG. 42 illustrates how the process finds subsumption problems in the access lists of the routers The input to this flow chart is the list of SROs and the output is a violation list which has the access list element pairs that are in violation. Step 1 of FIG. 42 sets the violation list to "empty". Step (2) sets R to the first SRO, that is, to the first router in the list of routers. Step (3) asks whether R has one or more access lists. If the answer is "no" then there is no need to process this router and the process moves to Step (4) which asks whether the last router has been reached. If so, the process terminates. If not, Step (5) is reached which sets R to the next SRO and then continues at Step (3). If in Step (3), router (R) has an access list, then set a variable Acc to the first access list in R Step (6).

(A router can have one or many access lists.) Step (7) asks whether the access list has more than one element. If it only has one element, then there's no processing to do because the algorithm is looking for conflicts between two elements. So if the answer is "no", move to Step (8), which asks whether Acc is the last access list in R. If the answer is "yes", then go to Step (4) and process the next router. If the answer is "no", then set the variable Acc to the next access list in router (R) and then process this access list. If the answer to Step (7) is "yes", that is, the access list pointed to by Acc has more than one element, then in Step (10) set AcEL which will be a pointer to an access element, to the second element in Acc. Step (11) asks whether there is any element in the access list Acc before AcEL which is equal to or more general than AcEL. If this is the case, then conflicts have been located. Go to Step (12) where these conflicts are placed in the violation list. If this is not the case then at Step (13), ask whether the last element in Acc has been reached. If the last element in Acc has been reached, then move onto Step (8) which processes the next access list in Router R (if it exists). If the answer is "no" at Step (13), then Step (14) sets AcEL to the next element in the access list, and the process continues processing this access-list element.

Each router typically has a routing table for each level 3 protocol. A routing table is responsible for determining the "next hop" a packet of data must take along the way from its source to its destination. The "next hop" refers to the next adjacent router along the "path" through the network that the packet(s) will take en route to its ultimate destination. A routing table consists of a set of elements, each having a destination to match against and a "next hop" specification. When a packet enters a router, the router looks in its routing table to find a matching element. If a match is found, then this element indicates the next hop (Note: there could be more than one next hop, meaning that there are multiple choices). It is possible that for a particular destination no route is in the routing table. If that is the case, the router looks for what is called a gateway of last resort which might or might not beset. If it is not set, then packet being matched is dropped by the router. If a gateway of last resort is set, it will be handled like any other routing table element, which the router will use as a defined "next hop".

Figure 44:
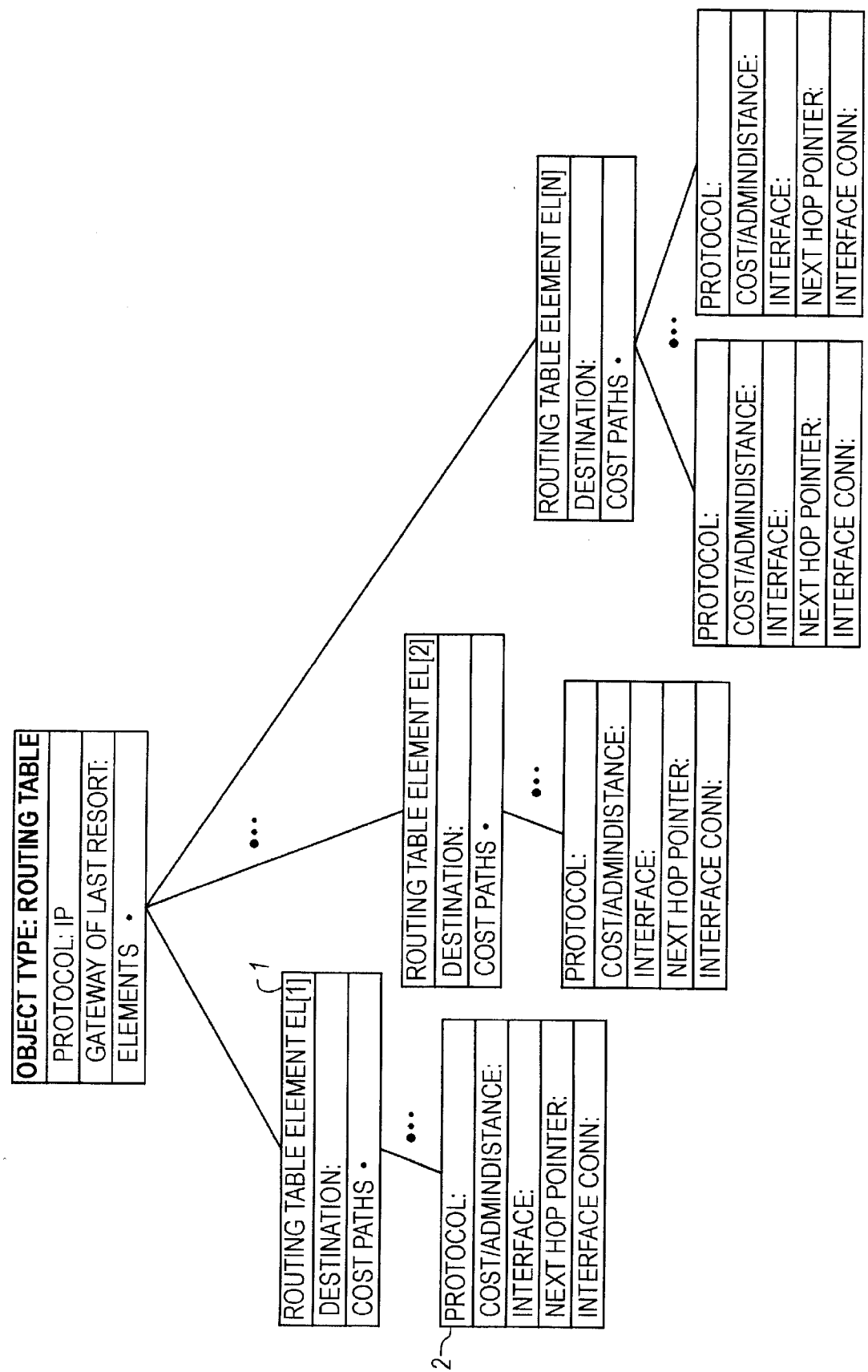
FIG. 44 shows the object data structure of the Routing Table object. This object is populated during either of the processes shown as FIGS. 1e or f. It becomes input to the process shown in FIG. 1g which evaluates integrity checks that use routing tables as input.

FIG. 44 shows, in attribute form, a Routing Table Object. For each Level 3 protocol, each router will have a Routing Table Object. In the first field of the Routing Table Object is the Protocol attribute, which is set to IP, IPX, APPLETALK, etc. In the second field is a pointer which is either empty or references a gateway of last resort (which is a Routing Table Element object described below). The last high-level attribute, which contains the bulk of this object, is a set of routing table elements. Each one of these mentions a destination and if this destination matches, where to go next.

In FIG. 44, reference numeral (1) refers to routing table element EL[1], which includes a destination. The different protocols have different ways of describing the destination. For IP, a destination is given by an address and a mask. For example, consider a destination with an address being 10.10.0.0 and a mask being 255.255.0.0. In this context 255 in the mask means pay attention to the corresponding octet, 0 means ignore the corresponding octet. So for example, 10.10.0.0 255.2550.0 would match anything that starts with 10.10 and any other setting of the last two octets. In general mask Octets can be any number from 0 to 255 and "matching" is decided by applying the mask using Bit-wise AND.

The second part of a routing table is an attribute "Cost Paths", which can have one or more elements. Each Cost Path element (see reference numeral (2) in FIG. 44) contains five attributes. First, is Protocol indicating the routing protocol that caused the element to be put in the routing table. This attribute can have a number of settings. A routing table element could be there because it is a directly connected interface; it could be there because there was a static route; or it could be there because it was learned by a dynamic routing protocol such as RIP, IGRP or OSPF, etc. The second field, Cost/Administrative distance, is an attribute that is used in the case of two or more routes being available. When there are two routes, the router tries to determine the best route. The Cost/Admin. distance value is a metric that is used for comparison to find the best route. The third field, Interface, tells which port/interface to send a matching packet out of. The Next Hop pointer will be non-empty if the protocol was learned either from a static route or a dynamic protocol and this tells what next router to send the packet to. Lastly, the field, Interface Conn, refers to a connection in the SPT of the corresponding protocol that is attached to the interface identified in the third field.

Recall that cost-paths may have one or more elements. It is possible to have a number of equal cost-paths in which case cost-paths will have two or more elements showing the different ways the router can route the packet.

The routing table data structures can be obtained in two basic ways; these structures can be obtained by reading the routing tables from the live routers in the network (the process shown in FIG. 1e) or by computing them, through simulation, using the integrated SPT/SRO object model as input (the process shown in FIG. 1f). If IP routing tables are being computed then the IP SPT is used; if IPX routing tables are being computed then the IPX SPT is used, etc.

An important benefit of computing routing tables, rather than observing them, is that a simulation using computed routing tables can indicate what happens to the routers under hypothetical failure scenarios enabling a pro-active failure analysis.

The routing tables being used and computed by the invention refer to "steady-state" routing tables. The steady-state routing tables are the routing tables that are produced once the routing process settles; in a live network, the routing tables can converge to a new state when network devices or router ports change in status (i.e., whether they are operational or failed); routing tables can also converge to a new state when the configuration of the routers or other network devices are changed, new devices are added, or existing ones removed. By saying that the invention is computing steady-state routing tables, we mean to imply that the invention is not computing information about the convergence process, such as the settling time or the number of messages exchanged during convergence.

Focusing on steady-state, rather than also the transient states, allows novel efficient techniques to be applied in this invention because the invention can "cut to the chase"; this is in contrast to the live routers running, for example, the periodic distance vector protocols, such as RIP and IGRP, which must do a lot more cycling before obtaining a steady-state.

The invention's routing table simulation technique draws on the published specification of the standardized routing algorithms, such as RIP and OSPF, and draws on the vendors' public specification of their own proprietary routing protocols, such as Cisco's IGRP and EIGRP routing protocols, as well as the vendors embellishments and slight modifications to the standardized routing protocols.

We separate the part of the invention that models the published algorithms from the rest of the structure, which constitutes the invention's novel contribution, by defining the functions below, which capture the published algorithm's behavior. These functions below are used for all of the routing protocols being treated.

SEND(RT_EL,RP,<Ro,Po>) is a function computable from Ro's SRO that returns either null if router Ro cannot generate from routing table element RT_EL an update using routing protocol BP and send it out interface Po; otherwise this function returns the routing table element that router Ro would send when advertising route RT_EL out interface Po using protocol RP. If SEND(RT_EL,RP,<Ro,Po>) is non-null, then its destination is either the same as RT_EL's destination or more general than RT_EL's destination (in which case we say that it refers to a summarized route). Also, if the value of SEND(RT_EL,RP,<Ro,Po>) is non-null, then the protocol attribute associated this value will be RP. If the element RT_EL has its protocol attribute set to RP or to Direct Connect (meaning that it refers to a directly connected interface), then we say that SEND(RT EL,RP, <Ro,Po>) refers to natively sending RT_EL; otherwise we say that SEND(RT_EL,RP,<Ro,Po>) refers to redistribution of RT_EL into protocol RP.

The function SEND(RT_EL,RP,<Ro,Po>) embodies the routing update 'sending" behavior enabled by the configuration of protocol RP for router Ro, which is captured by the (routing) protocol object in Ro's SRO with Protocol attribute set to RP (see FIG., 2 for the placement of this object in the SRO and a partial view of a routing protocol object). There are many routing protocol configuration commands that impact what routes can be sent out; for example, route filters can be configured for a routing protocol, which consist of references to access-lists that indicate which destinations a routing protocol can send out. Another example is passive inteitces; if protocol RP has a passive interface on interface (i.e., port) Po, then this protocol will not send any updates out of port Po.

RECEIVE(RT_EL,RP,<Ro,Po>) is a function computable from Ro's SRO that returns null if either router Ro is not running protocol RP or Ro will filter or otherwise block element RT_EL in an update from routing protocol RP coming in interface Po; otherwise the function returns the routing table element that router Ro will consider putting in its routing table when receiving an update from RP containing element RT_EL.

Suppose that RECEIVE(RT EL,RP,<Ro,Po>) is non-null and returns RT_EL2; in this case RT_EL and RT_EL2 can differ in the following ways: i) RT_EL2's and RT_EL's costInfo object's cost/admin. dist attributes typically will differ (with RT_EL2's cost/admin. dist typically being larger), ii) RT_EL's Interface attribute will be set to the name associated with Po, iii) RT_EL's Interface_Conn attribute will be set to the SPT connection attached to Po, and iv) Next_hop_pointer will be set to the pointer on the SPT connection associating with the router sending the update (so being more formal would require RECEIVE to take as another argument the sending router).

The function RECEIVE(RT_EL,RP,<Ro,Po>) embodies the routing update "receiving" behavior enabled by the configuration of protocol RP on router Ro (if RP happens to be enabled on Ro). For example, a configuration option that can block the reception of incoming updates is the setting of an input route filter.

COMPARE(CostInfo1,CostInfo2,RP,Ro)—is a function computable from Ro's SRO that returns one of the three states: Greater_than, Equal_to, or Less_than. If cost/ admin. distance of CostInfo1 is less than that of CostInfo2, Less_than is returned; if the cost/admin. distance of CostInfo1 is greater than that of CostInfo2, Greater_than is returned; otherwise the two cost/admin. distances are equal and Equal is returned. (Note: For simplicity here we are not presenting the more general form of SEND and RECEIVE used in the invention that is applicable in cases where the router sending the update and the one directly receiving it are not directly connected, such as can be the case for BGP (which can use remote neighbors). The invention generalizes SEND and RECEIVE so that, rather than just taking a port as an input, it can also take an argument that designates the router that is receiving or sending the update).

Figures 1, 43:
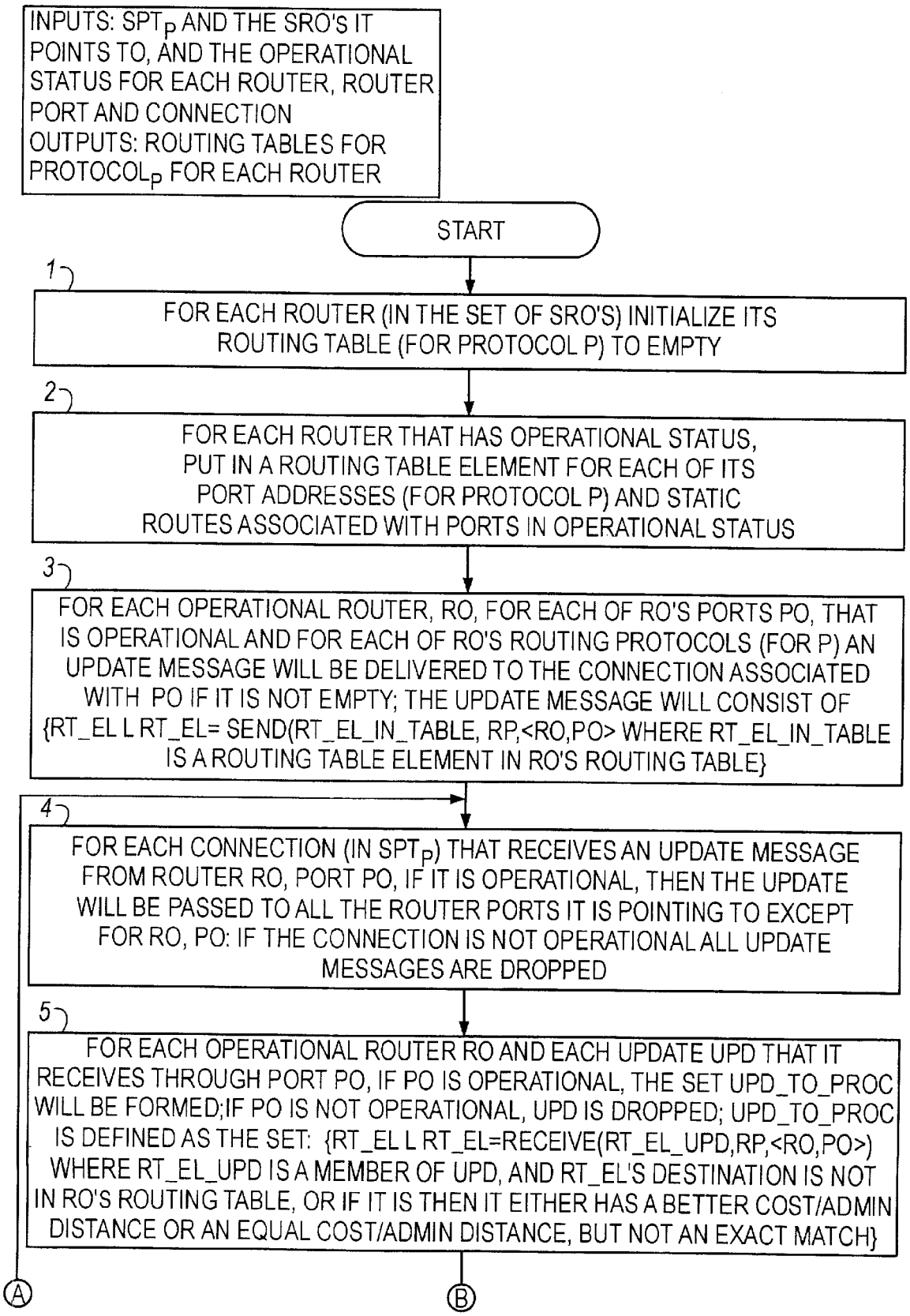
FIG. 43 is a flowchart showing the process for calculating routing table elements taking a SPT and SROs as input, it occurs during execution of the phase shown as FIG. 1f. It is an alternative method to capturing live routing tables from the network as shown in FIG. 1e.
Figures 2, 43:
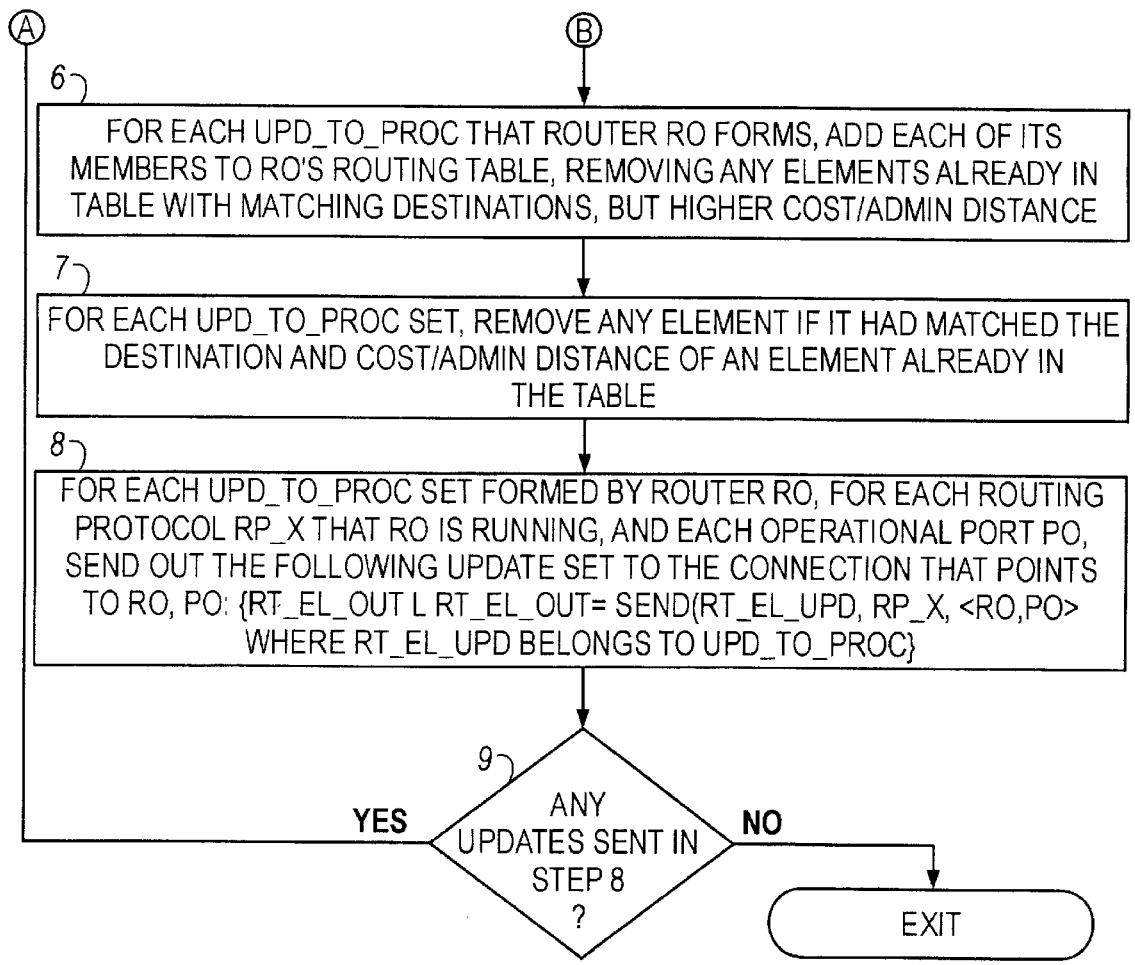

FIG. 43 depicts the process the invention uses to compute the steady-state routing tables for protocol P (e.g., IP, IPX, AppleTalk) given a SPT for protocol P, the SROs it points to, and the operational status of each router, each of its ports, and each of the connections in the SPT. A routing table is computed for each router in the set of SROs given as input. The output routing tables are the steady state routing tables that would be produced by running all the routing protocols that are specified in each routers SRO. The invention's algorithm is applicable when there are multiple routing protocols running on one or more routers. It also handles redistribution between routing protocols; that is, for example, router R1 might learn about a destination through RIP and if it is configured to do so can re-advertise this route by if redistribution from RIP into IGRP is enabled. Lastly, the algorithm handles summarization as embodied by the SEND function, which has the property that it returns an output routing table element that can have a more generalized routing table element destination than the input element (to capture summarization cases).

A novel aspect of the invention is that all routing protocols are simulated using a distance vector message passing scheme based on incremental updates, similar as to what is used by EIGRP. This scheme produces the steady-state routing tables that are produced by routing algorithms that use difference methods during their convergence process, such as periodic distance vector (RIP and IGRP), link state (OSPF, IS-IS, and NLSP), and BGP. Also, for IP destinations for all the protocols take both a 32 bit address and 32 bit mask, rather than just a 32 bit destination used by RIP and IGRP. This treatment provides, although, more general than needed for RIP and IGRP are for uniformity in implementation across routing protocols. The advantage of treating all these type of routing algorithms with one type of scheme is that it facilitates a general mechanism for explanation and it makes incorporating a new routing algorithm into the invention much easier to handle.

In Step (1) of the "routing table simulation algorithm" (shown in FIG. 43), each routing table (for protocol P) for each router is initialized to empty. In Step (2), for each operational router Ro, routes (i.e., Routing Table Element objects) corresponding to Ro's port addresses (for protocol P) on ports that have operational status are put into Ro's routing table with Protocol set to Direct Connect (see FIG. 44, point 2); also each static route configured on Ro (see point 5 on FIG. 2) that is not associated with a failed port, is put in Ro's routing table with Protocol set to Static_to_ next_hop (note: there are two types of static routes; static routes which mention a next hop address and static routes that mention a router interface; although the invention treats both types, for simplicity in the Patent we just discuss the statics to a next hop address).

In Step (3) the static and directly connected routes are advertised. For each operational router Ro, each of its routing protocols RP will try to advertise update messages out its operational ports for the static and directly connected routes put in its routing table in Step (2). The function SEND is used in this step to determine which routes are permitted to be advertised out of what ports (as dictated by each router's configuration as captured by its SRO (from which SEND is computable)).

An update message sent from Router Ro out port Po in Step (3) is directed (in the simulation) to the SPT connection that is attached to (i.e., points to) router Ros port Po. In Step (4), each failed connection drops any message it receives, while each operational connection passes the message to each of the other Router/ports attached to the connection.

Step (5) refers to the process where for each update that an operational router receives, it determines for each routing table element in the update whether it should be processed or discarded. A failed router that receives an update or a router that receives an update through a failed port simply drops the update. The RECEIVE function is used in Step (5) to determine if a router is configured to receive each routing table element in an update message. In Step (5), the router is also computing the new cost/admin. distance to be used for a received element, which is typically higher than the one it received (this "new cost" computation is embodied in the RECEIVE function); in Step (5) the router also discards any element where its new cost/admin. distance is greater than an routing table element already in the routing table with matching destination. The function COMPARE is used in this step to make this cost/admin. distance comparison. The output of Step (5) is a set of UPD_TO_PROC sets for each router, capturing the update elements that need further processing.

In Step (6), for each router Ro with one or more UPD_TO_PROC sets, it will add each member from each one of these sets and put it in its routing table, replacing any route previously in its routing table having higher cost/admin. distance. If the new route being added matches a route already in the table with equal cost/admin. distance, then the resulting table will have multiple (equal cost routes). Another condition mentioned in Step (5) is not an "exact match"; by this we mean that two routes have exact same destinations, cost/admin distances and in addition match on the other attributes, such as Interace (see FIG. 44 point 1) (Notes for simplicity here we just present an algorithm that allows multiple routes that have equal cost/admin. distance; this is easily generalized to handle multiple routes where the costs may differ, a possibility for example, when using Cisco's IGRP variance command).

In Step (7) each UPD_TO_PROC set is examined to look for and remove any routing table element that when put in is an "equal cost/admin. distance" route, that is a route that matched an existing destination and has equal cost/admin. distance. The reason for removing these elements is because in the next step these "incremental changes" will be sent out and it is not necessary to send out an incremental change corresponding to a new, but equal cost/admin. distance route.

In Step (8), the "incremental updates", which are in the UP_TO_PROC sets will be advertised both through the native protocol associated with each element in a UPD_TO_PROC set and by redistribution. The SEND function is used in this step to determine which advertisements and redistributions are permitted by the configuration. Consider an element EL in a UPD_TO_PROC set for router Ro. For the protocol RP associated with EL, SEND(EL,RP,Ro,Po) will be non-null only if the router Ro is configured to natively send EL (using protocol RP) out Po. For a routing protocol RP_X different from E1's protocol, SEND(EL, RP_X,Ro,Po) will be non-null only if the router Ro is configured to redistribute from EL's protocol to RP_X and send it out port Po. Like Step (3), Step (8) will only send updates out operational ports.

Step (9) checks whether any updates are sent in Step (8); if not then the process terminates; otherwise the algorithm loops back to Step (4) where the new updates are processed.

Figure 43A:
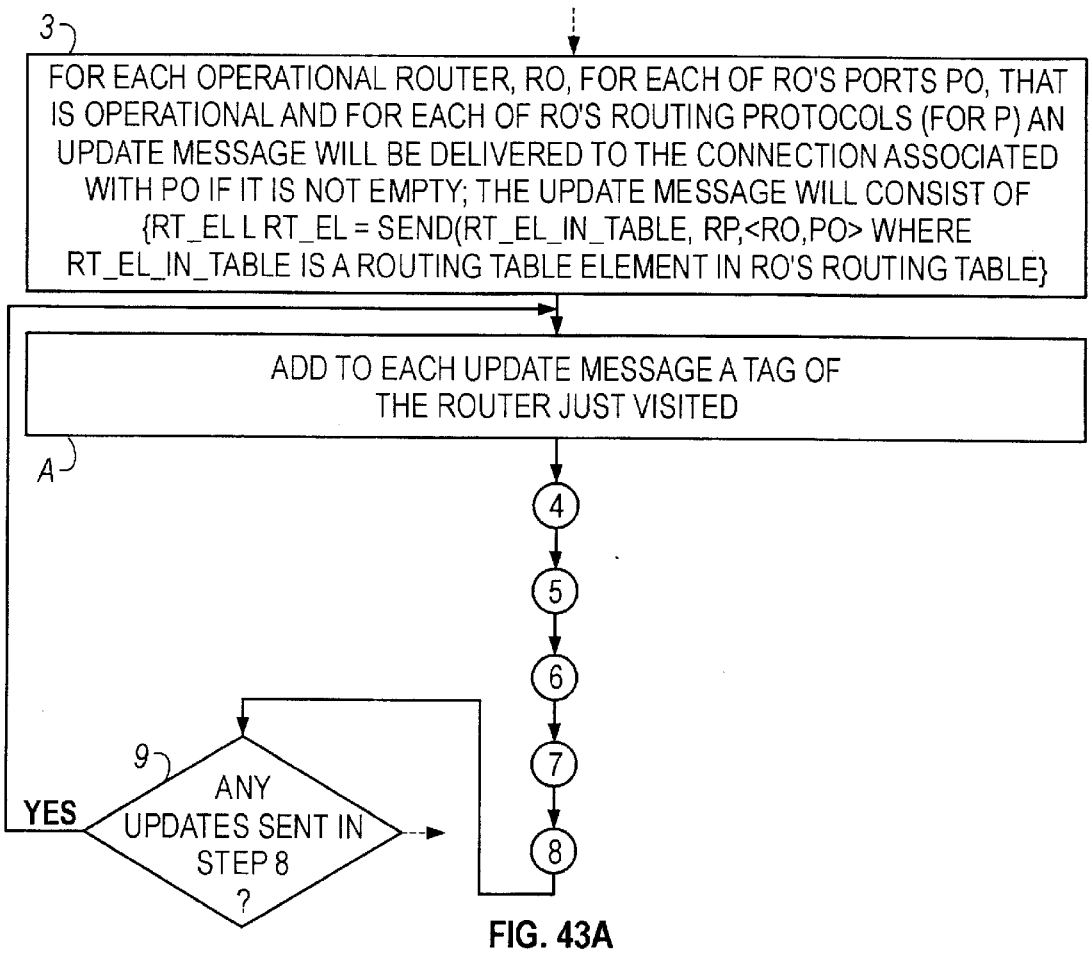
FIG. 43a shows the first modification made to the process shown in FIG. 44 to efficiently handle loops encountered while creating routing tables.
Figure 43B:
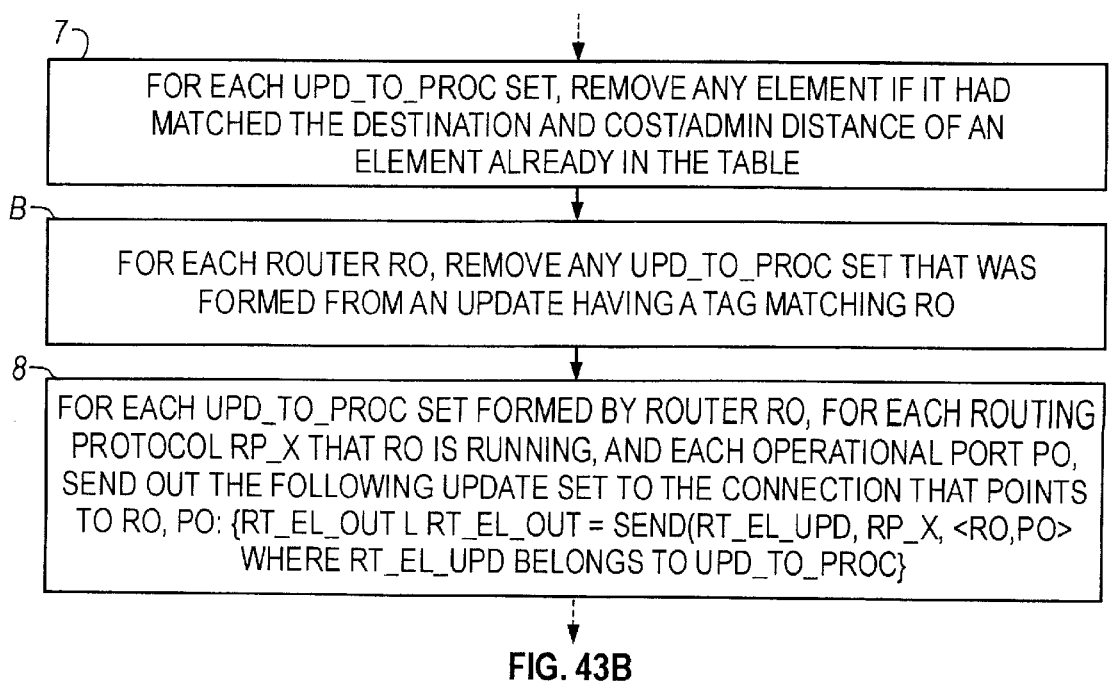
FIG. 43b shows a companion modification to that shown in FIG. 43a that efficiently handles loops encountered while creating routing tables.

FIGS. 43a and 43b show grafts onto the algorithm in FIG. 43 for additional processing that efficiently handles loop conditions; as an update is passed from router to router, the update is tagged to produce the list of routers that the update has visited. The tagging is done in Step (A) shown in FIG. 43a, which is inserted between FIG. 43's Steps (3) and (4). Before a router sends out an incremental update, it checks if the update is in a loop; if it is, then it is dropped. FIG. 43b shows this process as Step (B), which is inserted between FIG. 43's Step (7) and Step (8). The reason for "cutting off loops" at this point, rather than earlier, before Step (5) when an update first reaches the router, is we want to leave the routing tables in a 'loop state" so that it can be picked up by the "Routing Loop" Integrity Check, shown in FIG. 66.

A novel aspect of the invention's steady-state routing table computation is that it contains a number of kind of routing loops. It is possible to configure the live routers so that they produce persistent, periodic, or transient routing loops for different destinations. Routing loops that result after the procedure in FIG. 43 terminates can be of any of these three types. By having an integrity check point out all these type of loops, the user can then look at the live routers to judge the severity of the problem. Clearly, persistent routing loops are the most severe and the transient loops are least severe. The severity of periodic routing loops depends on the frequency that the routing table destination is in "loop state" versus a non-loop state and whether the non-loop state results in correct routing or a no route condition. Many times, for periodic routes, the user may not be aware because he or she may poll the table while in a good state Thus knowing about loops, which can be periodic, is valuable diagnostic information (note: to be formally strict here, in the real routers there may not be a "steady-state" condition for some routing destinations, such as those involved in a periodic routing loop; for this particular case, our algorithm presents one of the cases, in the steady-state routing tables.)

Another novel aspect of the invention stems form the fact that in some cases, the simulation "fleshes out the non-determinism" found in the live routers. For example, the actual routers can be configured to keep only up to two (equal cost paths) for each destination. If there happens to be more than two equal routes, two of them will be arbitrarily chosen. In contrast the invention can find all the equal cost paths to a destination D and show them all, reporting "two out of the following X paths will be chosen to destination D."

Another contrast between the invention and live routers is that the invention exploits the fact that in its simulation model all the routers' models are in the same memory space, as opposed to a live network, where each router has its own memory space. For example, Step (9) in FIG. 43 is a question that could be asked only if the routers where in the same memory space. It is a question that looks at global convergence.

Recall that the processes in accordance with the invention have the ability to either import routing tables from the live routers or to calculate the routing tables based on information in the SROs and SPT's. In either case, once the routing table objects are populated, there are a number of integrity checks that can be applied. To see where in the overall process of the invention these routing table integrity checks are applied, refer to FIG. 1g.

Before describing how the particular integrity checks operate, there are some preliminary concepts that need to be discussed. The routing tables, as we alluded to, are used by the routers when they receive a packet. When a host wants to forward a packet to another destination it will send it to its neighboring routers and that router, if it has a routing table element, will send to a next hop router en route to a final destination. So in this process, the routers will send packets of data from hop to hop until they reach the destination. So in a sense, given a set of routing tables they implicitly define paths through the network going from a source to a destination. A concept that we'll define here is the notion as to whether given a source address and a destination address there is a path that exists throughout the network; and if there is, what path will be taken; and in a case where multiple paths can be taken what are these multiple paths.

Figure 45:
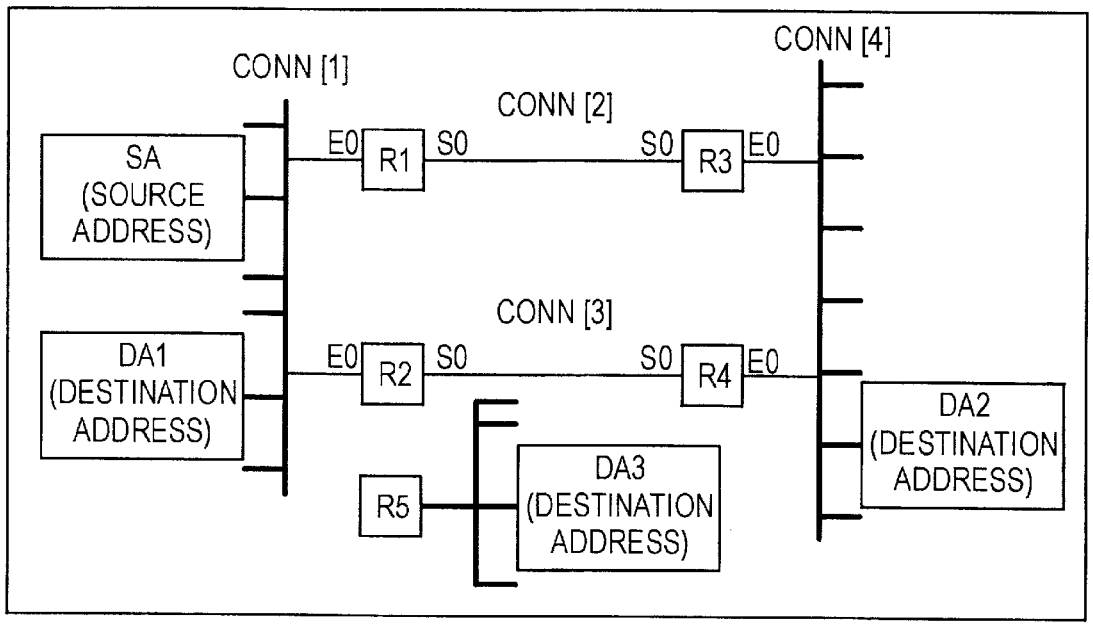
FIG. 45 is a topology drawing of a hypothetical network and a definition of the Current Path Set (CPS) concept. It is used to provide background to enhance the readers understanding of the concepts explained in FIGS. 46 through 53.

FIG. 45 shows an example network that shall be used for explanation. In this example, there are five routers, R1 through R5, R1 and R2 are connected through an Ethernet (Con[1]). R1 is connected to R2 through a serial link (Conn[2]). Router R2 is connected to Router R4 through a serial link Conn[3]. R3 and R4 are connected through an Ethernet (Conn[4]). R5 is isolated. It's just connected to an Ethernet (Conn[5]). Source Addresses and Destination Addresses, SA and DA1 are respectively source and destination addresses on Conn[1], DA2 is a destination address on Conn[4] and DA3 is a destination address on Conn[5]. (Note: When we say source and destination address that's an arbitrary distinction. We say source address because it's used as a source in our example and destination address because it's used as a destination in our example.)

Continuing in FIG. 45, the output for the analysis, which given a source address and destination address shall be called herein a "Completed Path Set." A Completed Path Set (CPS) will be empty if there is no path from SA to DA (where SA refers to the source address and DA refers to the destination address). If CPS has one element that means that there's one path from SA to DA and if it has more than one element there's multiple paths between the source and destination. For the example network, suppose we are considering a CPS (a Completed Path Set,) for a path from source address SA to DA2. In this case, there will be two paths, one of them that starts at SA and goes to Conn[1], R1, Conn[2], R3, Conn[4] and then gets to the destination DA2. The second path starts at SA, goes to Conn[1], R2, Conn[3], R4, Conn[4] and then to DA2. If on the other hand, we are interested in a CPS where the source destination is SA and the destination address is DA1, (this is a case where the source and destination are on the same subnet), there would be one path; from SA to Conn[1] to DA1. An example where there is no path, is if a packet is to go from SA to DA3. In this case, CPS would be represented as an empty set.

Figure 46A:
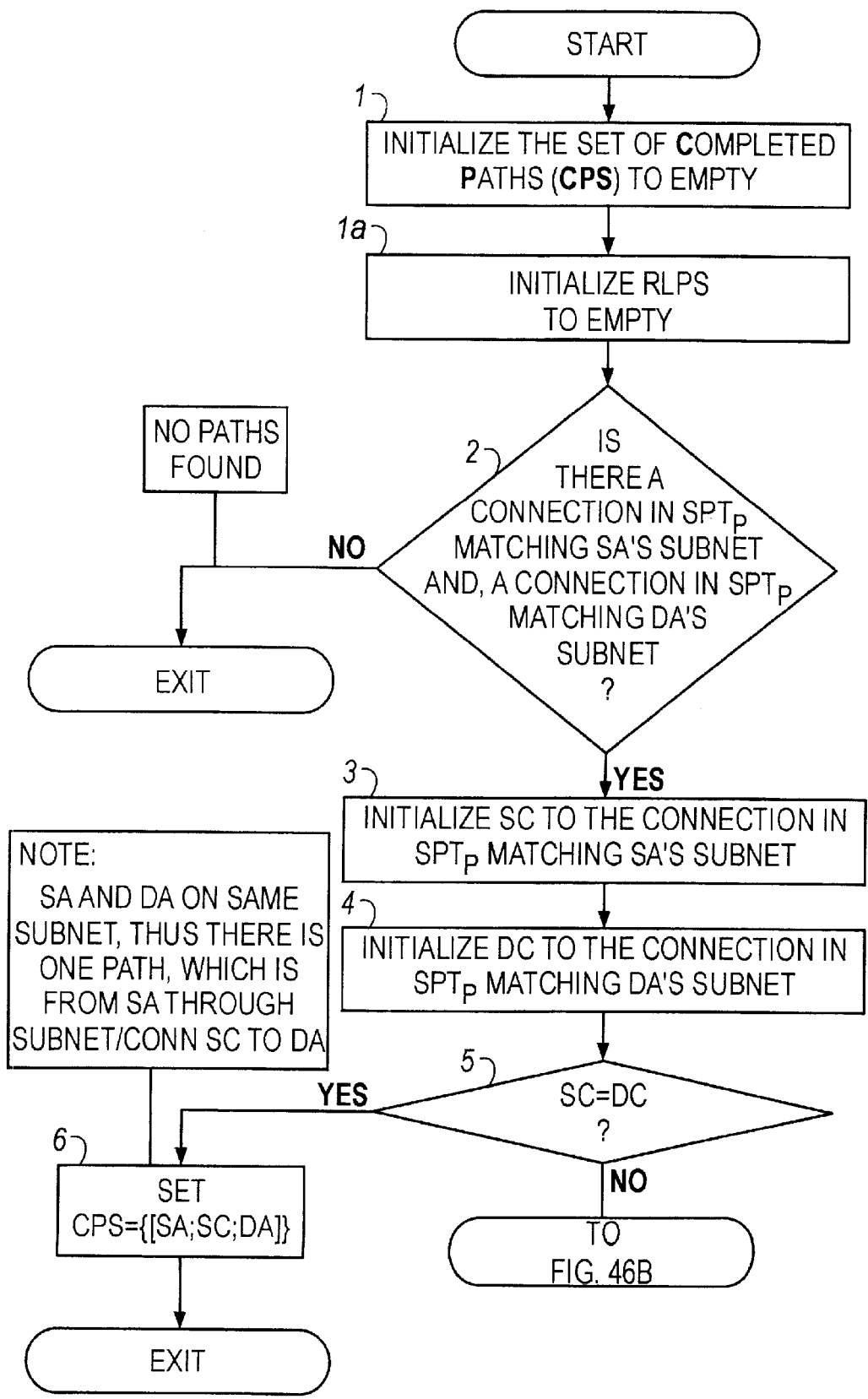
FIG. 46a, 46b & 46c comprise a flowchart that describes the process of finding paths from a Source Address to Destination Address, which is used as a subroutine as part of the phase shown as FIG. 1g.
Figure 46B:
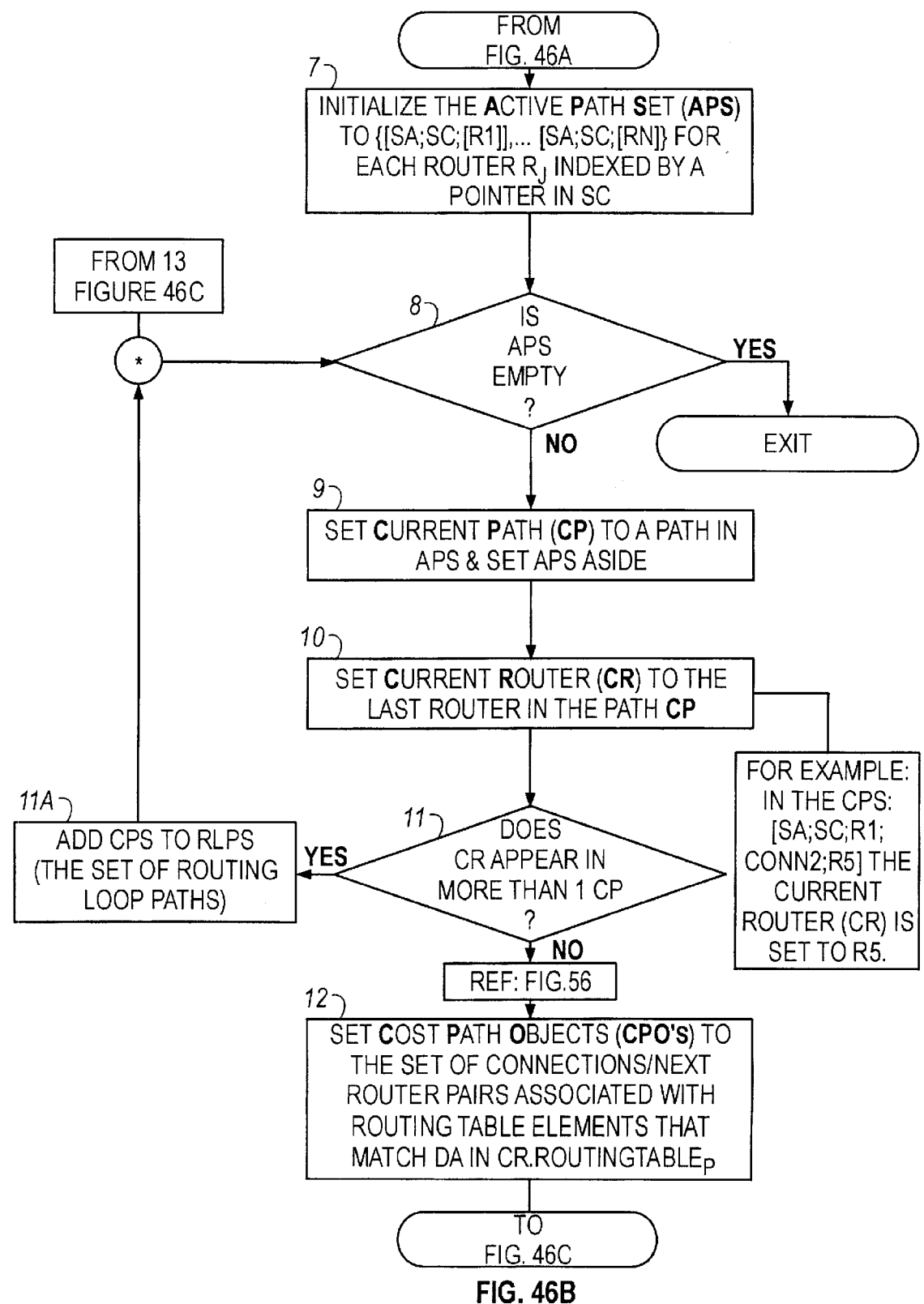
Figure 46C:
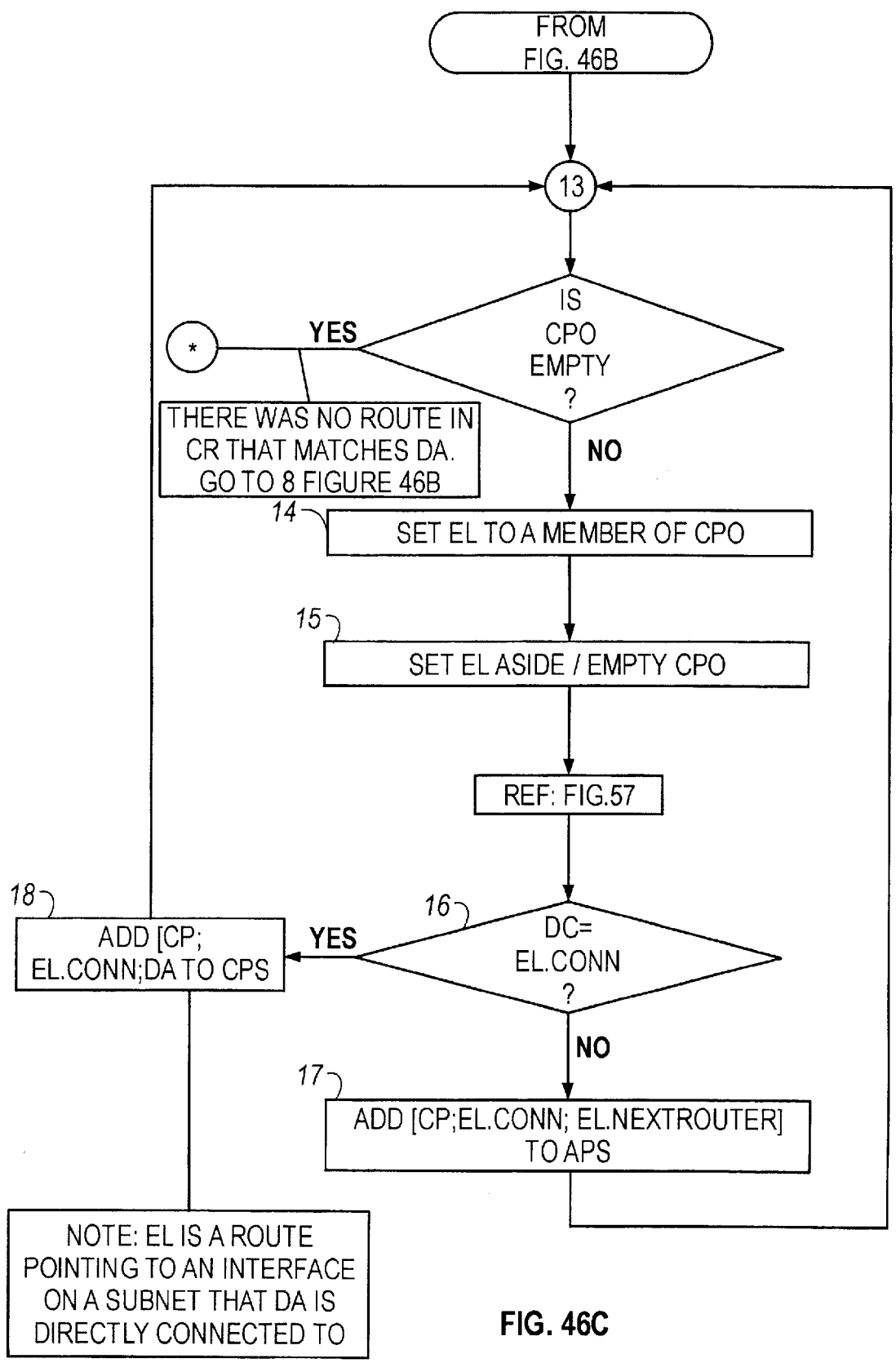
Figure 48:
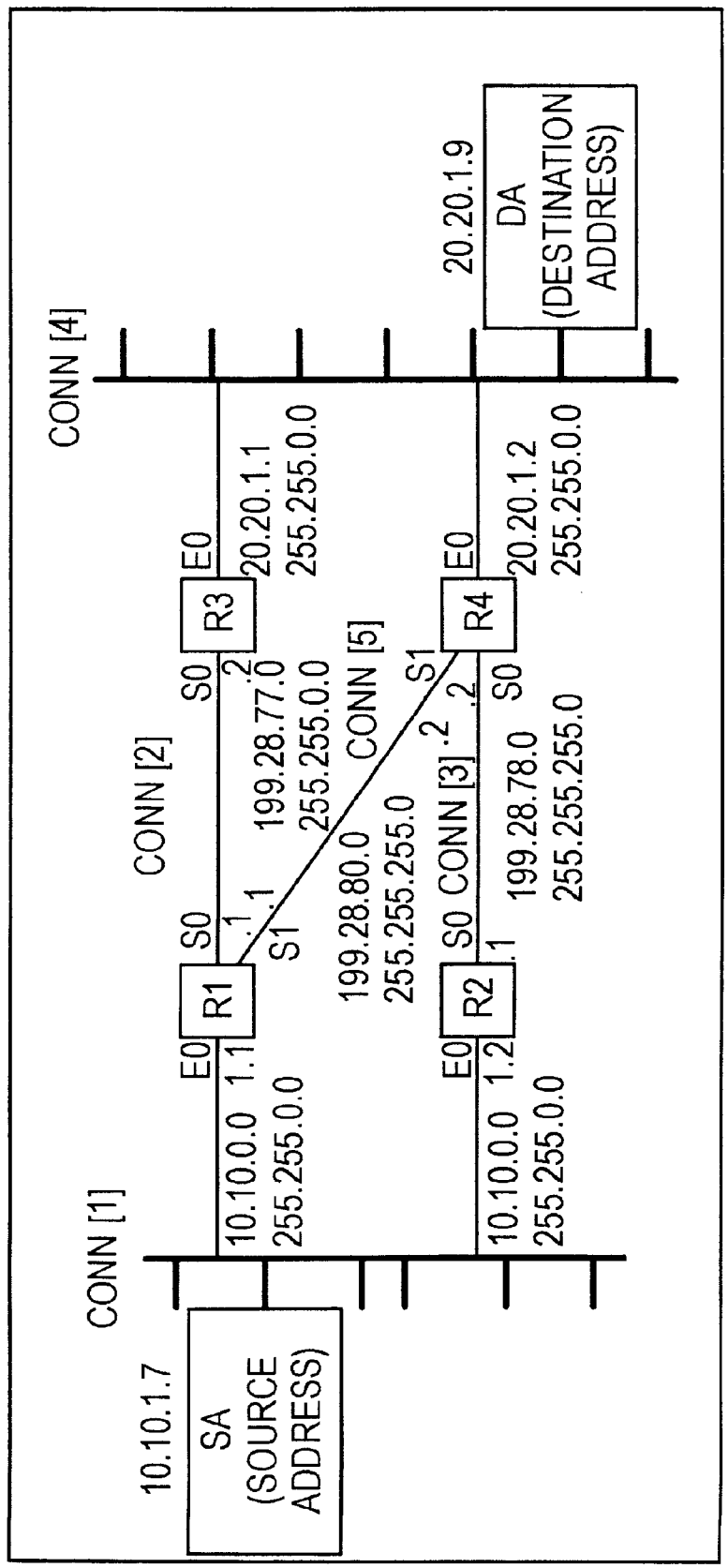
FIG. 48 is a hypothetical network topology map annotated with port designations and subnet addresses to be referenced in subsequent FIGS. 49 through 53.

FIGS. 46a–46c depict a flow chart that the invention follows to produce a CPS, a completed path set, given a source address and a destination address. A novel aspect of this procedure is that it identifies multiple paths between source and destination and is performed off-line; this is in contrast, for example, with Cisco Systems Path Tool, which is an on-line tool that only identifies the current path, not all the possible ones. An advantage of knowing all the paths is that the current one might be working while another possible path, which can be chosen at a later time, might have problems. The best way to present this is a walkthrough of a particular example. Refer now our attention on FIG. 48, which is a generalized block diagram of a network very similar to the one in FIG. 45, but with an added link, the link labeled Conn[5] between R1 and R4. Also, the router R5 we included in FIG. 45 is omitted. The reason for including this link is to show what happens in the case of routing table element with multiple paths. In this example, a CPS will be produced in which the source address is SA and the destination address is DA.

Figure 49:
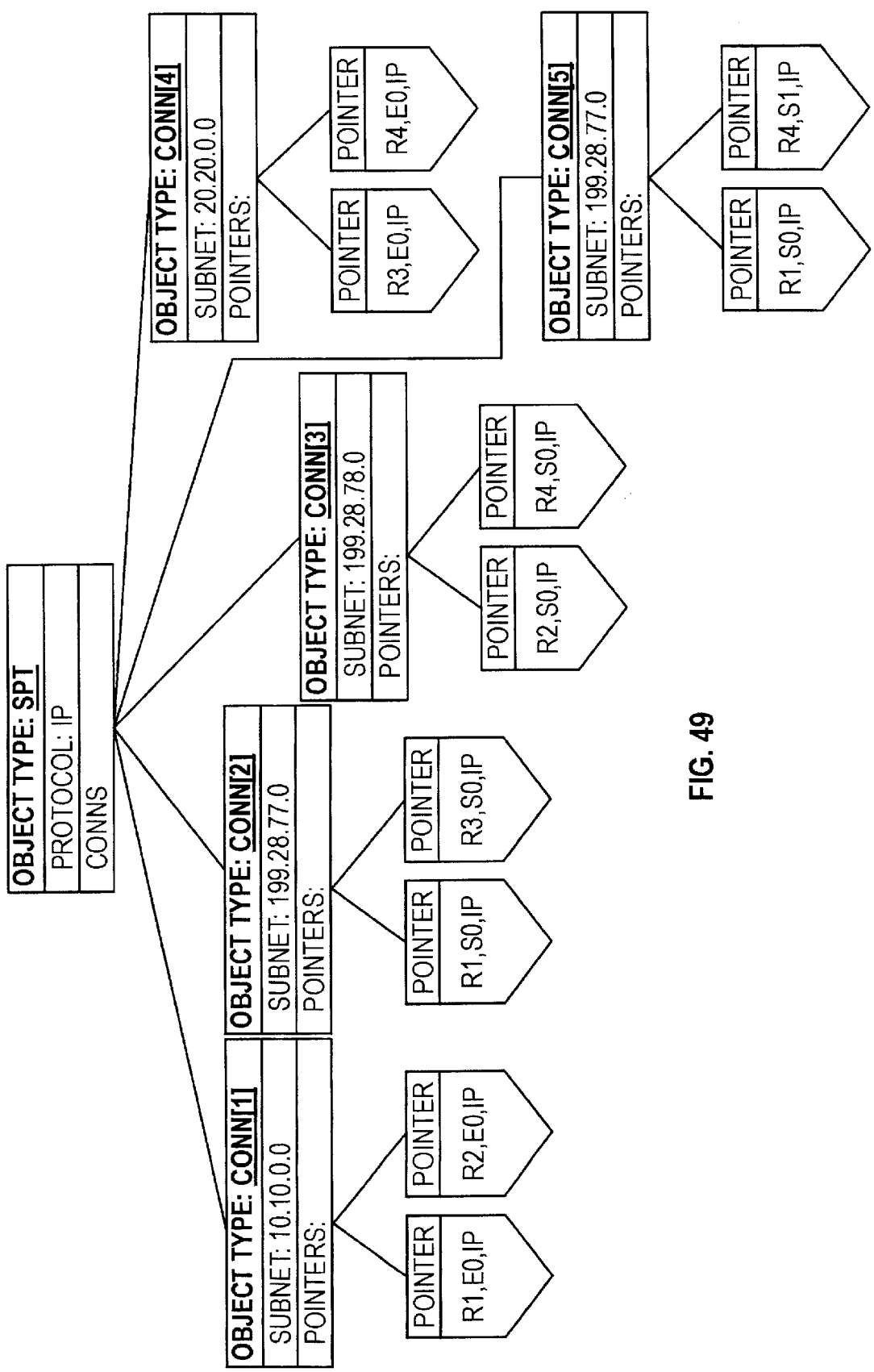
FIG. 49 shows a SPT object data structure corresponding to the topology shown in FIG. 48.

The input to the process of FIG. 46 is the SPT for the protocol under consideration, so in this case, its an SPTP. FIG. 49 shows the $SPT_{IP}$ that corresponds to FIG. 48.

Figure 50:
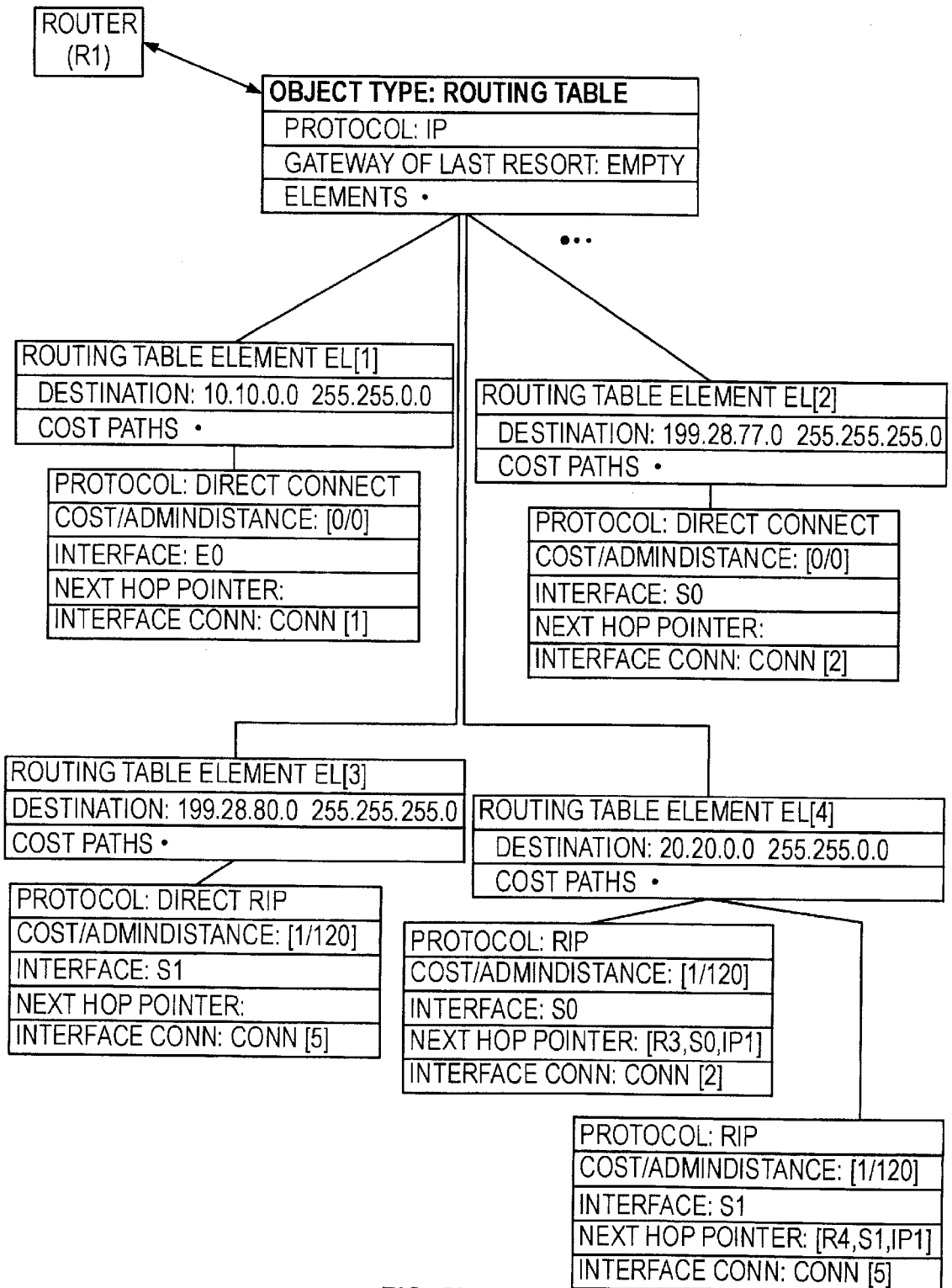
FIG. 50 shows pan of a routing table object data structure for router R1 in FIG. 48.

FIG. 50 shows the IP routing table for router R1. The element labeled EL[1], has destination 10.0.0 255.255.0.0. It has one cost-path, which corresponds to the fact that it is directly connected. Routing table element EL[2] corresponds to destination 199.28.77.0 255.255.255.0 and this again is directly connected and corresponds to interface S0. Element EL[3], like elements ELE[2] and element EL[1] corresponds to a directly connected interface. Element EL[4] is the only element out of the four which corresponds to a route that was dynamically learned. This corresponds to destination 2020.0.0 255.25500. There are two cost-paths in the example, showing that there are two different ways to leave the router if a packet matches this element. The Cost Path element on the left indicates it was learned by RIP; it has a cost/administrative distance of $1/120$. It's interface is S0. The next hop pointer is to router R3, S0 and its interface connection is Conn[2]; the second cost-path object is also learned via RIP and has the same administrative distance as the first cost-path. This object specifies output interface S1, rather than S0. Its next hop pointer is R4, S1 and its interface connection is Conn[5].

Figure 51:
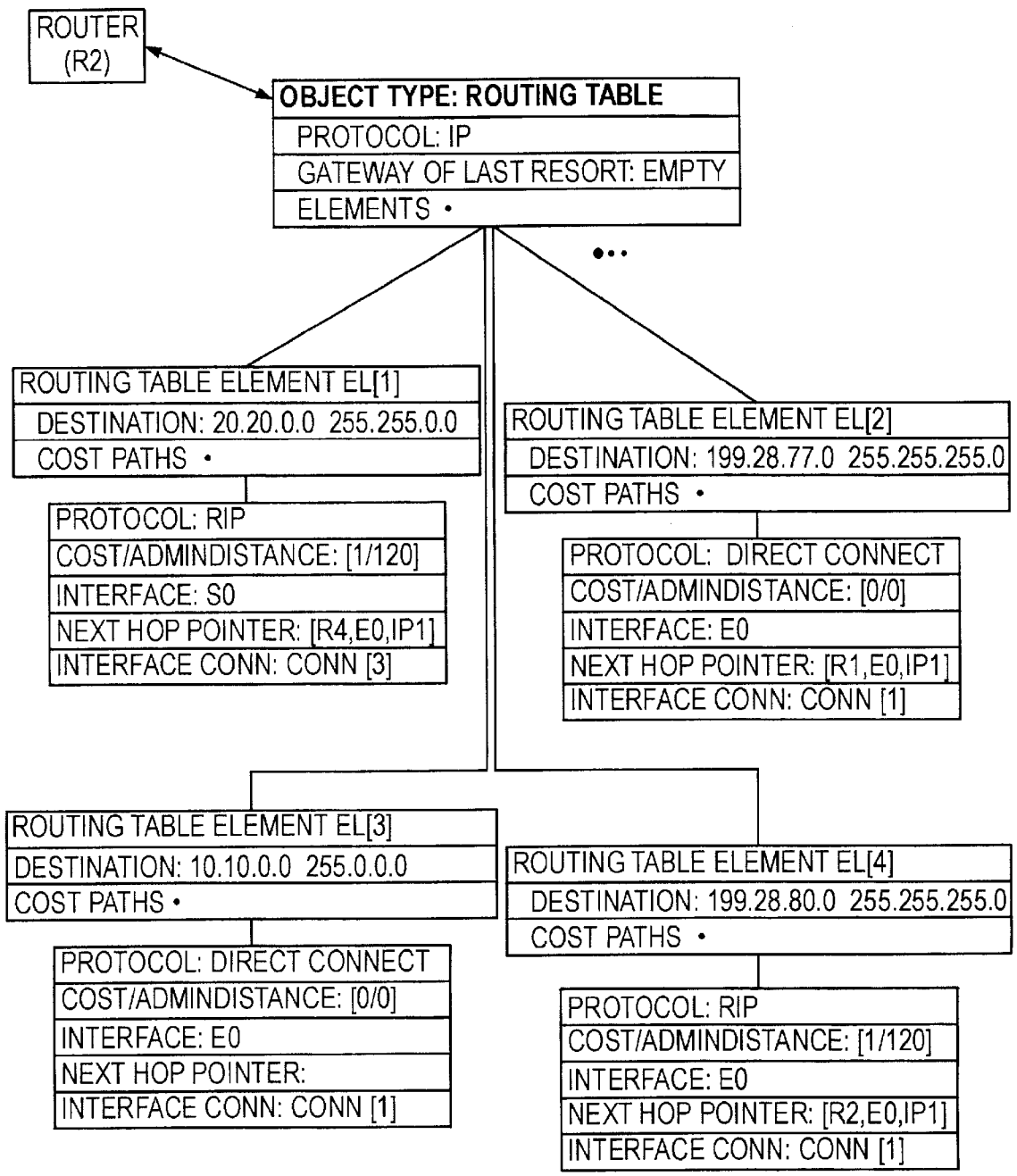
FIG. 51 shows part of a routing table object data structure for router R2 in FIG. 48.
Figure 52:
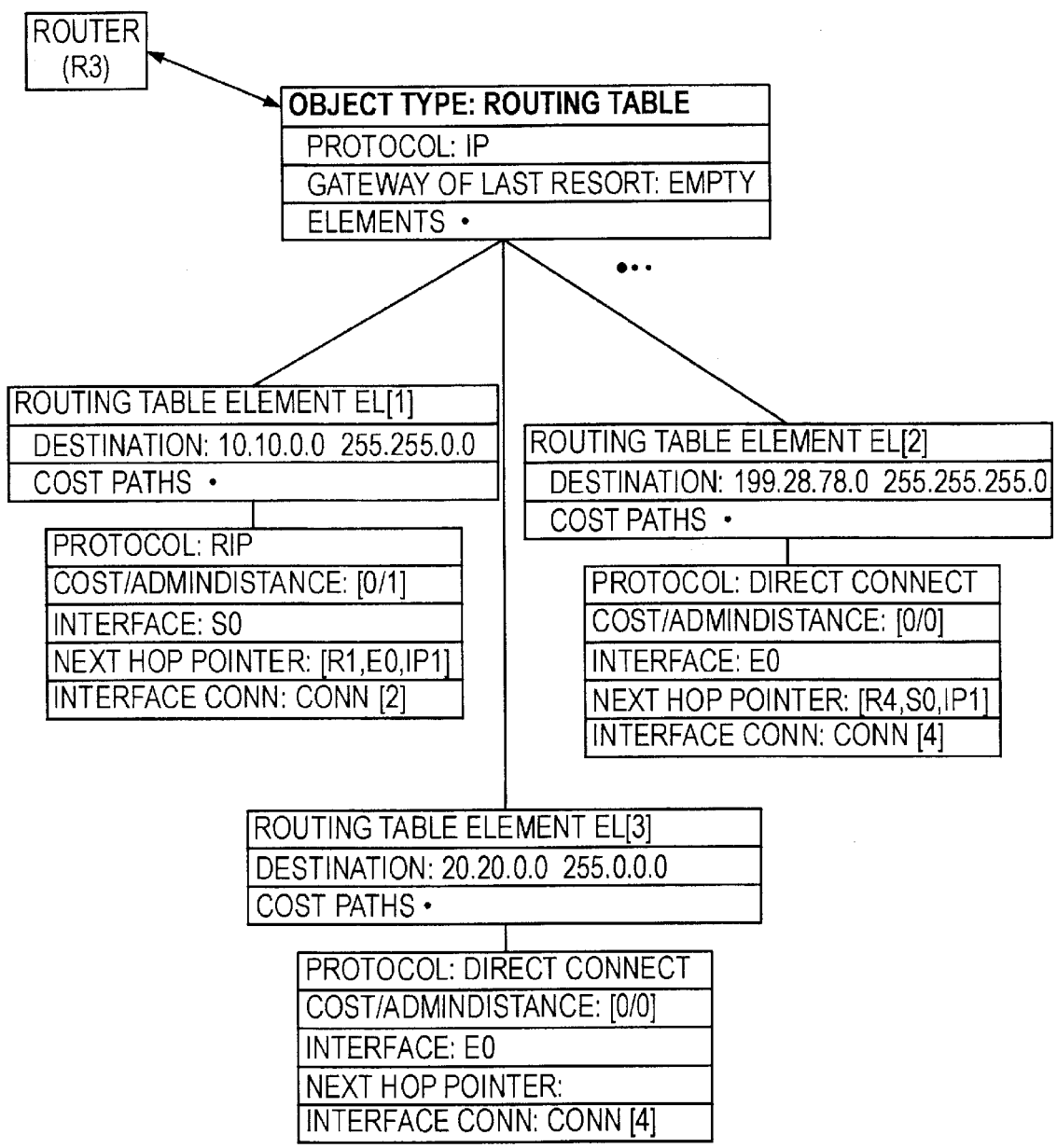
FIG. 52 shows part of a routing table object data structure for router R3 in FIG. 48.
Figure 52A:
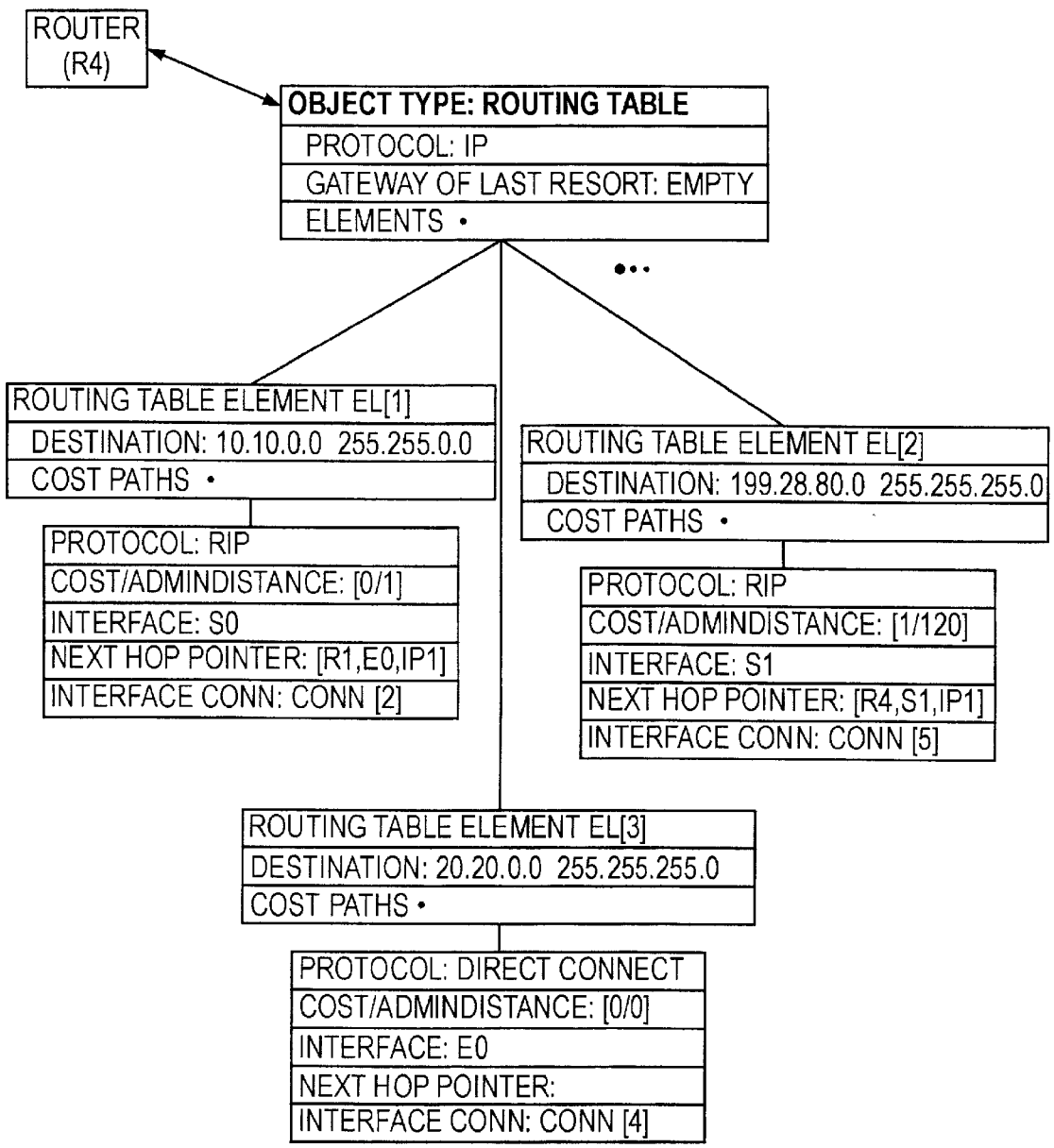
FIG. 52a shows part of a routing table object data structure for router R4 in FIG. 48.

FIG. 51 shows an IP routing table object for R2. FIG. 52 shows an IP routing table object for R3 and 52a shows an IP routing table for router R4.

The flow chart in FIGS. 46a–46c shall be described in the context of the example by going through the walkthrough in conjunction with FIGS. 53a–53f. Starting in FIG. 53a refer to reference numeral (1), which indicates that in Step (1) of the flowchart in FIG. 46a the output produced is the CPS, is set to "empty". Step (2) asks whether there is a connection in the $SPT_{IP}$ (Note: in this example, P is IP because the example looks at a destination address and source which are both IP). The answer in this case "yes". If this was not the case, that meant that the source and destination were on subnets that the object model did not have and consequently the analysis could not proceed. If the answer is "yes", for convenience, at Step 3 the variable SC is set to the connection in the SPT which matches SA's subnet. So for this example SC is set to Conn[1] because SA is directly connected to the Ethernet labeled Conn[1]. Step (4) sets DC (which is a variable referring to the destination's Conn) to the subnet matching DA; in this case it is Conn[4] because DA is directly connected to Conn[4]. Step (5) asks whether SC equals DC. In other words, are the source and destination on the same subnet? If that is the case, go to Step (6) and return a CPS with one element where the path is from SA, to the shared connection, to DA, a very simple path. If the answer is "no", which is the case in this example, go to Step (7) (labeled on FIG. 46b) and initialize a variable called APS (for "active path set") to the path that is being constructed. In this case, there are two paths in progress. The first one starts at SA, goes to Conn[1] and to router R1, and the second one goes from SA to Conn[1] to router R2. In general, at Step (7), the procedure puts in as many elements as there are routers connected to the source's subnet.

In FIG. 53a, we show the progress of APS, which are paths that are incrementally building. So in this example, we can see that we have two paths shown by the dotted lines that both start at SA and one that ends at R1 and the other that ends at R2. As the process proceeds, it will be picking one of the elements in this set to extend by a hop and then puts it back in APS unless it gets to its destination the router that drops the packet or is involved in a routing loop.

Figures 1, 53B:
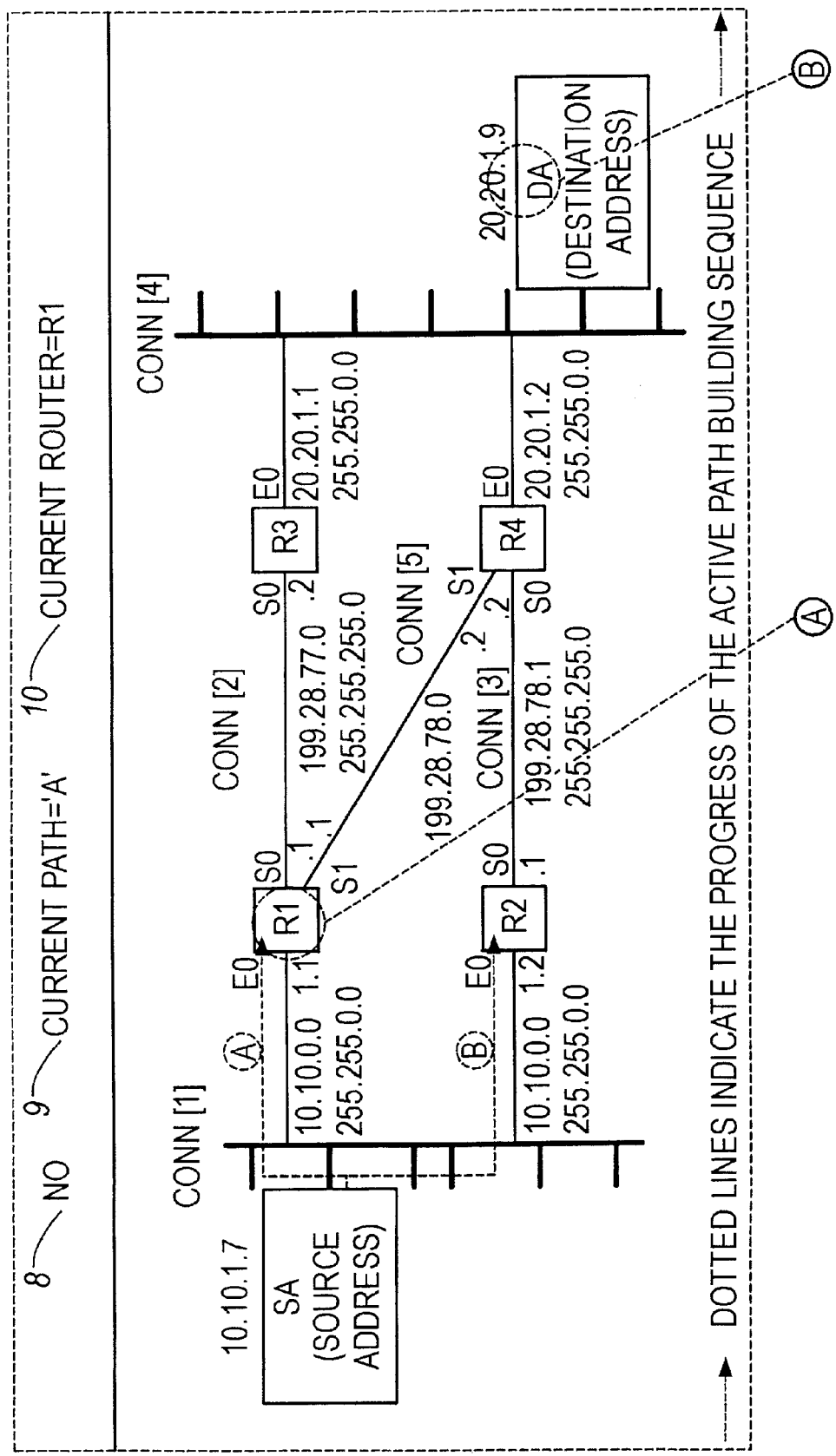
Figures 2, 53B:
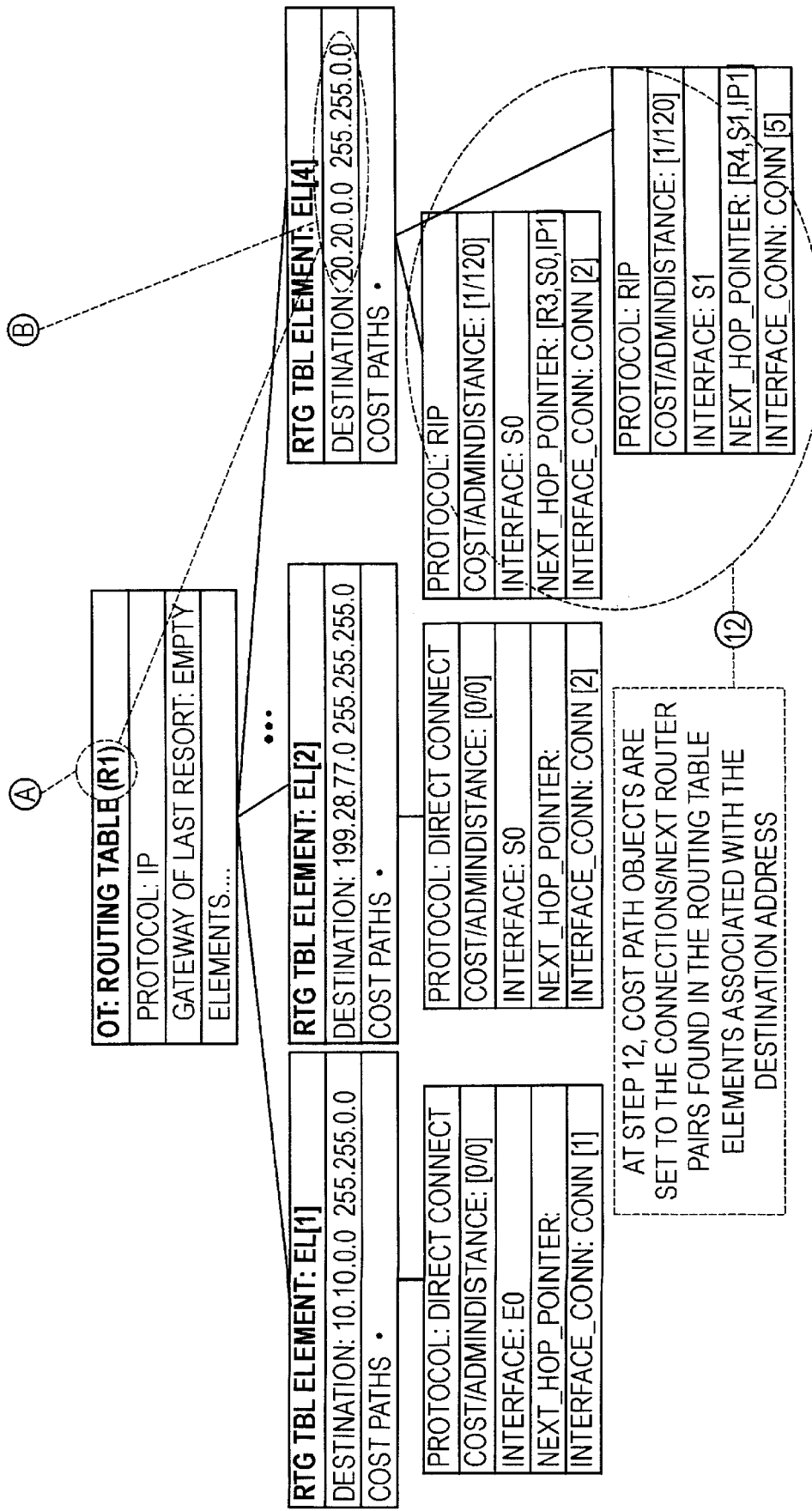

Now refer to FIG. 53b, and more specifically to the reference therein to Step (8) (from the flowchart in FIG. 46b), which asks whether there are any elements (active paths) in APS. If it's "empty", the process terminates. If it is not empty, then proceed to Step (9). In this case, since the ADS has two elements, proceed to Step (9). Step (9) sets the variable CP (for "current path") to one of the elements in APS and removes this element from APS. In the example, CP is set to the first path, which goes from SA to Conn[1] to router R1. In Step (10) for convenience we are letting the variable, CR (for "current router"), refer to the last router in the path CP. In this case, the current router is R1 since there is only one router in the path. In Step (11) we ask, "does CR appear in the path more than once." This is a check to see if we are in a routing loop and to protect this procedure from being in an infinite loop. If CP refers to a loop, we add CP to the set of routing loop paths and proceed by going back to Step (8) to see if there are any more paths to process in APS. If there is no loop, we go to Step (12) where we set a variable called CPO, standing for the Cost Path Objects, to the set of Cost Path objects associated with a routing table element that matches the destination address in the current routers routing table for the applicable protocol; IP in this case. If there are no elements matching DA and no gateway of last resort, CPO is set to null.

Figure 47:
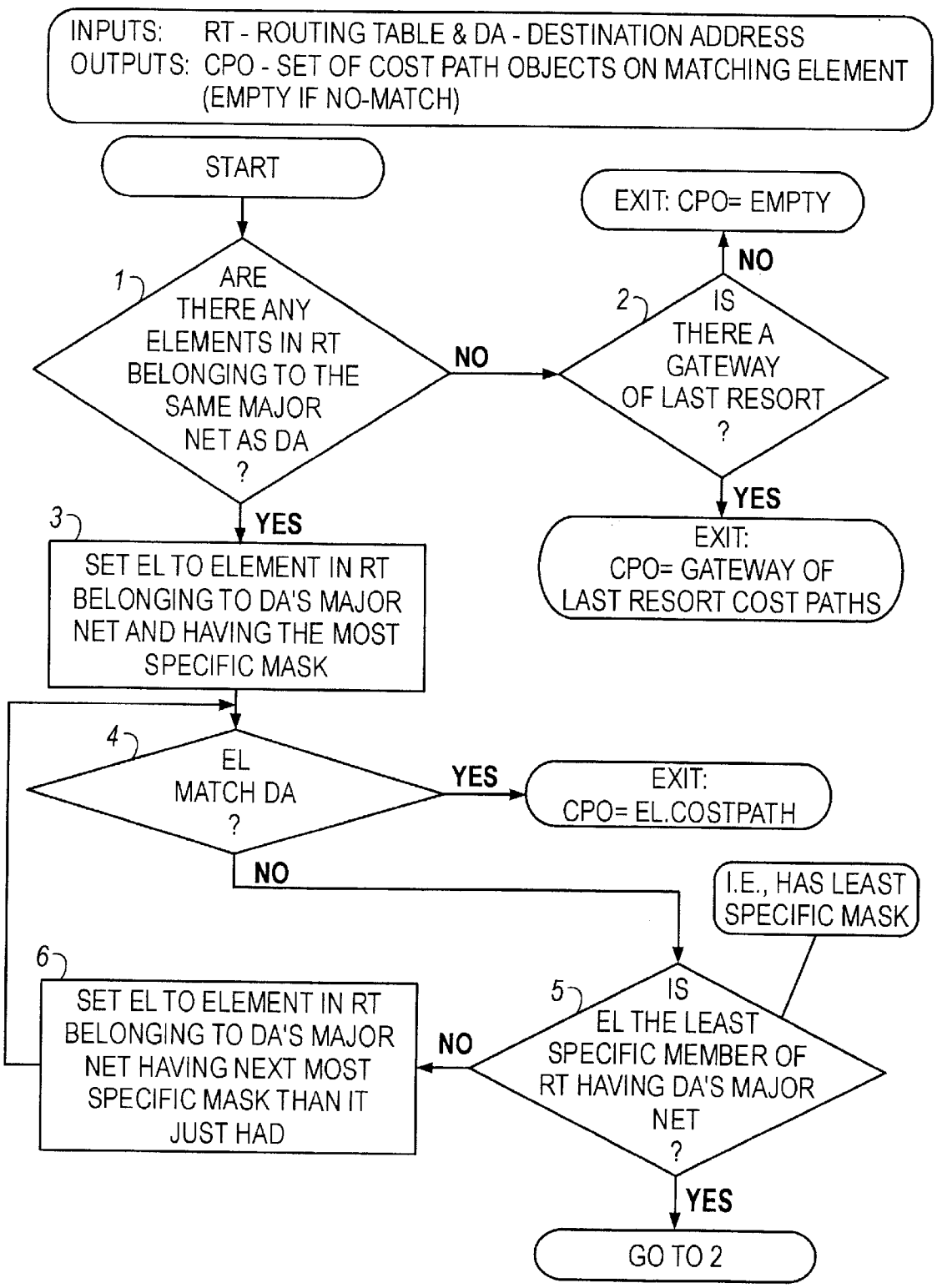
FIG. 47 is a flowchart of the subprocess of matching routing table elements per FIG. 48b Step 12.

The bottom of FIG. 53b shows the cost paths that is set to CPO in Step (12). These are the two cost paths that are circled, the ones that are under element EL[4]. The details of how Step (12) is executed are depicted in the flowchart in FIG. 47. In FIG. 47, the input is a routing table (the routing table for the router and protocol under consideration—Router R1 and protocol IP in this example) and DA which refers to the destination address. In our example, the destination address is 20.20.1.9. The output is the CPO, in other words a set of cost path objects that match the element DA. If there is no match, CPO will be empty.

Let's walk through this flowchart. In Step (1) it asks are there any elements in the routing table that belong to the same major net as DA. For example, the major net that is associated with 20.20.0.0 is 200.0.0. (It's a Class A network address as opposed to being a Class B or Class C address). See, Martin, James, "Internet Address Formats", Local Area Networks Architectures and Implementations, pp. 439–440, PTR Prentice Hall, 1994. In Step (3) of FIG. 47, we set EL to the element in the routing table belonging to the destination's major net having the most specific mask. The most specific mask is the one with the most 255s on the left. In this case, there is only one element in the routing table shown in FIG. 53b belonging to net 20.0.0.0 and that is element EL [4]. Proceeding to Step (4) we ask, "does this element match the destination address?" We look at the destination in element EL[4] and we see the destination is 20.20.0.0 with mask 255.255.0.0. That means we are looking for any destination that starts 20.20 and don't care about the last two octets. In our example this matches. So the answer at Step (4) is "yes" and the procedure exits, returning this element's cost path set which are the two circled cost paths in FIG. 53b as output. If it didn't match, we would go to Step (5) and see if there are any other elements belonging to DA's major network which have a more general mask and then go back to Step (4) and try to apply the match. If the answer to Step (5) is "no" then we go to Step (2), which asks the question, "is there a gateway of last resort?" If it is, we return the CPO associated with it; if not, we return saying the CPO is empty. Also, we should note that in Step (1) if there are no matching elements in the routing table that belong to the same major net as DA, we go to Step (2) and look for gateway of last resort and return the CPO associated with it, if it is found; otherwise an empty CPO is returned. So in general, this procedure iterating, looking for the most specific match; if one is found, its CPO is returned, If we don't find any matches then we return the gateway of last resort's CPO if it exists.

Figure 53C:
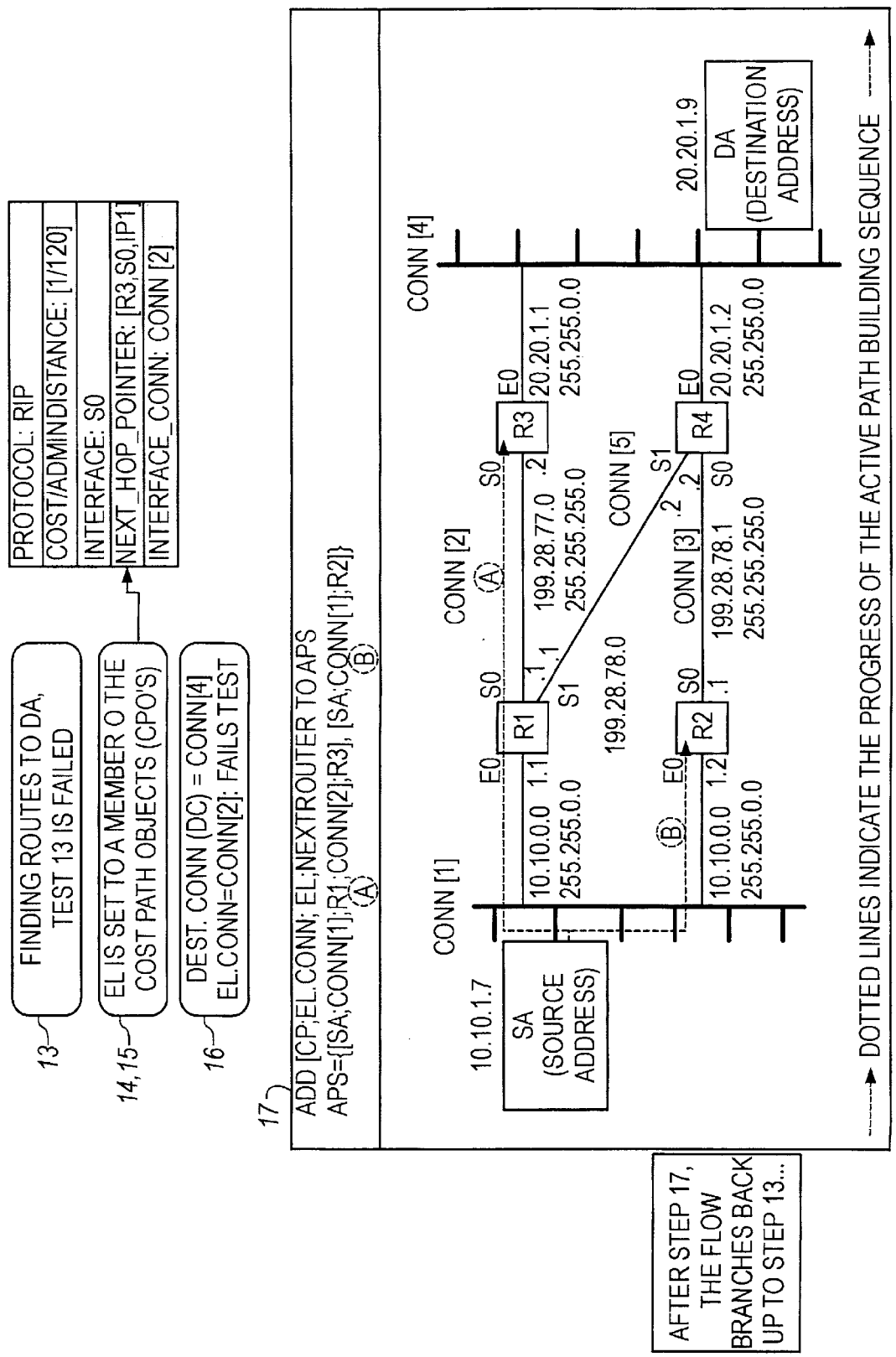

Let's continue the walkthrough at FIG. 53c. To set the context, we had reached Step (12) as shown in 53b, which identified the CPO as being the circled items; in other words, the items under element EL[4] in FIG. 53b. In Step (13), we ask the question, "is the CPO empty?" In this case, since there are two elements, the answer is "no" and we go onto Step (14). If it were the case that the CPO were "empty", meaning that there are no routes in the current router that match the destination address, then we are in a sense discarding this active path and going back to Step (8) to see if there are any more active paths to process. In our case, as we said, there was a match, so we go on to Step (14). In Step (14) and (15) we take one of the elements of the CPO, remove it, and set EL to the CPO we're processing. In this case, L is set to the CPO as depicted in FIG. 53c, one CPO who's interface is set to S0. We next go to Step (16) which asks, "does the destination connection (DC) match the EL's connection?" In other words, "are we pointed to the interface attached to the media on which the destination is connected?"; in this case, the answer is "no" because the destination connection is Conn[4], but the connection associated with EL is Conn[2]. So the answer at Step (16) is "No" and we go onto Step (17). In (17), the current path is extended with the element's Conn[2] (EL's interface Conn) and the next hop router R3 and put back in the set of active paths APS. The diagram in FIG. 53a pictorially shows the paths being developed that currently are in APS.

Figure 53D:
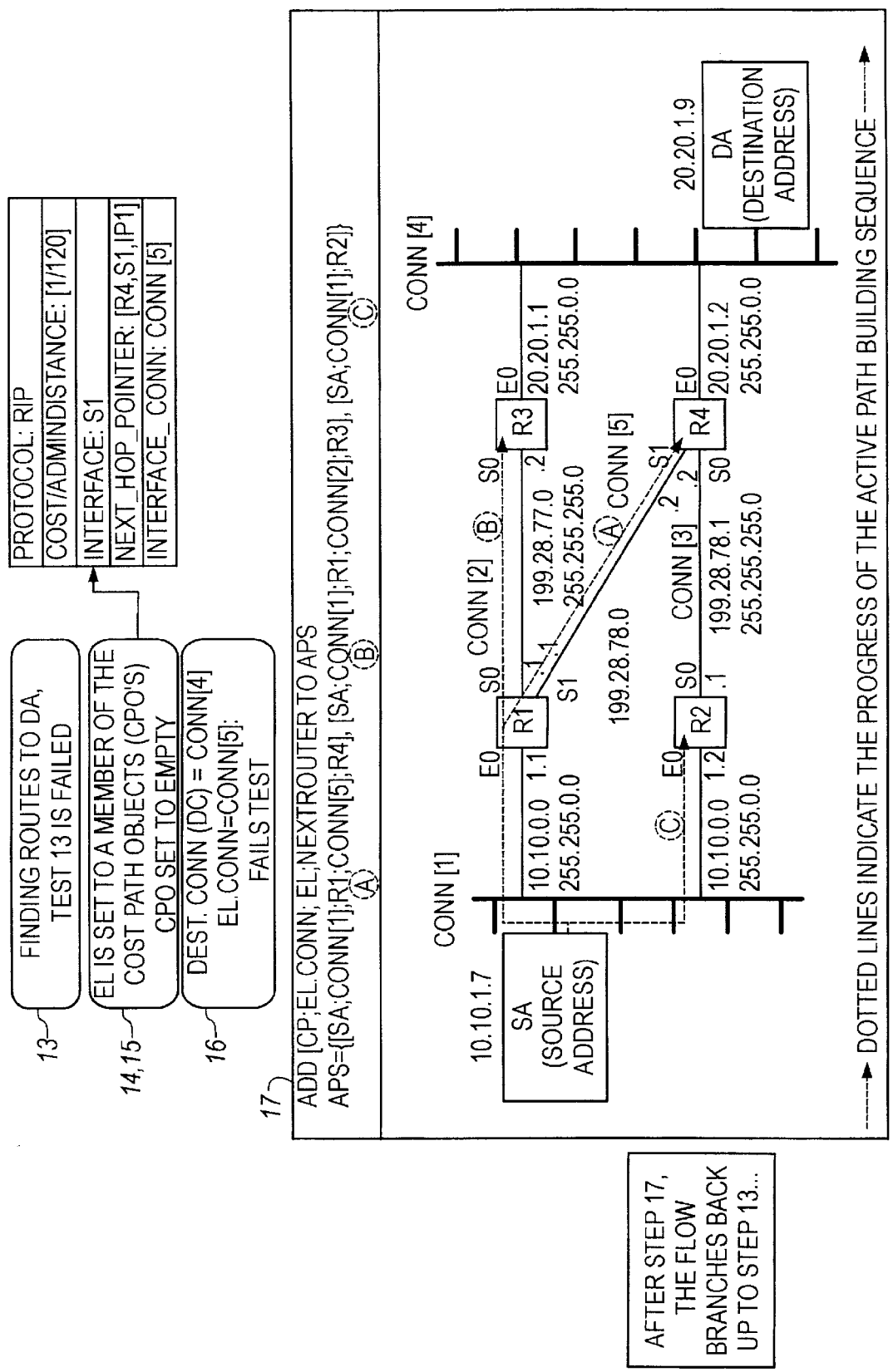

The walkthrough continues at FIG. 53d; after processing Step (17), we go back to Step (13) and see if there is (another) cost path object to process. In our example, since there was two paths out of the router associated with the matching routing table element, there is another cost path object to process. In FIG. 53d, in the items marked (14) (15) we see that CPO is set to the cost path object who with interface is set to S1. We then go to (16) and ask the question, "does the connection associated with CPO, which in this case is Conn[5], match the destination connection Conn[4]. The answer is "No"; we haven't gotten to the destination connection. So we go back to Step (17) and add a new path to the APS. In this case it is the path that starts from SA to Conn[1] to R1 and this time rather than going out S0, we go out S1 to Conn[5] to Router R4. The diagram in 53d depicts the three paths under construction that are on the APS after we execute Step (17).

Figure 53E:
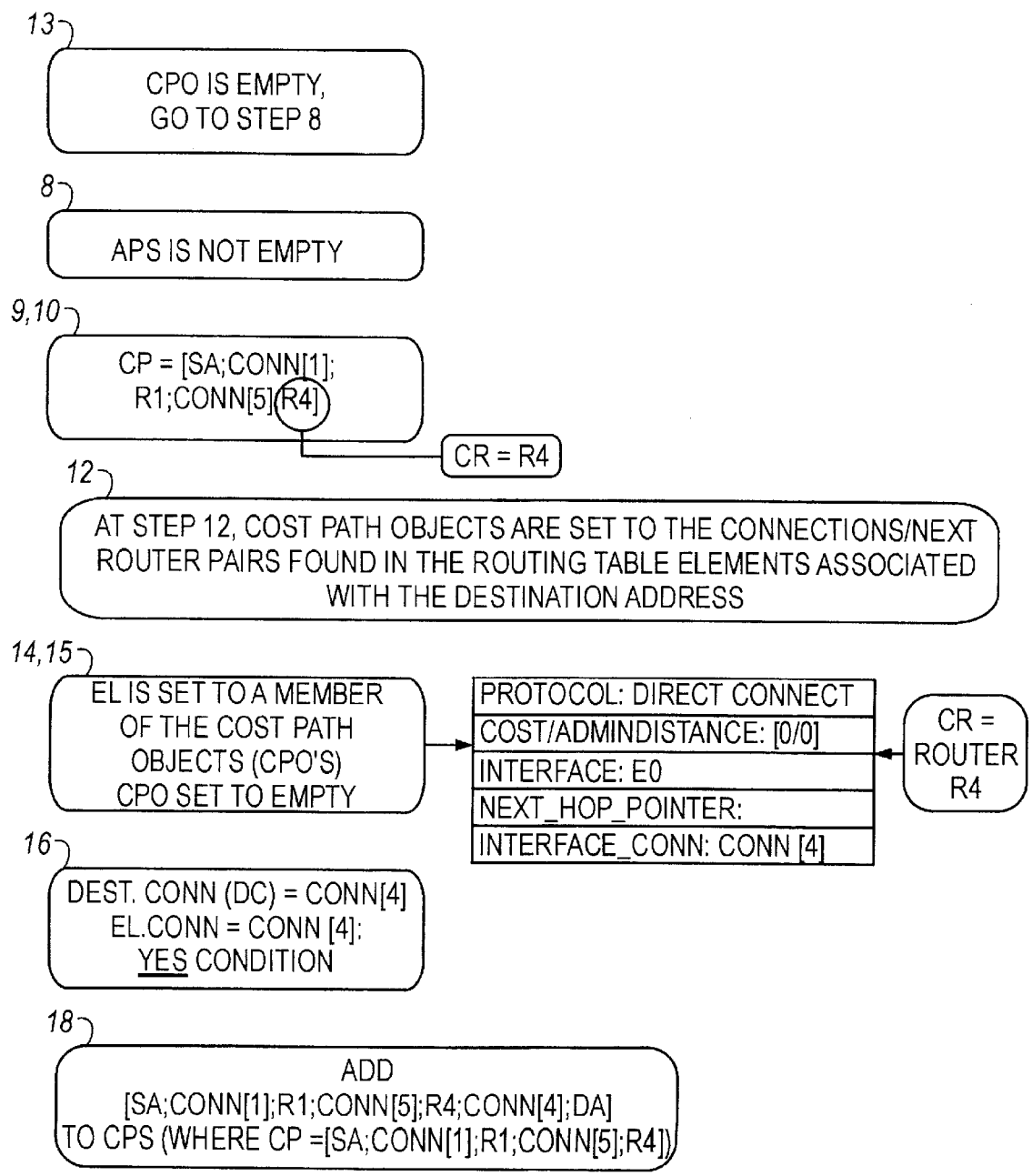
Figure 53F:
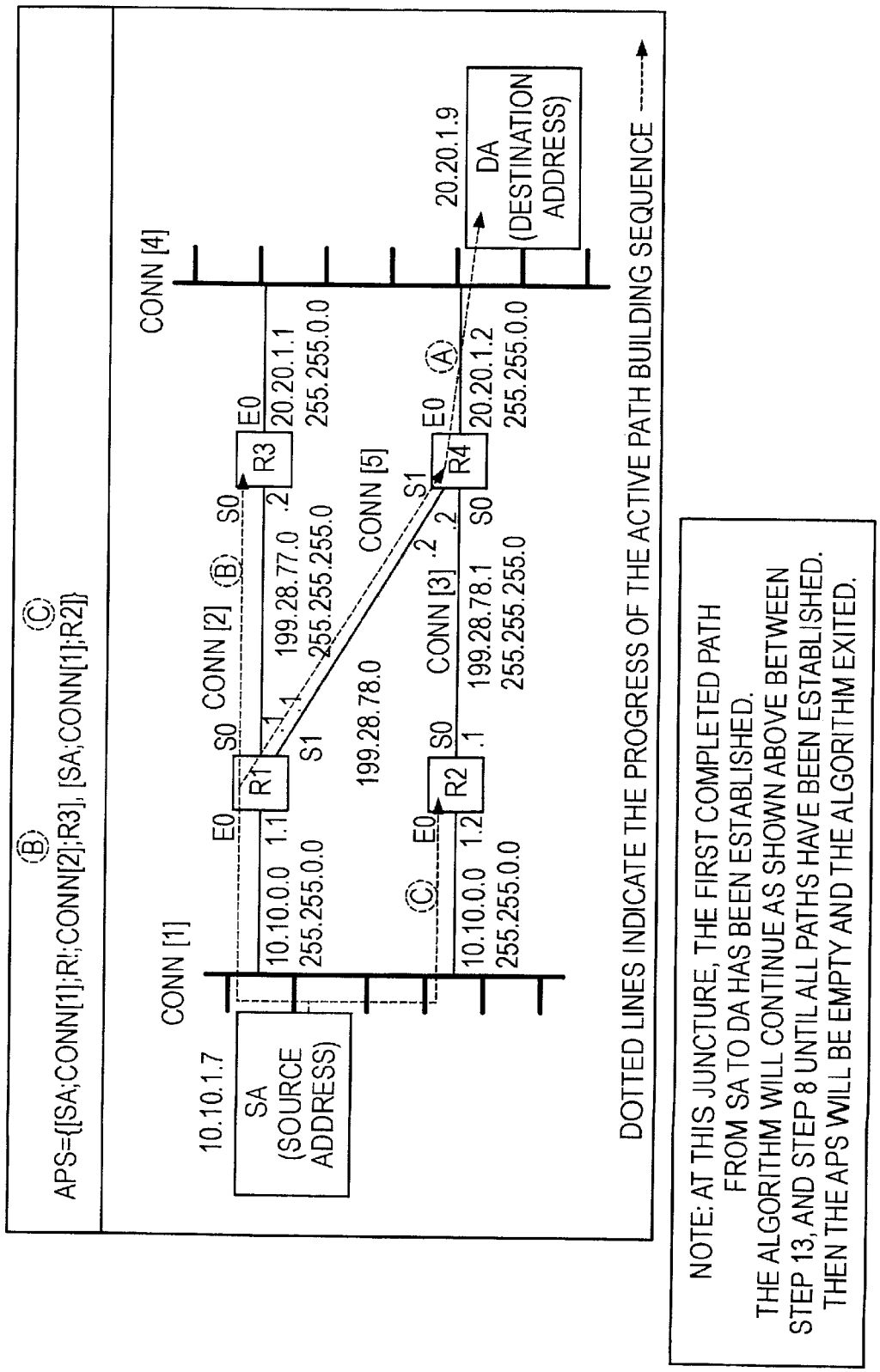

The walkthrough continues at FIG. 53e. After processing Step (17) we go back to Step (13) and ask "is the CPO empty?" This time the answer is "yes, it is empty", so then we go to Steps 8 and 9 which refer to picking one element from the APS, if it is not empty, and seeing if we could add another hop to it in trying to reach the destination. So after going to Step (8) and getting the answer that APS is not empty, we go to Step (9) where we set CP to one of the elements in the APS. In this case we set it to the path labeled Path A in diagram 53d. Step 10 mentioned in FIG. 53e refers to setting CR to the last router in the current path, R4. We then go to Step (12), which looks through R4s IP routing table for a match to destination address DA. In this case, a matching element is found with a CPO that is depicted right after Steps (14) and (15) in FIG. 53e. This CPO is a directly connected CPO, which means that the matching destination, which is Subnet 20.20.0.0 is directly connected. CPO's interface is set to E0, (Ethernet 0), since it is directly connected it does not have a next-hop pointer and associated connections, Conn[4]. We then go to (16) which asks the questions, "does the destination's connection, which is Conn [4], match the one on the CPO that we are processing? The answer here is 'yes". So, after Step (16) we go to Step (18) which is the first time in this example, we have added to the CPS; thus, we have reached the destination; the path that gets added to the CPS is one that goes from SA to Conn[1] to Router R1 to Conn[5] to Router R4, out Conn[4] to the destination address.

After Step (18) processing goes to Step (13), which returns "yes" since there are no more cost path objects to process; consequently, the algorithm goes to Step (8). At Step (8), the APS has the two paths shown in FIG. 53f. This processing of elements in the APS repeats itself; the end result will be that the CPS has 3 elements which are shown in the computer form at the bottom of FIG. 53f and shown in the diagram in the middle of FIG. 53f, the paths are from SA to Conn[1] to R1 to Conn[2] to R3 to Conn[4] to DA; from SA to Conn[1] to R1 to Conn[5] to R4 to Conn[4] to DA, and from SA to Conn[1] to R2 to Conn[3] to R4 to Conn[4] to DA.

One of the complications that we have to take into account in constructing the CPS is that the routers might have both input and output access lists. These, as we described before, are filters that can block traffic coming into the router (an input port filter) or going out of the router (an output port filter). If the procedure runs into an access list that blocks the path being constructed, then it will not put it into CPS.

Figure 54:
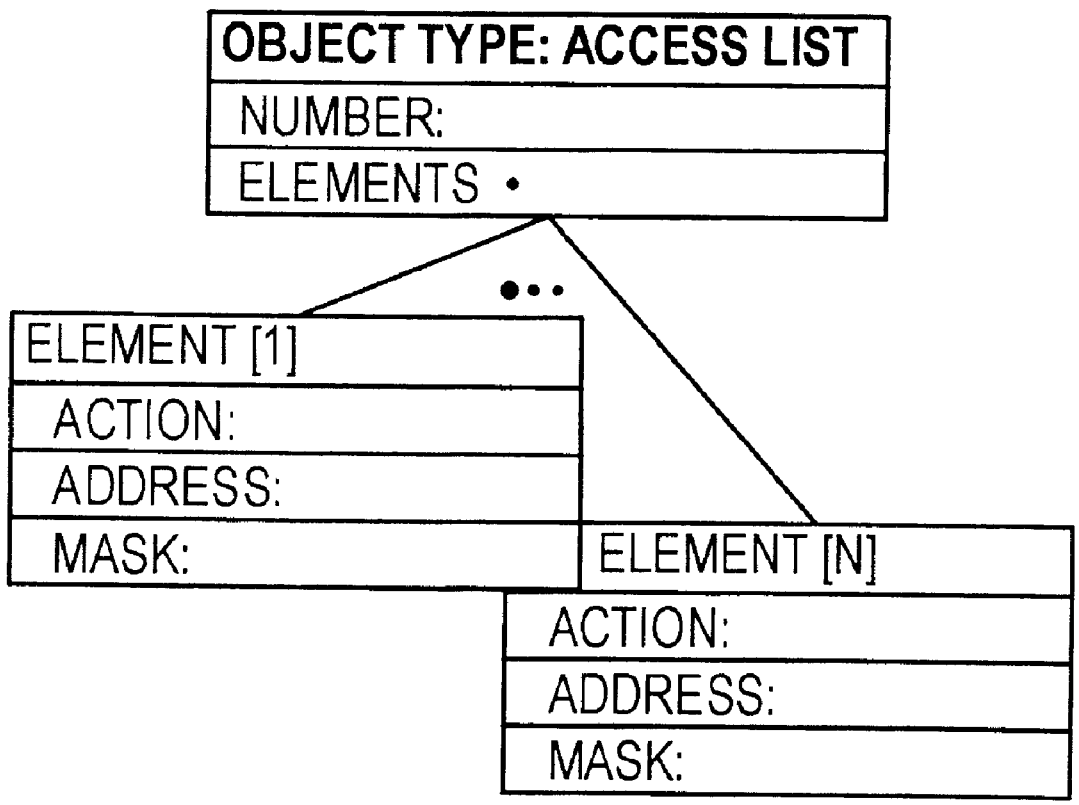
FIG. 54 shows the object data structure of the Access List object in attribute form.

FIG. 54 shows, in attribute form, an access list. An access list is indexed with a Number as an identifier. Access lists are maintained on the router and since the same access list may be used on a variety of ports, each port refers to it's associated access list by the identifier (Number), rather than redundantly storing the whole access list. The main part of an access list is its element objects. Access lists are processed by going from the first element down to the next element looking for a match, and if there is a match and the matching element has a permit action, the packet being matched gets through. If the matching element then has a "deny" action the matching packet does not get through. If all the elements in an access list is reached and no match is found, then the packet is blocked. What "matching" means depends on the protocol. For IP, the conditions for a match are as follows. For example, consider an element with the address set to 10.0.0.0 and the mask set to 0.255.255.255: For an access list element, 0 means consider the corresponding octet, while 255 means ignore it; so this pattern would match anything that starts with Octet 10 and match it regardless of what the last 3 octets are. Similarly, if the access list's address and mask were 10.20.0.0 and 0.0.25.25 respectively, this pattern would match anything that starts with a 10.20 regardless of the last 2 octets.

Figure 55:
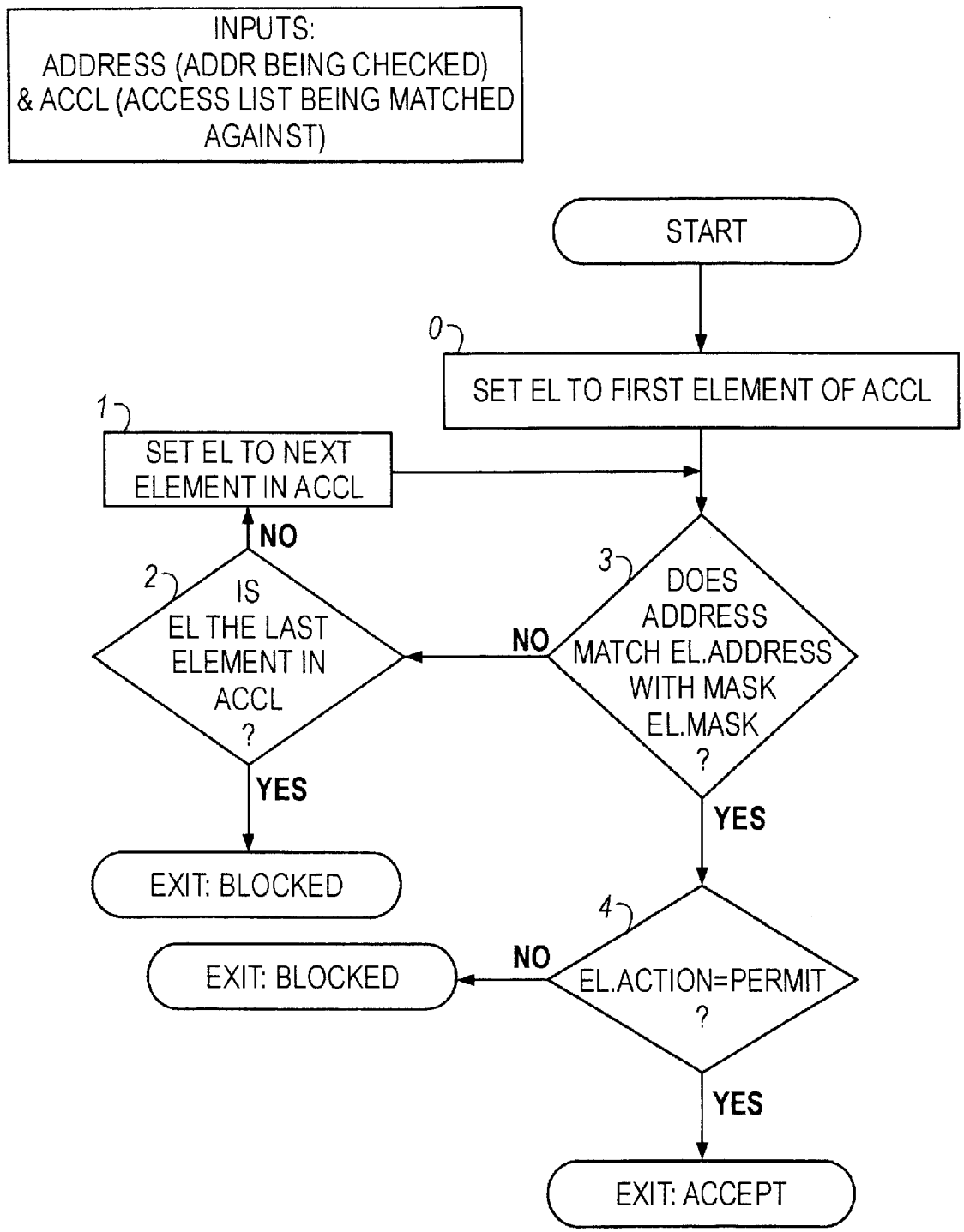
FIG. 55 is a flowchart showing the process of determining whether or not an element is blocked by an access list. This logic is invoked during the process shown as FIG. 1g.

FIG. 55 presents the flow chart that the invention follows to see if the addresses matches an access list Accl. In Step (1), we set EL to the first element in the access list. In Step (2) we ask, "does the address (addr) match the EL's address, given the elements mask. If the answer is "no", we go to Step (4) where we ask, is this the last element? If this is the case the process terminates saying that the status is "blocked". If the answer is no we set EL to the next element in the access list and proceed by going to Step (2). If the answer to Step (2) was "yes", then we ask the question, is the action associated with the matching element a "permit" ? If the answer is "yes", then the process exits saying the status is "accepting". If the answer is "no", the process exits with status blocked.

Figure 56:
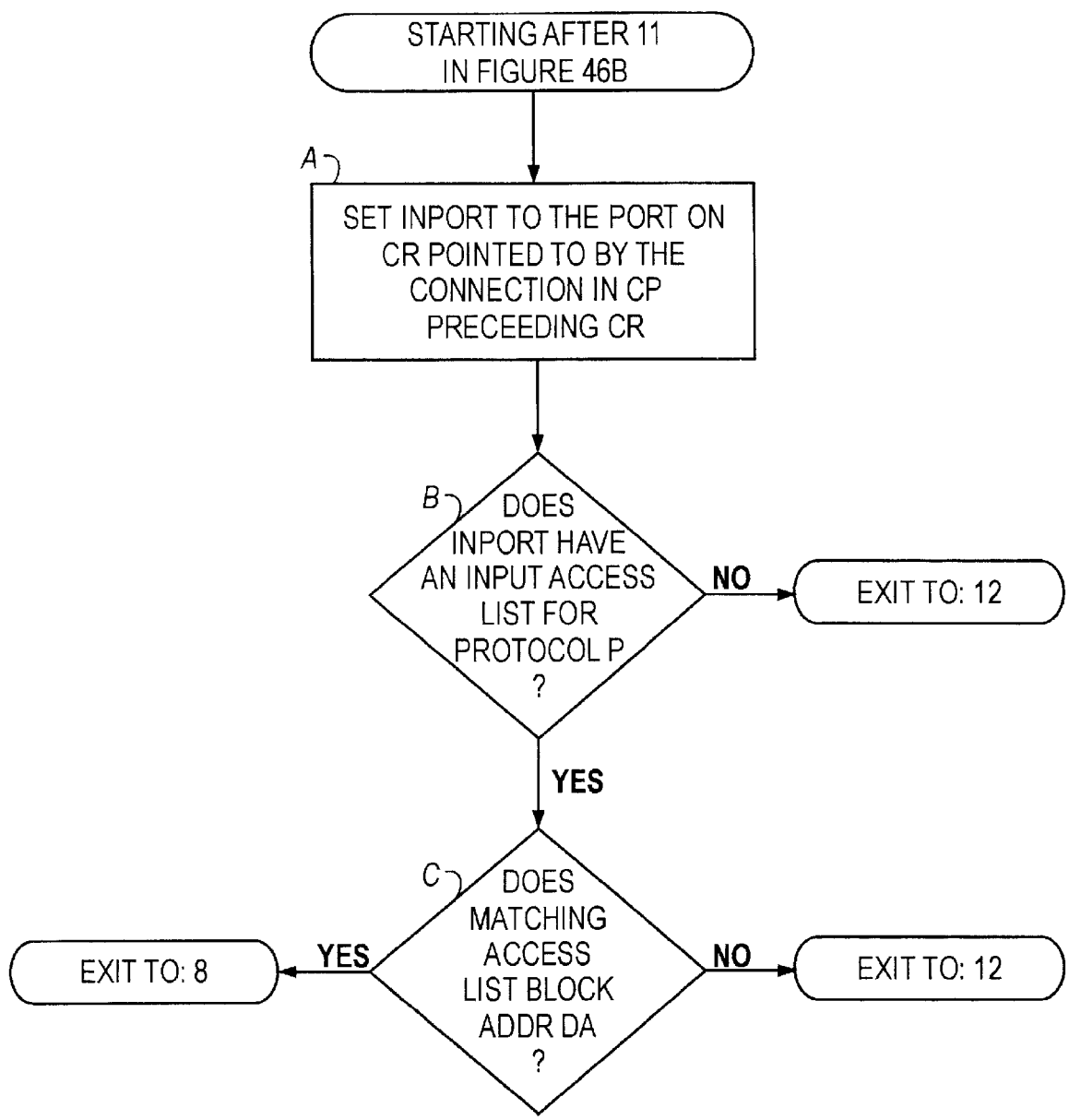
FIG. 56 is a flowchart that shows the modifications to the flowchart in FIG. 46 (which determines network connectivity) to take into account Input Access Lists.

As we mentioned, a complication that we have to factor into the flowchart in FIG. 46a–46c taking into account the access lists on both input and output ports. In FIG. 56 we show how we patch into Flowchart on FIG. 46 the logic that is need to process input access lists and in FIG. 57 we show how we further patch this flowchart to take into account output access lists.

The process shown in FIG. 56 is put in place starting from Step (11) in FIG. 46b. When we are at Step (7) in FIG. 46b, we are at the state where we take a path off the APS list and set CR to the current router, which is the router last in the path. After going to Step (11), rather than going directly to Step (12) we go to Step (A) as labeled in FIG. 56 and we set input port to the port on the current router pointed to by the connection in the current path right proceeding CR. So for the example you saw in FIG. 46b it would be the port that is connected to R5 that is pointed to by Conn[2]. Given this input port, we ask, "does this input port have an access list for the protocol under consideration?" So for our last example, it would be IP. If the answer is "no", we proceed as we did in the earlier example and go to Step (12). If the answer is "yes", then we ask at Step C, does the matching access list block the destination address (DA). If the answer is "no" (it doesn't block it), the packet gets through and proceed as normal and go on to Step (12). If it does block the packet then we go to Step (8) in 46b, which effectively means ignore the path being processed because we took it out of the APS; that is, by just going right to Step (8), we are dropping this path and going to the next one.

Figure 57:
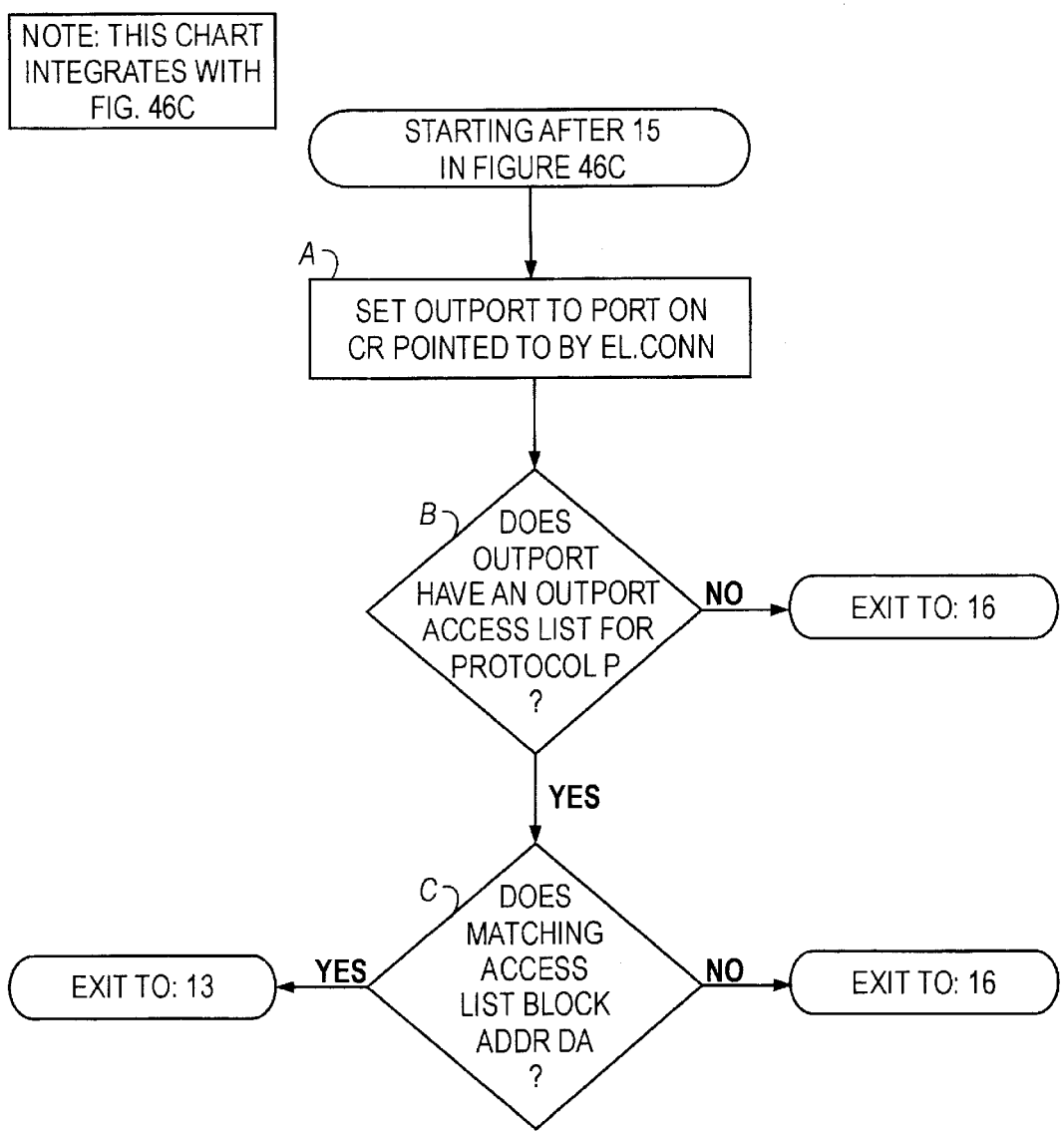
FIG. 57 is a flowchart that shows the modifications to the flowchart in FIG. 46 (which determines network connectivity) to take into account Output Access Lists.

FIG. 57 shows the modification we make to the flowchart in FIGS. 46a through 46c, to handle the complication of encountering output access lists. This process is integrated in at Step (15) in FIG. 46c. Setting context, after the point that we are processing an active path, we identify the current router; we then look to see if there is a matching element in its routing table that matches the destination address. If that is the case, then we set CPO to the set which shows how to get out the router. Then we set EL to the, one of these elements. Step (15) is at the state where we have a path (given by EL) out of the router. EL identifies a particular port, so in Step (A) we set output to the port mentioned by EL. Then we ask the question in Step (B), "does the output port have an access list for protocol P?" If the answer is "no", we proceed, doing nothing, and go to Step (16); if the answer is "yes" we try to match the destination address against the access list. If the answer is that it doesn't block it, we proceed as normal and go to Step (16), if the answer is it does block, then we go straight to Step (13), which has the effect of rejecting the path out of the current router given by EL. So for example, if you found a matching element with two ways out of the router, and both of them have access lists that block it, then we will drop all paths for the destination DA that go into the router.

Note that although an example has been provided in which matching takes place on destination address, matching can take place on other values as well. For example, as alternatives, matching can occur on the source address, the ports associated with a TCP packet, etc. So there are many conditions that can be applied and tested during the filtering. For the sake of illustration only, matching on the destination address was discussed above.

Figure 58:
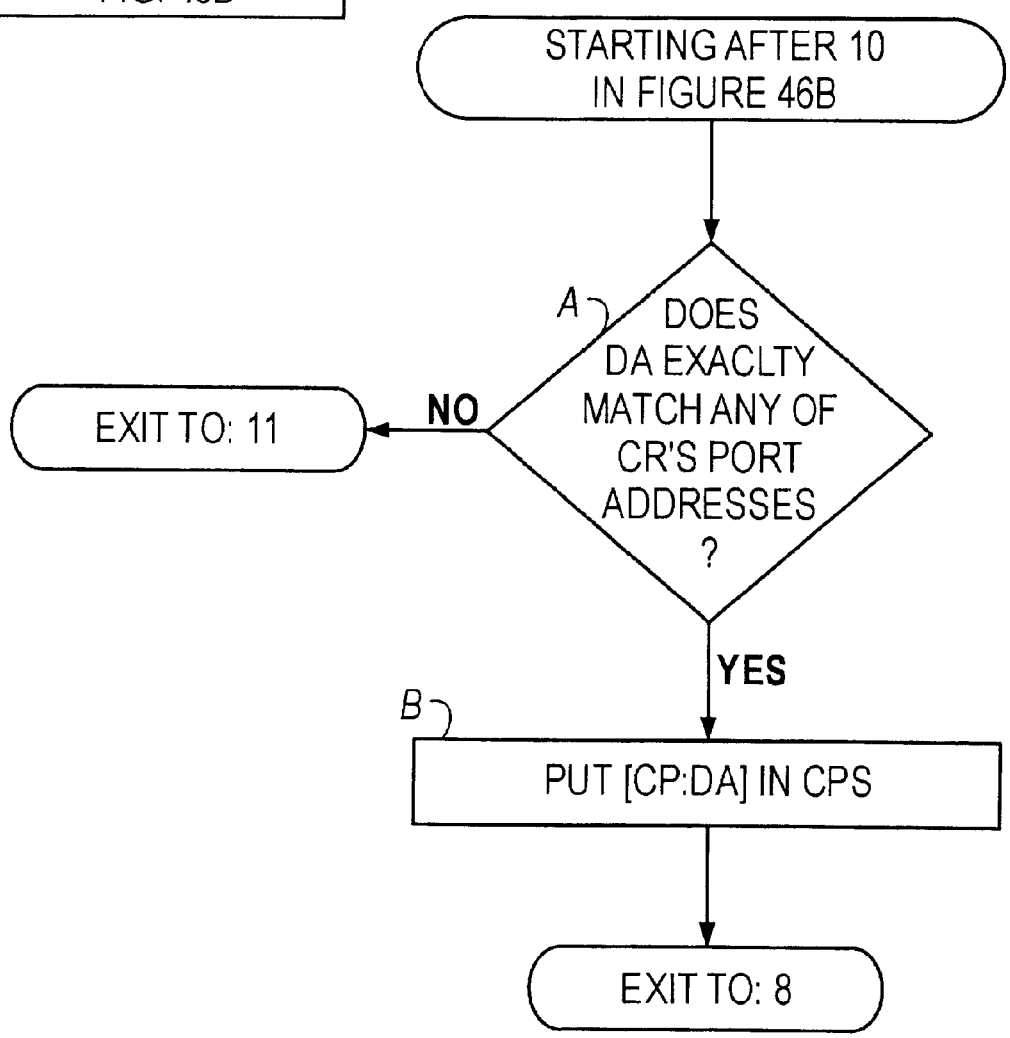
FIG. 58 is a flowchart of a modification the invention applied to the process shown in FIG. 46b to handle paths addressed to a router.

FIG. 58 depicts a graft to the flow chart for finding network paths (FIGS. 46a–c) to handle paths addressed to routers. To set context, at Step (1) in FIG. 46b, the procedure is at the stage where it is processing a path in the active path set (APS), referred to by CP and has just assigned the variable CR to the last router in this path. In FIG. 58, processing (for the graft) goes from Step 10 to Step (A), which determines whether the destination address DA exactly matches any of CR's port addresses. If the answer is "yes", then the path being processed is one that is addressed to router CR; consequently, processing moves to Step (B) where the path [CP;DA] (i.e., the active path, which has reached router CR, annotated with the destination address DA) is put into CPS, the set of completed paths; next processing goes to Step (8), shown in FIG. 46b, which checks if there is another active path to process.

If at Step (A), the algorithm determines that the pat is not addressed to router CR, processing continues as it would have for the non-grafted algorithm; that is, processing moves to Step (11), shown in FIG. 46b.

Figure 59:
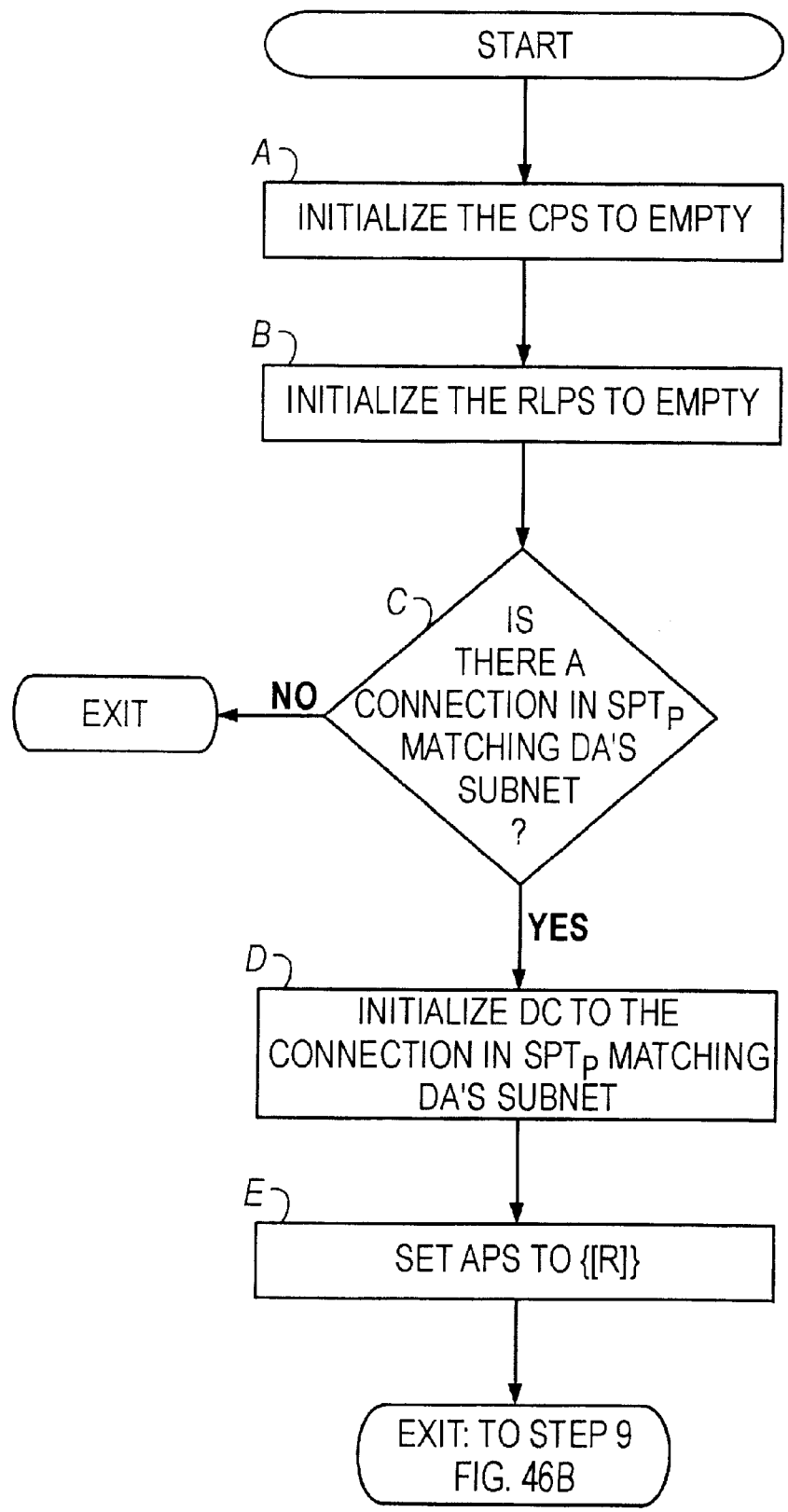
FIG. 59 is a flowchart of a process which is a variant to the process shown in FIG. 46a–c to handle a path starting from a router, instead of a host address.

FIG. 59 depicts a variant of the flowchart for finding network paths (FIGS. 46a–c) to handle paths starting at a router. The input to this procedure is a reference to a router R, a destination address DA, the SPT for the protocol associated with DA, the set of SROs that the SPT points to, and the routing tables (for the associated protocol) for each of the routers. In Step (A), the output set CPS, for Completed Path Set, is initialized to empty and at Step (B), the output RLPS, for Routing Loop Path Set, is set to empty. Step (C) checks whether the destination address has a connection in the SPT associated with it; if not, then processing terminates; otherwise Step (D) is reached where DC is set to the connection in SPT that address DA is associated with. At Step (E), the variable APS, for Active Path Set, is set to be a single element denoting a path starting at router R; processing then continues at Step (9), shown in FIG. 46b, which is the step in the main algorithm, which chooses a member of APS to process (that is, to try to extend to the destination address). Because there is only one element in APS, in Step (9), CP is set to that element (i.e., the path being "starting at R").

We have now described the process of, given a SPT the routing tables, a destination address and a source address, determining whether there exists one or more paths through the network. This is basic function that we are going to use in the following section, which describes the routing table integrity checks (FIG. 1).

In the general case, whether two hosts should communicate is an organizational specific need. There is no general rule saying this host should talk to this host. So we are introducing here a new type of integrity check where the user supplies an input, namely, the set of source and destination address that should communicate and the set of ones that should not. Given this set of "connection requirements", the invention simply applies the CPS algorithm to find if the source-destination pairs that should communicate have a CPS with one or more elements and the pairs that should not communicate produce an empty CPS. If the invention is given the connectivity requirement, SA should talk to DA and CPS is computed to be empty, then that is an integrity violation to be presented to the user. Conversely, if there is a requirement that SA should not be able to reach DA, but we find that there is a path, then we present this violation to the user.

Figure 65:
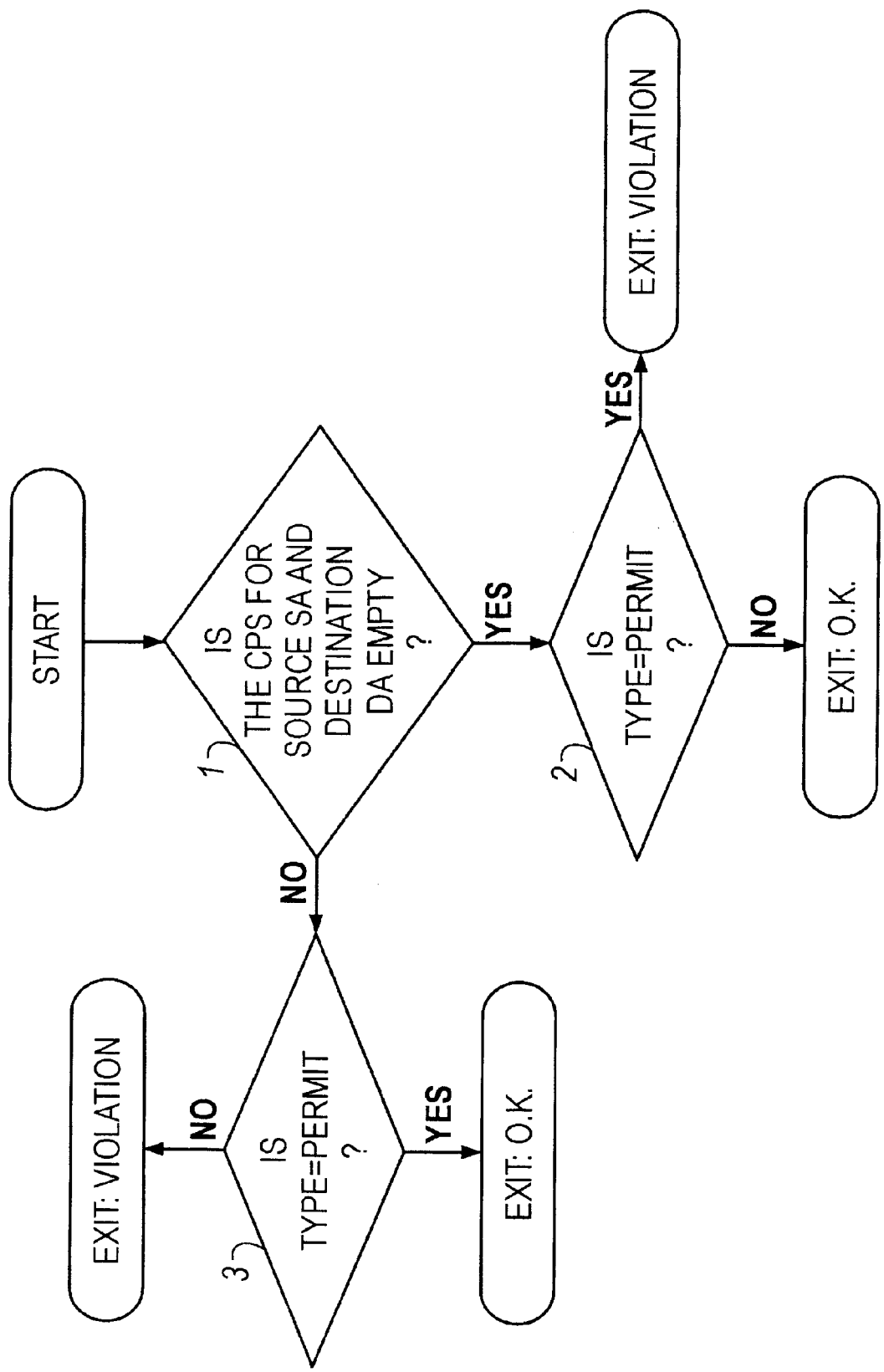
FIG. 65 shows a flowchart that computes the "User supplied connectivity requirements" integrity check. This is part of the phase shown as FIG. 1g.

FIG. 65 depicts the process for computing the "User Specified Requirements" integrity check; the input to this process is a source address SA, destination address DA, a TYPE variable, which is set to "Permit" or "Block" and the routing tables objects for each router in the list of SROs. The output is the state "OK" or "Violation". If TYPE is set to Permit then the output will be OK if and only if one or more paths exist from the source SA to the destination DA; conversely, if TYPE is set to Block then the output will be OK if and only if no paths exist from the source SA to the destination DA.

In Step (1) of the flowchart (FIG. 65), the procedure calls the subfunction described by the flowchart in 46a–c, which determines whether there is a path from a source address to a destination address given as input; if there is a path, then the output CPS, which is a set, will be non-empty (and contain the path(s)). At Step (1), the input to this procedure is SA as the source address and DA as the destination address. If the output (CPS) is empty, then there is no path and processing moves to Step (2), which returns Violation if TYPE is Permit and OK otherwise (i.e., when TYPE is set to Block). If CPS in Step (1) is not empty, then processing moves to Step (3), which returns OK if TYPE is Permit and Violation otherwise.

Figures 60, 61A, 61B:
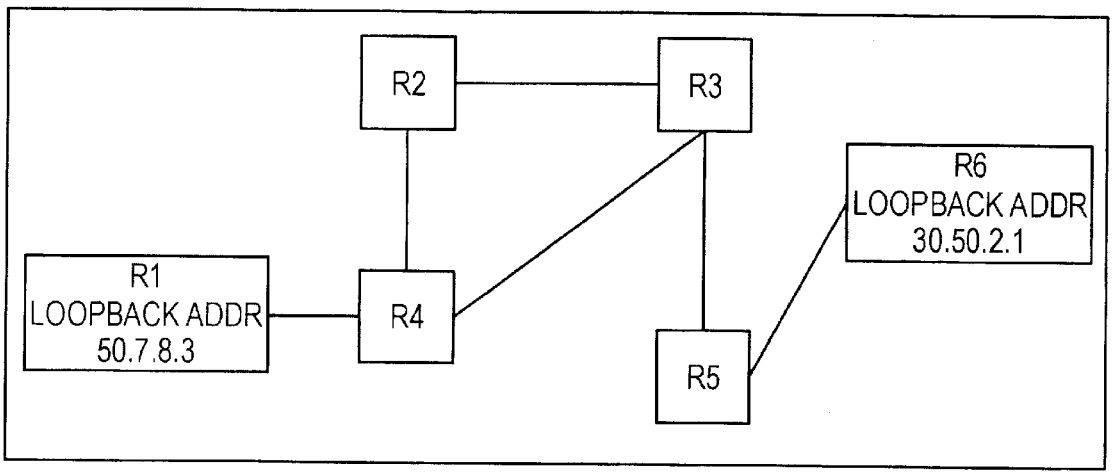
FIG. 60 is a topology rendering showing implicit RSRB connections that preface discussion and subsequent figures to show how the invention evaluates the quality of connectivity given instances of level 2 connectivity (i.e., bridging—or specifically Remote Source Route Bridging (RSRB)).
FIG. 61a is a sample router configuration file for Router R1 in FIG. 60.
FIG. 61b is a sample router configuration file for Router R6 in FIG. 60.

The integrity check just presented above required the user to give the pairs of source and destination addresses and specify whether or not they should communicate, since this is a organization specific requirement. The integrity checks prior to this were ones that were applicable regardless of the organization. These are typically patterns, if found, in the network are problems. For the case of paths, there are some examples (i.e. routing table integrity checks) where we have integrity checks that do not require asking the user to supply source and destination addresses. By virtue of some of the configurations of other options in the router, there are implicit requirements about routers that must communicate. One example relates to Remote Source Route Bridging (RSRB), when routers are configured to encapsulate source route bridge traffic (which is inherently OSI Model level 2) over an IP backbone. To do so, a set of routers are designated as SRB peers and within each of these routers' configuration there is a mention of peers that it needs to communicate with. By design, for example, these routers need to talk to each other over, for example, a TCP connection. Note the example in FIG. 60, 61a and 61b. This is an example of a network where we have two routers, router R1 and R6 that are configured as source route bridge peers. Router R1 mentions the address of router R6 and conversely R6 mentions an address associated with R1 saying that they are source route bridging peers and that they should talk using TCP.

Figure 62:
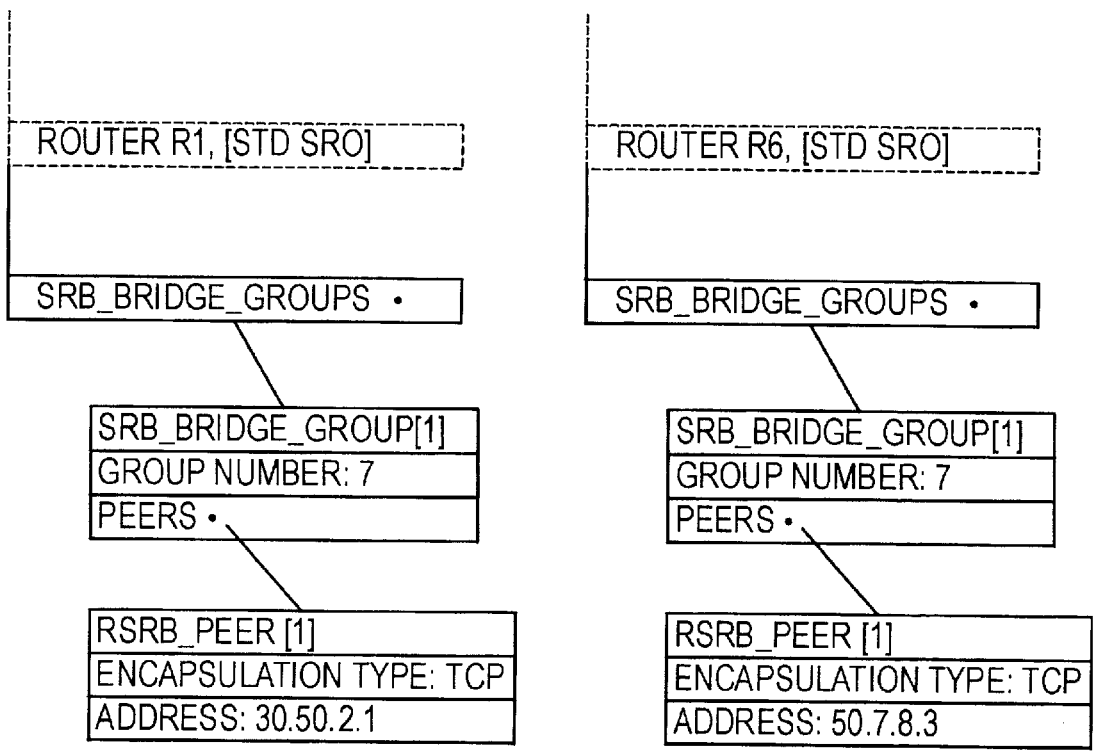
FIG. 62 shows the SRO excerpts focusing on the RSRB attributes for Routers R1 and R6 having configs in FIGS. 61a and 61b.

Reiterating, the routers communicate with TCP. So by virtue of the configuration you see in FIG. 61a and 61b (or looking in FIG. 62 where we show the RSRB fragments that are found on the SRO's of R1 and R6 respectively) we know that these routers should be able to communicate. In other words, we know there should be a path from router R1 to router R6 and vice versa. So there should be a path from 30.50.2.1 to 50.7.8.3, a path from R1 to R6, in both directions. So without asking the user which hosts, or which routers should communicate we are able to automatically infer connectivity requirements. So the integrity check associated with source route bridging simply looks at all the routers for RSRB peer statements and then applies the CPS algorithm for each of the routers that should peer together to find out if there is one or more path. If there is no path, for a RSRB pair, then an integrity violation is given to the user showing you, for example, that R1 and R6 cannot communicate although they are set up as RSRB peers.

There are a number of examples of these integrity checks that the invention includes. Another example stems from the use of the routing protocol BGP, which can mention a neighbor router which could be many hops away. In this case, by virtue of having the configuration mention a neighbor, we come up with a connectivity requirement saying that the router should be able to find a path to the neighbor. Another example is the use of static routes that mention an address that is not directly connected, and could be many hops away. In this situation we want to make sure that there is a one-way path from the router to the address that is mentioned. If there is any cases where we have a static route not having this property, a violation is flagged. So, in summary, by virtue of configuration, we are able to infer a number of connectivity requirements, and if these connectivity requirements are failed, the user is given a list of the violations.

Figure 63:
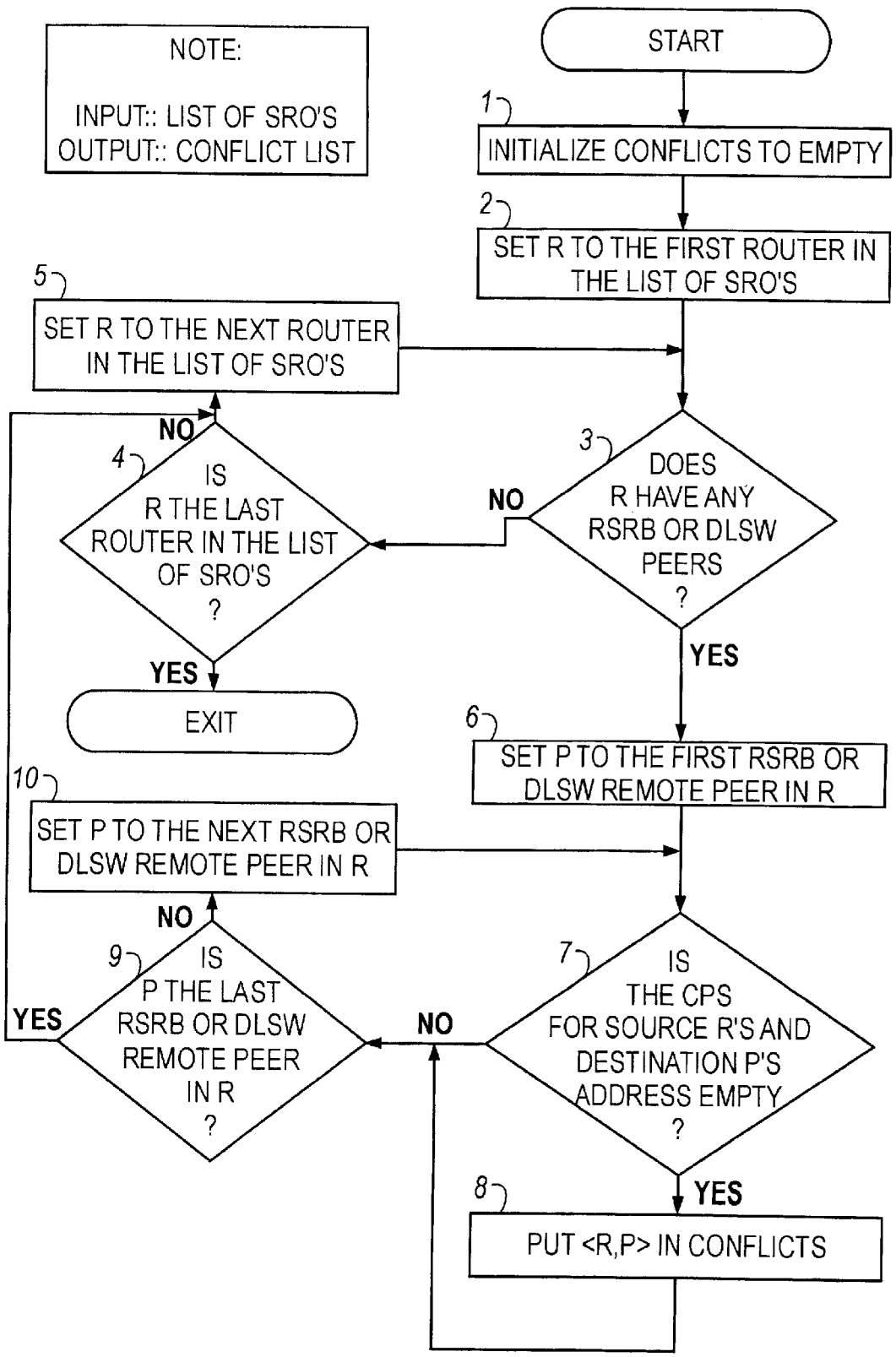
FIG. 63 shows a flowchart that computes the "RSRB/DLSw remote peers connectivity" integrity check, This is part of the phase shown as FIG. 1g.

FIG. 63 depicts the process for computing the "RSRB/DLSW Peer" integrity check; the input to this process is the SROs and routing tables objects for each router in the list of SROs. The output is the set Conflicts, which contains <Router, Remote Peer object>; if <R1,P1> is in Conflicts, this means that a connection cannot be established from router R1 to the address of the remote peer mentioned in P1.

In Step (1) of the flowchart in FIG. 63, the output Conflicts is initialized as an empty set. At Step (2), the variable R is set to the first router in the list of SROs and at Step (3), the question is asked whether R has any remote DLSW or RSRB peers. If the answer is "no", then processing moves to Step (4) to determine if there are any more routers that need processing; if there are more routers to process, then the algorithm goes to Step (5), setting R to the next router, and then to Step (3) to process this new router. If the answer to Step (3) is "yes" (i.e., router R has DLSW and/or RSRB peers), then processing moves to Step (6) where variable P is set to the first RSRB or DLSW remote peer object in R.

At Step (7), the procedure calls the subfunction described by the flowchart in 59, which determines whether there is a path from a router given as input to a destination given as input; if there is a path, then the output CPS, which is a set, will be non-empty (and contain the path(s)). At Step (7), the input to this procedure is R as the input router and the address mentioned in P as the destination address. If the output (CPS) is empty, then there is no path and processing moves to Step (8) where the pair consisting of R and P is put in the set Conflicts: processing next continues at Step (9), which checks whether R has any more RSRB or DLSW peers needing processing; if there are more remote peers to process, then the algorithm sets P to the next remote peer (at Step (10) and then moves to Step (7) to process this new peer. Now, if at Step (7), the result of computing CPS yields a non-empty set (i.e. there is a path from R to P's remote address), then processing goes straight to Step (9).

Figure 64:
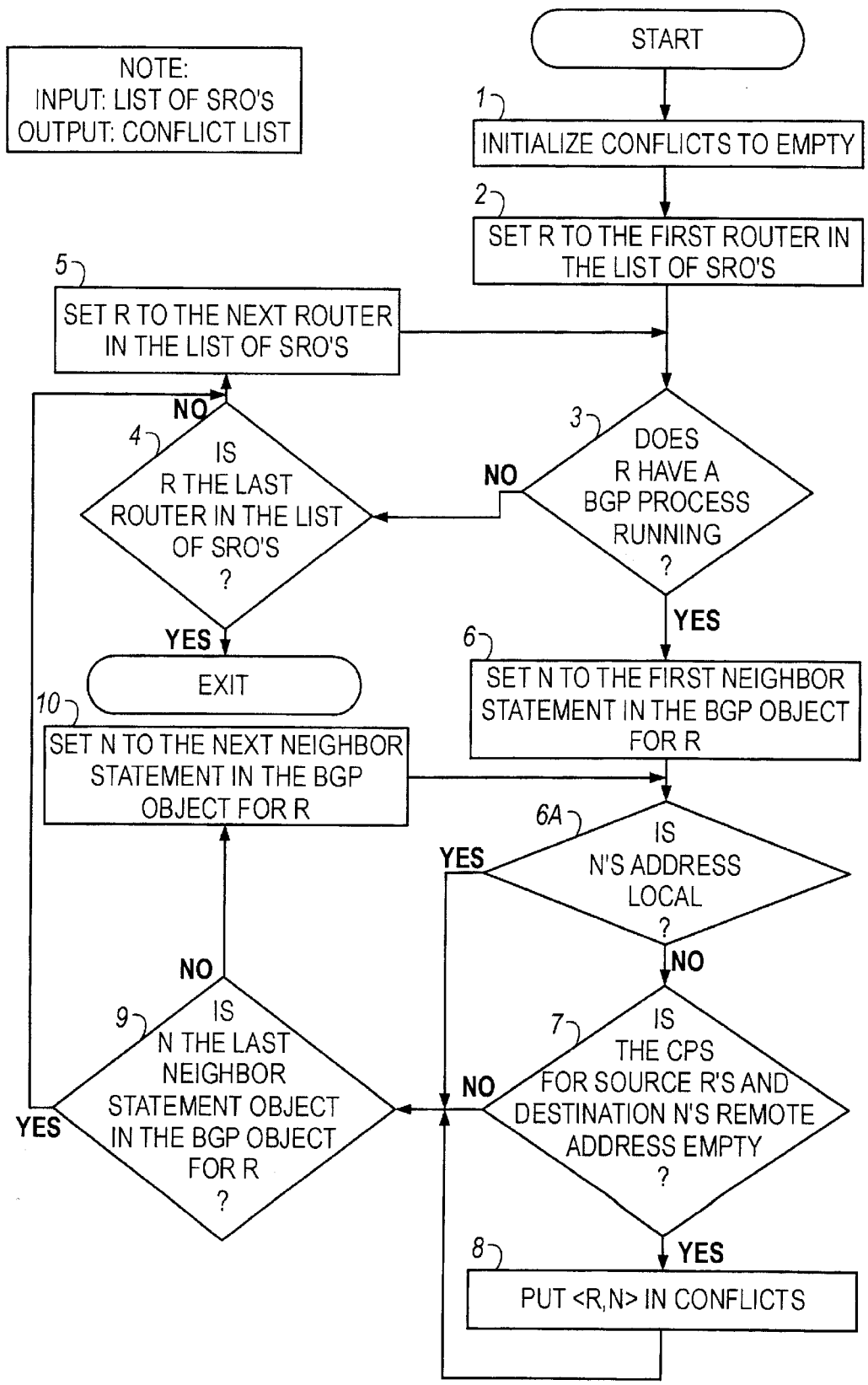
FIG. 64 shows a flowchart that computes the "BGP remote neighbors connectivity" integrity check. This is part of the phase shown as FIG. 1g.

FIG. 64 depicts the process for computing the "BGP Neighbor" integrity check; the input to this process is the SROs and routing tables objects for each router in the list of SROs. The output is the set Conflicts, which contains <Router, BGP Neighbor object>; if <R1,N1> is in Conflicts, this means that a connection cannot be established from router R1 to the address of the neighbor mentioned in N1.

In Step (1) of the flowchart in FIG. 64, the output Conflicts is initialized as an empty set. At Step (2), the variable R is set to the first router in the list of SROs and at Step (3), the question is asked whether R has A BGP process running. If the answer is "no", then processing moves to Step (4) to determine if there are any more routers that need processing; if there are more routers to process, then the algorithm goes to Step (5), setting R to the next router, and then to Step (3) to process this new router. If the answer to Step (3) is "yes" (i.e., router R has A BGP processing running), then processing moves to Step (6) where variable N is set to the first BGP neighbor object in R's BGP object.

At Step (6a), the invention checks whether N's address refers to a remote (i.e., more than 1 hop away router); if it does not, this neighbor does not need processing, and the algorithm moves to Step (9), which checks whether R has any more BGP Neighbor Objects to process; if there are more BGP process, then the algorithm sets P to the next remote peer (at Step (10) and then moves to Step (7) to process this new peer. Now, if at Step (6) it is determined that N has a remore address then processing goes to Step (7).

At Step (7), the procedure calls the subfunction described by the flowchart in 59, which determines whether there is a path from a router given as input to a destination given as input; At Step (7), the input to this procedure is R as the input router and the address mentioned in N as the destination address. If the output (CPS) is empty, then there is no path and processing moves to Step (8) where the pair consisting of R and N is put in the set Conflicts; processing next continues at Step (9) to process the next BGP Neighbor object with a remote address (if one exists). Now, if at Step (7), the result of computing CPS yields a non-empty set (i.e. there is a path from R to Ps remote address), then processing goes straight to Step (9).

Figure 66:
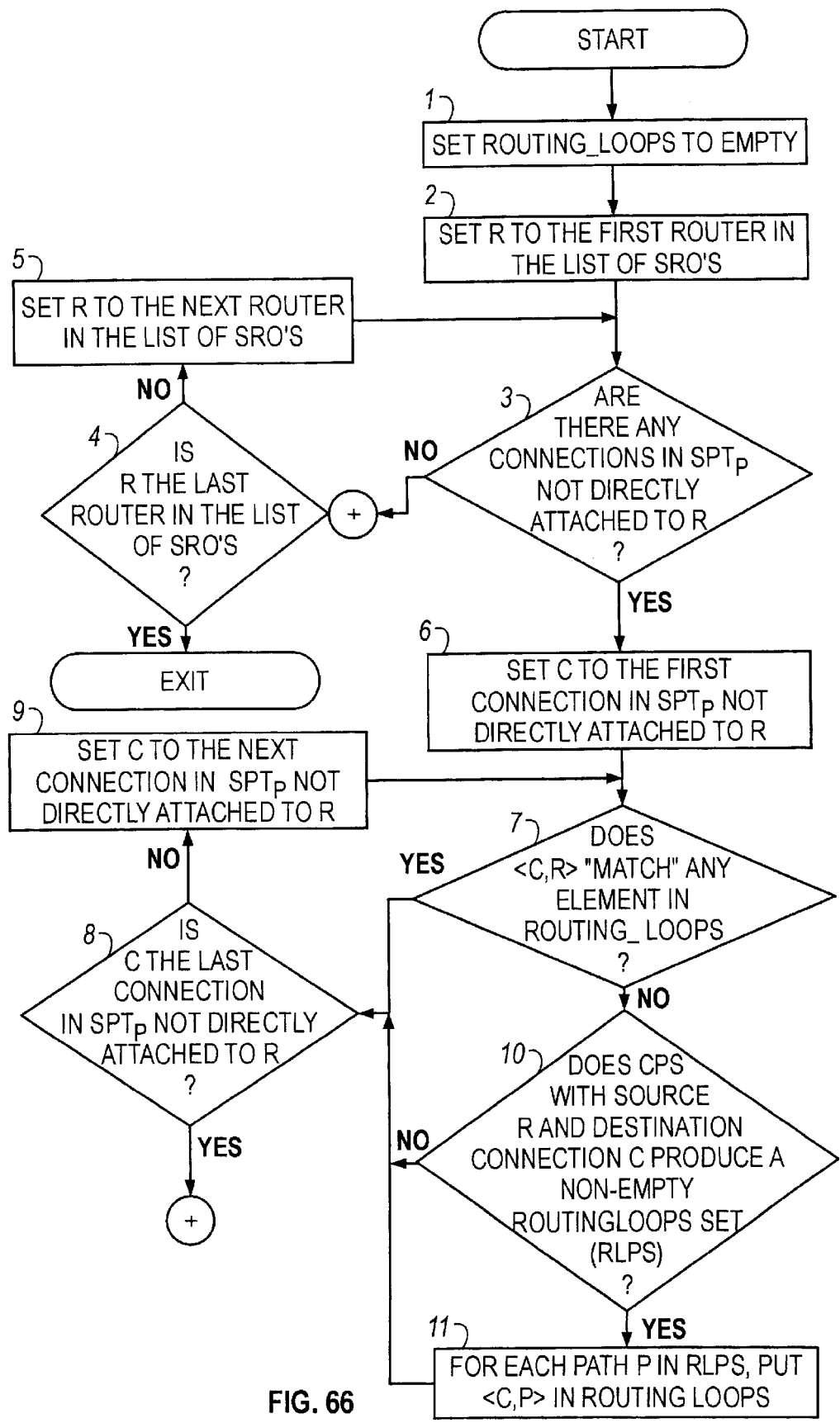
FIG. 66 shows a flowchart that computes the "Routing Loops" integrity check. This is apart of the phase shown in FIG. 1g.

FIG. 66 shows the inventions process for finding all routing loops for a protocol P. The input to this procedure is a SPT for protocol P, the list of SROs it points to and the set of routing tables for protocol P for each router in the list of SROs. The output is the set Routing_Loops which contains elements of the form <Conn,Pth> where Conn is a connection in the SPT and Pth is a path through the network having a routing loop for hosts on connection Conn.

In Step (1) of the flowchart in diagram 66, the output Routing_loops is set to empty. At Step (2), the variable R is set to the first router in the list of SROs given as input.

Step (3) checks whether there are any connections in the SPT for protocol P not directly attached to R. The reason for asking this question is because the algorithm will be trying to reach all connections from each router and there is no need to consider directly connected ones since they are trivially reachable. If the answer to Step (3) is "no" (i.e., all connections in SPT are connected to R, the processing moves to Step (4), which checks to see if the last router has been reached; if so, the process terminates, if not, processing moves to Step (5) where R is set to the next router (in the list of SROs) and the process repeats itself for this new router.

If the answer to Step (3) is "yes' then processing moves to Step (6) where variable C is set to the first connection in SPT that is not directly attached to R. Next, at Step (7), there is a check to see if a routing loop with connection C and Router R has already be found (which can happen for example, if there was an earlier router processed which in going to C went through R and ended in a loop). If a loop has already been found, there is no need to process Connection C starting at router R and thus execution continues at Step (8); at this, the invention checks whether there are any more connections (not directly attached to R) left to process; if so, processing goes to Step (9) where C is set to the next applicable connection and then processing continues for this new connection (still using router R as the starting point); on the other hand, if the answer to Step (6) is "no" (i.e., there are no more connection to process), then the procedure goes to Step (4) to see if there are any routers left to process.

Now, going back to Step (7); if the answer at this step is "no", meaning that a routing loop involving connection C and router R has not yet been found, then processing moves to Step (1). At Step (10), the procedure calls the subfunction described by the flowchart in 59, which determines whether there is a path from a router given as input to a destination address given as input and if not whether there is a routing loop; At Step (7), the input to this procedure is R, as the input router and C, the destination connection, which is given in place of a destination address, (note: It is trivial modification of FIG. 59 to use a destination connection, rather than a destination address, as input because essentially the only role of the destination address in the CPS procedure is as a handle at getting the destination connection (see Step (D) in FIG. 62.))

The result of the CPS computation at Step (7) will be both the CPS output and the routing loop set (RLPS) which will be empty if no routing loops are found. If RLPS is empty, then no problem has been found, and processing continues at Step (8), which checks if there is another connection to process (starting at router R) If RLPS is not empty, then processing goes to Step (11), where all the routing loop paths contained in RLPS are added to the output Routing Loops, each annotated with the destination connection that they are associated with (i.e. the connection C), processing then continues at Step (8).

While particular implementations of a presently preferred embodiment of the invention have been disclosed, described and illustrated in detail, it will be appreciated that various modifications to the preferred embodiment can be made without departing from the spirit and scope of the invention which is defined in the appended claims.

What is claimed is:

1. A method of analysis of an actual or planned routed computer network comprising:

producing structured routing device data in electronic memory which represents the actual or planned routed computer network and in which respective stored level three protocol routing device port addresses are associated with respective routing device names;

identifying based upon the structured routing device data respective first level three protocol subnets associated with respective first level three protocol port addresses, wherein identifying includes sequencing through the structured routing device data to identify respective level three port addresses associated with a first level three protocol and determining respective first level three protocol subnet functions associated with such identified first level three protocol port addresses in the actual or planned routed computer network as represented by the structured routing device data; and producing first connection information in electronic memory indicating respective associations between respective identified first level three protocol subnets and respective first level three protocol port addresses.

2. A method of analysis of an actual or planned routed computer network comprising:

producing structured routing device data in electronic memory which represents the actual or planned routed computer network and in which respective stored level three protocol routing device port addresses are associated with respective routing device names;

identifying based upon the structured routing device data respective first level three protocol subnets associated with respective first level three protocol port addresses;

producing first connection information in electronic memory indicating respective associations between respective identified first level three protocol subnets and respective first level three protocol port addresses;

identifying based upon the structured routing device data respective second level three protocol subnets associated with respective second level three protocol port addresses; and producing second connection information in electronic memory indicating respective associations between respective identified second level three protocol subnets and respective second level three protocol port addresses.

3. The method of claim 2, wherein identifying respective first level three protocol subnets includes sequencing through the structured routing device data to identify respective level three port addresses associated with a first level three protocol and determining respective first level three protocol subnet functions associated with such identified first level three port addresses in the actual or planned routed computer network as represented by the structured routing device data; and wherein identifying respective second level three protocol subnets includes sequencing through the structured routing device data to identify respective level three port addresses associated with a second level three protocol and determining respective second level three protocol subnet functions associated with such identified second level three port addresses in the actual or planned routed computer network as represented by the structured router data.

4. The method of claim 2, wherein producing first connection information includes producing in electronic memory respective first subnet information which represents respective identified first level three protocol subnets and which provides references between the respective first subnet information to associated first level three protocol port addresses in the structured routing device data; and wherein producing second connection information includes producing in electronic memory respective second subnet information which represents respective identified second level three protocol subnets and which provides references between the respective second subnet information and associated second level three protocol port addresses in the structured routing device data.

5. The method of claim 2 wherein each of the first and second protocols is a different one of, IP, IPX and AppleTalk.

6. A method of analysis of an actual or planned routed computer network comprising:

producing structured routing device data in electronic memory which represents the actual or planned routed computer network and in which respective stored level three protocol routing device port addresses are associated with respective routing device names;

identifying based upon the structured routing device data respective first level three protocol subnets associated with respective first level three protocol port addresses;

producing first connection information in electronic memory indicating respective associations between respective identified first level three protocol subnets and respective first level three protocol port addresses;

identifying based upon the structured routing device data respective second level three protocol subnets associated with respective second level three protocol port addresses;

producing second connection information in electronic memory indicating respective associations between respective identified second level three protocol subnets and respective second level three protocol port addresses;

identifying based upon the structured routing device data respective third level three protocol subnets associated with respective third level three protocol port addresses; and producing third connection information in electronic memory indicating respective associations between respective identified third level three protocol subnets and respective third level three protocol port addresses.

7. The method of claim 6, wherein identifying respective first subnets includes sequencing through the structured routing device data to identify respective level three port addresses associated with a first level three protocol and determining respective first level three protocol subnet functions associated with such identified first level three protocol port addresses in the actual or planned routed computer network as represented by the structured routing device data;

wherein identifying respective second subnets includes sequencing through the structured routing device data to identify respective level three port addresses associated with a second level three protocol and determining respective second level three protocol subnet functions associated with such identified second level three protocol port addresses in the actual or planned routed computer network as represented by the structured routing device data; and wherein identifying respective third subnets includes sequencing through the structured routing device data to identify respective level three port addresses associated with a third level three protocol and determining respective third level three protocol subnet functions associated with such identified third level three port addresses in the actual or planned routed computer network as represented by the structured routing device data.

8. The method of claim 6, wherein producing first connection information includes producing in electronic memory respective first subnet information which represents respective identified first level three protocol subnets and which provides respective references between the respective first subnet information and associated first level three protocol port addresses in the structured routing device data;

wherein producing second connection information includes producing in electronic memory respective second subnet information which represents respective identified second level three protocol subnets and which provides respective references between the respective second subnet information and associated second level three protocol port addresses in the structured routing device data; and wherein producing third connection information includes producing in electronic memory respective third subnet information which represents respective identified third level three protocol subnets and which provides respective references between the respective third subnet information and associated third level three protocol port addresses in the structured router data.

9. The method of claim 6 wherein each of the first, second and third protocols is a different one of, IP, IPX and AppleTalk.

10. A method of analysis of an actual or planned routed computer network comprising:

producing structured routing device data in electronic memory in which respective stored level three protocol routing device port addresses are associated with respective routing device names from the actual or planned routed computer network;

identifying respective first level three protocol subnets associated with first level three port addresses in the actual or planned routed computer network as represented by the structured routing device data;

identifying respective second level three protocol subnets associated with second level three port addresses in the actual or planned routed computer network as represented by the structured routing device data;

identifying respective third level three protocol subnets associated with third level three port addresses in the actual or planned routed computer network as represented by the structured router data;

producing first subnet information in electronic memory representing respective first level three protocol subnets and references to associated first level three protocol port addresses in the structured routing device data;

producing second subnet information in electronic memory representing respective identified second level three protocol subnets and references to associated second level three protocol port addresses in the structured routing device data; and producing third subnet information in electronic memory representing respective identified third level three protocol subnets and references to associated third level three protocol port addresses in the structured routing device data.

11. A method of analysis of an actual or planned routed computer network comprising:

producing structured routing device data in electronic memory which corresponds to the actual or planned routed computer network and which associates respective level three protocol routing device port addresses with respective routing device names;

identifying based upon the structured data multiple respective first level three protocol subnets respectively associated with respective first level three protocol port addresses;

producing first subnet information in electronic memory that represents respective first identified level three protocol subnets and that references associated first level three protocol port addresses in the structured routing device data that respectively belong to respective represented first level three protocol subnets;

identifying based upon the structured routing device data multiple respective second level three protocol subnets respectively associated with respective second level three protocol port addresses; and producing second subnet information in electronic memory that represents the respective second identified level three protocol subnets and that references associated second level three protocol port address in the structured routing device data that respectively belong to respective represented second level three protocol subnets.

12. The method of claim 11, wherein producing first structured subnet information includes producing in electronic memory respective stored representations of multiple different first level three protocol subnets and producing respective links in electronic memory between respective first subnet representations and respective associated first level three protocol port addresses in the structured routing device data;

wherein producing second structured subnet information includes producing in electronic memory respective stored representations of multiple different second level three protocol subnets and producing respective links in electronic memory between respective second subnet representations and respective associated second level three protocol port addresses in the structured routing device data.

13. A method of analysis of an actual or planned routed computer network comprising:

producing structured routing device data in electronic memory which corresponds to the actual or planned routed computer network and which associates respective level three protocol routing device port addresses with respective routing device names;

identifying based upon the structured data multiple respective first level three protocol subnets respectively associated with respective first level three protocol port addresses;

producing first subnet information in electronic memory that represents respective first identified level three protocol subnets and that references associated first level three protocol port addresses in the structured routing device data that respectively belong to respective represented first level three protocol subnets;

identifying based upon the structured routing device data multiple respective second level three protocol subnets respectively associated with respective second level three protocol port addresses;

producing second subnet information in electronic memory that represents the respective second identified level three protocol subnets and that references associated second level three protocol port addresses in the structured routing device data that respectively belong to respective represented second level three protocol subnets;

identifying based upon the structured routing device data multiple respective third level three protocol subnets respectively associated with respective third level three protocol port addresses; and producing third subnet information in electronic memory that represents the respective third identified level three protocol subnets and that references associated third level three protocol port addresses in the structured routing device data that respectively belong to respective represented third level three protocol subnets.

14. The method of claim 13, wherein producing first structured subnet information includes producing in electronic memory respective stored representations of multiple different first level three protocol subnets and producing respective links in electronic memory between respective first subnet representations and respective associated first level three protocol port addresses in the structured routing device data;

wherein producing second structured subnet information includes producing in electronic memory respective stored representations of multiple different second level three protocol subnets and producing respective links in electronic memory between respective second subnet representations and respective associated second level three protocol port addresses in the structured routing device data;

wherein producing third structured subnet information includes producing in electronic memory respective stored representations of multiple different third level three protocol subnets and producing respective links in electronic memory between respective third level three protocol subnet representations and respective associated third level three protocol port addresses in the structured routing device data.

15. A method of analysis of an actual or planned routed computer network comprising:

producing structured routing device data in electronic memory which corresponds to the actual or planned routed computer network and which associates respective level three protocol routing device port addresses with respective routing device names;

identifying based upon the structured data multiple respective first level three protocol subnets respectively associated with respective first level three protocol port addresses;

producing in electronic memory first subnet information which includes respective stored representations of multiple different first level three protocol subnets;

producing respective references in electronic memory between respective first subnet representations and respective first level three protocol port addresses such that such respective references represent respective connections between respective routing device ports in the actual or planned routed network;

producing in electronic memory second subnet information which includes respective stored representations of multiple different second level three protocol subnets; and producing respective references in electronic memory between respective second subnet representations and respective second level three protocol port addresses such that such respective references represent respective connections between respective routing device ports in the actual or planned routed network.

16. The method of claim 15 further comprising:

producing in electronic memory third subnet information which includes respective stored representations of multiple different third level three protocol subnets; and producing respective references in electronic memory between respective third subnet representations and respective third level three protocol port addresses such that such respective references represent respective connections between respective router ports in the actual or planned routed network.

17. A method of analyzing a routed computer network, comprising the computer-implemented steps of:

creating and storing structured routing device data in electronic memory which represents the routed computer network and in which stored level three protocol routing device port addresses are associated with corresponding routing device names;

identifying, based upon the structured routing device data, one or more first level three protocol subnets that are associated with corresponding first level three protocol port addresses, by sequencing through the structured routing device data to identify level three port addresses that are associated with a first level three protocol subnet and determining respective first level three protocol subnet functions associated with such identified first level three protocol port addresses in the routed computer network; and creating and storing first connection information in electronic memory indicating one or more associations between the first level three protocol subnets that have been identified and corresponding first level three protocol port addresses.

18. A method as recited in claim 17, further comprising the steps of:

identifying, based upon the structured routing device data, one or more second level three protocol subnets that are associated with corresponding second level three protocol port addresses; and creating and storing second connection information in electronic memory indicating one or more associations between the second level three protocol subnets that have been identified and corresponding second level three protocol port addresses.

19. A method as recited in claim 17, wherein the step of identifying first level three protocol subnets includes the steps of sequencing through the structured routing device data to identify one or more level three port addresses that are associated with a first level three protocol, and determining one or more first level three protocol subnet functions that are associated with the first level three port addresses that are identified.

20. A method as recited in claim 17, wherein the step of identifying second level three protocol subnets includes the steps of sequencing through the structured routing device data to identify one or more level three port addresses that are associated with a second level three protocol, and determining one or more second level three protocol subnet functions that are associated with the first level three port addresses that are identified.

21. A method as recited in claim 17, wherein the step of creating and storing first connection information includes the step of creating and storing first subnet information that represents the first level three protocol subnets that have been identified, and that includes one or more references between the first subnet information and corresponding first level three protocol port addresses in the structured routing device data.

22. A method as recited in claim 17, wherein the step of creating and storing second connection information includes the step of creating and storing second subnet information that represents the second level three protocol subnets that have been identified, and that includes one or more references between the second subnet information and corresponding second level three protocol port addresses in the structured routing device data.

23. A method as recited in claim 17, further comprising the steps of:
  identifying, based upon the structured routing device data, one or more second level three protocol subnets associated with corresponding second level three protocol port addresses;
  creating and storing second connection information in electronic memory that indicates one or more associations between the second level three protocol subnets that have been identified and one or more second level three protocol port addresses;
  identifying, based upon the structured routing device data, one or more third level three protocol subnets associated with corresponding third level three protocol port addresses;
  creating and storing third connection information in electronic memory that indicates one or more associations between the third level three protocol subnets that have been identified and one or more third level three protocol port addresses.

24. A method as recited in claim 17, further comprising the steps of:
  creating and storing in electronic memory second subnet information that includes one or more stored representations of one or more different second level three protocol subnets; and
  creating and storing references in electronic memory between the second subnet representations and corresponding second level three protocol port addresses, wherein the references represent corresponding connections between routing device ports in the network.

25. A computer-readable medium carrying one or more sequences of instructions for analyzing a routed computer network, wherein execution of the one or more sequences of instructions by one or more processors causes the one or more processors to perform the steps of:
  creating and storing structured routing device data in electronic memory which represents the routed computer network and in which stored level three protocol routing device port addresses are associated with corresponding routing device names;
  identifying, based upon the structured routing device data, one or more first level three protocol subnets that are associated with corresponding first level three protocol port addresses, by sequencing through the structured routing device data to identify level three port addresses that are associated with a first level three protocol subnet and determining respective first level three protocol subnet functions associated with such identified first level three protocol port addresses in the routed computer network; and
  creating and storing first connection information in electronic memory indicating one or more associations between the first level three protocol subnets that have been identified and corresponding first level three protocol port addresses.

26. A computer-readable medium as recited in claim 25, further comprising instructions which, when executed by the one or more processors, cause the one or more processors to carry out the steps of:
  identifying, based upon the structured routing device data, one or more second level three protocol subnets that are associated with corresponding second level three protocol port addresses; and
  creating and storing second connection information in electronic memory indicating one or more associations between the second level three protocol subnets that have been identified and corresponding second level three protocol port addresses.

27. A computer-readable medium as recited in claim 25, wherein the instructions for carrying out the steps of identifying first level three protocol subnets include instructions for carrying out the steps of sequencing through the structured routing device data to identify one or more level three port addresses that are associated with a first level three protocol, and determining one or more first level three protocol subnet functions that are associated with the first level three port addresses that are identified.

28. A computer-readable medium as recited in claim 25, wherein the instructions for carrying out the steps of identifying second level three protocol subnets include instructions for carrying out the steps of sequencing through the structured routing device data to identify one or more level three port addresses that are associated with a second level three protocol, and determining one or more second level three protocol subnet functions that are associated with the first level three port addresses that are identified.

29. A computer-readable medium as recited in claim 25, wherein the instructions for carrying out the step of creating and storing first connection information include instructions for carrying out the step of creating and storing first subnet information that represents the first level three protocol subnets that have been identified, and that includes one or more references between the first subnet information and corresponding first level three protocol port addresses in the structured routing device data.

30. A computer-readable medium as recited in claim 25, wherein the instructions for carrying out the step of creating and storing second connection information include instructions for carrying out the step of creating and storing second subnet information that represents the second level three protocol subnets that have been identified, and that includes one or more references between the second subnet information and corresponding second level three protocol port addresses in the structured routing device data.

31. A computer-readable medium as recited in claim 25, further comprising instructions for carrying out the steps of:
  identifying, based upon the structured routing device data, one or more second level three protocol subnets associated with corresponding second level three protocol port addresses;

creating and storing second connection information in electronic memory that indicates one or more associations between the second level three protocol subnets that have been identified and one or more second level three protocol port addresses;

identifying, based upon the structured routing device data, one or more third level three protocol subnets associated with corresponding third level three protocol port addresses;

creating and storing third connection information in electronic memory that indicates one or more associations between the third level three protocol subnets that have been identified and one or more third level three protocol port addresses.

32. A computer-readable medium as recited in claim 25, further comprising instructions for carrying out the steps of:

creating and storing in electronic memory second subnet information that includes one or more stored representations of one or more different second level three protocol subnets; and creating and storing references in electronic memory between the second subnet representations and corresponding second level three protocol port addresses, wherein the references represent corresponding connections between routing device ports in the network.

33. An apparatus for analyzing a routed computer network, comprising:

means for creating and storing structured routing device data in electronic memory which represents the routed computer network and in which stored level three protocol routing device port addresses are associated with corresponding routing device names;

means for identifying, based upon the structured routing device data, one or more first level three protocol subnets that are associated with corresponding first level three protocol port addresses, by sequencing through the structured routing device data to identify level three port addresses that are associated with a first level three protocol subnet and determining respective first level three protocol subnet functions associated with such identified first level three protocol port addresses in the routed computer network; and means for creating and storing first connection information in electronic memory indicating one or more associations between the first level three protocol subnets that have been identified and corresponding first level three protocol port addresses.

34. An apparatus for analyzing a routed computer network, comprising:

one or more processors;

one or more storage devices that are accessible to the processors for storing data therein;

one or more sequences of instructions stored in the one or more storage devices, which instructions, when executed by the one or more processors, cause the one or more processors to carry out the steps of:

creating and storing structured routing device data in electronic memory which represents the routed computer network and in which stored level three protocol routing device port addresses are associated with corresponding routing device names;

identifying, based upon the structured routing device data, one or more first level three protocol subnets that are associated with corresponding first level three protocol port addresses, by sequencing through the structured routing device data to identify level three port addresses that are associated with a first level three protocol subnet and determining respective first level three protocol subnet functions associated with such identified first level three protocol port addresses in the routed computer network; and creating and storing first connection information in electronic memory indicating one or more associations between the first level three protocol subnets that have been identified and corresponding first level three protocol port addresses.

* * * * *